US008988312B2

(12) United States Patent
Satou et al.

(10) Patent No.: US 8,988,312 B2
(45) Date of Patent: Mar. 24, 2015

(54) DISPLAY CONTROLLER, DISPLAY DEVICE, IMAGE PROCESSING METHOD, AND IMAGE PROCESSING PROGRAM

(71) Applicant: NLT Technologies, Ltd., Kanagawa (JP)

(72) Inventors: Tetsushi Satou, Kanagawa (JP); Kazunori Masumura, Kanagawa (JP); Koji Shigemura, Kanagawa (JP); Shinichi Uehara, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 14/309,534

(22) Filed: Jun. 19, 2014

(65) Prior Publication Data

US 2015/0015592 A1 Jan. 15, 2015

Related U.S. Application Data

(62) Division of application No. 12/760,145, filed on Apr. 14, 2010, now Pat. No. 8,797,231.

(30) Foreign Application Priority Data

Apr. 15, 2009 (JP) ................................ 2009-099340
Mar. 24, 2010 (JP) ................................ 2010-067645
Mar. 24, 2010 (JP) ................................ 2010-067646

(51) Int. Cl.
*G09G 5/00* (2006.01)
*G09G 3/36* (2006.01)
(Continued)

(52) U.S. Cl.
CPC .............. *G09G 3/3607* (2013.01); *G09G 3/003* (2013.01); *H04N 13/0404* (2013.01); *H04N 13/0422* (2013.01); *G09G 2300/0452* (2013.01); *G09G 2320/0247* (2013.01)
USPC ................................ 345/1.1; 345/1.3; 345/9

(58) Field of Classification Search
CPC ............... G09G 3/003; H04N 13/04–13/0497; G02B 27/22–27/2292; G02B 27/24; G02B 27/26
USPC ........... 345/1.1–1.3, 7–9; 348/42–60; 349/15; 362/462–477
See application file for complete search history.

(56) References Cited

U.S. PATENT DOCUMENTS 6,545,653 B1 4/2003 Takahara et al.
7,233,347 B2 6/2007 Jones et al.
(Continued)

FOREIGN PATENT DOCUMENTS

CN 1877409 A 12/2006
CN 101153961 A 4/2008
(Continued)

OTHER PUBLICATIONS

Office Action dated Oct. 30, 2012, issued by the Chinese Patent Office in counterpart Chinese Patent Application No. 201010164439.X.

(Continued)

*Primary Examiner* — Gene W Lee
(74) *Attorney, Agent, or Firm* — Sughrue Mion, PLLC

(57) ABSTRACT

To overcome issues generated due to the light-shield part in a display device which displays different images towards a plurality of viewpoints, and to provide a device for easily synthesizing images to be displayed on a display part. A display controller includes: an image memory which stores viewpoint image data for a plurality of viewpoints; a writing control device which writes the viewpoint image data inputted from outside to the image memory; a parameter storage device which stores parameters showing a positional relation between a lenticular lens and the display part; and a readout control device which reads out the viewpoint image data from the image memory according to a readout order obtained by applying the parameters to a repeating regulation that is determined based on layout of the sub-pixels, number of colors, and layout of the colors, and outputs it to the display module as synthesized image data.

8 Claims, 134 Drawing Sheets

(51) Int. Cl.
*G09G 3/00* (2006.01)
*H04N 13/04* (2006.01)

(56) References Cited

U.S. PATENT DOCUMENTS

| | | | |
|---|---|---|---|
| 7,471,274 | B2 | 12/2008 | Kim |
| 7,965,365 | B2 | 6/2011 | Uehara et al. |
| 7,969,544 | B2 | 6/2011 | Uehara et al. |
| 7,995,166 | B2 | 8/2011 | Uehara |
| 8,149,359 | B2 | 4/2012 | Uehara |
| 8,379,178 | B2 | 2/2013 | Uehara et al. |
| 8,446,355 | B2 | 5/2013 | Uehara et al. |
| 8,446,554 | B2 | 5/2013 | Uehara et al. |
| 8,587,757 | B2 | 11/2013 | Uehara et al. |
| 8,614,774 | B2 | 12/2013 | Uehara et al. |
| 2006/0012593 | A1 | 1/2006 | Iriguchi et al. |
| 2006/0050385 | A1 | 3/2006 | Uehara et al. |
| 2006/0082574 | A1 | 4/2006 | Tsubaki |
| 2006/0114394 | A1 | 6/2006 | Yamzaki |
| 2008/0068516 | A1 | 3/2008 | Mori et al. |
| 2008/0079678 | A1 | 4/2008 | Cho et al. |
| 2008/0094700 | A1 | 4/2008 | Uehara |
| 2008/0278641 | A1 | 11/2008 | Uehara |
| 2009/0096726 | A1 | 4/2009 | Uehara et al. |
| 2009/0096943 | A1 | 4/2009 | Uehara et al. |
| 2009/0167846 | A1 | 7/2009 | Niioka et al. |
| 2009/0257119 | A1 | 10/2009 | Uehara |
| 2011/0205623 | A1 | 8/2011 | Uehara et al. |
| 2011/0234556 | A1 | 9/2011 | Uehara et al. |
| 2011/0273769 | A1 | 11/2011 | Uehara |
| 2011/0304601 | A1 | 12/2011 | Niioka et al. |
| 2012/0113100 | A1 | 5/2012 | Niioka et al. |
| 2012/0163700 | A1 | 6/2012 | Ikeda |
| 2013/0076723 | A1 | 3/2013 | Niioka et al. |
| 2013/0128363 | A1 | 5/2013 | Uehara et al. |
| 2013/0181891 | A1 | 7/2013 | Uehara et al. |
| 2013/0229394 | A1 | 9/2013 | Uehara et al. |
| 2014/0036185 | A1 | 2/2014 | Uehara et al. |

FOREIGN PATENT DOCUMENTS

| | | | |
|---|---|---|---|
| EP | 1909509 | A2 | 4/2008 |
| JP | 7-5420 | A | 1/1995 |
| JP | 08-292419 | A | 11/1996 |
| JP | 2004-274485 | A | 9/2004 |
| JP | 2005-208567 | A | 8/2005 |
| JP | 2006-115246 | A | 4/2006 |
| JP | 2006-308864 | A | 11/2006 |
| JP | 2007-078923 | A | 3/2007 |
| JP | 2008/001825 | A1 | 1/2008 |
| JP | 2008-109607 | A | 5/2008 |
| JP | 2008-249887 | A | 10/2008 |
| JP | 2009-098311 | A | 5/2009 |

OTHER PUBLICATIONS

Extended European Search Report, dated Apr. 11, 2013, issued by the European Patent Office in counterpart European Application No. 12/760,145.

Japanese Office Action issued Sep. 17, 2013 in corresponding Japanese Patent Application No. 2010-067646.

"Nikkei Electronics" Jan. 6, 2003, pp. 26-27, No. 838. (http:/ne.nikkeibp.co.jp).

STRUCTURE OF UP-AND-DOWN SUB-PIXEL PAIR P2R

EQUIVALENT CIRCUIT OF UP-AND-DOWN SUB-PIXEL PAIR P2R

EQUIVALENT CIRCUIT OF FIG. 3

STRUCTURE OF UP-AND-DOWN SUB-PIXEL PAIR P2L

EQUIVALENT CIRCUIT OF UP-AND-DOWN SUB-PIXEL PAIR P2L

FIG. 6

| | | | | | |
|---|---|---|---|---|---|
| M1 (1, 1) RGB | M1 (1, 2) RGB | M1 (1, 3) RGB | M1 (1, 4) RGB | M1 (1, 5) RGB | M1 (1, 6) RGB |
| M1 (2, 1) RGB | M1 (2, 2) RGB | M1 (2, 3) RGB | M1 (2, 4) RGB | M1 (2, 5) RGB | M1 (2, 6) RGB |
| M1 (3, 1) RGB | M1 (3, 2) RGB | M1 (3, 3) RGB | M1 (3, 4) RGB | M1 (3, 5) RGB | M1 (3, 6) RGB |
| M1 (4, 1) RGB | M1 (4, 2) RGB | M1 (4, 3) RGB | M1 (4, 4) RGB | M1 (4, 5) RGB | M1 (4, 6) RGB |

M1: FIRST VIEWPOINT IMAGE DATA
(FOR LEFT EYE)

| | | | | | |
|---|---|---|---|---|---|
| M2 (1, 1) RGB | M2 (1, 2) RGB | M2 (1, 3) RGB | M2 (1, 4) RGB | M2 (1, 5) RGB | M2 (1, 6) RGB |
| M2 (2, 1) RGB | M2 (2, 2) RGB | M2 (2, 3) RGB | M2 (2, 4) RGB | M2 (2, 5) RGB | M2 (2, 6) RGB |
| M2 (3, 1) RGB | M2 (3, 2) RGB | M2 (3, 3) RGB | M2 (3, 4) RGB | M2 (3, 5) RGB | M2 (3, 6) RGB |
| M2 (4, 1) RGB | M2 (4, 2) RGB | M2 (4, 3) RGB | M2 (4, 4) RGB | M2 (4, 5) RGB | M2 (4, 6) RGB |

M2: SECOND VIEWPOINT IMAGE DATA
(FOR RIGHT EYE)

INPUT IMAGE DATA

POLARITY DISTRIBUTION : LAYOUT PATTERN 2

DATA LINE POLARITY : GATE LINE INVERSION DRIVE (1H INVERSION DRIVE)

| | D1 | D2 | D3 | D4 | D5 | D6 | D7 |
|---|---|---|---|---|---|---|---|
| G1 | + | + | + | + | + | + | + |
| G2 | − | − | − | − | − | − | − |
| G3 | + | + | + | + | + | + | + |
| G4 | − | − | − | − | − | − | − |
| G5 | + | + | + | + | + | + | + |
| G6 | − | − | − | − | − | − | − |
| G7 | + | + | + | + | + | + | + |
| G8 | − | − | − | − | − | − | − |
| G9 | + | + | + | + | + | + | + |
| G10 | − | − | − | − | − | − | − |
| G11 | + | + | + | + | + | + | + |
| G12 | − | − | − | − | − | − | − |
| G13 | + | + | + | + | + | + | + |

POLARITY DISTRIBUTION :
LAYOUT PATTERN 2

DATA LINE POLARITY : GATE 2-LINE
INVERSION DRIVE (2H INVERSION DRIVE)

| | D1 | D2 | D3 | D4 | D5 | D6 | D7 |
|---|---|---|---|---|---|---|---|
| G1 | + | + | + | + | + | + | + |
| G2 | + | + | + | + | + | + | + |
| G3 | − | − | − | − | − | − | − |
| G4 | − | − | − | − | − | − | − |
| G5 | + | + | + | + | + | + | + |
| G6 | + | + | + | + | + | + | + |
| G7 | − | − | − | − | − | − | − |
| G8 | − | − | − | − | − | − | − |
| G9 | + | + | + | + | + | + | + |
| G10 | + | + | + | + | + | + | + |
| G11 | − | − | − | − | − | − | − |
| G12 | − | − | − | − | − | − | − |
| G13 | + | + | + | + | + | + | + |

POLARITY DISTRIBUTION :
LAYOUT PATTERN 2

DATA LINE POLARITY :
DOT INVERSION DRIVE

| | D1 | D2 | D3 | D4 | D5 | D6 | D7 |
|---|---|---|---|---|---|---|---|
| G1 | + | − | + | − | + | − | + |
| G2 | − | + | − | + | − | + | − |
| G3 | + | − | + | − | + | − | + |
| G4 | − | + | − | + | − | + | − |
| G5 | + | − | + | − | + | − | + |
| G6 | − | + | − | + | − | + | − |
| G7 | + | − | + | − | + | − | + |
| G8 | − | + | − | + | − | + | − |
| G9 | + | − | + | − | + | − | + |
| G10 | − | + | − | + | − | + | − |
| G11 | + | − | + | − | + | − | + |
| G12 | − | + | − | + | − | + | − |
| G13 | + | − | + | − | + | − | + |

DATA LINE POLARITY :
DOT INVERSION DRIVE

| | D1 | D2 | D3 | D4 | D5 | D6 | D7 |
|---|---|---|---|---|---|---|---|
| G1 | + | − | + | − | + | − | + |
| G2 | − | + | − | + | − | + | − |
| G3 | + | − | + | − | + | − | + |
| G4 | − | + | − | + | − | + | − |
| G5 | + | − | + | − | + | − | + |
| G6 | − | + | − | + | − | + | − |
| G7 | + | − | + | − | + | − | + |
| G8 | − | + | − | + | − | + | − |
| G9 | + | − | + | − | + | − | + |
| G10 | − | + | − | + | − | + | − |
| G11 | + | − | + | − | + | − | + |
| G12 | − | + | − | + | − | + | − |
| G13 | + | − | + | − | + | − | + |

DATA LINE POLARITY : VERTICAL 2-DOT INVERSION DRIVE

| | D1 | D2 | D3 | D4 | D5 | D6 | D7 |
|---|---|---|---|---|---|---|---|
| G1 | + | - | + | - | + | - | + |
| G2 | + | - | + | - | + | - | + |
| G3 | - | + | - | + | - | + | - |
| G4 | - | + | - | + | - | + | - |
| G5 | + | - | + | - | + | - | + |
| G6 | + | - | + | - | + | - | + |
| G7 | - | + | - | + | - | + | - |
| G8 | - | + | - | + | - | + | - |
| G9 | + | - | + | - | + | - | + |
| G10 | + | - | + | - | + | - | + |
| G11 | - | + | - | + | - | + | - |
| G12 | - | + | - | + | - | + | - |
| G13 | + | - | + | - | + | - | + |

FIG. 18

SYNTHESIZED IMAGE DATA 1 : LAYOUT PATTERN 1

| Gy \ Dx | D1 | D2 | D3 | D4 | D5 | D6 | D7 | D8 | D9 | D10 | D11 | D12 | D13 |
|---|---|---|---|---|---|---|---|---|---|---|---|---|---|
| G1 | | M1 (1, 1)R | | M1 (1, 2)R | | M1 (1, 3)R | | M1 (1, 4)R | | M1 (1, 5)R | | M1 (1, 6)R | |
| G2 | M2 (1, 1)G | M2 (1, 1)R | M2 (1, 2)G | M2 (1, 2)R | M2 (1, 3)G | M2 (1, 3)R | M2 (1, 4)G | M2 (1, 4)R | M2 (1, 5)G | M2 (1, 5)R | M2 (1, 6)G | M2 (1, 6)R | |
| G3 | | M1 (1, 1)B | M1 (1, 1)G | M1 (1, 2)B | M1 (1, 2)G | M1 (1, 3)B | M1 (1, 3)G | M1 (1, 4)B | M1 (1, 4)G | M1 (1, 5)B | M1 (1, 5)G | M1 (1, 6)B | M1 (1, 6)G |
| G4 | M2 (2, 1)R | M2 (1, 1)B | M2 (2, 2)R | M2 (1, 2)B | M2 (2, 3)R | M2 (1, 3)B | M2 (2, 4)R | M2 (1, 4)B | M2 (2, 5)R | M2 (1, 5)B | M2 (2, 6)R | M2 (1, 6)B | |
| G5 | | M1 (2, 1)G | M1 (2, 1)R | M1 (2, 2)G | M1 (2, 2)R | M1 (2, 3)G | M1 (2, 3)R | M1 (2, 4)G | M1 (2, 4)R | M1 (2, 5)G | M1 (2, 5)R | M1 (2, 6)G | M1 (2, 6)R |
| G6 | M2 (2, 1)B | M2 (2, 1)G | M2 (2, 2)B | M2 (2, 2)G | M2 (2, 3)B | M2 (2, 3)G | M2 (2, 4)B | M2 (2, 4)G | M2 (2, 5)B | M2 (2, 5)G | M2 (2, 6)B | M2 (2, 6)G | |
| G7 | | M1 (3, 1)R | M1 (2, 1)B | M1 (3, 2)R | M1 (2, 2)B | M1 (3, 3)R | M1 (2, 3)B | M1 (3, 4)R | M1 (2, 4)B | M1 (3, 5)R | M1 (2, 5)B | M1 (3, 6)R | M1 (2, 6)B |
| G8 | M2 (3, 1)G | M2 (3, 1)R | M2 (3, 2)G | M2 (3, 2)R | M2 (3, 3)G | M2 (3, 3)R | M2 (3, 4)G | M2 (3, 4)R | M2 (3, 5)G | M2 (3, 5)R | M2 (3, 6)G | M2 (3, 6)R | |
| G9 | | M1 (3, 1)B | M1 (3, 1)G | M1 (3, 2)B | M1 (3, 2)G | M1 (3, 3)B | M1 (3, 3)G | M1 (3, 4)B | M1 (3, 4)G | M1 (3, 5)B | M1 (3, 5)G | M1 (3, 6)B | M1 (3, 6)G |
| G10 | M2 (4, 1)R | M2 (3, 1)B | M2 (4, 2)R | M2 (3, 2)B | M2 (4, 3)R | M2 (3, 3)B | M2 (4, 4)R | M2 (3, 4)B | M2 (4, 5)R | M2 (3, 5)B | M2 (4, 6)R | M2 (3, 6)B | |
| G11 | | M1 (4, 1)G | M1 (4, 1)R | M1 (4, 2)G | M1 (4, 2)R | M1 (4, 3)G | M1 (4, 3)R | M1 (4, 4)G | M1 (4, 4)R | M1 (4, 5)G | M1 (4, 5)R | M1 (4, 6)G | M1 (4, 6)R |
| G12 | M2 (4, 1)B | M2 (4, 1)G | M2 (4, 2)B | M2 (4, 2)G | M2 (4, 3)B | M2 (4, 3)G | M2 (4, 4)B | M2 (4, 4)G | M2 (4, 5)B | M2 (4, 5)G | M2 (4, 6)B | M2 (4, 6)G | |
| G13 | | | M1 (4, 1)B | | M1 (4, 2)B | | M1 (4, 3)B | | M1 (4, 4)B | | M1 (4, 5)B | | M1 (4, 6)B |

FIG. 19

SYNTHESIZED IMAGE DATA 2 : LAYOUT PATTERN 2

| Gy \ Dx | D1 | D2 | D3 | D4 | D5 | D6 | D7 | D8 | D9 | D10 | D11 | D12 | D13 |
|---|---|---|---|---|---|---|---|---|---|---|---|---|---|
| G1 | | | M1 (1, 1)R | | M1 (1, 2)R | | M1 (1, 3)R | | M1 (1, 4)R | | M1 (1, 5)R | | M1 (1, 6)R |
| G2 | M2 (1, 1)R | M2 (1, 1)G | M2 (1, 2)R | M2 (1, 2)G | M2 (1, 3)R | M2 (1, 3)G | M2 (1, 4)R | M2 (1, 4)G | M2 (1, 5)R | M2 (1, 5)G | M2 (1, 6)R | M2 (1, 6)G | |
| G3 | | M1 (1, 1)G | M1 (1, 1)B | M1 (1, 2)G | M1 (1, 2)B | M1 (1, 3)G | M1 (1, 3)B | M1 (1, 4)G | M1 (1, 4)B | M1 (1, 5)G | M1 (1, 5)B | M1 (1, 6)G | M1 (1, 6)B |
| G4 | M2 (1, 1)B | M2 (2, 1)R | M2 (1, 2)B | M2 (2, 2)R | M2 (1, 3)B | M2 (2, 3)R | M2 (1, 4)B | M2 (2, 4)R | M2 (1, 5)B | M2 (2, 5)R | M2 (1, 6)B | M2 (2, 6)R | |
| G5 | | M1 (2, 1)R | M1 (2, 1)G | M1 (2, 2)R | M1 (2, 2)G | M1 (2, 3)R | M1 (2, 3)G | M1 (2, 4)R | M1 (2, 4)G | M1 (2, 5)R | M1 (2, 5)G | M1 (2, 6)R | M1 (2, 6)G |
| G6 | M2 (2, 1)G | M2 (2, 1)B | M2 (2, 2)G | M2 (2, 2)B | M2 (2, 3)G | M2 (2, 3)B | M2 (2, 4)G | M2 (2, 4)B | M2 (2, 5)G | M2 (2, 5)B | M2 (2, 6)G | M2 (2, 6)B | |
| G7 | | M1 (2, 1)B | M1 (3, 1)R | M1 (2, 2)B | M1 (3, 2)R | M1 (2, 3)B | M1 (3, 3)R | M1 (2, 4)B | M1 (3, 4)R | M1 (2, 5)B | M1 (3, 5)R | M1 (2, 6)B | M1 (3, 6)R |
| G8 | M2 (3, 1)R | M2 (3, 1)G | M2 (3, 2)R | M2 (3, 2)G | M2 (3, 3)R | M2 (3, 3)G | M2 (3, 4)R | M2 (3, 4)G | M2 (3, 5)R | M2 (3, 5)G | M2 (3, 6)R | M2 (3, 6)G | |
| G9 | | M1 (3, 1)G | M1 (3, 1)B | M1 (3, 2)G | M1 (3, 2)B | M1 (3, 3)G | M1 (3, 3)B | M1 (3, 4)G | M1 (3, 4)B | M1 (3, 5)G | M1 (3, 5)B | M1 (3, 6)G | M1 (3, 6)B |
| G10 | M2 (3, 1)B | M2 (4, 1)R | M2 (3, 2)B | M2 (4, 2)R | M2 (3, 3)B | M2 (4, 3)R | M2 (3, 4)B | M2 (4, 4)R | M2 (3, 5)B | M2 (4, 5)R | M2 (3, 6)B | M2 (4, 6)R | |
| G11 | | M1 (4, 1)R | M1 (4, 1)G | M1 (4, 2)R | M1 (4, 2)G | M1 (4, 3)R | M1 (4, 3)G | M1 (4, 4)R | M1 (4, 4)G | M1 (4, 5)R | M1 (4, 5)G | M1 (4, 6)R | M1 (4, 6)G |
| G12 | M2 (4, 1)G | M2 (4, 1)B | M2 (4, 2)G | M2 (4, 2)B | M2 (4, 3)G | M2 (4, 3)B | M2 (4, 4)G | M2 (4, 4)B | M2 (4, 5)G | M2 (4, 5)B | M2 (4, 6)G | M2 (4, 6)B | |
| G13 | | M1 (4, 1)B | | M1 (4, 2)B | | M1 (4, 3)B | | M1 (4, 4)B | | M1 (4, 5)B | | M1 (4, 6)B | |

FIG. 20

SYNTHESIZED IMAGE DATA 3 : LAYOUT PATTERN 3

| Gy \ Dx | D1 | D2 | D3 | D4 | D5 | D6 | D7 | D8 | D9 | D10 | D11 | D12 | D13 |
|---|---|---|---|---|---|---|---|---|---|---|---|---|---|
| G1 | | M1 (1, 1)R | | | M1 (1, 2)R | M1 (1, 3)R | | | M1 (1, 4)R | M1 (1, 5)R | | | M1 (1, 6)R |
| G2 | M2 (1, 1)R | M2 (1, 1)G | M2 (1, 2)G | M2 (1, 2)R | M2 (1, 3)R | M2 (1, 3)G | M2 (1, 4)G | M2 (1, 4)R | M2 (1, 5)R | M2 (1, 5)G | M2 (1, 6)G | M2 (1, 6)R | |
| G3 | | M1 (1, 1)G | M1 (1, 1)B | M1 (1, 2)B | M1 (1, 2)G | M1 (1, 3)G | M1 (1, 3)B | M1 (1, 4)B | M1 (1, 4)G | M1 (1, 5)G | M1 (1, 5)B | M1 (1, 6)B | M1 (1, 6)G |
| G4 | M2 (2, 1)R | M2 (1, 1)B | M2 (1, 2)B | M2 (2, 2)R | M2 (2, 3)R | M2 (1, 3)B | M2 (1, 4)B | M2 (2, 4)R | M2 (2, 5)R | M2 (1, 5)B | M2 (1, 6)B | M2 (2, 6)R | |
| G5 | | M1 (2, 1)G | M1 (2, 1)R | M1 (2, 2)R | M1 (2, 2)G | M1 (2, 3)G | M1 (2, 3)R | M1 (2, 4)R | M1 (2, 4)G | M1 (2, 5)G | M1 (2, 5)R | M1 (2, 6)R | M1 (2, 6)G |
| G6 | M2 (2, 1)G | M2 (2, 1)B | M2 (2, 2)B | M2 (2, 2)G | M2 (2, 3)G | M2 (2, 3)B | M2 (2, 4)B | M2 (2, 4)G | M2 (2, 5)G | M2 (2, 5)B | M2 (2, 6)B | M2 (2, 6)G | |
| G7 | | M1 (2, 1)B | M1 (3, 1)R | M1 (3, 2)R | M1 (2, 2)B | M1 (2, 3)B | M1 (3, 3)R | M1 (3, 4)R | M1 (2, 4)B | M1 (2, 5)B | M1 (3, 5)R | M1 (3, 6)R | M1 (2, 6)B |
| G8 | M2 (3, 1)G | M2 (3, 1)R | M2 (3, 2)R | M2 (3, 2)G | M2 (3, 3)G | M2 (3, 3)R | M2 (3, 4)R | M2 (3, 4)G | M2 (3, 5)G | M2 (3, 5)R | M2 (3, 6)R | M2 (3, 6)G | |
| G9 | | M1 (3, 1)B | M1 (3, 1)G | M1 (3, 2)G | M1 (3, 2)B | M1 (3, 3)B | M1 (3, 3)G | M1 (3, 4)G | M1 (3, 4)B | M1 (3, 5)B | M1 (3, 5)G | M1 (3, 6)G | M1 (3, 6)B |
| G10 | M2 (3, 1)B | M2 (4, 1)R | M2 (4, 2)R | M2 (3, 2)B | M2 (3, 3)B | M2 (4, 3)R | M2 (4, 4)R | M2 (3, 4)B | M2 (3, 5)B | M2 (4, 5)R | M2 (4, 6)R | M2 (3, 6)B | |
| G11 | | M1 (4, 1)R | M1 (4, 1)G | M1 (4, 2)G | M1 (4, 2)R | M1 (4, 3)R | M1 (4, 3)G | M1 (4, 4)G | M1 (4, 4)R | M1 (4, 5)R | M1 (4, 5)G | M1 (4, 6)G | M1 (4, 6)R |
| G12 | M2 (4, 1)B | M2 (4, 1)G | M2 (4, 2)G | M2 (4, 2)B | M2 (4, 3)B | M2 (4, 3)G | M2 (4, 4)G | M2 (4, 4)B | M2 (4, 5)B | M2 (4, 5)G | M2 (4, 6)G | M2 (4, 6)B | |
| G13 | | | M1 (4, 1)B | M1 (4, 2)B | | | M1 (4, 3)B | M1 (4, 4)B | | | M1 (4, 5)B | M1 (4, 6)B | |

FIG. 21

SYNTHESIZED IMAGE DATA 4 : LAYOUT PATTERN 4

| Gy \ Dx | D1 | D2 | D3 | D4 | D5 | D6 | D7 | D8 | D9 | D10 | D11 | D12 | D13 |
|---|---|---|---|---|---|---|---|---|---|---|---|---|---|
| G1 | | | M1 (1, 1)R | M1 (1, 2)R | | | M1 (1, 3)R | M1 (1, 4)R | | | M1 (1, 5)R | M1 (1, 6)R | |
| G2 | M2 (1, 1)R | M2 (1, 1)G | M2 (1, 2)G | M2 (1, 2)R | M2 (1, 3)R | M2 (1, 3)G | M2 (1, 4)G | M2 (1, 4)R | M2 (1, 5)R | M2 (1, 5)G | M2 (1, 6)G | M2 (1, 6)R | |
| G3 | | M1 (1, 1)G | M1 (1, 1)B | M1 (1, 2)B | M1 (1, 2)G | M1 (1, 3)G | M1 (1, 3)B | M1 (1, 4)B | M1 (1, 4)G | M1 (1, 5)G | M1 (1, 5)B | M1 (1, 6)B | M1 (1, 6)G |
| G4 | M2 (1, 1)B | M2 (2, 1)R | M2 (2, 2)R | M2 (1, 2)B | M2 (1, 3)B | M2 (2, 3)R | M2 (2, 4)R | M2 (1, 4)B | M2 (1, 5)B | M2 (2, 5)R | M2 (2, 6)R | M2 (1, 6)B | |
| G5 | | M1 (2, 1)R | M1 (2, 1)G | M1 (2, 2)G | M1 (2, 2)R | M1 (2, 3)R | M1 (2, 3)G | M1 (2, 4)G | M1 (2, 4)R | M1 (2, 5)R | M1 (2, 5)G | M1 (2, 6)G | M1 (2, 6)R |
| G6 | M2 (2, 1)G | M2 (2, 1)B | M2 (2, 2)B | M2 (2, 2)G | M2 (2, 3)G | M2 (2, 3)B | M2 (2, 4)B | M2 (2, 4)G | M2 (2, 5)G | M2 (2, 5)B | M2 (2, 6)B | M2 (2, 6)G | |
| G7 | | M1 (2, 1)B | M1 (3, 1)R | M1 (3, 2)R | M1 (2, 2)B | M1 (2, 3)B | M1 (3, 3)R | M1 (3, 4)R | M1 (2, 4)B | M1 (2, 5)B | M1 (3, 5)R | M1 (3, 6)R | M1 (2, 6)B |
| G8 | M2 (3, 1)R | M2 (3, 1)G | M2 (3, 2)G | M2 (3, 2)R | M2 (3, 3)R | M2 (3, 3)G | M2 (3, 4)G | M2 (3, 4)R | M2 (3, 5)R | M2 (3, 5)G | M2 (3, 6)G | M2 (3, 6)R | |
| G9 | | M1 (3, 1)G | M1 (3, 1)B | M1 (3, 2)B | M1 (3, 2)G | M1 (3, 3)G | M1 (3, 3)B | M1 (3, 4)B | M1 (3, 4)G | M1 (3, 5)G | M1 (3, 5)B | M1 (3, 6)B | M1 (3, 6)G |
| G10 | M2 (3, 1)B | M2 (4, 1)R | M2 (4, 2)R | M2 (3, 2)B | M2 (3, 3)B | M2 (4, 3)R | M2 (4, 4)R | M2 (3, 4)B | M2 (3, 5)B | M2 (4, 5)R | M2 (4, 6)R | M2 (3, 6)B | |
| G11 | | M1 (4, 1)R | M1 (4, 1)G | M1 (4, 2)G | M1 (4, 2)R | M1 (4, 3)R | M1 (4, 3)G | M1 (4, 4)G | M1 (4, 4)R | M1 (4, 5)R | M1 (4, 5)G | M1 (4, 6)G | M1 (4, 6)R |
| G12 | M2 (4, 1)G | M2 (4, 1)B | M2 (4, 2)B | M2 (4, 2)G | M2 (4, 3)G | M2 (4, 3)B | M2 (4, 4)B | M2 (4, 4)G | M2 (4, 5)G | M2 (4, 5)B | M2 (4, 6)B | M2 (4, 6)G | |
| G13 | | M1 (4, 1)B | | | M1 (4, 2)B | M1 (4, 3)B | | | M1 (4, 4)B | M1 (4, 5)B | | | M1 (4, 6)B |

FIG. 22

SYNTHESIZED IMAGE DATA 5 : LAYOUT PATTERN 5

| Gy \ Dx | D1 | D2 | D3 | D4 | D5 | D6 | D7 | D8 | D9 | D10 | D11 | D12 | D13 |
|---|---|---|---|---|---|---|---|---|---|---|---|---|---|
| G1 | M2 (1, 1)R | | M2 (1, 2)R | | M2 (1, 3)R | | M2 (1, 4)R | | M2 (1, 5)R | | M2 (1, 6)R | | |
| G2 | | M1 (1, 1)G | M1 (1, 1)R | M1 (1, 2)G | M1 (1, 2)R | M1 (1, 3)G | M1 (1, 3)R | M1 (1, 4)G | M1 (1, 4)R | M1 (1, 5)G | M1 (1, 5)R | M1 (1, 6)G | M1 (1, 6)R |
| G3 | M2 (1, 1)B | M2 (1, 1)G | M2 (1, 2)B | M2 (1, 2)G | M2 (1, 3)B | M2 (1, 3)G | M2 (1, 4)B | M2 (1, 4)G | M2 (1, 5)B | M2 (1, 5)G | M2 (1, 6)B | M2 (1, 6)G | |
| G4 | | M1 (2, 1)R | M1 (1, 1)B | M1 (2, 2)R | M1 (1, 2)B | M1 (2, 3)R | M1 (1, 3)B | M1 (2, 4)R | M1 (1, 4)B | M1 (2, 5)R | M1 (1, 5)B | M1 (2, 6)R | M1 (1, 6)B |
| G5 | M2 (2, 1)G | M2 (2, 1)R | M2 (2, 2)G | M2 (2, 2)R | M2 (2, 3)G | M2 (2, 3)R | M2 (2, 4)G | M2 (2, 4)R | M2 (2, 5)G | M2 (2, 5)R | M2 (2, 6)G | M2 (2, 6)R | |
| G6 | | M1 (2, 1)B | M1 (2, 1)G | M1 (2, 2)B | M1 (2, 2)G | M1 (2, 3)B | M1 (2, 3)G | M1 (2, 4)B | M1 (2, 4)G | M1 (2, 5)B | M1 (2, 5)G | M1 (2, 6)B | M1 (2, 6)G |
| G7 | M2 (3, 1)R | M2 (2, 1)B | M2 (3, 2)R | M2 (2, 2)B | M2 (3, 3)R | M2 (2, 3)B | M2 (3, 4)R | M2 (2, 4)B | M2 (3, 5)R | M2 (2, 5)B | M2 (3, 6)R | M2 (2, 6)B | |
| G8 | | M1 (3, 1)G | M1 (3, 1)R | M1 (3, 2)G | M1 (3, 2)R | M1 (3, 3)G | M1 (3, 3)R | M1 (3, 4)G | M1 (3, 4)R | M1 (3, 5)G | M1 (3, 5)R | M1 (3, 6)G | M1 (3, 6)R |
| G9 | M2 (3, 1)B | M2 (3, 1)G | M2 (3, 2)B | M2 (3, 2)G | M2 (3, 3)B | M2 (3, 3)G | M2 (3, 4)B | M2 (3, 4)G | M2 (3, 5)B | M2 (3, 5)G | M2 (3, 6)B | M2 (3, 6)G | |
| G10 | | M1 (4, 1)R | M1 (3, 1)B | M1 (4, 2)R | M1 (3, 2)B | M1 (4, 3)R | M1 (3, 3)B | M1 (4, 4)R | M1 (3, 4)B | M1 (4, 5)R | M1 (3, 5)B | M1 (4, 6)R | M1 (3, 6)B |
| G11 | M2 (4, 1)G | M2 (4, 1)R | M2 (4, 2)G | M2 (4, 2)R | M2 (4, 3)G | M2 (4, 3)R | M2 (4, 4)G | M2 (4, 4)R | M2 (4, 5)G | M2 (4, 5)R | M2 (4, 6)G | M2 (4, 6)R | |
| G12 | | M1 (4, 1)B | M1 (4, 1)G | M1 (4, 2)B | M1 (4, 2)G | M1 (4, 3)B | M1 (4, 3)G | M1 (4, 4)B | M1 (4, 4)G | M1 (4, 5)B | M1 (4, 5)G | M1 (4, 6)B | M1 (4, 6)G |
| G13 | | M2 (4, 1)B | | M2 (4, 2)B | | M2 (4, 3)B | | M2 (4, 4)B | | M2 (4, 5)B | | M2 (4, 6)B | |

FIG. 24

EVEN/ODD OF SCANNING LINE AND VIEWPOINT IMAGE

| | | SUB-PIXEL ON FIRST ROW OF FIRST COLUMN | | | |
|---|---|---|---|---|---|
| | | UPWARD (u=0) | | DOWNWARD (u=1) | |
| | | v1 | v2 | v1 | v2 |
| IMAGE SEPARATING DEVICE | ODD-NUMBERED COLUMN : M1<br>EVEN-NUMBERED COLUMN : M2 | 2 | 1 | 1 | 2 |
| | ODD-NUMBERED COLUMN : M2<br>EVEN-NUMBERED COLUMN : M1 | 1 | 2 | 2 | 1 |

VIEWPOINT IMAGE OF ODD-NUMBERED SCANNING LINE M(v1)
VIEWPOINT IMAGE OF EVEN-NUMBERED SCANNING LINE M(v2)

FIG. 25

REGULARITY IN A SCANNING LINE UNIT

| SCANNING LINE Gy= | CORRESPONDING INPUT IMAGE DATA | SUB-PIXEL UPPER SIDE | SUB-PIXEL DOWN SIDE |
|---|---|---|---|
| 6q−5 | VIEWPOINT(k)<br>COLOR<br>ROW(i) | v1<br>C1=B<br>Ui=2q−2 | v1<br>C2=R<br>Di= 2q−1 |
| 6q−4 | VIEWPOINT(k)<br>COLOR<br>ROW(i) | v2<br>C1=R<br>Ui= 2q−1 | v2<br>C2=G<br>Di= 2q−1 |
| 6q−3 | VIEWPOINT(k)<br>COLOR<br>ROW(i) | v1<br>C1=G<br>Ui= 2q−1 | v1<br>C2=B<br>Di= 2q−1 |
| 6q−2 | VIEWPOINT(k)<br>COLOR<br>ROW(i) | v2<br>C1=B<br>Ui= 2q−1 | v2<br>C2=R<br>Di= 2q |
| 6q−1 | VIEWPOINT(k)<br>COLOR<br>ROW(i) | v1<br>C1=R<br>Ui= 2q | v1<br>C2=G<br>Di= 2q |
| 6q | VIEWPOINT(k)<br>COLOR<br>ROW(i) | v2<br>C1=G<br>Ui= 2q | v2<br>C2=B<br>Di= 2q |

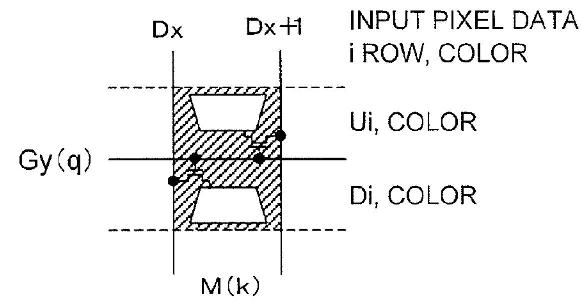

UP-AND-DOWN SUB-PIXEL PAIR P2R

FIG. 26

EVEN/ODD OF SCANNING LINE, AND CONNECTION BETWEEN SUB-PIXELS AND DATA LINES

| | SUB-PIXEL ON FIRST ROW OF FIRST COLUMN | |
|---|---|---|
| | UPWARD (u=0) | DOWNWARD (u=1) |
| SCANNING LINE : ODD NUMBER | D2∼Dn+1<br>D1 UNCONNECTED | D1∼Dn<br>Dn+1<br>UNCONNECTED |
| SCANNING LINE : EVEN NUMBER | D1∼Dn<br>Dn+1<br>UNCONNECTED | D2∼Dn+1<br>D1 UNCONNECTED |

FIG. 27

LUT(Gy,p) : LAYOUT PATTERN 3

| Gy \ p | 1 | 2 | 3 | 4 | 5 | 6 |
|---|---|---|---|---|---|---|
| G1 | 0 | 1 | 0 | 1 | 0 | 1 |
| G2 | 1 | 0 | 1 | 0 | 1 | 0 |
| G3 | 1 | 0 | 1 | 0 | 1 | 0 |
| G4 | 0 | 1 | 0 | 1 | 0 | 1 |
| G5 | 0 | 1 | 0 | 1 | 0 | 1 |
| G6 | 1 | 0 | 1 | 0 | 1 | 0 |
| G7 | 1 | 0 | 1 | 0 | 1 | 0 |
| G8 | 0 | 1 | 0 | 1 | 0 | 1 |
| G9 | 0 | 1 | 0 | 1 | 0 | 1 |
| G10 | 1 | 0 | 1 | 0 | 1 | 0 |
| G11 | 1 | 0 | 1 | 0 | 1 | 0 |
| G12 | 0 | 1 | 0 | 1 | 0 | 1 |
| G13 | 0 | 1 | 0 | 1 | 0 | 1 |

LUT(Gy,p) : LAYOUT PATTERN 4

| Gy \ p | 1 | 2 | 3 | 4 | 5 | 6 |
|---|---|---|---|---|---|---|
| G1 | 1 | 0 | 1 | 0 | 1 | 0 |
| G2 | 1 | 0 | 1 | 0 | 1 | 0 |
| G3 | 1 | 0 | 1 | 0 | 1 | 0 |
| G4 | 1 | 0 | 1 | 0 | 1 | 0 |
| G5 | 1 | 0 | 1 | 0 | 1 | 0 |
| G6 | 1 | 0 | 1 | 0 | 1 | 0 |
| G7 | 1 | 0 | 1 | 0 | 1 | 0 |
| G8 | 1 | 0 | 1 | 0 | 1 | 0 |
| G9 | 1 | 0 | 1 | 0 | 1 | 0 |
| G10 | 1 | 0 | 1 | 0 | 1 | 0 |
| G11 | 1 | 0 | 1 | 0 | 1 | 0 |
| G12 | 1 | 0 | 1 | 0 | 1 | 0 |
| G13 | 1 | 0 | 1 | 0 | 1 | 0 |

0 : UP-AND-DOWN SUB-PIXEL PAIR P2R

1 : UP-AND-DOWN SUB-PIXEL PAIR P2L

FIG. 28

LUT(Gy,p) : LAYOUT PATTERN 1

| Gy \ p | | LOWER 1 BIT 0 | LOWER 1 BIT 1 |
|---|---|---|---|
| LOWER 2 BITS | 00 | 0 | 0 |
| | 01 | 0 | 0 |
| | 10 | 0 | 0 |
| | 11 | 0 | 0 |

LUT(Gy,p) : LAYOUT PATTERN 2

| Gy \ p | | LOWER 1 BIT 0 | LOWER 1 BIT 1 |
|---|---|---|---|
| LOWER 2 BITS | 00 | 1 | 1 |
| | 01 | 1 | 1 |
| | 10 | 1 | 1 |
| | 11 | 1 | 1 |

LUT(Gy,p) : LAYOUT PATTERN 3

| Gy \ p | | LOWER 1 BIT 0 | LOWER 1 BIT 1 |
|---|---|---|---|
| LOWER 2 BITS | 00 | 0 | 1 |
| | 01 | 1 | 0 |
| | 10 | 1 | 0 |
| | 11 | 0 | 1 |

LUT(Gy,p) : LAYOUT PATTERN 4

| Gy \ p | | LOWER 1 BIT 0 | LOWER 1 BIT 1 |
|---|---|---|---|
| LOWER 2 BITS | 00 | 1 | 0 |
| | 01 | 1 | 0 |
| | 10 | 1 | 0 |
| | 11 | 1 | 0 |

0 : UP-AND-DOWN SUB-PIXEL PAIR P2R

1 : UP-AND-DOWN SUB-PIXEL PAIR P2L

FIG. 29

SAVED PARAMETER

| | PARAMETER VARIABLE | PARAMETER SPECIFIC EXAMPLES |
|---|---|---|
| INPUT VIEWPOINT IMAGE ON ODD-NUMBERED SCANNING LINE | v1 | 1 |
| INPUT VIEWPOINT IMAGE ON EVEN-NUMBERED SCANNING LINE | v2 | 2 |
| FIRST-ROW COLOR | CL1 | R |
| SECOND-ROW COLOR | CL2 | G |
| THIRD-ROW COLOR | CL3 | B |
| SUB-PIXEL ROW NUMBER | Gm | 12 |
| SUB-PIXEL COLUMN NUMBER | Dn | 12 |
| SUB-PIXEL ON FIRST ROW OF FIRST COLUMN | u | 0 |
| UP-AND-DOWN SUB-PIXEL PAIR LAYOUT | LUT | ※ SEE FIG. 27 |

POLARITY DISTRIBUTION :
LAYOUT PATTERN 6

DATA LINE POLARITY :
VERTICAL 2-DOT INVERSION DRIVE

| | D1 | D2 | D3 | D4 | D5 | D6 | D7 |
|---|---|---|---|---|---|---|---|
| G1 | + | − | + | − | + | − | + |
| G2 | + | − | + | − | + | − | + |
| G3 | − | + | − | + | − | + | − |
| G4 | − | + | − | + | − | + | − |
| G5 | + | − | + | − | + | − | + |
| G6 | + | − | + | − | + | − | + |
| G7 | − | + | − | + | − | + | − |
| G8 | − | + | − | + | − | + | − |
| G9 | + | − | + | − | + | − | + |
| G10 | + | − | + | − | + | − | + |
| G11 | − | + | − | + | − | + | − |
| G12 | − | + | − | + | − | + | − |
| G13 | + | − | + | − | + | − | + |

FIG. 42

| | | |
|---|---|---|
| M1 (1, 1) RGB | M1 (1, 2) RGB | M1 (1, 3) RGB |
| M1 (2, 1) RGB | M1 (2, 2) RGB | M1 (2, 3) RGB |
| M1 (3, 1) RGB | M1 (3, 2) RGB | M1 (3, 3) RGB |
| M1 (4, 1) RGB | M1 (4, 2) RGB | M1 (4, 3) RGB |

FIRST VIEWPOINT IMAGE DATA

| | | |
|---|---|---|
| M2 (1, 1) RGB | M2 (1, 2) RGB | M2 (1, 3) RGB |
| M2 (2, 1) RGB | M2 (2, 2) RGB | M2 (2, 3) RGB |
| M2 (3, 1) RGB | M2 (3, 2) RGB | M2 (3, 3) RGB |
| M2 (4, 1) RGB | M2 (4, 2) RGB | M2 (4, 3) RGB |

SECOND VIEWPOINT IMAGE DATA

| | | |
|---|---|---|
| M3 (1, 1) RGB | M3 (1, 2) RGB | M3 (1, 3) RGB |
| M3 (2, 1) RGB | M3 (2, 2) RGB | M3 (2, 3) RGB |
| M3 (3, 1) RGB | M3 (3, 2) RGB | M3 (3, 3) RGB |
| M3 (4, 1) RGB | M3 (4, 2) RGB | M3 (4, 3) RGB |

THIRD VIEWPOINT IMAGE DATA

| | | |
|---|---|---|
| M4 (1, 1) RGB | M4 (1, 2) RGB | M4 (1, 3) RGB |
| M4 (2, 1) RGB | M4 (2, 2) RGB | M4 (2, 3) RGB |
| M4 (3, 1) RGB | M4 (3, 2) RGB | M4 (3, 3) RGB |
| M4 (4, 1) RGB | M4 (4, 2) RGB | M4 (4, 3) RGB |

FOURTH VIEWPOINT IMAGE DATA

FIG. 43

SYNTHESIZED IMAGE DATA : LAYOUT PATTERN 6

| | D1 | D2 | D3 | D4 | D5 | D6 | D7 | D8 | D9 | D10 | D11 | D12 | D13 |
|---|---|---|---|---|---|---|---|---|---|---|---|---|---|
| G1 | | | M3 (1, 1)R | | M1 (1, 1)R | M3 (1, 2)R | | M1 (1, 2)R | | | M3 (1, 3)R | | M1 (1, 3)R |
| G2 | M4 (1, 1)R | M4 (1, 1)G | M2 (1, 1)R | M2 (1, 1)G | M4 (1, 2)G | M4 (1, 2)R | M2 (1, 2)G | M2 (1, 2)R | M4 (1, 3)R | M4 (1, 3)G | M2 (1, 3)R | M2 (1, 3)G | |
| G3 | | M3 (1, 1)G | M3 (1, 1)B | M1 (1, 1)G | M1 (1, 1)B | M3 (1, 2)B | M3 (1, 2)G | M1 (1, 2)B | M1 (1, 2)G | M3 (1, 3)G | M3 (1, 3)B | M1 (1, 3)G | M1 (1, 3)B |
| G4 | M4 (1, 1)B | M4 (2, 1)R | M2 (1, 1)B | M2 (2, 1)R | M4 (2, 2)R | M4 (1, 2)B | M2 (2, 2)R | M2 (1, 2)B | M4 (1, 3)B | M4 (2, 3)R | M2 (1, 3)B | M2 (2, 3)R | |
| G5 | | M3 (2, 1)R | M3 (2, 1)G | M1 (2, 1)R | M1 (2, 1)G | M3 (2, 2)G | M3 (2, 2)R | M1 (2, 2)G | M1 (2, 2)R | M3 (2, 3)R | M3 (2, 3)G | M1 (2, 3)R | M1 (2, 3)G |
| G6 | M4 (2, 1)G | M4 (2, 1)B | M2 (2, 1)G | M2 (2, 1)B | M4 (2, 2)B | M4 (2, 2)G | M2 (2, 2)B | M2 (2, 2)G | M4 (2, 3)G | M4 (2, 3)B | M2 (2, 3)G | M2 (2, 3)B | |
| G7 | | M3 (2, 1)B | M3 (3, 1)R | M1 (2, 1)B | M1 (3, 1)R | M3 (3, 2)R | M3 (2, 2)B | M1 (3, 2)R | M1 (2, 2)B | M3 (2, 3)B | M3 (3, 3)R | M1 (2, 3)B | M1 (3, 3)R |
| G8 | M4 (3, 1)R | M4 (3, 1)G | M2 (3, 1)R | M2 (3, 1)G | M4 (3, 2)G | M4 (3, 2)R | M2 (3, 2)G | M2 (3, 2)R | M4 (3, 3)R | M4 (3, 3)G | M2 (3, 3)R | M2 (3, 3)G | |
| G9 | | M3 (3, 1)G | M3 (3, 1)B | M1 (3, 1)G | M1 (3, 1)B | M3 (3, 2)B | M3 (3, 2)G | M1 (3, 2)B | M1 (3, 2)G | M3 (3, 3)G | M3 (3, 3)B | M1 (3, 3)G | M1 (3, 3)B |
| G10 | M4 (3, 1)B | M4 (4, 1)R | M2 (3, 1)B | M2 (4, 1)R | M4 (4, 2)R | M4 (3, 2)B | M2 (4, 2)R | M2 (3, 2)B | M4 (3, 3)B | M4 (4, 3)R | M2 (3, 3)B | M2 (4, 3)R | |
| G11 | | M3 (4, 1)R | M3 (4, 1)G | M1 (4, 1)R | M1 (4, 1)G | M3 (4, 2)G | M3 (4, 2)R | M1 (4, 2)G | M1 (4, 2)R | M3 (4, 3)R | M3 (4, 3)G | M1 (4, 3)R | M1 (4, 3)G |
| G12 | M4 (4, 1)G | M4 (4, 1)B | M2 (4, 1)G | M2 (4, 1)B | M4 (4, 2)B | M4 (4, 2)G | M2 (4, 2)B | M2 (4, 2)G | M4 (4, 3)G | M4 (4, 3)B | M2 (4, 3)G | M2 (4, 3)B | |
| G13 | | M3 (4, 1)B | | M1 (4, 1)B | M3 (4, 2)B | | M1 (4, 2)B | | | M3 (4, 3)B | | M1 (4, 3)B | |

FIG. 49

| | | | |
|---|---|---|---|
| rM (1, 1) RGB | rM (1, 2) RGB | rM (1, 3) RGB | rM (1, 4) RGB |
| rM (2, 1) RGB | rM (2, 2) RGB | rM (2, 3) RGB | rM (2, 4) RGB |
| rM (3, 1) RGB | rM (3, 2) RGB | rM (3, 3) RGB | rM (3, 4) RGB |
| rM (4, 1) RGB | rM (4, 2) RGB | rM (4, 3) RGB | rM (4, 4) RGB |
| rM (5, 1) RGB | rM (5, 2) RGB | rM (5, 3) RGB | rM (5, 4) RGB |
| rM (6, 1) RGB | rM (6, 2) RGB | rM (6, 3) RGB | rM (6, 4) RGB |

rM INPUT IMAGE DATA

| | j' : 1 | 2 | 3 | 4 | 5 | 6 |
|---|---|---|---|---|---|---|
| I' : 1 | rM (1, 4) RGB | rM (2, 4) RGB | rM (3, 4) RGB | rM (4, 4) RGB | rM (5, 4) RGB | rM (6, 4) RGB |
| 2 | rM (1, 3) RGB | rM (2, 3) RGB | rM (3, 3) RGB | rM (4, 3) RGB | rM (5, 3) RGB | rM (6, 3) RGB |
| 3 | rM (1, 2) RGB | rM (2, 2) RGB | rM (3, 2) RGB | rM (4, 2) RGB | rM (5, 2) RGB | rM (6, 2) RGB |
| 4 | rM (1, 1) RGB | rM (2, 1) RGB | rM (3, 1) RGB | rM (4, 1) RGB | rM (5, 1) RGB | rM (6, 1) RGB |

M1' (i' ,j' ) RGB ← rM IMAGE DATA

| | j' : 1 | 2 | 3 | 4 | 5 | 6 |
|---|---|---|---|---|---|---|
| I' : 1 | rM (1, 4) RGB | rM (2, 4) RGB | rM (3, 4) RGB | rM (4, 4) RGB | rM (5, 4) RGB | rM (6, 4) RGB |
| 2 | rM (1, 3) RGB | rM (2, 3) RGB | rM (3, 3) RGB | rM (4, 3) RGB | rM (5, 3) RGB | rM (6, 3) RGB |
| 3 | rM (1, 2) RGB | rM (2, 2) RGB | rM (3, 2) RGB | rM (4, 2) RGB | rM (5, 2) RGB | rM (6, 2) RGB |
| 4 | rM (1, 1) RGB | rM (2, 1) RGB | rM (3, 1) RGB | rM (4, 1) RGB | rM (5, 1) RGB | rM (6, 1) RGB |

M2' (i' ,j' ) RGB ← rM IMAGE DATA

TIMING CHART

TIMING CHART

TIMING CHART

INPUT IMAGE DATA

STRUCTURE 1 OF UP-AND-DOWN SUB-PIXEL PAIR P2R

EQUIVALENT CIRCUIT 1 OF UP-AND-DOWN SUB-PIXEL PAIR P2R

EQUIVALENT CIRCUIT OF FIG. 3

STRUCTURE 1 OF UP-AND-DOWN SUB-PIXEL PAIR P2L

EQUIVALENT CIRCUIT 1 OF UP-AND-DOWN SUB-PIXEL PAIR P2L

FIG. 69

| | | | | | |
|---|---|---|---|---|---|
| M1 (1, 1) RGB | M1 (1, 2) RGB | M1 (1, 3) RGB | M1 (1, 4) RGB | M1 (1, 5) RGB | M1 (1, 6) RGB |
| M1 (2, 1) RGB | M1 (2, 2) RGB | M1 (2, 3) RGB | M1 (2, 4) RGB | M1 (2, 5) RGB | M1 (2, 6) RGB |
| M1 (3, 1) RGB | M1 (3, 2) RGB | M1 (3, 3) RGB | M1 (3, 4) RGB | M1 (3, 5) RGB | M1 (3, 6) RGB |
| M1 (4, 1) RGB | M1 (4, 2) RGB | M1 (4, 3) RGB | M1 (4, 4) RGB | M1 (4, 5) RGB | M1 (4, 6) RGB |

M1: FIRST VIEWPOINT IMAGE DATA (FOR LEFT EYE)

| | | | | | |
|---|---|---|---|---|---|
| M2 (1, 1) RGB | M2 (1, 2) RGB | M2 (1, 3) RGB | M2 (1, 4) RGB | M2 (1, 5) RGB | M2 (1, 6) RGB |
| M2 (2, 1) RGB | M2 (2, 2) RGB | M2 (2, 3) RGB | M2 (2, 4) RGB | M2 (2, 5) RGB | M2 (2, 6) RGB |
| M2 (3, 1) RGB | M2 (3, 2) RGB | M2 (3, 3) RGB | M2 (3, 4) RGB | M2 (3, 5) RGB | M2 (3, 6) RGB |
| M2 (4, 1) RGB | M2 (4, 2) RGB | M2 (4, 3) RGB | M2 (4, 4) RGB | M2 (4, 5) RGB | M2 (4, 6) RGB |

M2: SECOND VIEWPOINT IMAGE DATA (FOR RIGHT EYE)

INPUT IMAGE DATA

POLARITY DISTRIBUTION: LAYOUT PATTERN 2

DATA LINE POLARITY: GATE LINE INVERSION DRIVE
(1H INVERSION DRIVE)

| | G1 | G2 | G3 | G4 | G5 | G6 | G7 |
|---|---|---|---|---|---|---|---|
| D1 | + | − | + | − | + | − | + |
| D2 | + | − | + | − | + | − | + |
| D3 | + | − | + | − | + | − | I |
| D4 | + | − | + | − | + | − | + |
| D5 | + | − | + | − | + | − | + |
| D6 | + | − | + | − | + | − | + |
| D7 | + | − | + | − | + | − | + |
| D8 | + | − | + | − | + | − | + |
| D9 | + | − | + | − | + | − | + |
| D10 | + | − | + | − | + | − | + |
| D11 | + | − | + | − | + | − | + |
| D12 | + | − | + | − | + | − | + |
| D13 | + | − | + | − | + | − | + |

POLARITY DISTRIBUTION: LAYOUT PATTERN 2

DATA LINE POLARITY: DOT INVERSION DRIVE

| | G1 | G2 | G3 | G4 | G5 | G6 | G7 |
|---|---|---|---|---|---|---|---|
| D1 | + | − | + | − | + | − | + |
| D2 | − | + | − | + | − | + | − |
| D3 | + | − | + | − | + | − | + |
| D4 | − | + | − | + | − | + | − |
| D5 | I | | I | | I | | I |
| D6 | − | + | − | + | − | + | − |
| D7 | + | − | + | − | + | − | + |
| D8 | − | + | − | + | − | + | − |
| D9 | + | − | + | − | + | − | + |
| D10 | − | + | − | + | − | + | − |
| D11 | + | − | + | − | + | − | + |
| D12 | − | + | − | + | − | + | − |
| D13 | + | − | + | − | + | − | + |

POLARITY DISTRIBUTION: LAYOUT PATTERN 3

DATA LINE POLARITY: DOT INVERSION DRIVE

| | G1 | G2 | G3 | G4 | G5 | G6 | G7 |
|---|---|---|---|---|---|---|---|
| D1 | + | − | + | − | + | − | + |
| D2 | − | + | − | + | − | + | − |
| D3 | + | − | + | − | + | − | + |
| D4 | − | + | − | + | − | + | − |
| D5 | + | − | + | − | + | − | + |
| D6 | − | + | − | + | − | + | − |
| D7 | + | − | + | − | + | − | + |
| D8 | − | + | − | + | − | + | − |
| D9 | + | − | + | − | + | − | + |
| D10 | − | + | − | + | − | + | − |
| D11 | + | − | + | − | + | − | + |
| D12 | − | + | − | + | − | + | − |
| D13 | + | − | + | − | + | − | + |

FIG. 78

SYNTHESIZED IMAGE DATA 1: LAYOUT PATTERN 1

| Gx \ Dy | D1 | D2 | D3 | D4 | D5 | D6 | D7 | D8 | D9 | D10 | D11 | D12 | D13 |
|---|---|---|---|---|---|---|---|---|---|---|---|---|---|
| G1 | | M2 (1, 1)G | | M2 (2, 1)R | | M2 (2, 1)B | | M2 (3, 1)G | | M2 (4, 1)R | | M2 (4, 1)B | |
| G2 | M1 (1, 1)R | M2 (1, 1)R | M1 (1, 1)B | M2 (1, 1)B | M1 (2, 1)G | M2 (2, 1)G | M1 (3, 1)R | M2 (3, 1)R | M1 (3, 1)B | M2 (3, 1)B | M1 (4, 1)G | M2 (4, 1)G | |
| G3 | | M2 (1, 2)G | M1 (1, 1)G | M2 (2, 2)R | M1 (2, 1)R | M2 (2, 2)B | M1 (2, 1)B | M2 (3, 2)G | M1 (3, 1)G | M2 (4, 2)R | M1 (4, 1)R | M2 (4, 2)B | M1 (4, 1)B |
| G4 | M1 (1, 2)R | M2 (1, 2)R | M1 (1, 2)B | M2 (1, 2)B | M1 (2, 2)G | M2 (2, 2)G | M1 (3, 2)R | M2 (3, 2)R | M1 (3, 2)B | M2 (3, 2)B | M1 (4, 2)G | M2 (4, 2)G | |
| G5 | | M2 (1, 3)G | M1 (1, 2)G | M2 (2, 3)R | M1 (2, 2)R | M2 (2, 3)B | M1 (2, 2)B | M2 (3, 3)G | M1 (3, 2)G | M2 (4, 3)R | M1 (4, 2)R | M2 (4, 3)B | M1 (4, 2)B |
| G6 | M1 (1, 3)R | M2 (1, 3)R | M1 (1, 3)B | M2 (1, 3)B | M1 (2, 3)G | M2 (2, 3)G | M1 (3, 3)R | M2 (3, 3)R | M1 (3, 3)B | M2 (3, 3)B | M1 (4, 3)G | M2 (4, 3)G | |
| G7 | | M2 (1, 4)G | M1 (1, 3)G | M2 (2, 4)R | M1 (2, 3)R | M2 (2, 4)B | M1 (2, 3)B | M2 (3, 4)G | M1 (3, 3)G | M2 (4, 4)R | M1 (4, 3)R | M2 (4, 4)B | M1 (4, 3)B |
| G8 | M1 (1, 4)R | M2 (1, 4)R | M1 (1, 4)B | M2 (1, 4)B | M1 (2, 4)G | M2 (2, 4)G | M1 (3, 4)R | M2 (3, 4)R | M1 (3, 4)B | M2 (3, 4)B | M1 (4, 4)G | M2 (4, 4)G | |
| G9 | | M2 (1, 5)G | M1 (1, 4)G | M2 (2, 5)R | M1 (2, 4)R | M2 (2, 5)B | M1 (2, 4)B | M2 (3, 5)G | M1 (3, 4)G | M2 (4, 5)R | M1 (4, 4)R | M2 (4, 5)B | M1 (4, 4)B |
| G10 | M1 (1, 5)R | M2 (1, 5)R | M1 (1, 5)B | M2 (1, 5)B | M1 (2, 5)G | M2 (2, 5)G | M1 (3, 5)R | M2 (3, 5)R | M1 (3, 5)B | M2 (3, 5)B | M1 (4, 5)G | M2 (4, 5)G | |
| G11 | | M2 (1, 6)G | M1 (1, 5)G | M2 (2, 6)R | M1 (2, 5)R | M2 (2, 6)B | M1 (2, 5)B | M2 (3, 6)G | M1 (3, 5)G | M2 (4, 6)R | M1 (4, 5)R | M2 (4, 6)B | M1 (4, 5)B |
| G12 | M1 (1, 6)R | M2 (1, 6)R | M1 (1, 6)B | M2 (1, 6)B | M1 (2, 6)G | M2 (2, 6)G | M1 (3, 6)R | M2 (3, 6)R | M1 (3, 6)B | M2 (3, 6)B | M1 (4, 6)G | M2 (4, 6)G | |
| G13 | | | M1 (1, 6)G | | M1 (2, 6)R | | M1 (2, 6)B | | M1 (3, 6)G | | M1 (4, 6)R | | M1 (4, 6)B |

FIG. 79

SYNTHESIZED IMAGE DATA 2: LAYOUT PATTERN 2

| Gx \ Dy | D1 | D2 | D3 | D4 | D5 | D6 | D7 | D8 | D9 | D10 | D11 | D12 | D13 |
|---|---|---|---|---|---|---|---|---|---|---|---|---|---|
| G1 | | M2 (1, 1)R | | M2 (1, 1)B | | M2 (2, 1)G | | M2 (3, 1)R | | M2 (3, 1)B | | M2 (4, 1)G | |
| G2 | | M2 (1, 1)G | M1 (1, 1)G | M2 (2, 1)R | M1 (2, 1)R | M2 (2, 1)B | M1 (2, 1)B | M2 (3, 1)G | M1 (3, 1)G | M2 (4, 1)R | M1 (4, 1)R | M2 (4, 1)B | M1 (4, 1)B |
| G3 | M1 (1, 1)R | M2 (1, 2)R | M1 (1, 1)B | M2 (1, 2)B | M1 (2, 1)G | M2 (2, 2)G | M1 (3, 1)R | M2 (3, 2)R | M1 (3, 1)B | M2 (3, 2)B | M1 (4, 1)G | M2 (4, 2)G | |
| G4 | | M2 (1, 2)G | M1 (1, 2)G | M2 (2, 2)R | M1 (2, 2)R | M2 (2, 2)B | M1 (2, 2)B | M2 (3, 2)G | M1 (3, 2)G | M2 (4, 2)R | M1 (4, 2)R | M2 (4, 2)B | M1 (4, 2)B |
| G5 | M1 (1, 2)R | M2 (1, 3)R | M1 (1, 2)B | M2 (1, 3)B | M1 (2, 2)G | M2 (2, 3)G | M1 (3, 2)R | M2 (3, 3)R | M1 (3, 2)B | M2 (3, 3)B | M1 (4, 2)G | M2 (4, 3)G | |
| G6 | | M2 (1, 3)G | M1 (1, 3)G | M2 (2, 3)R | M1 (2, 3)R | M2 (2, 3)B | M1 (2, 3)B | M2 (3, 3)G | M1 (3, 3)G | M2 (4, 3)R | M1 (4, 3)R | M2 (4, 3)B | M1 (4, 3)B |
| G7 | M1 (1, 3)R | M2 (1, 4)R | M1 (1, 3)B | M2 (1, 4)B | M1 (2, 3)G | M2 (2, 4)G | M1 (3, 3)R | M2 (3, 4)R | M1 (3, 3)B | M2 (3, 4)B | M1 (4, 3)G | M2 (4, 4)G | |
| G8 | | M2 (1, 4)G | M1 (1, 4)G | M2 (2, 4)R | M1 (2, 4)R | M2 (2, 4)B | M1 (2, 4)B | M2 (3, 4)G | M1 (3, 4)G | M2 (4, 4)R | M1 (4, 4)R | M2 (4, 4)B | M1 (4, 4)B |
| G9 | M1 (1, 4)R | M2 (1, 5)R | M1 (1, 4)B | M2 (1, 5)B | M1 (2, 4)G | M2 (2, 5)G | M1 (3, 4)R | M2 (3, 5)R | M1 (3, 4)B | M2 (3, 5)B | M1 (4, 4)G | M2 (4, 5)G | |
| G10 | | M2 (1, 5)G | M1 (1, 5)G | M2 (2, 5)R | M1 (2, 5)R | M2 (2, 5)B | M1 (2, 5)B | M2 (3, 5)G | M1 (3, 5)G | M2 (4, 5)R | M1 (4, 5)R | M2 (4, 5)B | M1 (4, 5)B |
| G11 | M1 (1, 5)R | M2 (1, 6)R | M1 (1, 5)B | M2 (1, 6)B | M1 (2, 5)G | M2 (2, 6)G | M1 (3, 5)R | M2 (3, 6)R | M1 (3, 5)B | M2 (3, 6)B | M1 (4, 5)G | M2 (4, 6)G | |
| G12 | | M2 (1, 6)G | M1 (1, 6)G | M2 (2, 6)R | M1 (2, 6)R | M2 (2, 6)B | M1 (2, 6)B | M2 (3, 6)G | M1 (3, 6)G | M2 (4, 6)R | M1 (4, 6)R | M2 (4, 6)B | M1 (4, 6)B |
| G13 | M1 (1, 6)R | | M1 (1, 6)B | | M1 (2, 6)G | | M1 (3, 6)R | | M1 (3, 6)B | | M1 (4, 6)G | | |

FIG. 80

SYNTHESIZED IMAGE DATA 3: LAYOUT PATTERN 3

| Dy / Gx | D1 | D2 | D3 | D4 | D5 | D6 | D7 | D8 | D9 | D10 | D11 | D12 | D13 |
|---|---|---|---|---|---|---|---|---|---|---|---|---|---|
| G1 | | M2 (1, 1)R | | M2 (2, 1)R | | M2 (2, 1)G | | M2 (3, 1)G | | M2 (3, 1)B | | M2 (4, 1)B | |
| G2 | M1 (1, 1)R | M2 (1, 1)G | M1 (1, 1)G | M2 (1, 1)B | M1 (2, 1)G | M2 (2, 1)B | M1 (2, 1)B | M2 (3, 1)R | M1 (3, 1)B | M2 (4, 1)R | M1 (4, 1)R | M2 (4, 1)G | |
| G3 | | M2 (1, 2)G | M1 (1, 1)B | M2 (1, 2)B | M1 (2, 1)R | M2 (2, 2)B | M1 (3, 1)R | M2 (3, 2)R | M1 (3, 1)G | M2 (4, 2)R | M1 (4, 1)G | M2 (4, 2)G | M1 (4, 1)B |
| G4 | | M2 (1, 2)R | M1 (1, 2)B | M2 (2, 2)R | M1 (2, 2)R | M2 (2, 2)G | M1 (3, 2)R | M2 (3, 2)G | M1 (3, 2)G | M2 (3, 2)B | M1 (4, 2)G | M2 (4, 2)B | M1 (4, 2)B |
| G5 | M1 (1, 2)R | M2 (1, 3)R | M1 (1, 2)G | M2 (2, 3)R | M1 (2, 2)G | M2 (2, 3)G | M1 (2, 2)B | M2 (3, 3)G | M1 (3, 2)B | M2 (3, 3)B | M1 (4, 2)R | M2 (4, 3)B | |
| G6 | M1 (1, 3)R | M2 (1, 3)G | M1 (1, 3)G | M2 (1, 3)B | M1 (2, 3)G | M2 (2, 3)B | M1 (2, 3)B | M2 (3, 3)R | M1 (3, 3)B | M2 (4, 3)R | M1 (4, 3)R | M2 (4, 3)G | |
| G7 | | M2 (1, 4)G | M1 (1, 3)B | M2 (1, 4)B | M1 (2, 3)R | M2 (2, 4)B | M1 (3, 3)R | M2 (3, 4)R | M1 (3, 3)G | M2 (4, 4)R | M1 (4, 3)G | M2 (4, 4)G | M1 (4, 3)B |
| G8 | | M2 (1, 4)R | M1 (1, 4)B | M2 (2, 4)R | M1 (2, 4)R | M2 (2, 4)G | M1 (3, 4)R | M2 (3, 4)G | M1 (3, 4)G | M2 (3, 4)B | M1 (4, 4)G | M2 (4, 4)B | M1 (4, 4)B |
| G9 | M1 (1, 4)R | M2 (1, 5)R | M1 (1, 4)G | M2 (2, 5)R | M1 (2, 4)G | M2 (2, 5)G | M1 (2, 4)B | M2 (3, 5)G | M1 (3, 4)B | M2 (3, 5)B | M1 (4, 4)R | M2 (4, 5)B | |
| G10 | M1 (1, 5)R | M2 (1, 5)G | M1 (1, 5)G | M2 (1, 5)B | M1 (2, 5)G | M2 (2, 5)B | M1 (2, 5)B | M2 (3, 5)R | M1 (3, 5)B | M2 (4, 5)R | M1 (4, 5)R | M2 (4, 5)G | |
| G11 | | M2 (1, 6)G | M1 (1, 5)B | M2 (1, 6)B | M1 (2, 5)R | M2 (2, 6)B | M1 (3, 5)R | M2 (3, 6)R | M1 (3, 5)G | M2 (4, 6)R | M1 (4, 5)G | M2 (4, 6)G | M1 (4, 5)B |
| G12 | | M2 (1, 6)R | M1 (1, 6)B | M2 (2, 6)R | M1 (2, 6)R | M2 (2, 6)G | M1 (3, 6)R | M2 (3, 6)G | M1 (3, 6)G | M2 (3, 6)B | M1 (4, 6)G | M2 (4, 6)B | M1 (4, 6)B |
| G13 | M1 (1, 6)R | | M1 (1, 6)G | | M1 (2, 6)G | | M1 (2, 6)B | | M1 (3, 6)B | | M1 (4, 6)R | | |

FIG. 81

SYNTHESIZED IMAGE DATA 4: LAYOUT PATTERN 4

| Gx \ Dy | D1 | D2 | D3 | D4 | D5 | D6 | D7 | D8 | D9 | D10 | D11 | D12 | D13 |
|---|---|---|---|---|---|---|---|---|---|---|---|---|---|
| G1 | M2 (1, 1) R | | M2 (1, 1) B | | M2 (2, 1) G | | M2 (3, 1) R | | M2 (3, 1) B | | M2 (4, 1) G | | |
| G2 | | M1 (1, 1) G | M2 (1, 1) G | M1 (2, 1) R | M2 (2, 1) R | M1 (2, 1) B | M2 (2, 1) B | M1 (3, 1) G | M2 (3, 1) G | M1 (4, 1) R | M2 (4, 1) R | M1 (4, 1) B | M2 (4, 1) B |
| G3 | M2 (1, 2) R | M1 (1, 1) R | M2 (1, 2) B | M1 (1, 1) B | M2 (2, 2) G | M1 (2, 1) G | M2 (3, 2) R | M1 (3, 1) R | M2 (3, 2) B | M1 (3, 1) B | M2 (4, 2) G | M1 (4, 1) G | |
| G4 | | M1 (1, 2) G | M2 (1, 2) G | M1 (2, 2) R | M2 (2, 2) R | M1 (2, 2) B | M2 (2, 2) B | M1 (3, 2) G | M2 (3, 2) G | M1 (4, 2) R | M2 (4, 2) R | M1 (4, 2) B | M2 (4, 2) B |
| G5 | M2 (1, 3) R | M1 (1, 2) R | M2 (1, 3) B | M1 (1, 2) B | M2 (2, 3) G | M1 (2, 2) G | M2 (3, 3) R | M1 (3, 2) R | M2 (3, 3) B | M1 (3, 2) B | M2 (4, 3) G | M1 (4, 2) G | |
| G6 | | M1 (1, 3) G | M1 (1, 3) G | M1 (2, 3) R | M2 (2, 3) R | M1 (2, 3) B | M2 (2, 3) B | M1 (3, 3) G | M2 (3, 3) G | M1 (4, 3) R | M2 (4, 3) R | M1 (4, 3) B | M2 (4, 3) B |
| G7 | M2 (1, 4) R | M1 (1, 3) R | M2 (1, 4) B | M1 (1, 3) B | M2 (2, 4) G | M1 (2, 3) G | M2 (3, 4) R | M1 (3, 3) R | M2 (3, 4) B | M1 (3, 3) B | M2 (4, 4) G | M1 (4, 3) G | |
| G8 | | M1 (1, 4) G | M2 (1, 4) G | M1 (2, 4) R | M2 (2, 4) R | M1 (2, 4) B | M2 (2, 4) B | M1 (3, 4) G | M2 (3, 4) G | M1 (4, 4) R | M2 (4, 4) R | M1 (4, 4) B | M2 (4, 4) B |
| G9 | M2 (1, 5) R | M1 (1, 4) R | M2 (1, 5) B | M1 (1, 4) B | M2 (2, 5) G | M1 (2, 4) G | M2 (3, 5) R | M1 (3, 4) R | M2 (3, 5) B | M1 (3, 4) B | M2 (4, 5) G | M1 (4, 4) G | |
| G10 | | M1 (1, 5) G | M2 (1, 5) G | M1 (2, 5) R | M2 (2, 5) R | M1 (2, 5) B | M2 (2, 5) B | M1 (3, 5) G | M2 (3, 5) G | M1 (4, 5) R | M2 (4, 5) R | M1 (4, 5) B | M2 (4, 5) B |
| G11 | M2 (1, 6) R | M1 (1, 5) R | M2 (1, 6) B | M1 (1, 5) B | M2 (2, 6) G | M1 (2, 5) G | M2 (3, 6) R | M1 (3, 5) R | M2 (3, 6) B | M1 (3, 5) B | M2 (4, 6) G | M1 (4, 5) G | |
| G12 | | M1 (1, 6) G | M2 (1, 6) G | M1 (2, 6) R | M2 (2, 6) R | M1 (2, 6) B | M2 (2, 6) B | M1 (3, 6) G | M2 (3, 6) G | M1 (4, 6) R | M2 (4, 6) R | M1 (4, 6) B | M2 (4, 6) B |
| G13 | | M1 (1, 6) R | | M1 (1, 6) B | | M1 (2, 6) G | | M1 (3, 6) R | | M1 (3, 6) B | | M1 (4, 6) G | |

FIG. 83

RELATION BETWEEN EVEN/ODD OF DATA LINE AND INPUT IMAGE DATA VIEWPOINT

| | | EVEN/ODD OF DATA LINE | | | |
|---|---|---|---|---|---|
| | | ODD NUMBER:v1 | | EVEN NUMBER:v2 | |
| | | u=0 | u=1 | u=0 | u=1 |
| IMAGE SEPARATING DEVICE | ODD-NUMBERED COLUMN:M1<br>EVEN-NUMBERED COLUMN:M2 | 2 | 1 | 1 | 2 |
| | ODD-NUMBERED COLUMN:M2<br>EVEN-NUMBERED COLUMN:M1 | 1 | 2 | 2 | 1 |

VIEWPOINT IMAGE OF ODD-NUMBERED DATA LINE M(v1)
VIEWPOINT IMAGE OF EVEN-NUMBERED DATA LINE M(v2)

FIG. 84

RELATION BETWEEN DATA LINE AND INPUT IMAGE DATA

| DATA LINE Dy(p) | INPUT IMAGE DATA | | |
|---|---|---|---|
| | VIEWPOINT | UPWARD SUB-PIXEL | DOWNWARD SUB-PIXEL |
| | | ROW NUMBER: Iy, COLOR | ROW NUMBER: Iy, COLOR |
| 6p−5 | v1 | 2p−2, C3 | 2p−1, C1 |
| 6p−4 | v2 | 2p−1, C1 | 2p−1, C2 |
| 6p−3 | v1 | 2p−1, C2 | 2p−1, C3 |
| 6p−2 | v2 | 2p−1, C3 | 2p, C1 |
| 6p−1 | v1 | 2p, C1 | 2p, C2 |
| 6p | v2 | 2p, C2 | 2p, C3 |

FIG. 85

| Gx | IMAGE SEPARATING DEVICE: ODD-NUMBERED COLUMN M2, EVEN-NUMBERED COLUMN M1 | | IMAGE SEPARATING DEVICE: ODD-NUMBERED COLUMN M1, EVEN-NUMBERED COLUMN M2 | |
|---|---|---|---|---|
| | DISPLAY PART x-1 COLUMN | DISPLAY PART x COLUMN | DISPLAY PART x-1 COLUMN | DISPLAY PART x COLUMN |
| | INPUT IMAGE DATA VIEWPOINT IMAGE, COLUMN NUMBER | INPUT IMAGE DATA VIEWPOINT IMAGE, COLUMN NUMBER | INPUT IMAGE DATA VIEWPOINT IMAGE, COLUMN NUMBER | INPUT IMAGE DATA VIEWPOINT IMAGE, COLUMN NUMBER |
| G1 | M1, 「0」 | M2, 「1」 | M2, 「0」 | M1, 「1」 |
| G2 | M2, 「1」 | M1, 「1」 | M1, 「1」 | M2, 「1」 |
| G3 | M1, 「1」 | M2, 「2」 | M2, 「1」 | M1, 「2」 |
| G4 | M2, 「2」 | M1, 「2」 | M1, 「2」 | M2, 「2」 |
| G5 | M1, 「2」 | M2, 「3」 | M2, 「2」 | M1, 「3」 |
| G6 | M2, 「3」 | M1, 「3」 | M1, 「3」 | M2, 「3」 |
| G7 | M1, 「3」 | M2, 「4」 | M2, 「3」 | M1, 「4」 |
| G8 | M2, 「4」 | M1, 「4」 | M1, 「4」 | M2, 「4」 |
| G9 | M1, 「4」 | M2, 「5」 | M2, 「4」 | M1, 「5」 |
| G10 | M2, 「5」 | M1, 「5」 | M1, 「5」 | M2, 「5」 |
| G11 | M1, 「5」 | M2, 「6」 | M2, 「5」 | M1, 「6」 |
| G12 | M2, 「6」 | M1, 「6」 | M1, 「6」 | M2, 「6」 |
| G13 | M1, 「6」 | M2, 「7」 | M2, 「6」 | M1, 「7」 |

FIG. 86

RELATION BETWEEN SCANNING LINE AND COLUMN NUMBER OF INPUT IMAGE DATA

| SUB-PIXEL ON FIRST ROW OF FIRST COLUMN "u" | SCANNING LINE Gx(q) | EVEN/ODD OF DATA LINE | INPUT IMAGE DATA COLUMN NUMBER: Ix |
|---|---|---|---|
| 0 (UPWARD PIXEL) | 2q − 1 (ODD NUMBER) | ODD NUMBER | q − 1 |
| | | EVEN NUMBER | q |
| | 2q (EVEN NUMBER) | ODD NUMBER | q |
| | | EVEN NUMBER | q |
| 1 (DOWNWARD PIXEL) | 2q − 1 (ODD NUMBER) | ODD NUMBER | q |
| | | EVEN NUMBER | q − 1 |
| | 2q (EVEN NUMBER) | ODD NUMBER | q |
| | | EVEN NUMBER | q |

FIG. 87

UP-AND-DOWN SUB-PIXEL PAIRS P2R/P2L IN LAYOUT PATTERN 3

| Dy \ Gx | G1 | G2 | G3 | G4 | G5 | G6 | G7 | G8 | G9 | G10 | G11 | G12 | G13 |
|---|---|---|---|---|---|---|---|---|---|---|---|---|---|
| D1 | × | 0 | 0 | 1 | 1 | 0 | 0 | 1 | 1 | 0 | 0 | 1 | 1 |
| D2 | 1 | 1 | 0 | 0 | 1 | 1 | 0 | 0 | 1 | 1 | 0 | 0 | × |
| D3 | × | 1 | 1 | 0 | 0 | 1 | 1 | 0 | 0 | 1 | 1 | 0 | 0 |
| D4 | 0 | 0 | 1 | 1 | 0 | 0 | 1 | 1 | 0 | 0 | 1 | 1 | × |
| D5 | × | 0 | 0 | 1 | 1 | 0 | 0 | 1 | 1 | 0 | 0 | 1 | 1 |
| D6 | 1 | 1 | 0 | 0 | 1 | 1 | 0 | 0 | 1 | 1 | 0 | 0 | × |
| D7 | × | 1 | 1 | 0 | 0 | 1 | 1 | 0 | 0 | 1 | 1 | 0 | 0 |
| D8 | 0 | 0 | 1 | 1 | 0 | 0 | 1 | 1 | 0 | 0 | 1 | 1 | × |
| D9 | × | 0 | 0 | 1 | 1 | 0 | 0 | 1 | 1 | 0 | 0 | 1 | 1 |
| D10 | 1 | 1 | 0 | 0 | 1 | 1 | 0 | 0 | 1 | 1 | 0 | 0 | × |
| D11 | × | 1 | 1 | 0 | 0 | 1 | 1 | 0 | 0 | 1 | 1 | 0 | 0 |
| D12 | 0 | 0 | 1 | 1 | 0 | 0 | 1 | 1 | 0 | 0 | 1 | 1 | × |
| D13 | × | 0 | 0 | 1 | 1 | 0 | 0 | 1 | 1 | 0 | 0 | 1 | 1 |

0 : UP-AND-DOWN SUB-PIXEL PAIR P2R

1 : UP-AND-DOWN SUB-PIXEL PAIR P2L

FIG. 88

LUT(Dy, Gx) : LAYOUT PATTERN 3

| Dy \ Gx | | LOWER 2 BITS | | | |
|---|---|---|---|---|---|
| | | 01 | 10 | 11 | 00 |
| LOWER 2 BITS | 01 | 1 | 0 | 0 | 1 |
| | 10 | 1 | 1 | 0 | 0 |
| | 11 | 0 | 1 | 1 | 0 |
| | 00 | 0 | 0 | 1 | 1 |

LUT(Dy, Gx) : LAYOUT PATTERNS 1 AND 4

| Dy \ Gx | | LOWER 2 BITS | | | |
|---|---|---|---|---|---|
| | | 01 | 10 | 11 | 00 |
| LOWER 2 BITS | 01 | 0 | 0 | 0 | 0 |
| | 10 | 0 | 0 | 0 | 0 |
| | 11 | 0 | 0 | 0 | 0 |
| | 00 | 0 | 0 | 0 | 0 |

LUT(Dy, Gx) : LAYOUT PATTERNS 2

| Dy \ Gx | | LOWER 2 BITS | | | |
|---|---|---|---|---|---|
| | | 01 | 10 | 11 | 00 |
| LOWER 2 BITS | 01 | 1 | 1 | 1 | 1 |
| | 10 | 1 | 1 | 1 | 1 |
| | 11 | 1 | 1 | 1 | 1 |
| | 00 | 1 | 1 | 1 | 1 |

| | |
|---|---|
| 0 | : UP-AND-DOWN SUB-PIXEL PAIR P2R |
| 1 | : UP-AND-DOWN SUB-PIXEL PAIR P2L |

FIG. 89

RELATION REGARDING LUT(Dy, Gx), EVEN/ODD OF SCANNING LINES AND DATA LINES, AND FACING DIRECTIONS OF SUB-PIXELS

| SCANNING LINE | DATA LINE | LUT(Dy, Gx) | FACING DIRECTION OF SUB-PIXEL |
|---|---|---|---|
| ODD NUMBER | ODD NUMBER | 0 | UPWARD PIXEL |
| | | 1 | DOWNWARD PIXEL |
| | EVEN NUMBER | 0 | DOWNWARD PIXEL |
| | | 1 | UPWARD PIXEL |
| EVEN NUMBER | ODD NUMBER | 0 | DOWNWARD PIXEL |
| | | 1 | UPWARD PIXEL |
| | EVEN NUMBER | 0 | UPWARD PIXEL |
| | | 1 | DOWNWARD PIXEL |

FIG. 90

RELATION BETWEEN EVEN/ODD OF DATA LINES AS WELL AS SCANNING LINES AND INPUT IMAGE DATA

| DATA LINE Dy(p) | LUT(Dy, Gx) | INPUT IMAGE DATA | | |
|---|---|---|---|---|
| | | ROW NUMBER: Iy, COLOR | | VIEWPOINT |
| | | SCANNING LINE (ODD NUMBER) | SCANNING LINE (EVEN NUMBER) | |
| 6p−5 | 0 | 2p−2, C3 | 2p−1, C1 | v1 |
| | 1 | 2p−1, C1 | 2p−2, C3 | |
| 6p−4 | 0 | 2p−1, C2 | 2p−1, C1 | v2 |
| | 1 | 2p−1, C1 | 2p−1, C2 | |
| 6p−3 | 0 | 2p−1, C2 | 2p−1, C3 | v1 |
| | 1 | 2p−1, C3 | 2p−1, C2 | |
| 6p−2 | 0 | 2p, C1 | 2p−1, C3 | v2 |
| | 1 | 2p 1, C3 | 2p, C1 | |
| 6p−1 | 0 | 2p, C1 | 2p, C2 | v1 |
| | 1 | 2p, C2 | 2p, C1 | |
| 6p | 0 | 2p, C3 | 2p, C2 | v2 |
| | 1 | 2p, C2 | 2p, C3 | |

FIG. 91

SAVED PARAMETER

| ITEMS | PARAMETER VARIABLE | PARAMETER SPECIFIC EXAMPLES: FIGS.73 | PARAMETER SPECIFIC EXAMPLES: FIGS.77 |
|---|---|---|---|
| INPUT VIEWPOINT IMAGE ON ODD-NUMBERED DATA LINE | v1 | 1 | 2 |
| INPUT VIEWPOINT IMAGE ON EVEN-NUMBERED DATA LINE | v2 | 2 | 1 |
| FIRST-ROW COLOR | C1 | R | R |
| SECOND-ROW COLOR | C2 | G | G |
| THIRD-ROW COLOR | C3 | B | B |
| SUB-PIXEL ROW NUMBER | n | 12 | 12 |
| SUB-PIXEL COLUMN NUMBER | m | 12 | 12 |
| SUB-PIXEL ON FIRST ROW OF FIRST COLUMN | u | 0 | 1 |
| UP-AND-DOWN SUB-PIXEL PAIR LAYOUT | LUT | FIG. 88: LAYOUT PATTERN 3 | FIG.88: LAYOUT PATTERNS 1 AND 4 |

BLOCK DIAGRAM OF TERMINAL DEVICE

BLOCK DIAGRAM OF TERMINAL DEVICE

STRUCTURE 2 OF UP-AND-DOWN SUB-PIXEL PAIR P2R

EQUIVALENT CIRCUIT 2 OF UP-AND-DOWN SUB-PIXEL PAIR P2R

STRUCTURE 2 OF UP-AND-DOWN SUB-PIXEL PAIR P2R PLURAL EQUIVALENT CIRCUITS

STRUCTURE 2 OF UP-AND-DOWN SUB-PIXEL PAIR P2L

EQUIVALENT CIRCUIT 2 OF UP-AND-DOWN SUB-PIXEL PAIR P2L

STRUCTURE 2 OF UP-AND-DOWN SUB-PIXEL PAIR P2L PLURAL EQUIVALENT CIRCUITS

POLARITY DISTRIBUTION: LAYOUT PATTERN 2

DATA LINE POLARITY: 2-DOT INVERSION DRIVE

| | G1 | G2 | G3 | G4 | G5 | G6 | G7 |
|---|---|---|---|---|---|---|---|
| D1 | + | − | + | − | + | − | + |
| D2 | − | | − | | − | | − |
| D3 | − | + | − | + | − | + | − |
| D4 | − | + | − | + | − | + | − |
| D5 | + | − | + | − | + | − | + |
| D6 | + | − | + | − | + | − | + |
| D7 | | − | | − | | − | |
| D8 | − | + | − | + | − | + | − |
| D9 | + | − | + | − | + | − | + |
| D10 | + | − | + | − | + | − | + |
| D11 | − | + | − | + | − | + | − |
| D12 | | − | | − | | − | |
| D13 | + | − | + | − | + | − | + |

POLARITY DISTRIBUTION: LAYOUT PATTERN 6

DATA LINE POLARITY: 2-DOT INVERSION DRIVE

| | G1 | G2 | G3 | G4 | G5 | G6 | G7 |
|---|---|---|---|---|---|---|---|
| D1 | + | − | + | − | + | − | + |
| D2 | + | − | + | − | + | − | + |
| D3 | − | + | − | + | − | + | − |
| D4 | − | + | − | + | − | + | − |
| D5 | + | − | + | − | + | − | + |
| D6 | + | − | + | − | + | − | + |
| D7 | − | + | − | + | − | + | − |
| D8 | − | + | − | + | − | + | − |
| D9 | + | − | + | − | + | − | + |
| D10 | + | − | + | − | + | − | + |
| D11 | − | + | − | + | − | + | − |
| D12 | − | + | − | + | − | + | − |
| D13 | + | − | + | − | + | − | + |

POLARITY DISTRIBUTION: LAYOUT PATTERN 5

DATA LINE POLARITY: DOT INVERSION DRIVE

| | G1 | G2 | G3 | G4 | G5 | G6 | G7 |
|---|---|---|---|---|---|---|---|
| D1 | + | - | + | - | + | - | + |
| D2 | - | + | - | + | - | + | - |
| D3 | + | - | + | - | + | - | + |
| D4 | - | + | - | + | - | + | - |
| D5 | + | - | + | - | + | - | + |
| D6 | - | + | - | + | - | + | - |
| D7 | + | - | + | - | + | - | + |
| D8 | - | + | - | + | - | + | - |
| D9 | + | - | + | - | + | - | + |
| D10 | - | + | - | + | - | + | - |
| D11 | + | - | + | - | + | - | + |
| D12 | - | + | - | + | - | + | - |
| D13 | + | - | + | - | + | - | + |

FIG. 113

| | | |
|---|---|---|
| M1<br>(1, 1)<br>RGB | M1<br>(1, 2)<br>RGB | M1<br>(1, 3)<br>RGB |
| M1<br>(2, 1)<br>RGB | M1<br>(2, 2)<br>RGB | M1<br>(2, 3)<br>RGB |
| M1<br>(3, 1)<br>RGB | M1<br>(3, 2)<br>RGB | M1<br>(3, 3)<br>RGB |
| M1<br>(4, 1)<br>RGB | M1<br>(4, 2)<br>RGB | M1<br>(4, 3)<br>RGB |

FIRST VIEWPOINT IMAGE DATA

| | | |
|---|---|---|
| M2<br>(1, 1)<br>RGB | M2<br>(1, 2)<br>RGB | M2<br>(1, 3)<br>RGB |
| M2<br>(2, 1)<br>RGB | M2<br>(2, 2)<br>RGB | M2<br>(2, 3)<br>RGB |
| M2<br>(3, 1)<br>RGB | M2<br>(3, 2)<br>RGB | M2<br>(3, 3)<br>RGB |
| M2<br>(4, 1)<br>RGB | M2<br>(4, 2)<br>RGB | M2<br>(4, 3)<br>RGB |

SECOND VIEWPOINT IMAGE DATA

| | | |
|---|---|---|
| M3<br>(1, 1)<br>RGB | M3<br>(1, 2)<br>RGB | M3<br>(1, 3)<br>RGB |
| M3<br>(2, 1)<br>RGB | M3<br>(2, 2)<br>RGB | M3<br>(2, 3)<br>RGB |
| M3<br>(3, 1)<br>RGB | M3<br>(3, 2)<br>RGB | M3<br>(3, 3)<br>RGB |
| M3<br>(4, 1)<br>RGB | M3<br>(4, 2)<br>RGB | M3<br>(4, 3)<br>RGB |

THIRD VIEWPOINT IMAGE DATA

| | | |
|---|---|---|
| M4<br>(1, 1)<br>RGB | M4<br>(1, 2)<br>RGB | M4<br>(1, 3)<br>RGB |
| M4<br>(2, 1)<br>RGB | M4<br>(2, 2)<br>RGB | M4<br>(2, 3)<br>RGB |
| M4<br>(3, 1)<br>RGB | M4<br>(3, 2)<br>RGB | M4<br>(3, 3)<br>RGB |
| M4<br>(4, 1)<br>RGB | M4<br>(4, 2)<br>RGB | M4<br>(4, 3)<br>RGB |

FOURTH VIEWPOINT IMAGE DATA

FIG. 114

SYNTHESIZED IMAGE DATA 5: LAYOUT PATTERN 5

| Gx \ Dy | D1 | D2 | D3 | D4 | D5 | D6 | D7 | D8 | D9 | D10 | D11 | D12 | D13 |
|---|---|---|---|---|---|---|---|---|---|---|---|---|---|
| G1 | | M4 (1, 1)R | | M4 (2, 1)R | | M4 (2, 1)G | | M4 (3, 1)G | | M4 (3, 1)B | | M4 (4, 1)B | |
| G2 | M3 (1, 1)R | M4 (1, 1)G | M3 (1, 1)G | M4 (1, 1)B | M3 (2, 1)G | M4 (2, 1)B | M3 (2, 1)B | M4 (3, 1)R | M3 (3, 1)B | M4 (4, 1)R | M3 (4, 1)R | M4 (4, 1)G | |
| G3 | | M2 (1, 1)G | M3 (1, 1)B | M2 (1, 1)B | M3 (2, 1)R | M2 (2, 1)B | M3 (3, 1)R | M2 (3, 1)R | M3 (3, 1)G | M2 (4, 1)R | M3 (4, 1)G | M2 (4, 1)G | M3 (4, 1)B |
| G4 | | M2 (1, 1)R | M1 (1, 1)B | M2 (2, 1)R | M1 (2, 1)R | M2 (2, 1)G | M1 (3, 1)R | M2 (3, 1)G | M1 (3, 1)G | M2 (3, 1)B | M1 (4, 1)G | M2 (4, 1)B | M1 (4, 1)B |
| G5 | M1 (1, 1)R | M4 (1, 2)G | M1 (1, 1)G | M4 (1, 2)B | M1 (2, 1)G | M4 (2, 2)B | M1 (2, 1)B | M4 (3, 2)R | M1 (3, 1)B | M4 (4, 2)R | M1 (4, 1)R | M4 (4, 2)G | |
| G6 | | M4 (1, 2)R | M3 (1, 2)B | M4 (2, 2)R | M3 (2, 2)R | M4 (2, 2)G | M3 (3, 2)R | M4 (3, 2)G | M3 (3, 2)G | M4 (3, 2)B | M3 (4, 2)G | M4 (4, 2)B | M3 (4, 2)B |
| G7 | M3 (1, 2)R | M2 (1, 2)R | M3 (1, 2)G | M2 (2, 2)R | M3 (2, 2)G | M2 (2, 2)G | M3 (2, 2)B | M2 (3, 2)G | M3 (3, 2)B | M2 (3, 2)B | M3 (4, 2)R | M2 (4, 2)B | |
| G8 | M1 (1, 2)R | M2 (1, 2)G | M1 (1, 2)G | M2 (1, 2)B | M1 (2, 2)G | M2 (2, 2)B | M1 (2, 2)B | M2 (3, 2)R | M1 (3, 2)B | M2 (4, 2)R | M1 (4, 2)R | M2 (4, 2)G | |
| G9 | | M4 (1, 3)R | M1 (1, 2)B | M4 (2, 3)R | M1 (2, 2)R | M4 (2, 3)G | M1 (3, 2)R | M4 (3, 3)G | M1 (3, 2)G | M4 (3, 3)B | M1 (4, 2)G | M4 (4, 3)B | M1 (4, 2)B |
| G10 | M3 (1, 3)R | M4 (1, 3)G | M3 (1, 3)G | M4 (1, 3)B | M3 (2, 3)G | M4 (2, 3)B | M3 (2, 3)B | M4 (3, 3)R | M3 (3, 3)B | M4 (4, 3)R | M3 (4, 3)R | M4 (4, 3)G | |
| G11 | | M2 (1, 3)G | M3 (1, 3)B | M2 (1, 3)B | M3 (2, 3)R | M2 (2, 3)B | M3 (3, 3)R | M2 (3, 3)R | M3 (3, 3)G | M2 (4, 3)R | M3 (4, 3)G | M2 (4, 3)G | M3 (4, 3)B |
| G12 | | M2 (1, 3)R | M1 (1, 3)B | M2 (2, 3)R | M1 (2, 3)R | M2 (2, 3)G | M1 (3, 3)R | M2 (3, 3)G | M1 (3, 3)G | M2 (3, 3)B | M1 (4, 3)G | M2 (4, 3)B | M1 (4, 3)B |
| G13 | M1 (1, 3)R | | M1 (1, 3)G | | M1 (2, 3)G | | M1 (2, 3)B | | M1 (3, 3)B | | M1 (4, 3)R | | |

FIG. 115

LUT (Dy, Gx) : LAYOUT PATTERN 5

| Dy \ Gx | | LOWER 3 BITS | | | | | | | |
|---|---|---|---|---|---|---|---|---|---|
| | | 001 | 010 | 011 | 100 | 101 | 110 | 111 | 000 |
| LOWER 2 BITS | 01 | 1 | 0 | 0 | 1 | 0 | 1 | 1 | 0 |
| | 10 | 1 | 1 | 0 | 0 | 0 | 0 | 1 | 1 |
| | 11 | 0 | 1 | 1 | 0 | 1 | 0 | 0 | 1 |
| | 00 | 0 | 0 | 1 | 1 | 1 | 1 | 0 | 0 |

0 : NEIGHBORING SUB-PIXEL PAIR P2R

1 : NEIGHBORING SUB-PIXEL PAIR P2L

FIG. 119

TM(N, op, x): RELATION BETWEEN COLUMNS OF DISPLAY PART AND VIEWPOINT NUMBER k

| NUMBER OF VIEWPOINTS | op | COLUMNS OF DISPLAY PART: x | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | ··· | m − 1 | m |
| N=3 | 1 | 3 | 2 | 1 | 3 | 2 | 1 | 3 | 2 | 1 | 3 | 2 | ··· | 2 | 1 |
| N=4 | 1 | 4 | 3 | 2 | 1 | 4 | 3 | 2 | 1 | 4 | 3 | 2 | ··· | 2 | 1 |
| N=4 | 2 | 2 | 1 | 4 | 3 | 2 | 1 | 4 | 3 | 2 | 1 | 4 | ··· | 4 | 3 |
| N=5 | 1 | 5 | 4 | 3 | 2 | 1 | 5 | 4 | 3 | 2 | 1 | 5 | ··· | 2 | 1 |
| N=6 | 1 | 6 | 5 | 4 | 3 | 2 | 1 | 6 | 5 | 4 | 3 | 2 | ··· | 2 | 1 |
| : | : | | | | | | | | | | | | | | |

FIG. 120

RELATION BETWEEN EVEN/ODD OF DATA LINES AND INPUT SYNTHESIZED DATA

| | EVEN/ODD OF DATA LINES | | | |
|---|---|---|---|---|
| | ODD NUMBER:v1 | | EVEN NUMBER:v2 | |
| | u=0 | u=1 | u=0 | u=1 |
| ODD-NUMBERED COLUMNS OF DISPLAY PART: M1'<br>EVEN-NUMBERED COLUMNS OF DISPLAY PART: M2' | 2 | 1 | 1 | 2 |
| ODD-NUMBERED COLUMNS OF DISPLAY PART: M2'<br>EVEN-NUMBERED COLUMNS OF DISPLAY PART: M1' | 1 | 2 | 2 | 1 |

INPUT SYNTHESIZED DATA OF ODD-NUMBERED DATA LINE M'(v1)
INPUT SYNTHESIZED DATA OF EVEN-NUMBERED DATA LINE M'(v2)

FIG. 124B
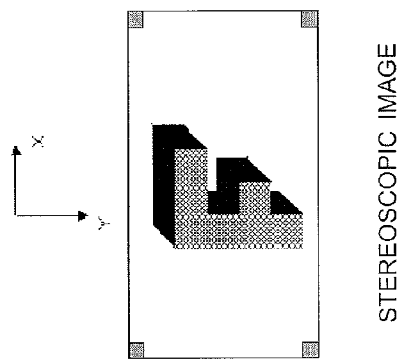
FIG. 124A
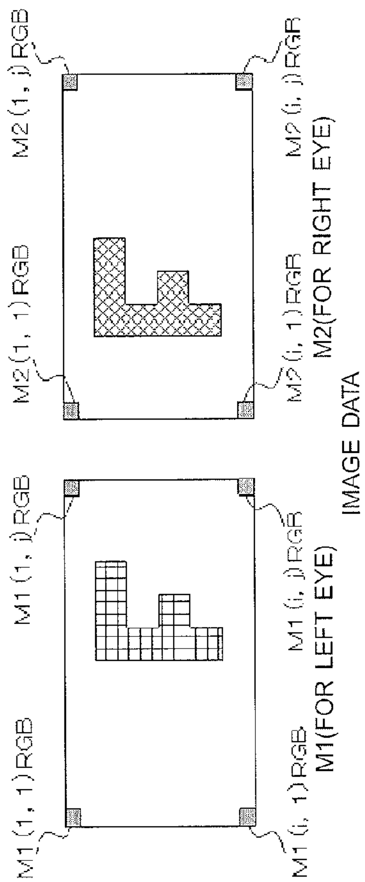
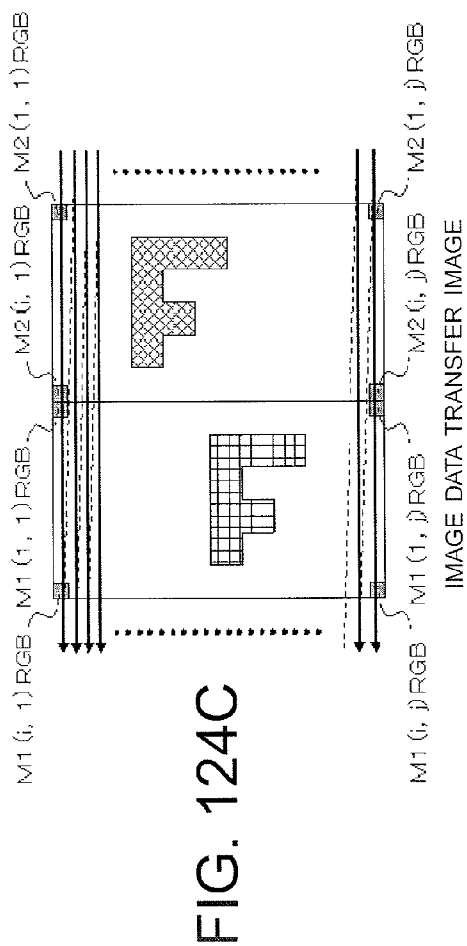
FIG. 124C

DISPLAY CONTROLLER, DISPLAY DEVICE, IMAGE PROCESSING METHOD, AND IMAGE PROCESSING PROGRAM

CROSS-REFERENCE TO RELATED APPLICATIONS

This application is a divisional of U.S. patent application Ser. No. 12/760,145, filed Apr. 14, 2010, which claims priority to Japanese Patent Application Nos. 2009-099340 filed on Apr. 15, 2009, 2010-067645 and 2010-067646 filed and Mar. 24, 2011, respectively, the contents of all of which are incorporated herein by reference.

BACKGROUND OF THE INVENTION

1. Field of the Invention

The present invention relates to a device for displaying different images to a plurality of viewpoints and to a signal processing method of image data to be displayed. More specifically, the present invention relates to a structure of a display part capable of providing high-quality display images, an image data processing device for transmitting image data for each viewpoint to the display part, and an image data processing method.

2. Description of the Related Art

In accordance with developments in portable telephones and PDAs (personal digital assistants), more and more size reduction and higher definition of the display devices have been achieved. In the meantime, as a display device with a new added values, a display device with which different images are viewed depending on the positions from which viewers observe the display device, i.e., a display device which provides different image to a plurality of viewpoints, and a display device which provides three-dimensional images to the viewer by making the different image as parallax images have attracted attentions.

As a method which provides different images to a plurality of viewpoints, there is known a method which synthesizes and displays image data for each of the viewpoints, separates the displayed synthesized image by an optical separating device formed with a barrier (light-shielding plate) having a lens or a slit, and provides the images to each of the viewpoints. The principle of image separation is to limit the pixels observed from each viewing direction by using an optical device such as a barrier having a slit or a lens. As the image separating device, generally used are a parallax barrier formed with a barrier having a great number of slits in stripes, and a lenticular lens in which cylindrical lenses exhibiting a lens effect in one direction are arranged.

There has been proposed a stereoscopic display device or a multi-viewpoint display device, which includes an optical image separating device such as the one described above and a device which generates synthesized images to be displayed from the image data for each viewpoint (see Japanese Unexamined Patent Publication 2008-109607 (Patent Document 1), for example). Patent Document 1 discloses: a display device which performs stereoscopic display by using a liquid crystal panel and a parallax barrier; and a synthesizing method for creating synthesized images to be displayed on a display part (liquid crystal panel) when performing the stereoscopic display. In this liquid crystal panel, pixel electrodes that form a plurality of sub-pixels are arranged in matrix in the horizontal direction and the vertical direction on the display part. At boundaries between each of the pixel electrodes, scanning lines are provided in the horizontal direction and data lines are provided in the vertical direction. Further, TFTs (thin film transistors) as pixel switching elements are provided in the vicinity of intersection points between the scanning lines and the data lines.

With the stereoscopic display device using the optical image separating device, it is unnecessary for users to wear special eyeglasses. Thus, it is suited to be loaded on portable devices because there is no troublesome work of wearing the eyeglasses. Actually, portable devices to which a stereoscopic display device formed with a liquid crystal panel and a parallax barrier is loaded have been manufactured as products on the market (see NIKKEI ELECTRONICS, Jan. 6, 2003, No. 838 pp. 26-27 (Non-Patent Document 1), for example).

With the above method, i.e., with the display device which provides different images to each of a plurality of viewpoints by using the optical separating device, there may be cases where the boundary between an image and another image is observed dark when the observer changes the viewing position and the image to be observed becomes changed. This phenomenon is caused because a non-display region (a light-shield part generally called a black matrix in liquid crystal panel) between the image and another image for each viewpoint is observed. The above-described phenomenon generated due to the change in the observer's viewing point does not occur in a general display device which does not have an optical separating device. Thus, the observers feel a sense of discomfort or deterioration in the display quality when encountering the above-described phenomenon which is generated in a multi-viewpoint display device or a stereoscopic display device having the optical separating device.

In order to improve the issues generated due to the optical separating device and the light-shield part described above, there is proposed a display device which suppresses deterioration in the display quality through devising the shape and the layout of the pixel electrodes and the light-shield part of the display part (Japanese Unexamined Patent Publication 2005-208567 (Patent Document 2), Japanese Unexamined Patent Publication 2009-098311 (Patent Document 3), for example).

FIG. 134 is a plan view showing a display part of a display device disclosed in Patent Document 2. An aperture part 75 shown in FIG. 134 is an aperture part of a sub-pixel that is the minimum unit of image display. The layout direction of the aperture part 75 in vertical and lateral directions are defined as a vertical direction 11 and a horizontal direction 12, respectively, as shown in FIG. 134. The shape of each aperture part 75 is substantially a trapezoid having features which will be described later. Further, the image separating device is a lenticular lens in which cylindrical lenses 30*a* having the vertical direction 11 as the longitudinal direction thereof are arranged in the horizontal direction 12. The cylindrical lens 30*a* does not exhibit the lens effect in the longitudinal direction but exhibits the lens effect only in the lateral direction. That is, the lens effect is achieved for the horizontal direction 12. Thus, light that exits from the aperture parts 75 of a sub-pixel 41 and a sub-pixel 42 neighboring in the horizontal direction 12 is directed towards different directions from each other.

In the aperture part 75, there are a pair of sides which slope towards opposite direction from each other with respect to the vertical direction 11 and the angles thereof between the vertical direction 11 and the extending directions are the same. As a result, along the horizontal direction 12, the position of an edge part of the aperture part 75 of the display panel and the position of the optical axis of the cylindrical lens 30*a* are relatively different in the vertical direction 11. Further, the aperture parts 75 neighboring to each other along the longitudinal direction are arranged to be line-symmetrical with respect to a segment extending in the lateral direction 12. Furthermore, the aperture parts 75 neighboring to each other along the horizontal direction 12 are arranged to be point-symmetrical with respect to an intersection point between a segment that connects the middle point between the both edges in the vertical direction 11 and a segment that connects the middle point between the both edges in the horizontal direction 12.

Therefore, regarding the aperture widths in the vertical direction 11, the total widths of the aperture part 75 of the sub-pixel 41 and the aperture part 75 of the sub-pixel 42 in the slope parts are substantially constant regardless of the positions in the horizontal direction 12.

That is, in the display device depicted in Patent Document 2, when sectional view of a display panel is assumed in the vertical direction 11 that is perpendicular with respect to the arranging direction of the cylindrical lenses 30*a* at an arbitrary point along the horizontal direction 12, the proportions of the light-shield parts (wirings 70 and light-shield parts 76) and the aperture parts are substantially the same. Thus, when the observer moves the viewing point to the lateral direction 12 that is the image separating direction so that the observing direction is changed, the proportions of the light-shield parts to be observed are substantially the same. That is, the observer does not observe only the light-shield parts from a specific direction, so that the display is not to be observed dark. That is, it is possible to prevent deterioration in the display quality that is caused due to the light-shield regions.

However, there are following issues with the related techniques described above. With the display device depicted in Patent Document 1, deterioration in the display quality caused due to the light-shield parts is an issue, as described above.

The display device depicted in Patent Document 2 which manages to overcome the issue caused due to the light-shield part needs to keep a complicated relation between the aperture shape of the pixel electrodes of the sub-pixels and the shape of the light-shield parts. Thus, the switching devices (TFTs) to be the light-shield parts cannot be arranged at uniform positions with a pixel electrode unit, such as in the vicinity of the intersection points between the scanning lines and the data lines, unlike the case of Patent Document 1. Further, with the display part of the display device, it is required to have minute pixel pitch for improving the definition and to increase the so-called numerical aperture that is determined with an area ratio of the aperture parts and the light-shield parts which contribute to the display luminance for improving the display luminance. In order to achieve the high numerical aperture while keeping the light-shield part shape and the aperture shape of the display part depicted in Patent Document 2, not only the arranging positions of the switching devices but also the connecting relations between the switching devices and the scanning lines as well as the data lines cannot be determined uniformly with the pixel electrode unit, unlike the case of Patent Document 1. To have nonuniform connecting relations regarding the switching devices of the pixel electrodes, the scanning lines, and the data lines in the pixel electrode unit means that a typical method for generating the synthesized image as depicted in Patent Document 1 cannot be employed.

The present invention has been designed in view of the aforementioned issues. It is an exemplary object of the present invention to provide: a display device capable of displaying images to each of a plurality of viewpoints, which includes a display part in which the shape and layout of the sub-pixels capable of suppressing the issues caused due to the light-shield parts are maintained, and layout and connections of the pixel electrodes, the switching devices, the scanning lines, the data lines, and the like are designed to achieve the high numerical aperture; a display controller of the display device; a device for generating synthesized images to be displayed on the display part; and a method for generating the synthesized images.

SUMMARY OF THE INVENTION

A display controller according to an exemplary aspect of the invention is a controller for outputting synthesized image data to a display module which includes: a display part in which sub-pixels connected to data lines via switching devices controlled by scanning lines are arranged in m-rows and n-columns (m and n are natural numbers), which is driven by (m+1) pieces of the scanning lines and at least n pieces of the data lines; and a first image separating device which directs light emitted from the sub-pixels towards a plurality of viewpoints in a sub-pixel unit. The display controller includes: an image memory which stores viewpoint image data for the plurality of viewpoints; a writing control device which writes the viewpoint image data inputted from outside to the image memory; a parameter storage device which stores parameters showing a positional relation between the first image separating device and the display part; and a readout control device which reads out the viewpoint image data from the image memory according to a readout order that is obtained by applying the parameters to a repeating regulation that is determined based on layout of the sub-pixels, number of colors, and layout of the colors, and outputs the readout data to the display module as the synthesized image data.

A display controller according to another exemplary aspect of the invention is a controller for outputting synthesized image data to a display module which includes: a display part in which sub-pixels connected to data lines via switching devices controlled by scanning lines are arranged in n-rows and m-columns (m and n are natural numbers), which is driven by (n+1) pieces of data lines and (m+1) pieces of the scanning lines; and an image separating device which directs light emitted from the sub-pixels towards a plurality of viewpoints in an extending direction of the data lines in a sub-pixel unit. The display controller includes: an image memory which stores viewpoint image data for the plurality of viewpoints; a writing control device which writes the viewpoint image data inputted from outside to the image memory; and a readout control device which reads out the viewpoint image data from the image memory according to a readout order corresponding to the display module, and outputs the readout data to the display module as the synthesized image data.

An image processing method according to still another exemplary aspect of the invention is a method for generating synthesized image data to be outputted to a display module which includes: a display part in which sub-pixels connected to data lines via switching devices controlled by scanning lines are arranged in m-rows and n-columns (m and n are natural numbers), which is driven by (m+1) pieces of the scanning lines and at least n pieces of the data lines; and a first image separating device which directs light emitted from the sub-pixels towards a plurality of viewpoints in a sub-pixel unit. The method includes: reading parameters showing a positional relation between the first image separating device and the display part from a parameter storage device; inputting viewpoint image data for a plurality of viewpoints from outside, and writing the data into the image memory; and reading out the viewpoint image data from the image memory according to a readout order that is obtained by applying the parameters to a repeating regulation that is determined based on layout of the sub-pixels, number of colors, and layout of the colors, and outputting the readout data to the display module as the synthesized image data.

An image processing method according to still another exemplary aspect of the invention is a method for generating synthesized image data to be outputted to a display module which includes: a display part in which sub-pixels connected to data lines via switching devices controlled by scanning lines are arranged in n-rows and m-columns (m and n are natural numbers), which is driven by (n+1) pieces of data lines and (m+1) pieces of the scanning lines; and an image separating device which directs light emitted from the sub-pixels towards a plurality of viewpoints in an extending direction of the data lines in a sub-pixel unit. The image processing method includes: inputting viewpoint image data for the plurality of viewpoints from outside, and writing the data into an image memory; reading out the viewpoint image data from the image memory according to a readout order corresponding to the display module; and outputting the readout viewpoint image data to the display module as the synthesized image data.

An image processing program according to still another exemplary aspect of the invention is a program for generating synthesized image data to be outputted to a display module which includes: a display part in which sub-pixels connected to data lines via switching devices controlled by scanning lines are arranged in m-rows and n-columns (m and n are natural numbers), which is driven by (m+1) pieces of the scanning lines and at least n pieces of the data lines; and a first image separating device which directs light emitted from the sub-pixels towards a plurality of viewpoints in a sub-pixel unit. The program causes a computer to execute: a procedure for reading parameters showing a positional relation between the first image separating device and the display part from a parameter storage device; a procedure for inputting viewpoint image data for a plurality of viewpoints from outside, and writing the data into the image memory; and a procedure for reading out the viewpoint image data from the image memory according to a readout order that is obtained by applying the parameters to a repeating regulation that is determined based on layout of the sub-pixels, number of colors, and layout of the colors, and outputting the readout data to the display module as the synthesized image data.

An image processing program according to still another exemplary aspect of the invention is a program for generating synthesized image data to be outputted to a display module which includes: a display part in which sub-pixels connected to data lines via switching devices controlled by scanning lines are arranged in n-rows and m-columns (m and n are natural numbers), which is driven by (n+1) pieces of data lines and (m+1) pieces of the scanning lines; and an image separating device which directs light emitted from the sub-pixels towards a plurality of viewpoints in an extending direction of the data lines in a sub-pixel unit. The image processing program causes a computer to execute: a procedure for inputting viewpoint image data for the plurality of viewpoints from outside, and writing the data into an image memory; a procedure for reading out the viewpoint image data from the image memory according to a readout order corresponding to the display module; and a procedure for outputting the readout viewpoint image data to the display module as the synthesized image data.

BRIEF DESCRIPTION OF THE DRAWINGS

FIG. 6 shows input image data according to the first exemplary embodiment of the present invention;

FIG. 18 shows synthesized image data 1 according to the first exemplary embodiment of the present invention (layout pattern 1);

FIG. 19 shows synthesized image data 2 according to the first exemplary embodiment of the present invention (layout pattern 2);

FIG. 20 shows synthesized image data 3 according to the first exemplary embodiment of the present invention (layout pattern 3);

FIG. 21 shows synthesized image data 4 according to the first exemplary embodiment of the present invention (layout pattern 4);

FIG. 22 shows synthesized image data 5 according to the first exemplary embodiment of the present invention (layout pattern 5);

FIG. 24 shows even/odd of scanning lines and viewpoint images in the first exemplary embodiment of the present invention;

FIG. 25 shows the regularity of scanning line unit according to the first exemplary embodiment of the present invention;

FIG. 26 shows even/odd of the scanning lines and the use state of the data lines according to the first exemplary embodiment of the present invention;

FIG. 27 shows an example of a lookup table for storing the layout pattern of the first exemplary embodiment according to the present invention;

FIG. 28 shows an example of a lookup table for storing the layout pattern of the first exemplary embodiment according to the present invention;

FIG. 29 shows saved parameters of the first exemplary embodiment according to the present invention;

FIG. 42 shows input image data according to the second exemplary embodiment of the present invention;

FIG. 43 shows synthesized image data 6 according to the second exemplary embodiment of the present invention (layout pattern 6);

FIG. 49 is an illustration for describing vertical-lateral conversion (flat display) according to the fourth exemplary embodiment;

FIG. 69 shows charts showing input image data of the ninth exemplary embodiment;

FIG. 78 is a chart showing synthesized image data 1 which is outputted to the display part of the layout pattern 1 of the ninth exemplary embodiment;

FIG. 79 is a chart showing synthesized image data 2 which is outputted to the display part of the layout pattern 2 of the ninth exemplary embodiment;

FIG. 80 is a chart showing synthesized image data 3 which is outputted to the display part of the layout pattern 3 of the ninth exemplary embodiment;

FIG. 81 is a chart showing synthesized image data 4 which is outputted to the display part of the layout pattern 4 of the ninth exemplary embodiment;

FIG. 83 is a chart showing the relation between viewpoints of input image data and even/odd of data lines on the display part according to the ninth exemplary embodiment;

FIG. 84 is a chart showing the relation between input image data and data lines on the display part according to the ninth exemplary embodiment;

FIG. 85 is a chart showing the relation between input image data and scanning lines on the display part according to the ninth exemplary embodiment;

FIG. 86 is a chart showing the relation between column numbers of the input image data and scanning lines on the display part according to the ninth exemplary embodiment;

FIG. 87 is a chart showing the connecting information of the up-and-down sub-pixel pairs P2R and P2L in the layout pattern 3 of the ninth exemplary embodiment;

FIG. 88 shows charts showing an example of lookup table which stores the layout pattern of the ninth exemplary embodiment;

FIG. 89 is a chart showing the relation regarding LUT (Dy, Gx), even/odd of scanning lines and data lines, and the facing directions of the sub-pixels according to the ninth exemplary embodiment;

FIG. 90 is a chart showing the relation between viewpoints of input image data and even/odd of data lines on the display part according to the ninth exemplary embodiment;

FIG. 91 is a chart showing saved parameters required for generating synthesized image data according to the ninth exemplary embodiment;

FIG. 113 shows charts of input image data according to the tenth exemplary embodiment;

FIG. 114 is a chart showing synthesized image data 5 which is outputted to the display part of the layout pattern 5 of the tenth exemplary embodiment;

FIG. 115 is a chart showing an example of lookup table which stores the layout pattern 5 of the tenth exemplary embodiment;

FIG. 119 is a chart showing an example of table TM which shows values of viewpoint number k for the column numbers of the display part according to the tenth exemplary embodiment;

FIG. 120 is a chart showing the relation between even/odd of data lines and input synthesized data according to the tenth exemplary embodiment;

FIG. 121 is a flowchart showing the outline of actions executed in the display device of the tenth exemplary embodiment;

FIG. 122 is a chart showing an example of input image data rearrangement executed in the display device of the tenth exemplary embodiment;

FIG. 123 is a functional block diagram showing an eleventh exemplary embodiment;

FIGS. 124A, 124B and 124C are explanatory diagrams showing an example of transform form of input image data according to the eleventh exemplary embodiment;

FIG. 125 is a timing chart showing an example of actions executed in the eleventh exemplary embodiment;

FIGS. 126A, 126B and 126C are explanatory diagrams showing another example of the transform form of input image data according to the eleventh exemplary embodiment;

FIGS. 127A, 127B and 127C are explanatory diagrams showing an example of transform form of input image data according to a twelfth exemplary embodiment;

FIG. 128 is a timing chart showing an example of actions executed in the twelfth exemplary embodiment;

FIG. 129 is a schematic plan view showing a corresponding relation between the first column and the second column of a second viewpoint image data M2 shown in FIG. 69 and sub-pixels of the display panel in the layout pattern shown in FIG. 71;

FIG. 130 is a schematic plan view showing a first example of a data-line driving circuit and a display part according to a thirteenth exemplary embodiment;

FIG. 131 is a timing chart showing an example of actions executed in the thirteenth exemplary embodiment;

Figure 132:
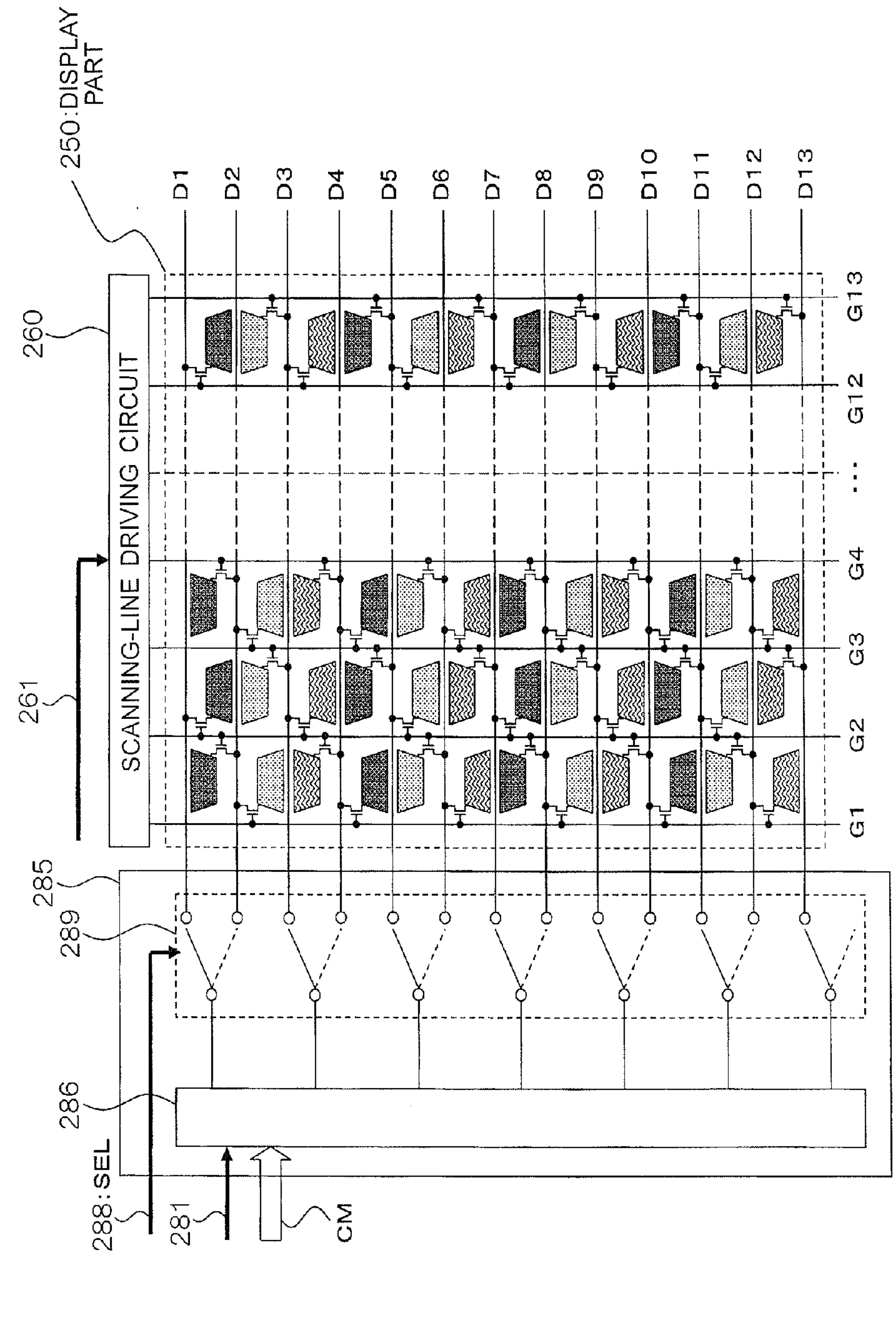
Figure 133:
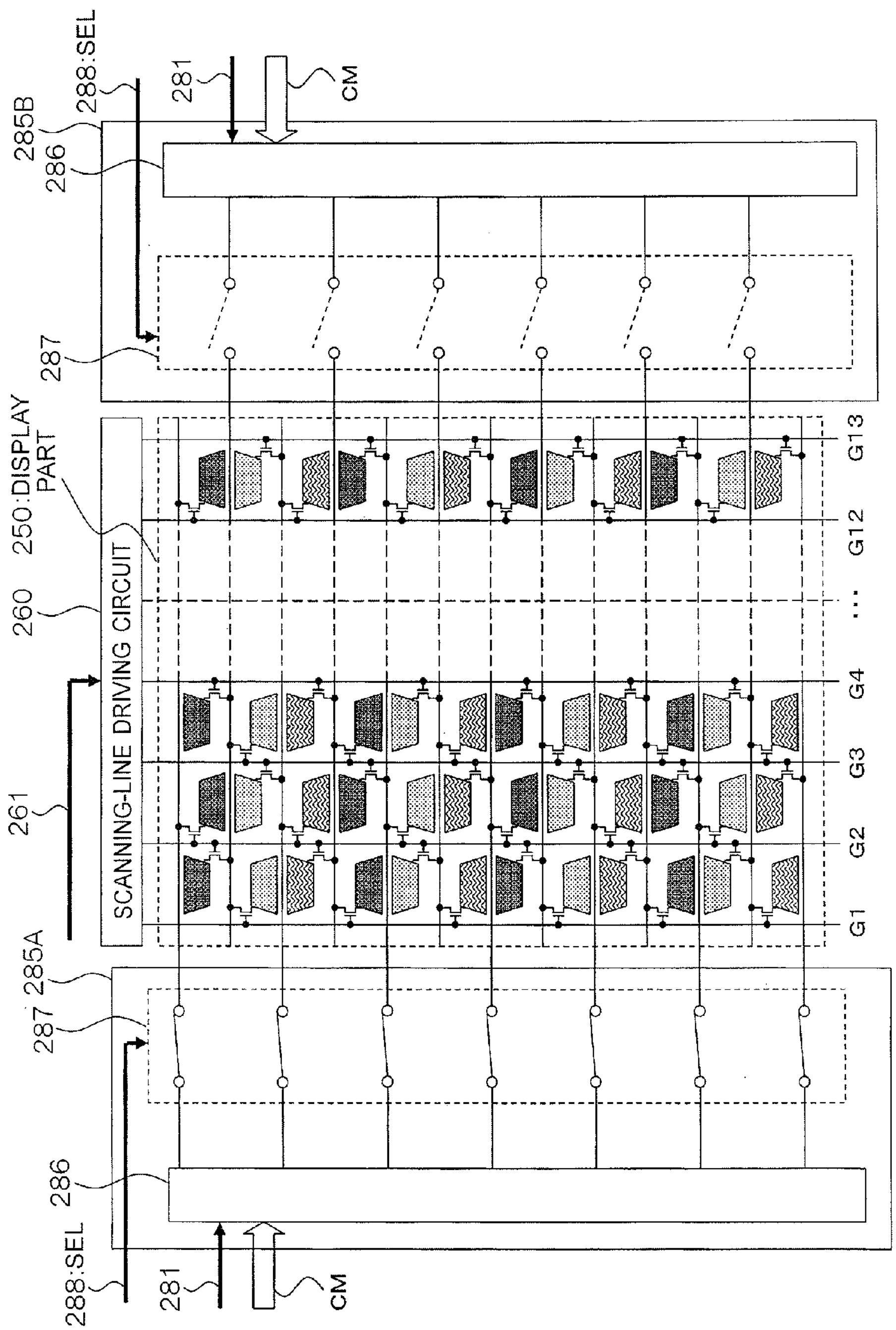
Figure 134:
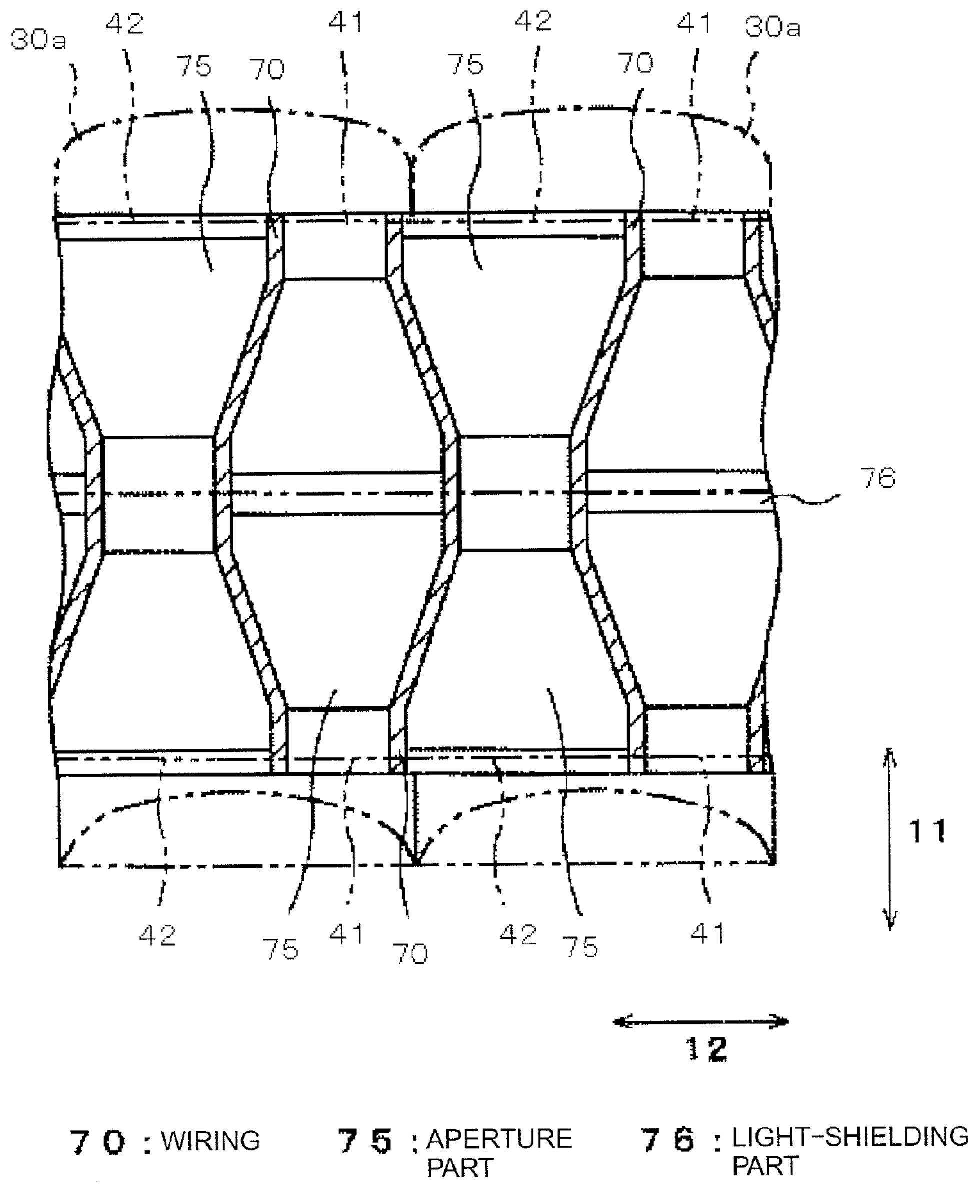

FIG. 132 is a schematic plan view showing a second example of the data-line driving circuit and the display part according to the thirteenth exemplary embodiment;

FIG. 133 is a schematic plan view showing a third example of the data-line driving circuit and the display part according to the thirteenth exemplary embodiment; and FIG. 134 is a plan view showing a display part of a display device according to a related technique.

DETAILED DESCRIPTION OF THE EXEMPLARY EMBODIMENTS

First, exemplary embodiments of the present invention will be described from a first exemplary embodiment to an eighth exemplary embodiment.

Hereinafter, the exemplary embodiments of the present invention will be described by referring to the accompanying drawings. In the following explanations of the first exemplary embodiment to the eighth exemplary embodiment, it is to be noted that the arranging direction of scanning lines in a display panel is defined as "vertical direction" and the arranging direction of data lines is defined as "horizontal direction". Further, a sequence of pixel electrodes along the vertical direction is called a "column", a sequence of pixel electrodes along the horizontal direction is called a "row", and a pixel electrode matrix is expressed as "m-rows×n-columns".

First Exemplary Embodiment

First, the outline of the first exemplary embodiment will be described by mainly referring to FIG. 1 and FIG. 2. A display controller 100 according to the embodiment outputs synthesized image data CM to a display module 200. The display module 200 includes a display part 50 and a first image separating device (30). In the display part 50, sub-pixels 40 connected to data lines D1, - - - via switching devices (46: FIG. 3) controlled by scanning lines G1, - - - are arranged in m-rows and n-columns (m and n are natural numbers), and the sub-pixels 40 are driven by (m+1) pieces of scanning lines G1, - - - and at least n pieces of data lines D1, - - - . The first image separating device (30) directs the light emitted from the sub-pixels 40 to a plurality of viewpoints by a unit of the sub-pixel 40. Further, the display controller 100 includes: an image memory 120 which stores viewpoint image data for a plurality of viewpoints; a writing control device 110 which writes the viewpoint image data inputted from outside to the image memory 120; a parameter storage device 140 which stores parameters showing a positional relation of the first image separating device (30) and the display part 50; and a readout control device 130 which reads out the viewpoint image data from the image memory 120 according to a readout order that is obtained by applying the parameters to a repeating regulation that is determined based on the layout of the sub-pixels 40, number of colors, and layout of the colors, and outputs it to the display module 200 as the synthesized image data CM. The first image separating device (30) corresponds to a lenticular lens 30, and the switching device (46: FIG. 3) corresponds to a TFT 46.

The display part 50 is formed by having an up-and-down sub-pixel pair P2R (FIG. 4) or P2L (FIG. 5) configured with two sub-pixels 40*a*, 40*b* arranged by sandwiching a single scanning line Gy as a basic unit. The switching devices (46) provided to each of the two sub-pixels 40*a*, 40*b* are controlled in common by the scanning line Gy sandwiched by the two sub-pixels 40*a*, 40*b*, and are connected to different data lines Dx, Dx+1. The up-and-down sub-pixel pairs P2R (FIG. 4) or P2L (FIG. 5) neighboring to each other in the extending direction of the scanning line Gy are so arranged that the switching devices (46) thereof are controlled by different scanning lines Gy−1, Gy+1.

More specifically, there are three colors of the sub-pixels 40 such as a first color (R), a second color (G), and a third color (B). Provided that "y" is a natural number, regarding the up-and-down sub-pixel pair P2R (FIG. 4) or P2L (FIG. 5) connected to the y-th scanning line Gy, the color of one of the two sub-pixels 40*a* and 40*b* is the first color (R) while the other is the second color (G), and forms either an even column or an odd column of the display part 50. Regarding the up-and-down sub-pixel pair P2R (FIG. 4) or P2L (FIG. 5) connected to the (y+1)-th scanning line Gy+1, the color of one of the two sub-pixels 40*a* and 40*b* is the second color (G) while the other is the third color (B), and forms the other one of the even column or the odd column of the display init 50. Regarding the up-and-down sub-pixel pair P2R (FIG. 4) or P2L (FIG. 5) connected to the (y+2)-th scanning line Gy+2, the color of one of the two sub-pixels 40*a* and 40*b* is the third color (B) while the other is the first color (R), and forms one of the even column or the odd column of the display init 50. Regarding the up-and-down sub-pixel pair P2R (FIG. 4) or P2L (FIG. 5) connected to the (y+3)-th scanning line Gy+3, the color of one of the two sub-pixels 40*a* and 40*b* is the first color (R) while the other is the second color (G), and forms the other one of the even column or the odd column of the display init 50. Regarding the up-and-down sub-pixel pair P2R (FIG. 4) or P2L (FIG. 5) connected to the (y+4)-th scanning line Gy+4, the color of one of the two sub-pixels 40*a* and 40*b* is the second color (G) while the other is the third color (B), and forms one of the even column or the odd column of the display init 50. Regarding the up-and-down sub-pixel pair P2R (FIG. 4) or P2L (FIG. 5) connected to the (y+5)-th scanning line Gy+5, the color of one of the two sub-pixels 40*a* and 40*b* is the third color (B) while the other is the first color (R), and forms the other one of the even column or the odd column of the display part 50.

At this time, the readout control device 130 reads out the viewpoint image data from the image memory 120 according to the readout order as follows. That is, the readout control device 130: reads out the first color (R) and the second color (G) by corresponding to the y-th scanning line Gy, and reads out the viewpoint image that corresponds to either an even column or an odd column of the display part 50; reads out the second color (G) and the third color (B) by corresponding to the (y+1)-th scanning line Gy+1, and reads out the viewpoint image that corresponds to the other one of the even column or the odd column of the display part 50; reads out the third color (B) and the first color (R) by corresponding to the (y+2)-th scanning line Gy+2, and reads out the viewpoint image that corresponds to either the even column or the odd column of the display part 50; reads out read out colors are the first color (R) and the second color (G) by corresponding to the (y+3)-th scanning line Gy+3, and reads out the viewpoint image that corresponds to the other one of the even column or the odd column of the display part 50; reads out the second color (G) and the third color (B) by corresponding to the (y+4)-th scanning line Gy+4, and reads out the viewpoint image that corresponds to either the even column or the odd column of the display part 50; ands reads the third color (B) and the first color (R) by corresponding to the (y+5)-th scanning line Gy+5, and reads out the viewpoint image that corresponds to the other one of the even column or the odd column of the display part 50.

An image processing method according to the exemplary embodiment is achieved by actions of the display controller 100 of the exemplary embodiment. That is, the image processing method of the exemplary embodiment is an image processing method for generating the synthesized image data CM to be outputted the display module 200, which: reads the parameter showing the positional relation between the first separating image (30) and the display part 50 from the parameter storage device 140; writes the viewpoint image data for a plurality of viewpoints inputted from the outside to the image memory 120; and reads out the viewpoint image data from the image memory 120 according to a readout order that is obtained by applying the parameters to a repeating regulation that is determined based on the layout of the sub-pixels 40, number of colors, and layout of the colors, and outputs it to the display module 200 as synthesized image data CM. Details of the image processing method according to the exemplary embodiment conform to the actions of the display controller 100 according to the exemplary embodiment. Image processing methods according to other exemplary embodiments are achieved by the actions of the display controllers of the other exemplary embodiments as in the case of the first exemplary embodiment, so that explanations thereof are omitted.

An image processing program according to the exemplary embodiment is for causing a computer to execute the actions of the display controller 100 of the exemplary embodiment. When the display controller 100 includes a computer formed with a memory, a CPU, and the like, the image processing program of the exemplary embodiment is stored in the memory, and the CPU reads out, interprets, and executes the image processing program of the exemplary embodiment. That is, the image processing program of the exemplary embodiment is a program for generating the synthesized image data CM to be outputted to the display module 200, which causes the computer to execute: a procedure which reads the parameter showing the positional relation between the first separating image (30) and the display part 50 from the parameter storage device 140; a procedure which writes the viewpoint image data for a plurality of viewpoints inputted from the outside to the image memory 120; and a procedure which reads out the viewpoint image data from the image memory 120 according to a readout order that is obtained by applying the parameters to a repeating regulation that is determined based on the layout of the sub-pixels 40, number of colors, and layout of the colors, and outputs it as synthesized image data CM to the display module 200. Details of the image processing program according to the exemplary embodiment conform to the actions of the display controller 100 according to the exemplary embodiment. Image processing programs according to other exemplary embodiments are for causing the computer to execute the actions of the display controllers of the other exemplary embodiments as in the case of the first exemplary embodiment, so that explanations thereof are omitted.

With the present invention, it is possible to find the scanning lines G1, - - - and the data lines D1, - - - connected to the sub-pixels 40 arranged in an arbitrary row and an arbitrary column without actually designing the layout, since the regularity in the connection patterns of scanning lines G1, - - - and the data lines D1, - - - for the matrix of the sub-pixels 40 has been found. Further, the synthesized image data CM can easily be generated from the found regularity, the placing condition of the first image separating device (30), the arranging order of the colors of the sub-pixels 40, the layout pattern of the up-and-down sub-pixel pair P2R or P2L as the minimum unit, and the like. This makes it possible to use input image data in a same transfer form as that of a typical flat display device, so that there is no load (e.g., being required to rearrange the output image data) imposed upon the device that employs the exemplary embodiment. Furthermore, the condition for generating the synthesized image data CM is made into parameters, and the parameter storage device 140 for storing the parameter is provided. Thus, when there is a change in the display module 200, it simply needs to change the parameters and does not need to change the video signal processing device. This makes it possible to decrease the number of designing steps and to reduce the cost.

Hereinafter, the first exemplary embodiment will be described in more details.

(Explanation of Structures)

Structures of the display device according to the first exemplary embodiment of the present invention will be described.

Figure 1:
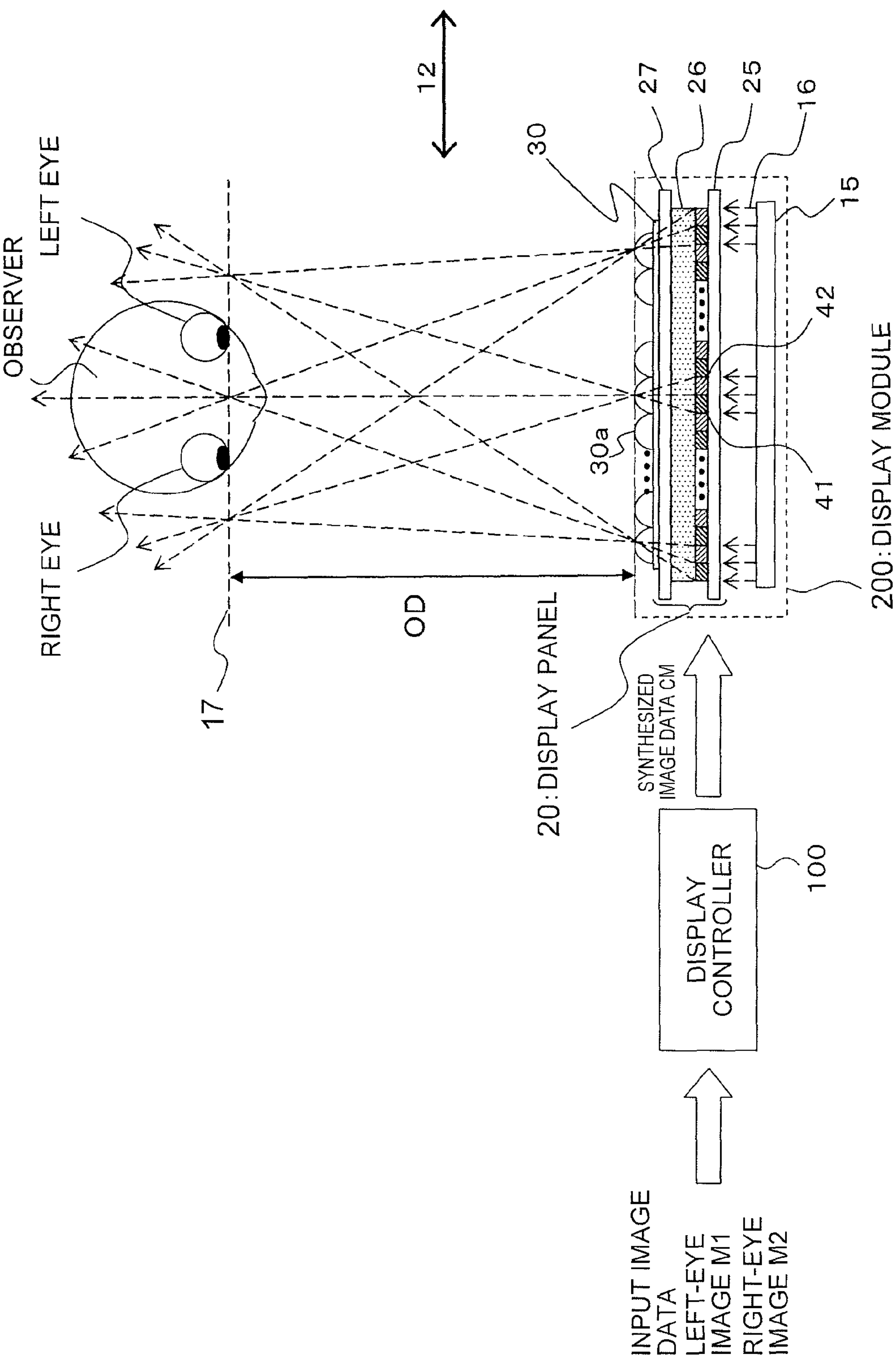
FIG. 1 is a schematic block diagram of a first exemplary embodiment according to the present invention.

FIG. 1 is a schematic block diagram of a stereoscopic display device of the exemplary embodiment, which shows an optical model viewed above the head of an observer. The outline of the exemplary embodiment will be described by referring to FIG. 1. The display device according to the exemplary embodiment is formed with the display controller 100 and the display module 200. The display controller 100 has a function which generates synthesized image data CM from a first viewpoint image data (left-eye image data) M1 and a second viewpoint image data (right-eye image data) M2 inputted from outside. The display module 200 includes a lenticular lens 30 as an optical image separating device of displayed synthesized image and a backlight 15 provided to a display panel 20 which is the display device of the synthesized image data CM.

Referring to FIG. 1, the optical system of the exemplary embodiment will be described. The display panel 20 is a liquid crystal panel, and it includes the first image separating device (30) and the backlight 15. The liquid crystal panel is in a structure in which a glass substrate 25 on which a plurality of sub-pixels 41 and 42 (the minimum display part) are formed and a counter substrate 27 having a color filter (not shown) and counter electrodes (not shown) are disposed by sandwiching a liquid crystal layer 26. On the faces of the glass substrate 25 and the counter substrate 27 on the opposite sides of the liquid crystal layer 26, a polarization plate (not shown) is provided, respectively. Each of the sub-pixels 41 and 42 is provided with a transparent pixel electrode (not shown), and the polarization state of the transmitted light is controlled by applying voltages to the liquid crystal layer 26 between the respective pixel electrodes and the counter electrodes of the counter substrate 27. Light rays 16 emitted from the backlight 15 pass through the polarization plate of the glass substrate 25, the liquid crystal layer 26, the color filter of the counter substrate 27, and the polarization plate, and intensity modulation and coloring can be done thereby. The lenticular lens 30 is formed with a plurality of cylindrical lenses 30a exhibiting the lens effect to one direction, which are arranged along the horizontal direction. The lenticular lens 30 is arranged in such a manner that projected images from all the sub-pixels 41 overlap with each other and the projected images from all the sub-pixels 42 overlap with each other at an observing plane 17 that is away from the lens by a distance OD, through alternately using the plurality of sub-pixels on the glass substrate 25 as the first viewpoint (left-eye) sub-pixels 41 and the second viewpoint (right-eye) sub-pixels 42. With the above-described structure, a left-eye image formed with the sub-pixels 41 is provided to the left eye of the observer at the distance OD and the right-eye image formed with the sub-pixels 42 is provided to the right eye.

Next, details of the display controller 100 and the display panel 20 shown in FIG. 1 will be described. FIG. 2 is a block diagram of the first exemplary embodiment showing the functional structures from image input to image display.

The display controller 100 includes the writing control device 110, the image memory 120, the readout control device 130, the parameter storage device 140, and a timing control device 150.

The writing control device 110 has a function which generates a writing address given to the inputted image data {Mk (row, column) RGB} in accordance with the synchronous signal inputted along the image data. Further, the writing control device 110 has a function which gives the writing address to an address bus 95, and writes the input image data formed with the pixel data to the image memory 120 via a data bus 90. While the synchronous signal inputted from outside is illustrated with a single thick-line arrow in FIG. 2 for convenience's sake, the synchronous signals are formed with a plurality of signals such as vertical/horizontal synchronous signal, data clock, data enable, and the like.

The readout control device 130 includes: a function which generates a readout address according to a prescribed pattern in accordance with parameter information 51 of the display part 50 supplied from the parameter storage device 140, and a vertical control signal 61 as well as a horizontal control signal 81 from the timing control device 150; a function which reads out pixel data via the data bus 90 by giving the readout address to the address bus 95; and a function which outputs the read out data to a data-line driving circuit 80 as the synthesized image data CM.

The parameter storage device 140 includes a function which stores the parameters required for rearranging data in accordance with the layout of the display part 50 to be described later in more details.

The timing control device 150 includes a function which generates the vertical control signal 61 and the horizontal drive signal 81 for driving the display part 20, and outputs those to the readout control device 130, a scanning-line driving circuit 60, and the data-line driving circuit 80 of the display panel. While each of the vertical control signal 61 and the horizontal drive signal 81 is illustrated by a single thick-line arrow in FIG. 2 for the convenience' sake, the signals include a plurality of signals such as a start signal, a clock signal, an enable signal, and the like.

The display panel 20 includes: a plurality of scanning lines G1, G2, - - - , Gm, Gm+1 and the scanning-line drive circuit 60; a plurality of data lines D1, D2, - - - , Dn, Dn+1 and the data-line driving circuit 80; and the display part 50 which is formed with a plurality of sub-pixels 40 arranged in m-rows× n-columns. FIG. 2 is a schematic illustration of the functional structures, and the shapes and the connecting relations of the scanning lines, the data lines, and the sub-pixels 40 will be described later. Although not shown, the sub-pixel 40 includes a TFT as a switching device and a pixel electrode, and the gate electrode of the TFT is connected to the scanning line, the source electrode is connected to the pixel electrode, and the drain electrode is connected to the data line. The TFT turns ON/OFF according to the voltages supplied to the connected arbitrary scanning lines Gy sequentially from the scanning-line driving circuit 60. When the TFT turns ON, the voltage is written to the pixel electrode from the data line. The data-line driving circuit 80 and the scanning-line driving circuit 60 may be formed on the glass substrate where the TFTs are formed or may be loaded on the glass substrate or separately from the glass substrate by using driving ICs.

Next, the structure of the sub-pixel 40 which configures the display part 50 will be described by referring to the drawing. FIG. 3 is a top view taken from the observer side for describing the structure of the sub-pixel 40 of the exemplary embodiment. The sizes and reduced scales of each structural element are altered as appropriate for securing the visibility in the drawing. In FIG. 3, the sub-pixels 40 are illustrated in two types of sub-pixels 40a and 40b depending on the facing direction of its shape. Further, FIG. 3 shows an example in which four sub-pixels form 2-rows×2-columns as a part of the display part 50 shown in FIG. 2. Regarding the XY axes in FIG. 3, X shows the horizontal direction, and Y shows the vertical direction. Furthermore, in order to describe the image separating direction, the cylindrical lens 30a configuring the lenticular lens is illustrated in FIG. 3. The cylindrical lens 30a is a one-dimensional lens having a semicylindrical convex part, which does not exhibit the lens effect for the longitudinal direction but exhibits the lens effect for lateral direction. In this exemplary embodiment, the longitudinal direction of the cylindrical lens 30a is arranged along the Y-axis direction to achieve the lens effect for the X-axis direction. That is, the image separating direction is the horizontal direction X.

The four sub-pixels shown in FIG. 3 as the sub-pixels 40a and 40b are substantially in a trapezoid form surrounded by three scanning lines Gy−1, Gy, Gy+1 arranged in parallel in the horizontal direction and three data lines Dx, Dx+1, Dx+2 which are repeatedly bent to the horizontal direction that is the image separating direction. Hereinafter, the substantially trapezoid form is considered a trapezoid, and the short side out of the two parallel sides along the scanning lines Gy, - - - is called a top side E while the long side is called a bottom side F. That is, regarding the sub-pixel 40_a_ and the sub-pixel 40_b_, the trapezoids thereof face towards the opposite directions form each other with respect to the vertical direction Y, i.e., the directions from the respective top sides E to the respective bottom sides F are in an opposite relation.

Each of the sub-pixels 40_a_ and 40_b_ has a pixel electrode 45, a TFT 46, and a storage capacitance 47. The TFT 46 is formed at the intersection between a silicon layer 44 whose shape is shown with a thick line in FIG. 3 and the scanning lines Gy, - - - , and the TFT 46 includes a drain electrode, a gate electrode, and a source electrode, not shown. The gate electrode of the TFT 46 is formed at the intersection between the scanning lines Gy, - - - and the silicon layer 44, and connected to the scanning lines Gy, - - - . The drain electrode is connected to the data lines Dx, - - - via a contact hole 48. The source electrode is connected to the pixel electrode 45 whose shape is shown with a dotted line in FIG. 3 via a contact hole 49. Further, the silicon layer 44 that is on the source electrode side with respect to the scanning lines Gy forms the storage capacitance 47 between a storage capacitance line CS formed via an insulating film and itself. The storage capacitance line CS is arranged to bend so as to connect the storage capacitances 47 of each sub-pixel neighboring along the extending direction of the scanning lines Gy, - - - , i.e., along the X-axis direction. Further, the intersection points between the storage capacitance lines CS and the data lines Dx, - - - are arranged to be lined along the data lines Dx, - - - .

As shown in FIG. 3, regarding the sub-pixel 40_a_ and the sub-pixel 40_b_, the shapes, layouts, and connecting relations of the respective pixel electrodes 45, TFTs 46, contact holes 48, 49, and storage capacitances 47 are in a point-symmetrical relation with each other. That is, on an XY plane, when the sub-pixel 40_a_ including each structural element is rotated by 180 degrees, the structural shape thereof matches with that of the sub-pixel 40_b_.

Regarding the aperture parts of the sub-pixels 40_a_ and 40_b_ arranged in the manner described above, the proportions of the aperture parts and the light-shield parts in the Y-axis direction orthogonal to the image separating direction are substantially constant for the X-axis direction that is the image separating direction. The aperture part is an area contributing to display, which is surrounded by the scanning line, the data line, the storage capacitance line CS, and the silicon layer 44, and is also covered by the pixel electrode 45. The area other than the aperture part is the light-shield part. Thus, the proportion of the aperture part and the light-shield part in the Y direction is the one-dimensional numerical aperture which is obtained by dividing the length of the aperture part when the sub-pixel 40_a_ or the sub-pixel 40_b_ is cut in the Y-axis direction by the pixel pitch in the Y-axis direction. Hereinafter, the one-dimensional numerical aperture in the direction orthogonal to the image separating direction is called a longitudinal numerical aperture.

Therefore, "the proportions of the aperture parts and the light-shield parts in the Y-axis direction are substantially constant for the X direction" specifically means that it is so designed that the longitudinal numerical aperture along the line B-B' shown in FIG. 3 (the value obtained by dividing the length of the aperture of the sub-pixel 40_a_ along the line B-B' by the distance between the scanning line Gy−1 and Gy) becomes almost equivalent to the longitudinal numerical aperture along the line A-A' (the value obtained by dividing the sum of the length of the aperture part of the sub-pixel 40_b_ and the length of the aperture part of the sub-pixel 40_a_ along the line A-A' by the distance between the scanning lines Gy−1 and Gy).

The display part of the present invention is configured with the sub-pixels 40_a_ and 40_b_ having the above-described structure and the features. In the present invention, two sub-pixels 40_a_ and 40_b_ facing towards the different directions are treated as one structural unit, and the sub-pixels 40_a_ and 40_b_ which are connected to the common scanning line Gy, - - - and lined in the vertical direction are called "up-and-down sub-pixel pair". Specifically, the sub-pixel 40_a_ connected to the data line Dx+1 and the sub-pixel 40_b_ connected to the data line Dx, which are connected to the scanning line Gy shown in FIG. 3 and arranged along the vertical direction, are defined as the "up-and-down sub-pixel pair" and treated as the structural unit of the display part.

Figure 3:
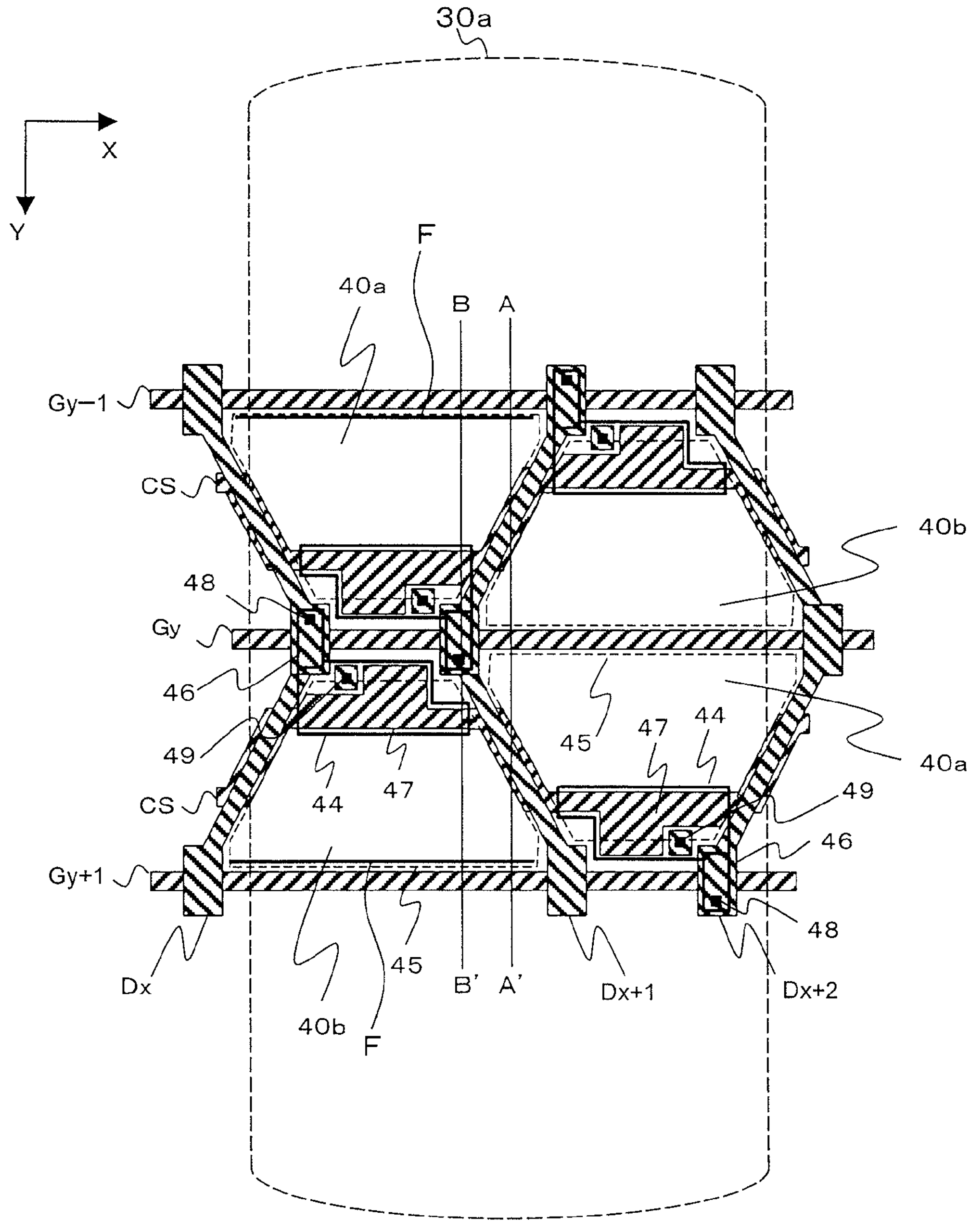
FIG. 3 is a top plan view showing four sub-pixels of the first exemplary embodiment according to the present invention.
Figures 4A, 4B, 4C:
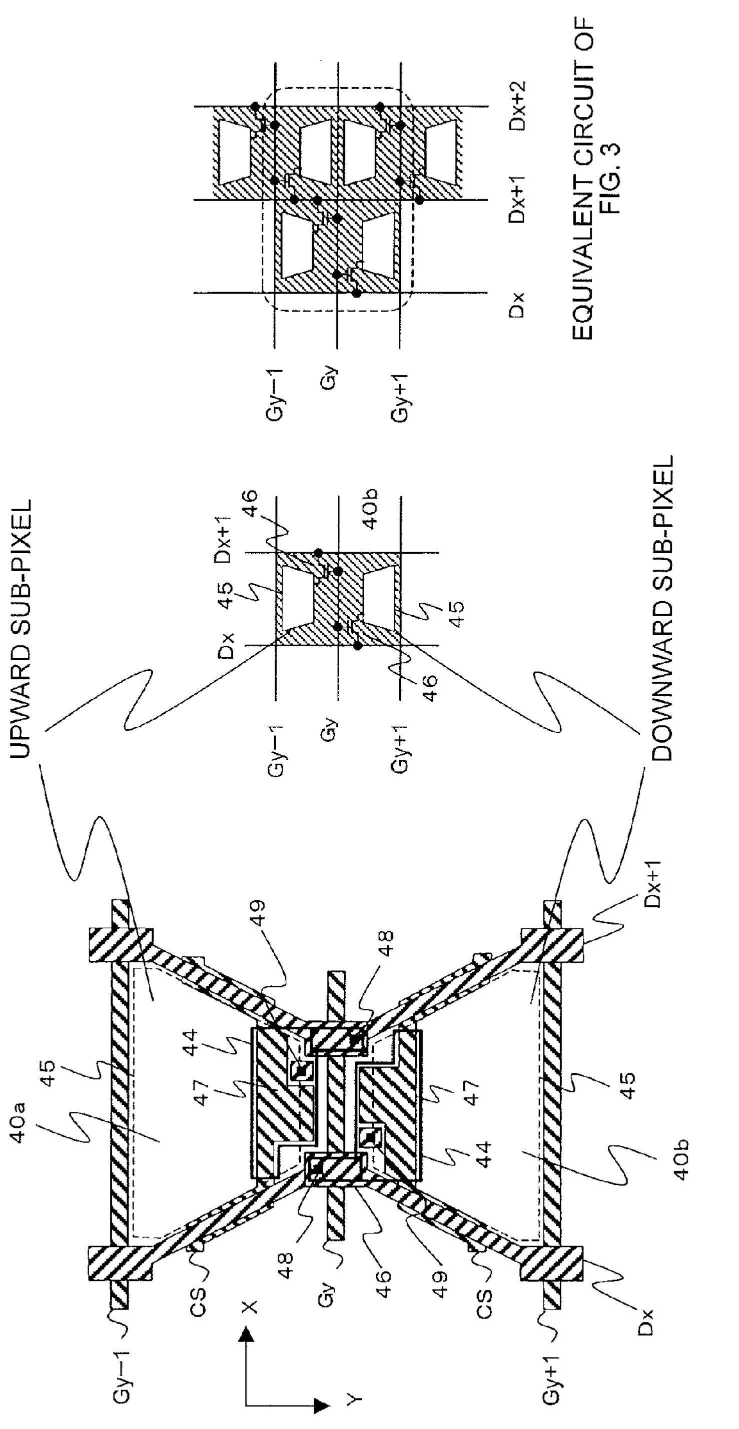
FIGS. 4A, 4B and 4C show the structure of an up-and-down sub-pixel pair P2R and equivalent circuits according to the present invention.

FIG. 4A is a plan view showing the up-and-down sub-pixel pair, which is a block diagram of the up-and-down sub-pixel pair taken from FIG. 3. FIG. 4B is an equivalent circuit of the up-and-down sub-pixel pair shown in FIG. 4A, in which the scanning lines Gy, - - - , the data lines Dx, the pixel electrodes 45, and the TFTs 46 are shown with same reference numerals. The up-and-down sub-pixel pair shown in FIG. 4 is named as the up-and-down sub-pixel pair P2R. FIG. 4C is an illustration which shows FIG. 3 with an equivalent circuit of the up-and-down sub-pixel pair P2R, and the four sub-pixels surrounded by a dotted line correspond to FIG. 3. As shown in FIG. 4C, the four sub-pixels neighboring to each other in FIG. 3 are configured with three up-and-down sub-pixel pairs. This is because the up-and-down sub-pixel pairs neighboring to each other along the extending direction of the scanning lines Gy, - - - are connected to different scanning lines Gy, - - - with respect to each other.

The reasons why the exemplary embodiment employing the display part configured with the up-and-down sub-pixel pairs can achieve the high numerical aperture and high image quality in the stereoscopic display device will be described. In order to achieve the high numerical aperture and the high image quality, it is necessary to increase the longitudinal numerical aperture while keeping the constant longitudinal numerical aperture of the pixels regardless of the positions in the image separating direction.

First, it is preferable for the scanning lines and the data lines to be disposed in the periphery of each pixel electrode. This is because there may be dead space that does not contributes to display generated between the wirings, thereby decreasing the numerical aperture, if there is no pixel electrode between scanning lines or the data lines. In this exemplary embodiment, as shown in FIG. 3, the scanning lines Gy, - - - and the data lines Dx. - - - are disposed in the periphery of each pixel electrode 45. Further, each of the TFTs 46 of the up-and-down sub-pixel pairs is connected to the respective data lines Dx, - - - which are different from each other. Furthermore, regarding the layout of the up-and-down sub-pixel pairs in the horizontal direction, i.e., the layout in the extending direction of the scanning lines Gy, - - - , the pairs are arranged neighboring to each other while being shifted from each other by one sub-pixel in the vertical direction. Thus, the up-and-down sub-pixel pairs neighboring to each other in the extending direction of the scanning lines Gy, - - - are connected to the respective scanning lines Gy, - - - which are different from each other. With the layout and the connecting relations described above, it becomes possible to suppress the number of necessary wirings and to improve the numerical aperture.

Further, the data lines need to be bent towards the image separating direction in order to have the constant longitudinal numerical aperture regardless of the positions along the image separating direction. As the factors for determining the longitudinal numerical aperture, there are the structure of the bent oblique sides, the structure between the bottom sides of the substantially trapezoid aperture parts, and the structure between the upper sides thereof. More specifically, regarding the vertical line cutting the oblique side as shown in the line A- A' of FIG. 3, the height (length) of the oblique side in the Y-axis direction and the height between the bottom sides (distance between the two neighboring bottom sides) affect the longitudinal numerical aperture. Furthermore, regarding the vertical line cutting the TFT 46 as shown in the line B- B' of FIG. 3, the height between the upper sides (distance between the two neighboring upper sides) and the height between the bottom sides affect the longitudinal numerical aperture.

The common thing between the line A-A' and the line B-B' is the height between the bottom sides. Thus, first, the structure for minimizing the height between the bottom sides is investigated. As described above, it is necessary to place at least one scanning line between the bottom sides. It is preferable to limit the structure to have one scanning line for minimizing the height between the bottom sides. For example, if the TFT is placed between the bottom sides, the height between the bottom sides becomes increased for that. Thus, it is not preferable. Particularly, in the line A-A', the bottom sides overlap with each other. Thus, the influence is extensive when the height between the bottom sides is increased. It needs to avoid having structures placed between the bottom sides as much as possible. Further, when the storage capacitance lines are formed with the same layer as that of the scanning lines, it is preferable not to place the storage capacitance line between the bottom sides. This makes it possible to cut the number of processes while decreasing the height between the bottom sides.

Next, the height of the oblique side in the line A-A' is investigated. It is extremely important to reduce the width of the oblique side in order to cut the height of the oblique side. For reducing the width of the oblique side, it is preferable not to place structures in the oblique side as much as possible. However, as described above, it is necessary to place at least one data line. Further, when the storage capacitance lines are formed with the same layer as that of the scanning lines, particularly the storage capacitance line can be arranged to be superimposed on the data line. In that case, the intersection part between the storage capacitance line CS and the data line DS is disposed to be along the data line. This makes it possible to cut the height of the oblique sides and to improve the longitudinal numerical aperture.

At last, the height between the upper sides in the line B-B' is investigated. As described above, it is not preferable to place the TFT between the bottom sides and in the oblique side. Thus, the TFT needs to be placed between the upper sides. Therefore, the layout for decreasing the height between the upper sides becomes important. In the exemplary embodiment, as shown in FIG. 3, the TFT 46 is placed between the upper sides. Further, the silicon layer 44 is placed by being stacked on the data lines Dx, - - - to prevent the increase of the light-shield parts, so that the numerical aperture can be improved.

As shown in FIG. 3, it is most efficient to dispose the storage capacitance CS in the vicinity of the TFT 46 for forming the storage capacitance. This is evident based on the fact that the storage capacitance is formed between the electrode connected to the source electrode of the TFT 46 and the electrode connected to the storage capacitance line CS.

As described, the layout of the sub-pixels according to this exemplary embodiment shown in FIG. 3 achieves the high numerical aperture and the high image quality in the stereoscopic display device. That is, the display unit of the exemplary embodiment formed with a plurality of up-and-down sub-pixel pairs by having the up-and-down sub-pixel pair described above by referring to FIG. 4 as the structural unit is capable of achieving the high numerical aperture and the high image quality.

Figures 5A, 5B:
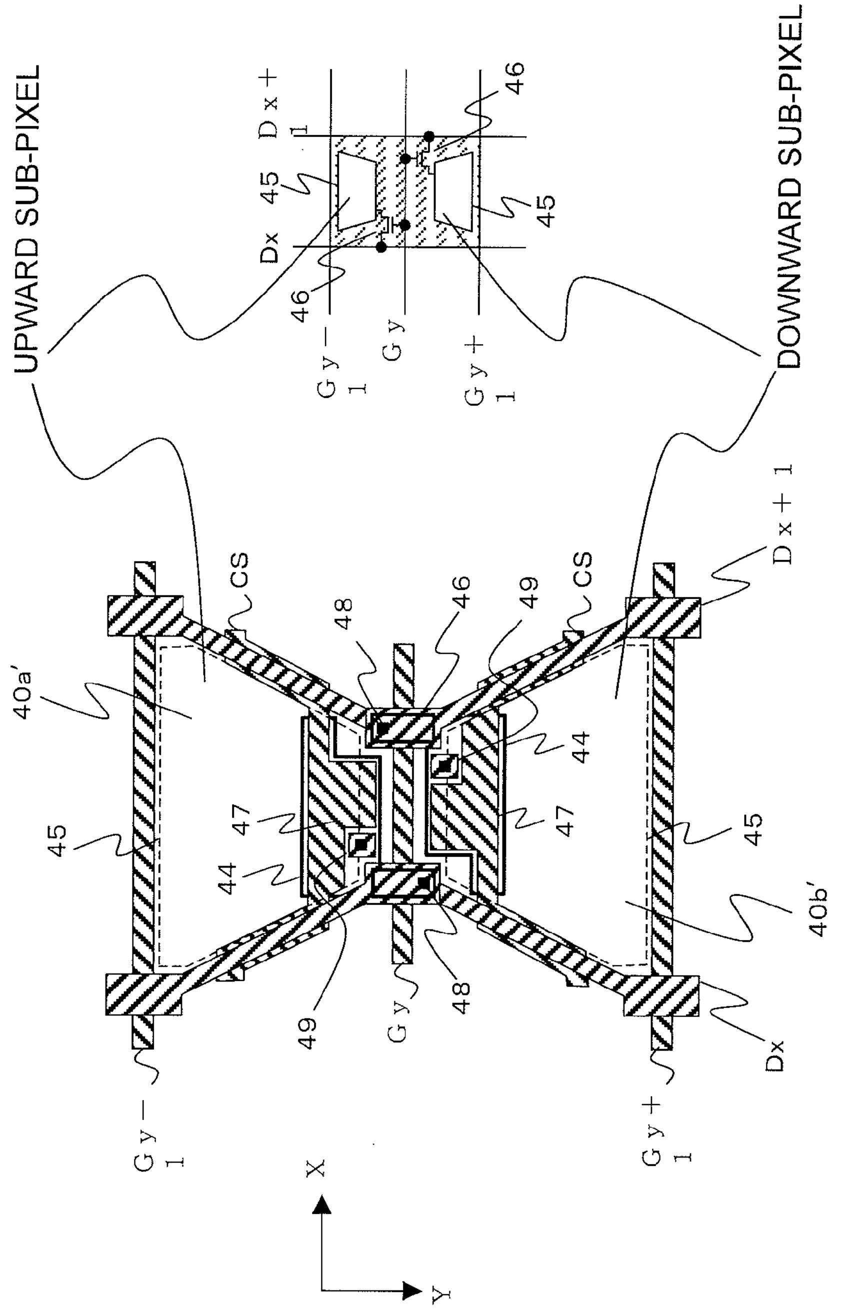
FIGS. 5A and 5B show the structure of an up-and-down sub-pixel pair P2L and equivalent circuit according to the present invention.

While the structure of the display part according to the exemplary embodiment has been described heretofore by referring to the up-and-down sub-pixel pairs shown in FIG. 3 and FIG. 4, it is also possible to employ the structure of the display part which uses the up-and-down sub-pixel pair P2L that is minor symmetrical with the up-and-down sub-pixel pair P2R shown in FIG. 4. FIG. 5A shows a plan view of the structure of the up-and-down sub-pixel pair P2L, and FIG. 5B shows an equivalent circuit of the up-and-down sub-pixel pair P2L. As shown in FIG. 5A, sub-pixels 40*a*' and 40*b*' configuring the up-and-down sub-pixel pair P2L are line-symmetrical with the sub-pixels 40*a* and 40*b* shown in FIG. 4A with respect to the Y-axis in terms of the shapes, layouts, and connecting relations of the pixel electrodes 45, the TFTs 46, the contact holes 48, 49, and the storage capacitances as the structural elements. That is, the up-and-down sub-pixel pair P2R and the up-and-down sub-pixel pair P2L are line-symmetrical with respect to the Y-axis, line-symmetrical with respect to the X-axis, and in a relation of the mirror symmetrical with respect to each other.

Therefore, when the up-and-down sub-pixel pairs P2L shown in FIG. 5 configure the display part with no difference in the numerical aperture from that of the up-and-down sub-pixel pairs P2R, the high numerical aperture and the high image quality can be achieved as well in an equivalent manner.

Note here that the sub-pixels configuring the up-and-down sub-pixel pair connected to a common scanning line are called as "upward sub-pixel" and as "downward sub-pixel" according to the facing direction of the bottom side F of the trapezoid, and the terms are used in the following explanations. That is, within the up-and-down sub-pixel pair P2R shown in FIG. 4, the sub-pixel 40*a* is the "upward sub-pixel", and the sub-pixel 40*b* is the "downward sub-pixel". Similarly, within the up-and-down sub-pixel pair P2L shown in FIG. 5, the sub-pixel 40*a*' is the "upwards sub-pixel", and the sub-pixel 40*b*' is the "downward sub-pixel". As described above, the optical effects obtained due to the structures thereof are the same for the up-and-down sub-pixel pairs P2R and P2L. However, the data lines Dx, Dx+1 to which the upward sub-pixel and the downward sub-pixel are connected are inverted.

The display part of the exemplary embodiment may be configured with the up-and-down sub-pixel pairs P2R or with the up-and-down sub-pixel pairs P2L. Further, the display part may be configured by combining the up-and-down sub-pixel pairs P2R and the up-and-down sub-pixel pairs P2L. Hereinafter, a structural example of the display part 50 of the exemplary embodiment shown in FIG. 2 will be described by referring to a case which displays a first viewpoint image (left-eye image) and a second viewpoint image (right-eye image) configured with pixels of 4-rows×6-columns. First, input image data will be described by referring to FIG. 6, and the image separating device and the color arranging relation of the display part according to the exemplary embodiment will be described by referring to FIG. 7. A specific example of the display part will be provided after the explanations of FIG. 6 and FIG. 7.

FIG. 6 shows charts of image data of the first viewpoint image (left-eye image) and the second viewpoint image (right-eye image) configured with the pixels of 4-rows×6-columns. As described above, "k" is a viewpoint (left, right), "i" is the row number within the image, "j" is the column number within the image, "RGB" means that the pixel carries color information of R: red, G: green, and B: blue.

Figure 7:
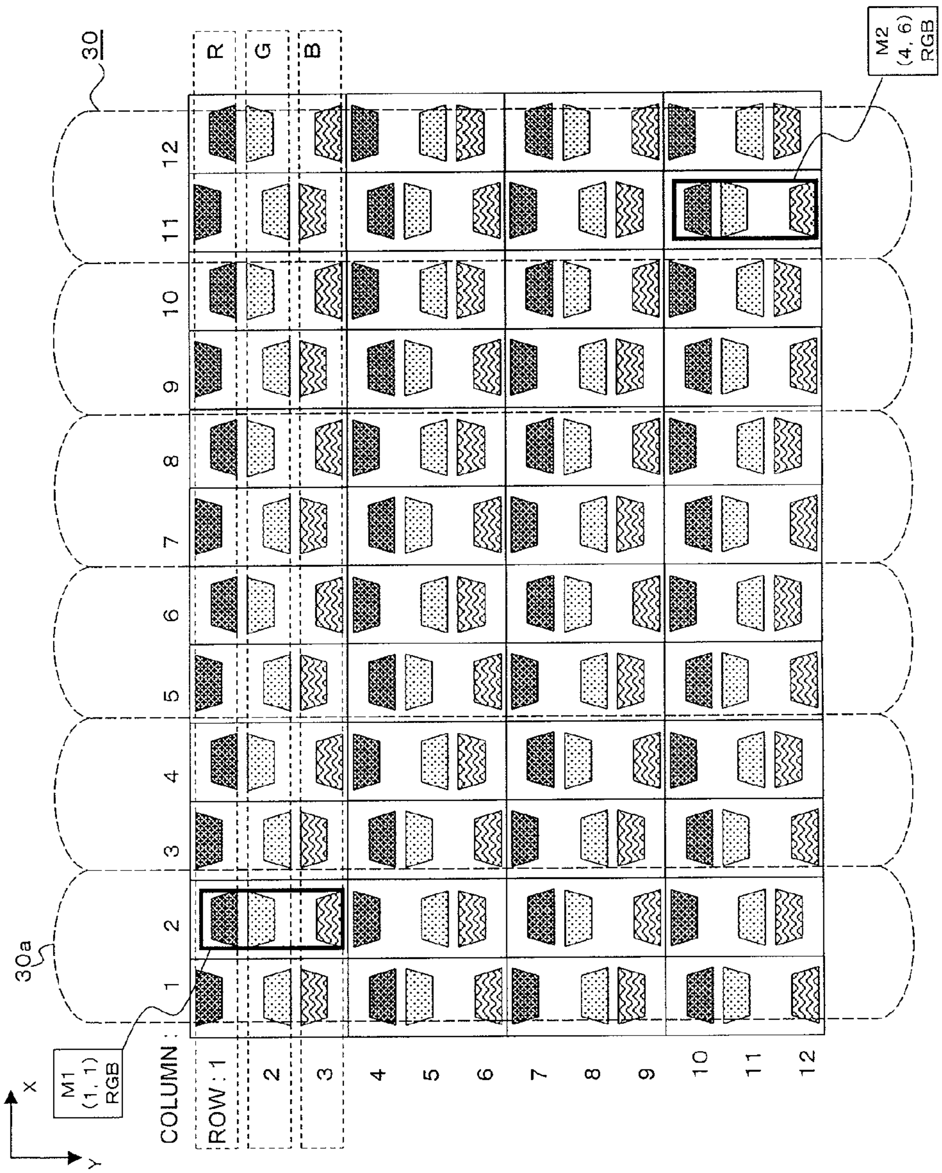
FIG. 7 shows a first example of layout of an image separating device according to the first exemplary embodiment of the present invention.

FIG. 7 is an example of the display part 50 which displays two images shown in FIG. 6, showing the layout of the image separating device and the colors of the sub-pixels. Regarding the XY axes in the drawing, X shows the horizontal direction and Y shows the vertical direction.

In FIG. 7, the sub-pixel is illustrated with a trapezoid, and shadings are applied to show examples of colors. Specifically, a red (R) color filter is arranged on a counter substrate of the sub-pixel lined on the first row in the horizontal direction, and the first row functions as the sub-pixels which display red. A green (G) color filter is arranged on a counter substrate of the sub-pixel lined on the second row in the horizontal direction, and the second row functions as the sub-pixels which display green. A blue (B) color filter is arranged on a counter substrate of the sub-pixel lined on the third row in the horizontal direction, and the third row functions as the sub-pixels which display blue. In the same manner, the sub-pixels on the fourth row and thereafter function in order of red, green, and blue in a row unit. The exemplary embodiment can be adapted to arbitrary color orders. For example, the colors may be arranged in repetitions of the order of blue, green, and red from the first row.

For the image separating device, the cylindrical lens 30*a* configuring the lenticular lens 30 corresponds to the sub-pixels of two-column unit, and it is arranged in such a manner that the longitudinal direction thereof exhibiting no lens effect is in parallel to the vertical direction, i.e., in parallel to the columns. Thus, due to the lens effect of the cylindrical lenses 30*a* in the X direction, light rays emitted from the sub-pixels on the even-numbered columns and the odd-numbered columns are separated to different directions. That is, as described by referring to FIG. 1, at a position away from the lens plane, the light rays are separated into an image configured with the pixels of the even-numbered columns and an image configured with the pixels of odd-numbered columns. As an example, with this exemplary embodiment in the layouts of FIG. 7 and FIG. 1, the sub-pixels on the even-numbered columns function as the image for the left eye (first viewpoint) and the sub-pixels on the odd-numbered columns function as the image for the right eye (second viewpoint).

The color filters and the image separating device are disposed in the above-described manner, so that one pixel of the input image shown in FIG. 6 is displayed with three sub-pixels of red, green, and blue lined on one column shown in FIG. 7. Specifically, the three sub-pixels on the first, second, and third rows of the second column display the upper-left corner pixel: M1(1, 1) RGB of the left-eye (first viewpoint) image, and the three sub-pixels on the tenth, eleventh, and twelfth rows of the eleventh column display the lower-right corner pixel: M2(4, 6) RGB of the right-eye (second viewpoint) image. Further, the sub-pixel pitch of every two columns and the sub-pixel pitch of every three rows are equal, so that the resolution at the time of stereoscopic display which has inputted left and right images as parallax images and the resolution at the time of flat display which has the inputted left and right images as the same images are equal. Thus, it is the feature of this exemplary embodiment that there is no degradation in the image quality caused due to changes in the resolution. Further, the same colors are arranged in the direction of the lens effect, so that there is no color separation generated by the image separating device. This makes it possible to provide the high image quality.

The connecting relations regarding a plurality of sub-pixels arranged in the matrix shown in FIG. 7 and the scanning lines as well as the data lines, i.e., a specific example for configuring the display part from the up-and-down sub-pixels shown in FIG. 4 and FIG. 5, are shown in FIG. 8-FIG. 11 and will be described hereinafter.

Figure 8:
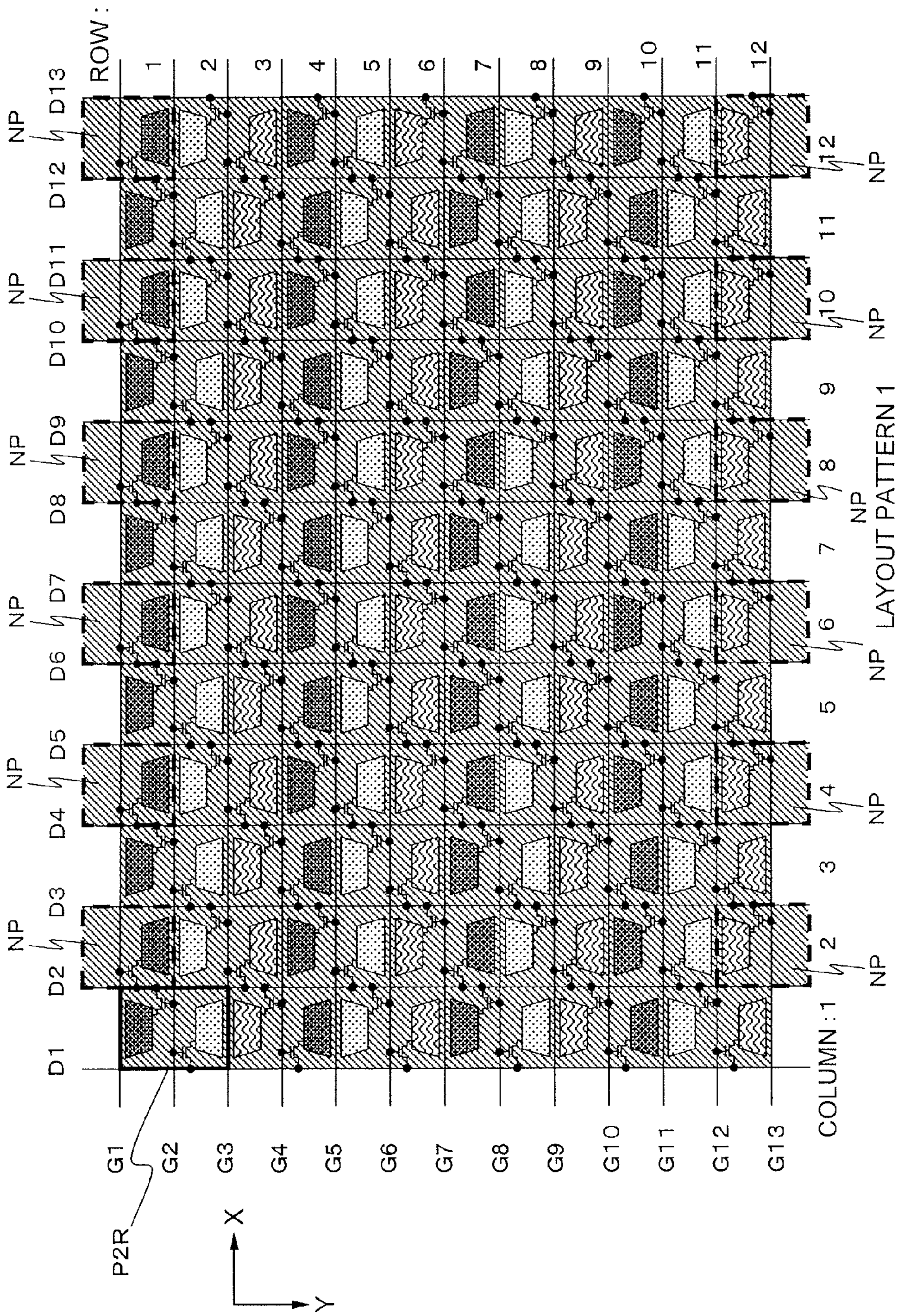
FIG. 8 shows a layout pattern 1 of a display part according to the first exemplary embodiment of the present invention.

FIG. 8 shows a layout pattern 1 of the display part which is formed with the up-and-down sub-pixel pairs P2R shown in FIG. 4. By having the position where the upward sub-pixel of the up-and-down sub-pixel pair P2R comes on the first row of the first column as the start, the up-and-down sub-pixel pairs P2R are disposed. At this time, the downward sub-pixels of the up-and-down sub-pixel pairs P2R are disposed on the first row of the even-numbered columns, and the upward sub-pixels do not configure the display part. Similarly, the upward sub-pixels of the up-and-down sub-pixel pairs P2R are disposed on the twelfth row of the even-numbered columns, and the downward sub-pixels do not configure the display part. "NP" shown in FIG. 8 indicates that sub-pixels that do not configure the display part are not disposed. Further, FIG. 8 corresponds to FIG. 7, shading in each pixel shows the display color, and the sub-pixels on the even-numbered columns function as the left-eye (first viewpoint) sub-pixels while the sub-pixels on the odd-numbered columns function as the right-eye (second viewpoint) sub-pixels by an optical separating device, not shown.

Figure 9:
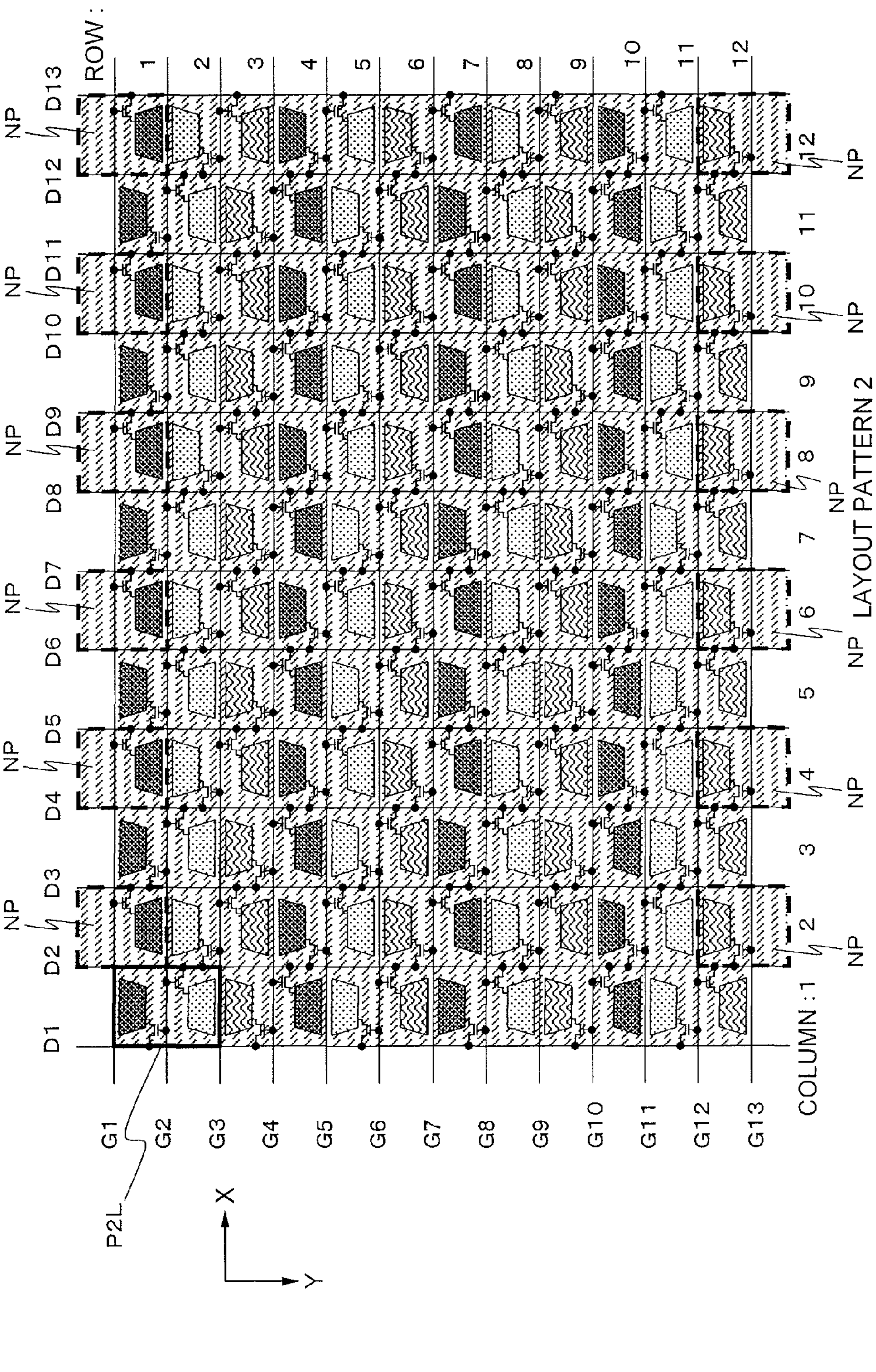
FIG. 9 shows a layout pattern 2 of the display part according to the first exemplary embodiment of the present invention.

FIG. 9 shows a layout pattern 2 of the display part which is formed with the up-and-down sub-pixel pairs P2L shown in FIG. 5. FIG. 9 is the same as the case of FIG. 8 except that the up-and-down sub-pixel pairs P2R are changed to the up-and-down sub-pixel pairs P2L, so that explanations thereof are omitted.

Figure 10:
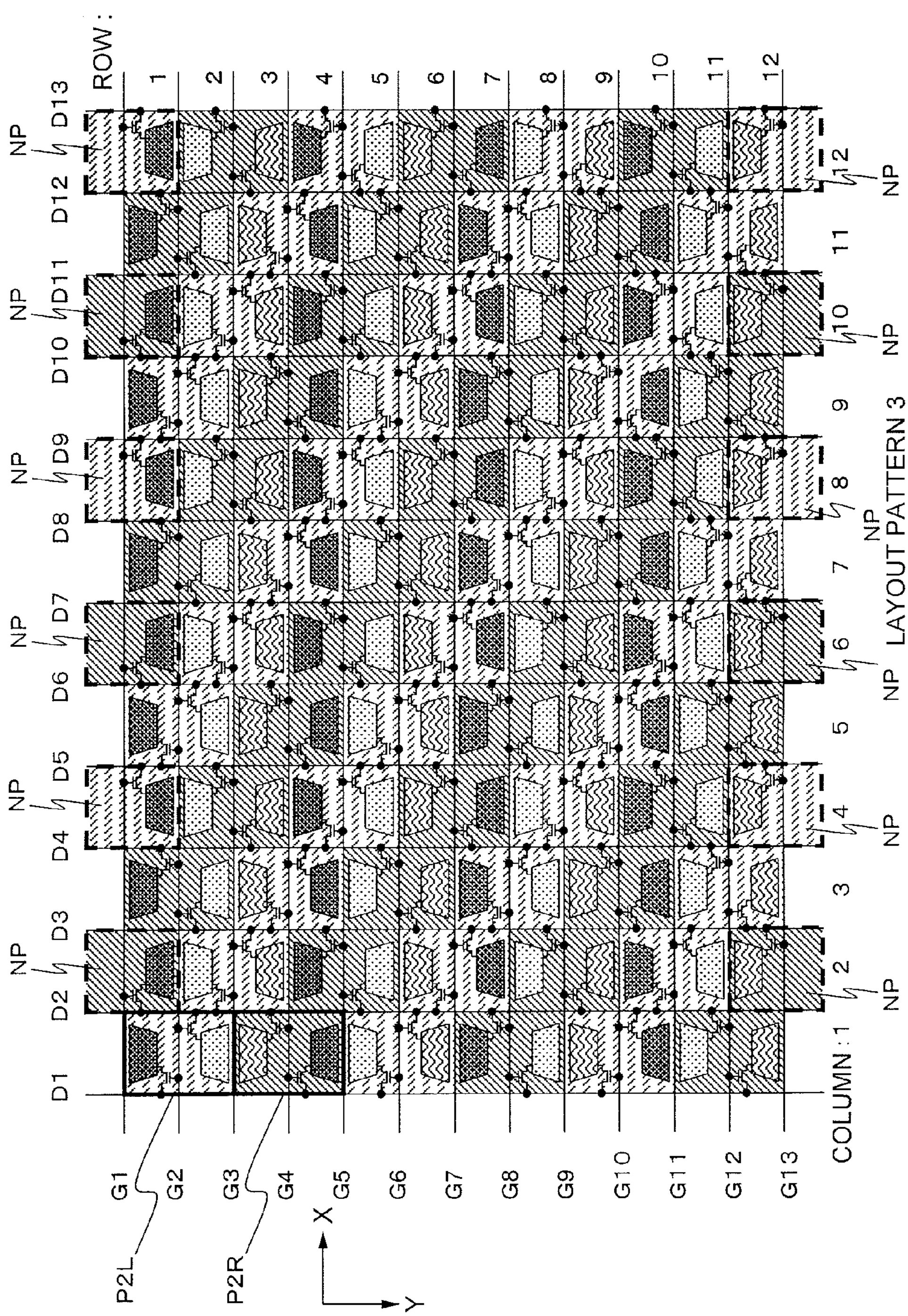
FIG. 10 shows a layout pattern 3 of the display part according to the first exemplary embodiment of the present invention.

FIG. 10 shows a layout pattern 3 which is a first example of configuring the display part with a combination of the up-and-down sub-pixel pairs P2R shown in FIG. 4 and the up-and-down sub-pixel pairs P2L shown in FIG. 5. As shown in FIG. 10, on the first column, by having the position where the upward sub-pixel of the up-and-down sub-pixel pair P2L comes on the first row of the first column as the start point, the up-and-down sub-pixel pair P2L and the up-and-down sub-pixel pair P2R are repeatedly disposed in the vertical direction. On the second column, by having the position where the downward sub-pixel of the up-and-down sub-pixel pair P2R comes on the first row of the second column as the start point, the up-and-down sub-pixel pair P2R and the up-and-down sub-pixel pair P2L are repeatedly disposed in the vertical direction. On the third column, by having the position where the upward sub-pixel of the up-and-down sub-pixel pair P2R comes on the first row of the third column as the start point, the up-and-down sub-pixel pair P2R and the up-and-down sub-pixel pair P2L are repeatedly disposed in the vertical direction. On the fourth column, by having the position where the downward sub-pixel of the up-and-down sub-pixel pair P2L comes on the first row of the fourth column as the start point, the up-and-down sub-pixel pair P2L and the up-and-down sub-pixel pair P2R are repeatedly disposed in the vertical direction. On the fifth column and thereafter, the layout pattern from the first column to the fourth column is repeated. This layout pattern 3 has an effect of achieving the high image quality in a case where the dot inversion driving method is employed to the polarity inversion driving. Details thereof will be described later.

Figure 11:
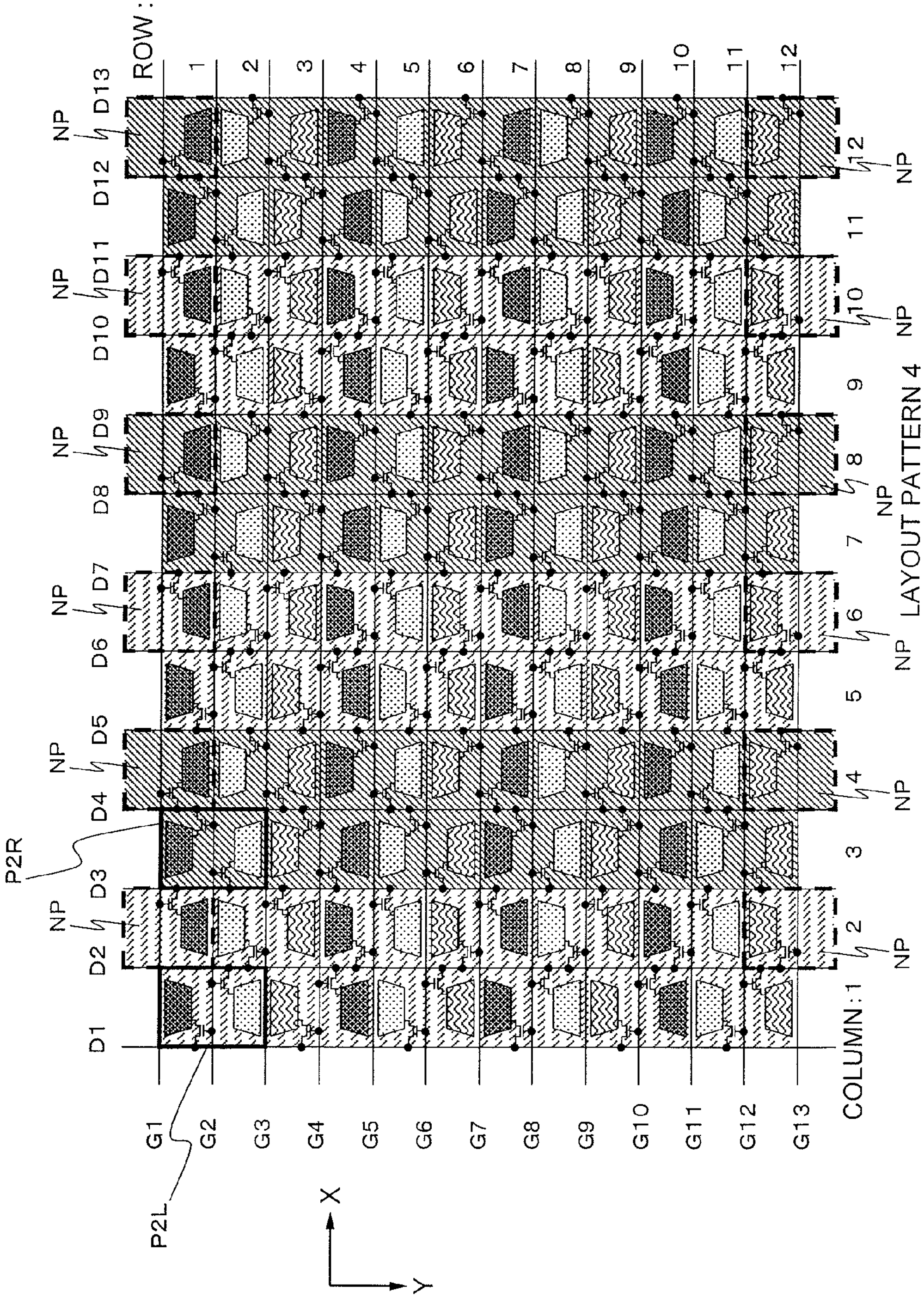
FIG. 11 shows a layout pattern 4 of the display part according to the first exemplary embodiment of the present invention.

FIG. 11 shows a layout pattern 4 which is a second example of configuring the display part with a combination of the up-and-down sub-pixel pairs P2R shown in FIG. 4 and the up-and-down sub-pixel pairs P2L shown in FIG. 5. As shown in FIG. 11, by having the position where the upward sub-pixel of the up-and-down sub-pixel pair P2L comes on the first row of the first column as the start point, the first column and the second column are formed with the up-and-down sub-pixel pairs P2L. The third column and the fourth column are formed from the up-and-down sub-pixel pairs P2R by having the position where the upward sub-pixel of the up-and-down sub-pixel pair P2R comes on the first row of the third column as the start point. On the fifth column and thereafter, the layout with every two columns described above is repeated. This layout pattern 4 has an effect of achieving the high image quality in a case where the vertical 2-dot inversion driving method is employed to the polarity inversion driving. Details thereof will be described later.

As shown in FIG. 8-FIG. 11, the display part configured with 12 rows×12 columns of sub-pixels takes the up-and-down sub-pixel pair as the structural unit, so that it is necessary to have thirteen scanning lines from G1 to G13 and thirteen data lines from D1 to D13. That is, the display part of the exemplary embodiment configured with m-rows×n-columns of sub-pixels is characterized to be driven by (m+1) pieces of scanning lines and (n+1) pieces of data lines.

Further, the display part of the exemplary embodiment can be structured with various layout patterns other than those that are described above as a way of examples by having the up-and-down sub-pixel pairs shown in FIG. 4 and FIG. 5 as the structural unit.

However, the difference in the layout pattern influences the polarity distribution of the display part when the liquid crystal panel is driven with the polarity inversion drive. Further, as can be seen from FIG. 8-FIG. 11, in the display part of the present invention, the sub-pixels lined on one row in the horizontal direction are connected to two scanning lines alternately, and the sub-pixels lined on one column in the vertical direction are connected to two data lines with the regularity according to the layout pattern. Thus, the polarity distribution thereof obtained according to the polarity inversion driving method is different from that of a typical liquid crystal panel in which the sub-pixels on one row are connected to one scanning line and the sub-pixels on one column are connected to one data line, so that the effect obtained thereby is different as well. Hereinafter, details of the effects obtained for each of the layout patterns of the exemplary embodiment when the polarity inversion driving method of the typical liquid crystal panel is employed will be described.

Figure 12:
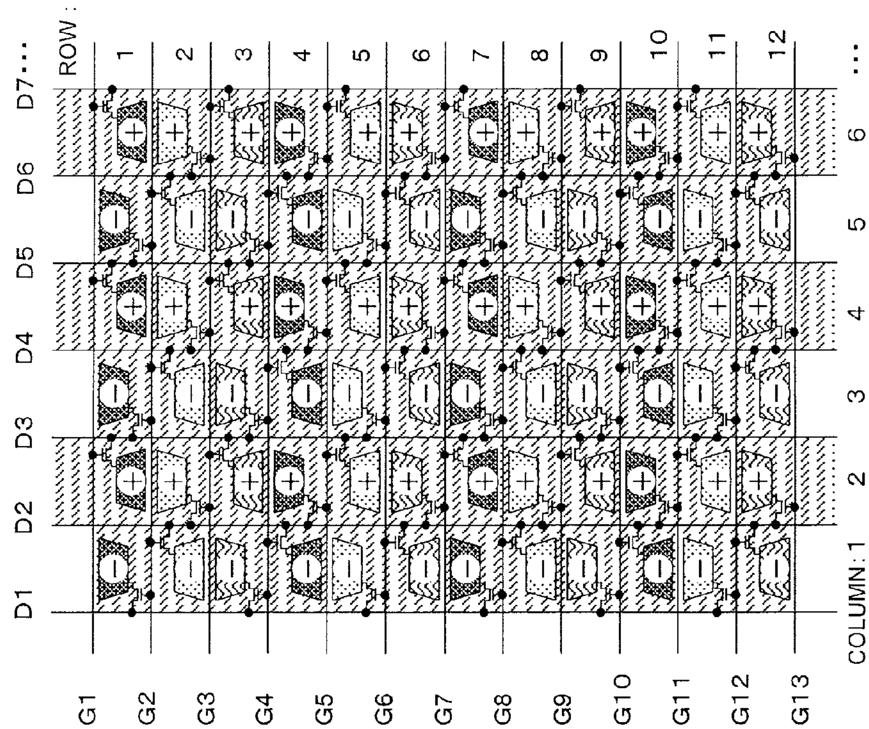
FIG. 12 shows polarity distributions of gate line inversion drive in the layout pattern 2 of the first exemplary embodiment according to the present invention.

FIG. 12 shows the polarity distribution of the display part when a gate line inversion drive (1H inversion drive) is employed to the layout pattern 2 shown in FIG. 9, and shows the data line polarity for each scanning line under the gate line inversion drive. In the illustration, "+" and "−" show the positive/negative polarities of the pixel electrodes and the data lines in an arbitrary frame (a period where scanning of all the scanning lines is done), and negative and positive polarities are inverted in a next frame. The gate line inversion drive is a driving method which inverts the polarity of the data line by each period of selecting one scanning line, which can reduce the resisting pressure of a data-line driving circuit (driver IC for driving data line) by being combined with the so-called common inversion drive which AC-drives the common electrodes on the counter substrate side. Thus, it only requires a small amount of power consumption. However, the images separated by the image separating device, i.e., the left-eye image configured with the even-numbered columns and the right-eye image configured with the odd-numbered columns, are frame inverted with which the entire display images are polarity-inverted by a frame unit. With the frame inversion, the so-called flickers (the displayed images are seen with flickering) tend to be observed due to a difference in the luminance generated in accordance with the polarity. When the flickers are observed, the flickers can be suppressed by increasing frame frequency.

Figure 13:
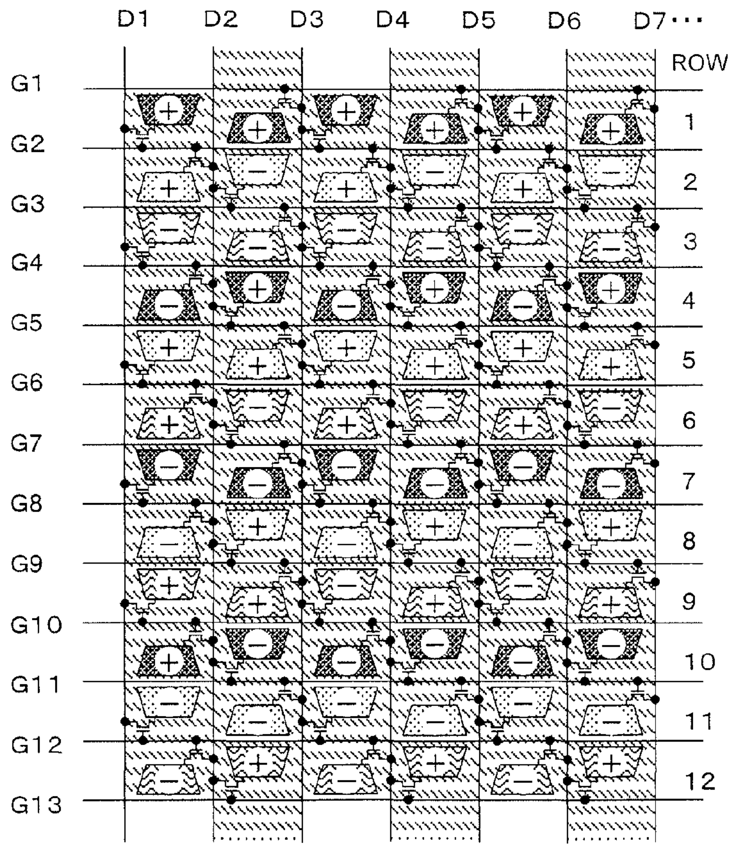
FIG. 13 shows polarity distributions of gate 2-line inversion drive in the layout pattern 2 of the first exemplary embodiment according to the present invention.

In a case where the gate line inversion drive is employed to the exemplary embodiment, it is more preferable to employ the drive which inverts the polarity for each of a plurality of scanning lines as illustrated in FIG. 13. FIG. 13 shows the polarity distribution of the display part when a gate 2-line inversion drive (2H inversion drive) is employed to the layout pattern 2 shown in FIG. 9, and the data line polarity for each scanning line of the gate 2-line inversion drive. "+" and "−" in the drawing show the polarity as in the case of FIG. 12. From the polarity distribution of FIG. 13, the polarity of each of the separated left-eye image and right-eye image is inverted by two rows of sub-pixels. Therefore, it is possible to suppress flickers, and to achieve the high image quality.

Figure 14:
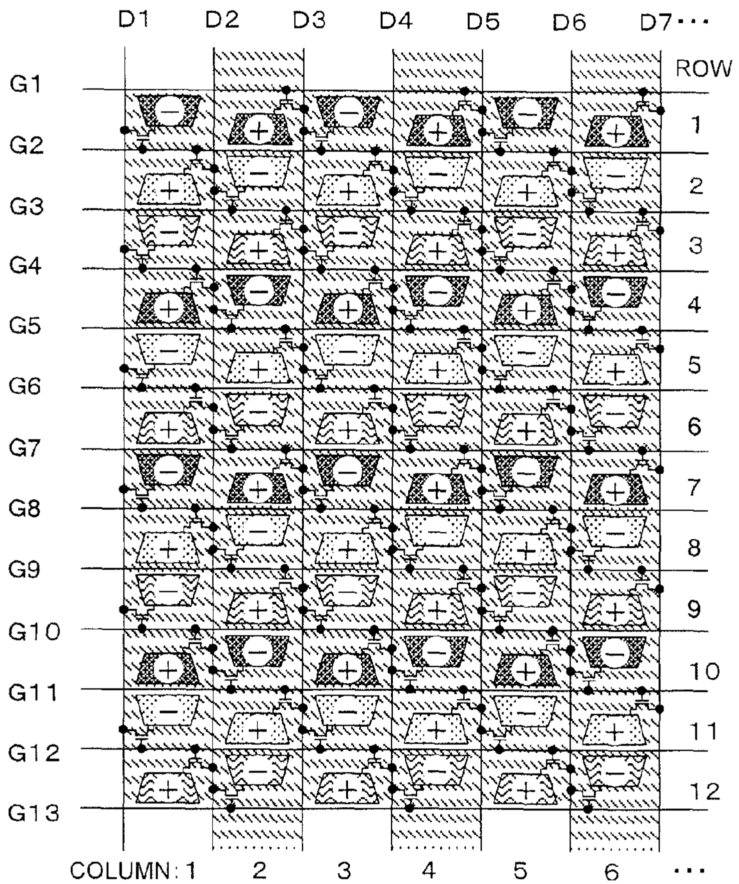
FIG. 14 shows polarity distributions of dot inversion drive in the layout pattern 2 of the first exemplary embodiment according to the present invention.

FIG. 14 shows the polarity distribution of the display part when a dot inversion drive is employed to the layout pattern 2 shown in FIG. 9, and shows the data line polarity for each scanning line under the dot inversion drive. "+" and "−" in the drawing show the polarity as in the case of FIG. 12. As shown in FIG. 14, the dot inversion drive is a driving method which inverts the polarity by each data line and, further, inverts the polarity of the data line by every selecting period of one scanning line. It is known as a method which suppresses flickers and achieves the high image quality in a typical liquid crystal panel. When the dot inversion drive is employed to the layout pattern 2 of the exemplary embodiment, the polarities on the odd-numbered columns are the same in a row unit (i.e., the polarities on all the odd-numbered columns on one row are the same) as shown in the polarity distribution of FIG. 14. This is the same for the even-numbered columns. Therefore, for each of the separated left-eye image and right-eye image, it is possible to achieve the same flicker suppressing effect as the case of employing the gate line inversion drive (1H inversion drive) to a typical panel.

Figure 15:
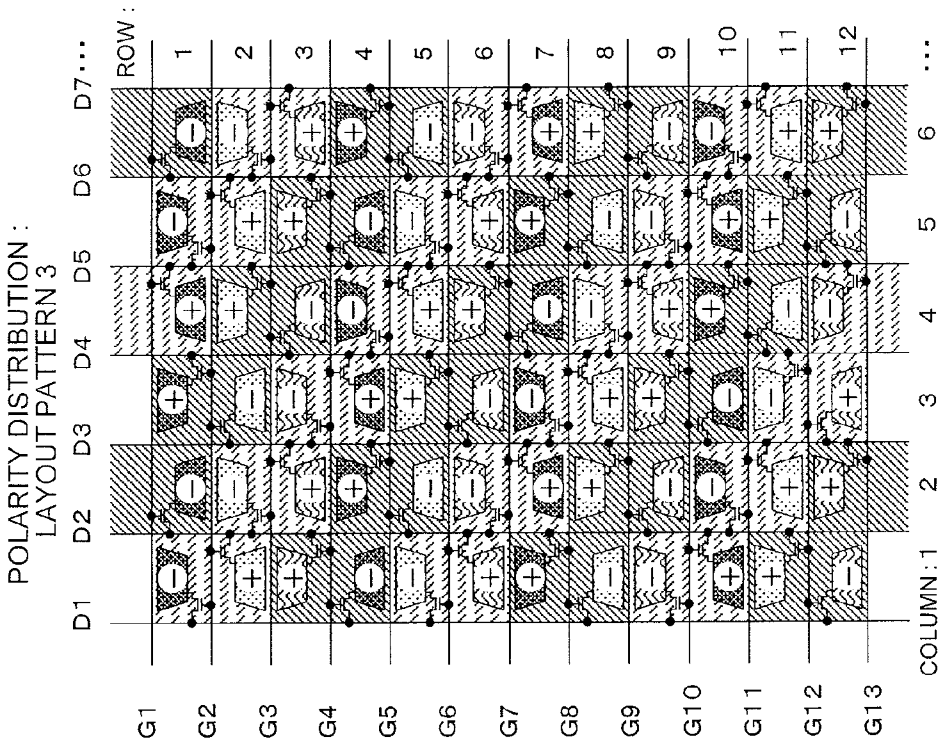
FIG. 15 shows polarity distributions of dot inversion drive in the layout pattern 3 of the first exemplary embodiment according to the present invention.

FIG. 15 shows the polarity distribution of the display part when a dot inversion drive is employed to the layout pattern 3 shown in FIG. 10, and shows the data line polarity for each scanning line under the dot inversion drive. "+" and "−" in the drawing show the polarity as in the case of FIG. 12. Polarity inversion on the odd-numbered columns is repeated in a column unit such as on the first row and the third row, the third row and the fifth row, - - - in each row unit as shown in the polarity distribution of FIG. 15. This is the same for the even-numbered columns. Further, regarding the polarity distribution within a column, the polarities of the pixel electrodes of the up-and-down sub-pixel pairs P2L and the up-and-down sub-pixel pairs P2R neighboring to each other in the vertical direction are the same, and the polarity is inverted by every two rows. Thus, the long sides of the pixel electrodes each in a trapezoid form, i.e., the bottom sides of the sub-pixels, come to be in the same polarities. Therefore, it is possible to suppress abnormal alignment of the liquid crystal molecules in the vicinity of the bottom sides, so that the high image quality can be achieved. Further, for each of the separated left-eye image and right-eye image, the columns whose polarities are inverted for every two rows of sub-pixels in the vertical direction are inverted by a column unit. This provides a high flicker suppressing effect, so that the high image quality can be achieved.

Figure 16:
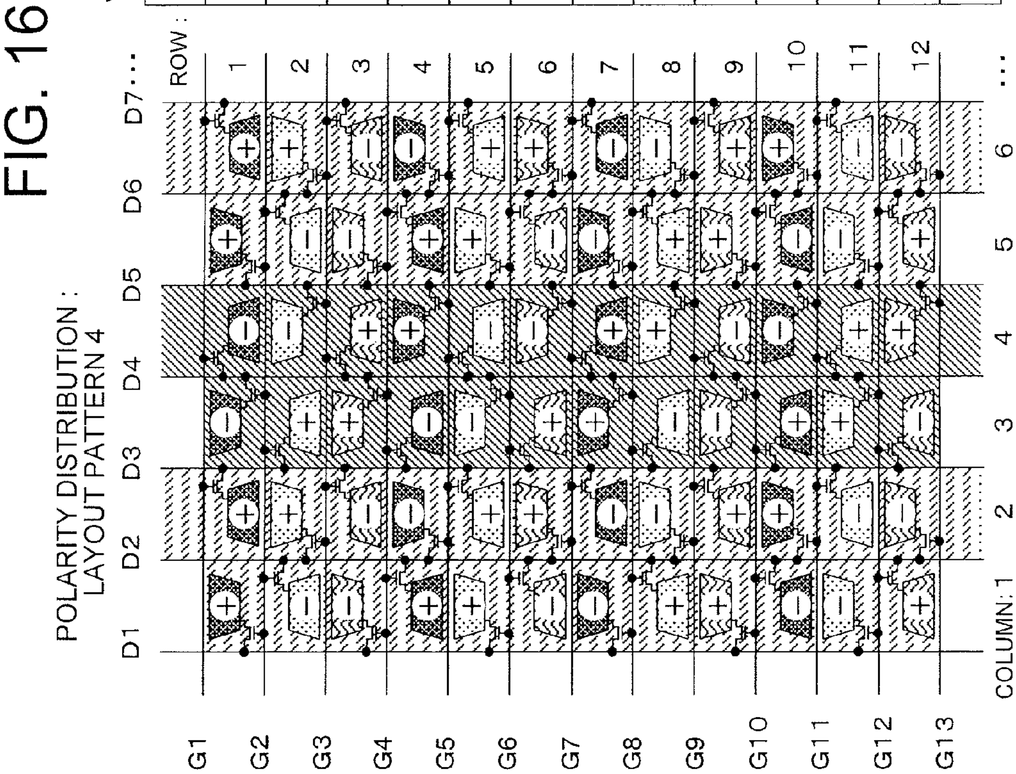
FIG. 16 shows polarity distributions of vertical 2-dot inversion drive in the layout pattern 4 of the first exemplary embodiment according to the present invention.

FIG. 16 shows the polarity distribution of the display part when a vertical 2-dot inversion drive is employed to the layout pattern 4 shown in FIG. 11, and shows the data line polarity for each scanning line of the vertical 2-dot inversion drive.

"+" and "−" in the drawing show the polarity as in the case of FIG. 12. As shown in FIG. 16, the vertical 2-dot inversion drive is a driving method which inverts the polarity by each data line and, further, inverts the polarity of the data line by every selecting period of two scanning lines. Compared to the case of the dot inversion drive, the polarity inversion cycle for each data line becomes doubled. Thus, the power consumption of the data-line driving circuit (driver IC for driving data line) can be reduced. The polarity distribution of FIG. 16 is the same as the polarity distribution of FIG. 15. Therefore, as in the case of FIG. 15, it is possible to suppress abnormal alignment of the liquid crystal molecules in the vicinity of the bottom sides. This provides a high flicker suppressing effect, so that the high image quality can be achieved.

As described above, the combination of the layout pattern of the display part and the polarity driving method may be selected as appropriate according to the target display quality, the power consumption, and the like. Further, with the display part of the exemplary embodiment, it is also possible to employ layout patterns and polarity inversion driving methods other than those described above as examples. For example, it is possible to employ a layout pattern 5 shown in FIG. 17. With the layout pattern 5, the display part is configured with the up-and-down sub-pixel pairs P2R shown in FIG. 4 by having the position where the upward sub-pixel comes at the first row of the second column as the start point. The layout pattern 5 shown in FIG. 17 and the layout pattern 1 shown in FIG. 8 configured with the same up-and-down sub-pixel pairs P2R are in a relation which is being translated in the horizontal direction by one column.

Figure 2:
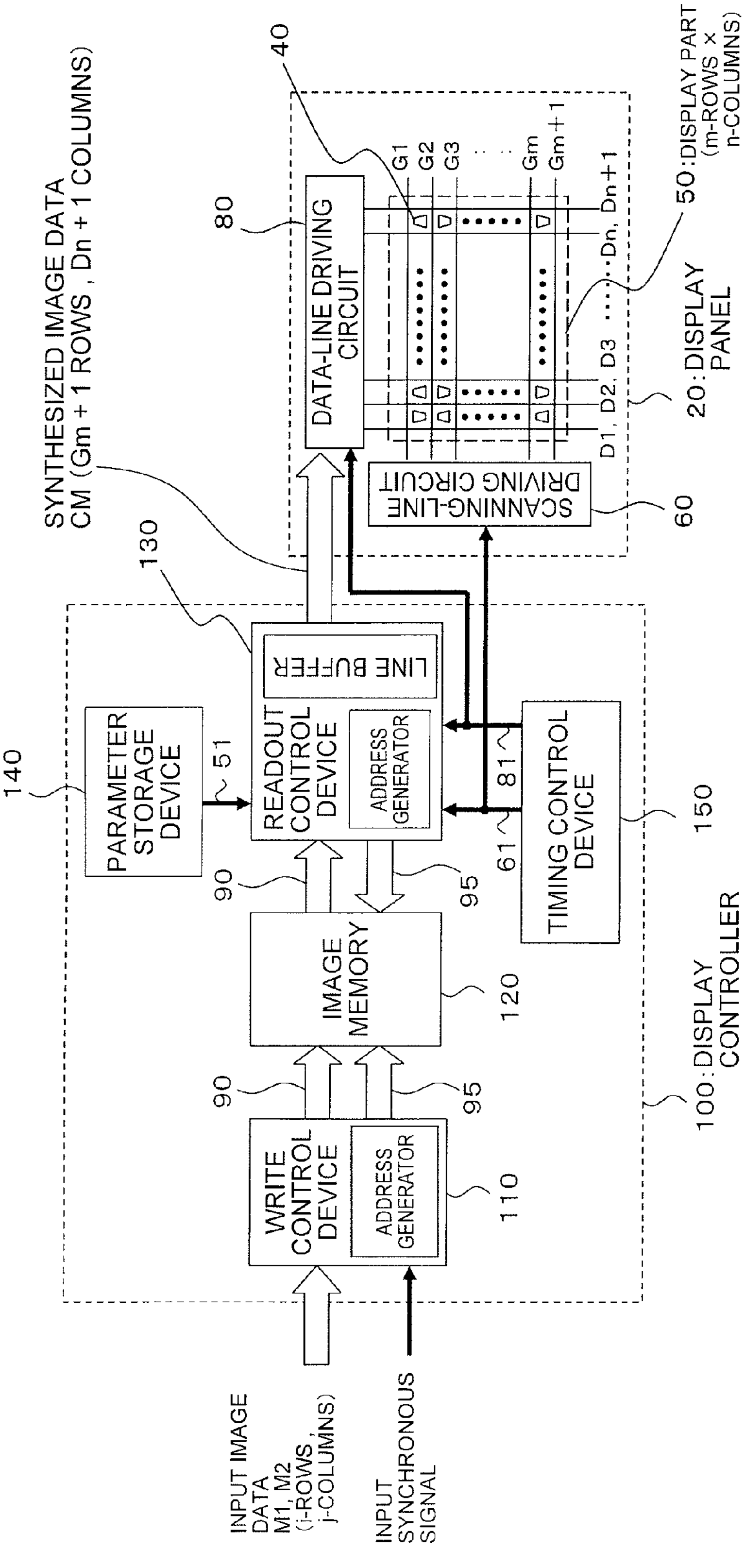
FIG. 2 is a functional block diagram of the first exemplary embodiment according to the present invention.

However, the synthesized image data CM outputted to the data-line driving circuit 80 shown in FIG. 2 needs to be changed in accordance with the changes in the layout pattern. The synthesized image data CM is the image data synthesized from input images M1 and M2, which is the data inputted to the data-line driving circuit 80 for writing the voltage to each pixel electrode of the display part 50 which is configured with the sub-pixels of m-rows×n-columns. That is, the synthesized image data CM is the data obtained by rearranging each of the pixel data configuring the input image data M1 and M2 to correspond to the data lines from D1 to Dn+1 by each of the scanning lines from G1 to Gm+1, and it is expressed with a data structure of (Gm+1) rows and (Dn+1) columns.

Therefore, as can be seen from the layout patterns 1 to 5 shown in FIG. 8-FIG. 11 and FIG. 17, the synthesized image data CM becomes different even with the sub-pixel that is designated on a same row and same column, since the connected data lines or the scanning lines very depending on the layout patterns.

As specific examples, FIG. 18-FIG. 22 show the synthesized image data CM when the input image data shown in FIG. 6 is displayed on the display parts of the layout patterns 1-5 while the image separating device is arranged as in FIG. 7. FIG. 18-FIG. 22 show the positions and colors of the input image data to be supplied to an arbitrary data line Dx when an arbitrary scanning line Gy is selected. M1 and M2 are viewpoint images, (row number, column number) shows the position within the image, and R/G/B shows the color. Further, "x" mark indicates that there is no pixel electrode. Naturally, there is no input data M1, M2 corresponding to "x" mark and no pixel electrode to which the supplied data to be reflected, so that the data to be supplied to "x" mark is optional.

The synthesized image data CM can be generated from the connection regularity of the up-and-down sub-pixel pairs in a unit of scanning line and the regularity in a unit of data line based on the color arrangement of the color filters shown in FIG. 7, the layout patterns shown in FIG. 8-FIG. 11 and FIG. 17, and setting parameters of the image separating device to be described later.

The regularity in a unit of scanning line will be described. In the exemplary embodiment, viewpoint images M1/M2 to be displayed with even/odd of the scanning lines are designated. This is because of the reason as follows. That is, in the layout of the up-and-down sub-pixel pairs configuring the display part, the up-and-down sub-pixel pairs sharing the same scanning line cannot be lined side by side on two columns but necessarily arranged on every other column. That is, even/odd of the scanning lines correspond to even/odd of the columns of the sub-pixel layout. Further, designation of the viewpoint images M1/M2 is determined by a column unit of the sub-pixels by the image separating device.

The factors for determining the even/odd of the scanning lines and the viewpoint images M1/M2 are the layout of the image separating device and the layout pattern.

Figure 23:
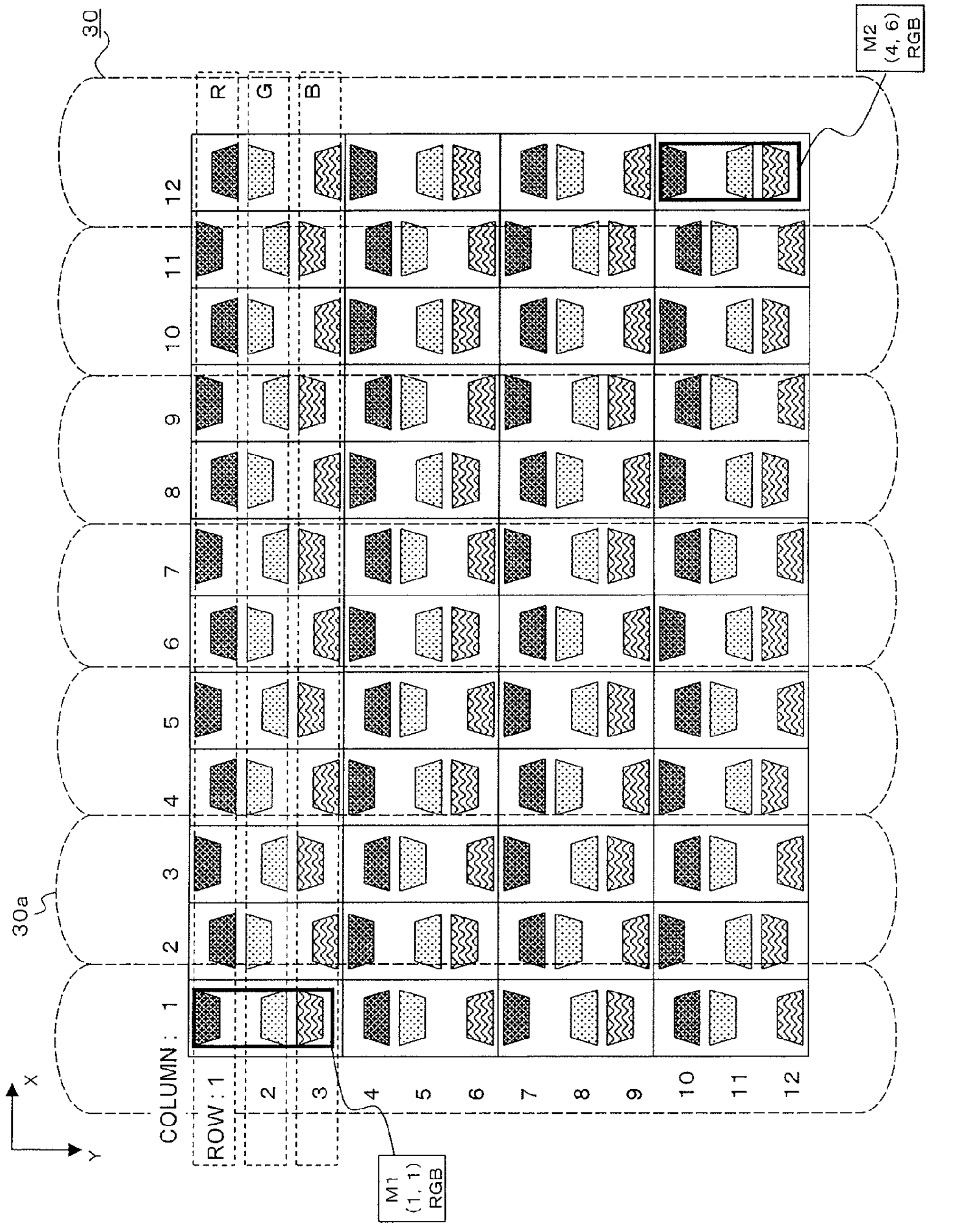
FIG. 23 shows a second example of the layout of the image separating device according to the first exemplary embodiment of the present invention.

The image separating device is not limited to be placed in the manner shown in FIG. 7 but may also be placed in the manner as shown in FIG. 23, for example. In FIG. 7, as described above, the first column is M2 and the second column is M1, i.e., the sub-pixels on the odd-numbered column are M2 and the sub-pixels on the even-numbered columns are M1. In the case of FIG. 23, the first column is M1 and the second column is M2, i.e., the sub-pixels on the odd-numbered column are M1 and the sub-pixels on the even-numbered columns are M2. As described, even/odd of the columns where the viewpoint images M1/M2 are displayed is determined depending on the layout of the image separating device.

Figure 17:
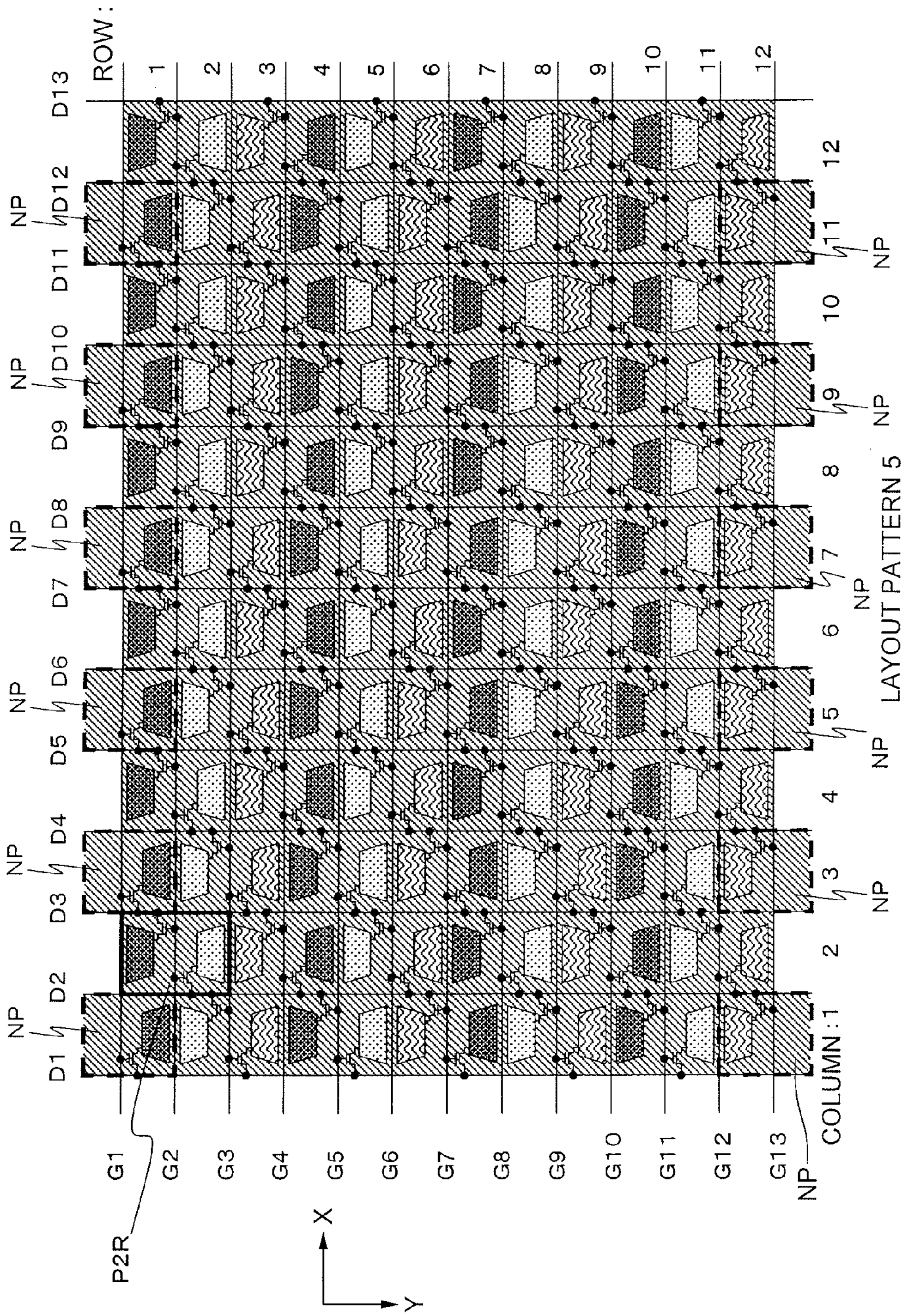
FIG. 17 shows a layout pattern 5 of the display part according to the first exemplary embodiment of the present invention.

Even/odd of the scanning lines corresponding to the odd-numbered columns and the even-numbered columns on the display part is determined whether the sub-pixel located on the first row of the first column on the display part is the upward sub-pixel or the downward sub-pixel. FIG. 8 is a layout example of the case where the sub-pixel on the first row of the first column is the upward sub-pixel, and FIG. 17 is a layout example of the case where the sub-pixel on the first row of the first column is the downward sub-pixel. It is assumed here that the facing directions (upward or downward) of the sub-pixel to be placed on the first row of the first column is a variable "u", and the sub-pixel on the first row of the first column is the upward sub-pixel when u=0 while the sub-pixel on the first row of the first column is the downward sub-pixel when u=1. As shown in FIG. 8 and FIG. 17, when the sub-pixel on the first row of the first column is the upward sub-pixel, i.e., when u=0, the odd-numbered scanning lines are connected to the sub-pixels on the even-numbered columns, and the even-numbered scanning lines are connected to the sub-pixel on the odd-numbered columns. When the sub-pixel on the first row of the first column is the downward sub-pixel, i.e., when u=1, the odd-numbered scanning lines are connected to the sub-pixels on the odd-numbered columns, and the even-numbered scanning lines are connected to the sub-pixel on the eve-numbered columns.

The relation between the even/odd of the scanning lines and the viewpoint images M1/M2 determined in the manner described above is summarized in FIG. 24. In FIG. 24, a viewpoint of an input image to which the odd-numbered scanning line corresponds is shown with "v1", and a viewpoint of an input image to which the even-numbered scanning line corresponds is shown with "v2". FIG. 24 shows that, when the image separating device is so disposed that the odd-numbered columns of the display part are M1 and the even-numbered columns are M2 and that the sub-pixel on the first row of the first column in the display part is the upward sub-pixel, "v1=2 and v2=1" applies. That is, the viewpoint images on the odd-numbered scanning lines are M2, and the viewpoint images on the even-numbered scanning lines are M1.

R/G/B to be the color of the first row is determined by the color filter. One scanning line is connected to the sub-pixels of two rows. Thus, the regularity of the colors corresponding to the scanning lines is determined, when the color on the first row set by the color filter and the order of colors are determined.

Further, the pixel data of the input image carries RGB color information, so that one row expressed with input image "i" corresponds to three rows of sub-pixels. Regarding the up-and-down sub-pixel pair, the sub-pixels are disposed on up-and-down by sandwiching a single scanning line therebetween. Thus, a single scanning line corresponds to two rows of sub-pixels. Accordingly, as a relation between the rows of the input image and the scanning lines, there is a periodicity having six scanning lines as a unit.

FIG. 25 shows the summary of the regularity in a scanning line unit according to the exemplary embodiment. An arbitrary scanning line Gy is expressed by using an arbitrary natural number "q", and "M(k)" is input image viewpoint to which the up-and-down sub-pixel pair connected to the Gy(q) connects, C1(R/G/B) is the color of the upwards sub-pixel, C2 (R/G/B) is the color of the downward sub-pixel, and (Ui/Di) is the rows of the vertically arranged sub-pixels. The row of the input image corresponding to the upward sub-pixel of the sub-pixel pair is defined as Ui, and the row of the input image corresponding to the downward sub-pixel of the sub-pixel pair is defined as Di. By using the regularity shown in FIG. 25, the viewpoints of the input image on an arbitrary signal line Gy, colors, rows can be designated when generating the synthesized image data. However, as illustrated in FIG. 8-FIG. 11 and FIG. 17, the top row (first row in the drawing) and the last row (twelfth row in the drawing) of the display part are configured with the up-and-down sub-pixel pairs including NP. That is, the up-and-down sub-pixel pairs connected to the top line of the scanning lines (G1 in the drawing) and to the last line (G13 in the drawing) include NP. If the regularity shown in FIG. 25 is applied including NP, the rows with no input image (shown in FIG. 6) may be designated for NP. Thus, when actually generating the synthesized image data by using the regularity of FIG. 25, it needs to be careful about handling NP.

Next, the regularity in a unit of data line will be described.

Due to the structure of the up-and-down sub-pixel pairs, two data lines are used for one column of sub-pixels, so that (n+1) data lines are necessary for n-columns of sub-pixels of the display part. However, as described above, one scanning line and the up-and-down sub-pixel pair are disposed by every other column. That is, one scanning line and the up-and-down sub-pixel pair are disposed on an odd-numbered column or an even-numbered column, and the number of up-and-down sub-pixel pairs connected to one scanning line is "n/2".

Considering the number of data lines connected to the sub-pixel by each scanning line, it is separated to a case where n-number of data lines from D1 to Dn are connected and Dn+1 is not connected to the sub-pixel and to a case where n-number of data lines from D2 to Dn+1 are connected and D1 is not connected. This is evident from the layout patterns of FIG. 8-FIG. 11 and FIG. 17 illustrated as the specific examples.

By using the regularity shown in FIG. 25, the viewpoints of the input image on an arbitrary signal line Gy, colors, rows for an arbitrary scanning line can be designated. It is the regularity regarding the correspondence between the number of data lines and the column number of the input image data required by a unit of data line. As described above, the number of up-and-down sub-pixel pairs connected to one scanning line is "n/2", the number of sub-pixels is "n", and the number of connected data lines is "n".

Thus, the data layout for one scanning line is expressed in order with variables as in L(1), L(2), - - - , L(n) and have those corresponded with the column order of the input image data. The direction of increase in the order of L is defined to be the same increasing direction of the order of the data lines. As a specific example, the data layout of the scanning line G2 can be expressed as follows by using the synthesized image data 1 shown in FIG. 18 that is the case where the image separating device of FIG. 7 is placed to the layout pattern 1 shown in FIG. 8.

L(1)=M2 (1, 1) G
L(2)=M2 (1, 1) R
L(3)=M2 (1, 2) G
L(4)=M2 (1, 2) R
- - -
L(11)=M2 (1, 6) G
L(12)=M2 (1, 6) R

Further, the data layout of the scanning line G3 can be expressed as follows by using the same drawing.

L(1)=M1 (1, 1) B
L(2)=M1 (1, 1) G
L(3)=M1 (1, 2) B
L(4)=M1 (1, 2) G
- - -
L(11)=M1 (1, 6) B
L(12)=M1 (1, 6) G

As in the above, when the number of the data layout is increased by 2, the column number of the input image is increased by 1. This is because the two sub-pixels of the up-and-down sub-pixel pair lined on one column shows two colors. This shows that the order of the up-and-down sub-pixel pairs connected to one scanning line in the horizontal direction corresponds to the column number of the input image data.

Thus, when it is assumed that a natural number showing the up-and-down sub-pixel pairs connected to one scanning line in the horizontal direction (extending direction of the scanning lines) is "p", the column number of the input image data is also "p". In FIG. 8, on the odd-numbered scanning lines, p=1 shows the up-and-down sub-pixel pair on the second column connected to the odd-numbered scanning line, p=2 shows the up-and-down sub-pixel pair on the fourth column, p=3 shows the up-and-down sub-pixel pair on the sixth column, p=4 shows the up-and-down sub-pixel pair on the eighth column, p=5 shows the up-and-down sub-pixel pair on the tenth column, and p=6 shows the up-and-down sub-pixel pair on the twelfth column. On the even-numbered scanning lines, p=1 shows the up-and-down sub-pixel pair on the first column connected to the even-numbered scanning line, p=2 shows the up-and-down sub-pixel pair on the third column, p=3 shows the up-and-down sub-pixel pair on the fifth column, p=4 shows the up-and-down sub-pixel pair on the seventh column, p=5 shows the up-and-down sub-pixel pair on the ninth column, and p=6 shows the up-and-down sub-pixel pair on the eleventh column.

When "p" is employed to the case of FIG. 18, the following applies for the scanning line G2.

L (2p−1)=M2 (1, p) G
L (2p)=M2 (1, p) R

Further, the following applies for the scanning line G3.

L (2p−1)=M1 (1, p) G
L (2p)=M1 (1, p) B

That is, "2p−1" and "2p" correspond to the order of two data lines connected to the up-and-down sub-pixel pair, and correspond to the color of the upward sub-pixel or the downward sub-pixel. As shown in FIG. 4 and FIG. 5, the order of data lines connected to the upward sub-pixel and the downward sub-pixel is determined depending on the structure of the up-and-down sub-pixel pairs (P2R/P2L). "Dx" and "Dx+1" which show the order of data lines connected to the up-and-down sub-pixel pair shown in FIG. 4 and FIG. 5 can be replaced with "Dx=2p−1" and "Dx+1=2p". That is, with the structure of P2R, the downward pixel corresponds to "2p−1" and the upward pixel corresponds to "2p". In the meantime, with the structure of P2L, the upward pixel corresponds to "2p−1" and the downward pixel corresponds to "2p".

Thus, information of the up-and-down sub-pixel pairs connected to arbitrary scanning lines is required. There is provided a lookup table in which the scanning line is Gy, the up-and-down sub-pixel pair connected to Gy is expressed as LUT (Gy, p), and the table returns "0" for P2R and "1" for P2L according to the structure of the up-and-down sub-pixel pairs.

As specific examples of LUT (Gy, p), FIG. 27 shows the lookup tables corresponded to the layout pattern 3 of FIG. 10 and the layout pattern 4 of FIG. 11. The use of LUT (Gy, p) makes it possible to know the order of the upward pixel and the downward pixel in an arbitrary up-and-down sub-pixel pair. Thus, based on the regularity of the scanning lines shown in FIG. 25, the order of two colors can be designated by using the color C1 of the upward sub-pixel and the color C2 of the downward sub-pixel. The lookup tables LUT (Gy, p) shown in FIG. 27 are expressed with the sub-pixel pair number (p) connected to all the scanning lines of the display part. However, it is also possible to pay attention to the repeated pattern, and to compress the table by using lower bits by expressing Gy and p in binary numbers as shown in FIG. 28.

As described above, it is possible to designate the viewpoints, row numbers, column numbers, and colors of input images corresponding to the data L(1), L(2), - - - , L(n) for one arbitrary scanning line Gy by using "p" and LUT (Gy, p).

The synthesized image data CM is completed by having the data from L(1) to L(n) as the data for one arbitrary scanning line corresponded to the data lines D1, D2, - - - , Dn, Dn+1.

Regarding the relation between even/odd of the scanning lines and the data lines connected to the sub-pixels is determined whether the sub-pixel located on the first row of the first column on the display part is the upward sub-pixel or the downward sub-pixel. FIG. 26 shows the relation between even/odd of the scanning lines and the data lines to be connected to the sub-pixels by using the variable "u" which shows whether the sub-pixel positioned on the first row of the first column is the upward sub-pixel or the downward sub-pixel. As shown in FIG. 26, when u=0, the data lines from D2 to Dn+1 are connected to the sub-pixels when the scanning lines are of odd-numbers, and the scanning line D1 is unconnected. Similarly, when u=0, the data lines from D1 to Dn are connected to the sub-pixels when the scanning lines are of even-numbers, and the scanning line Dn+1 is unconnected. When u=1, even/odd of the scanning lines are inverted.

The synthesized image CM is completed by supplying the data from L(1) to L(n) for one scanning line to the data lines according to FIG. 26 as in the followings.

In a case where "u=0" and the scanning lines are of odd numbers, the synthesized images are as follows.

CM (Gy, 1)=z
CM (Gy, 2)=L(1)
CM (Gy, 3)=L(2)
- - -
CM (Gy, n)=L(n−1)
CM (Gy, n+1)=L(n)

In a case where "u=0" and the scanning lines are of even numbers, the synthesized images are as follows.

CM (Gy, 1)=L(1)
CM (Gy, 2)=L(2)
CM (Gy, 3)=L(3)
- - -
CM (Gy, n)=L(n)
CM (Gy, n+1)=z

Note that "z" is the data supplied to the data line that is not connected to the sub-pixel.

As described above, it is possible to generate the synthesized image data based on the information and the regularities. FIG. 29 shows specific examples of the parameter variables required for generating the synthesized image data and specific examples of the variable contents. At least one set of the parameters shown in FIG. 29 is saved in the parameter storage device 140 shown in FIG. 2. Through saving the parameters required for generating the synthesized image data, it is possible to correspond to changes in the design of the display part by changing the parameters. It is also possible to save a plurality of parameters, and switch the parameters according to the display panel to be connected.

(Explanations of Actions)

Actions of the exemplary embodiment will be described by referring to the drawings.

Figure 30:
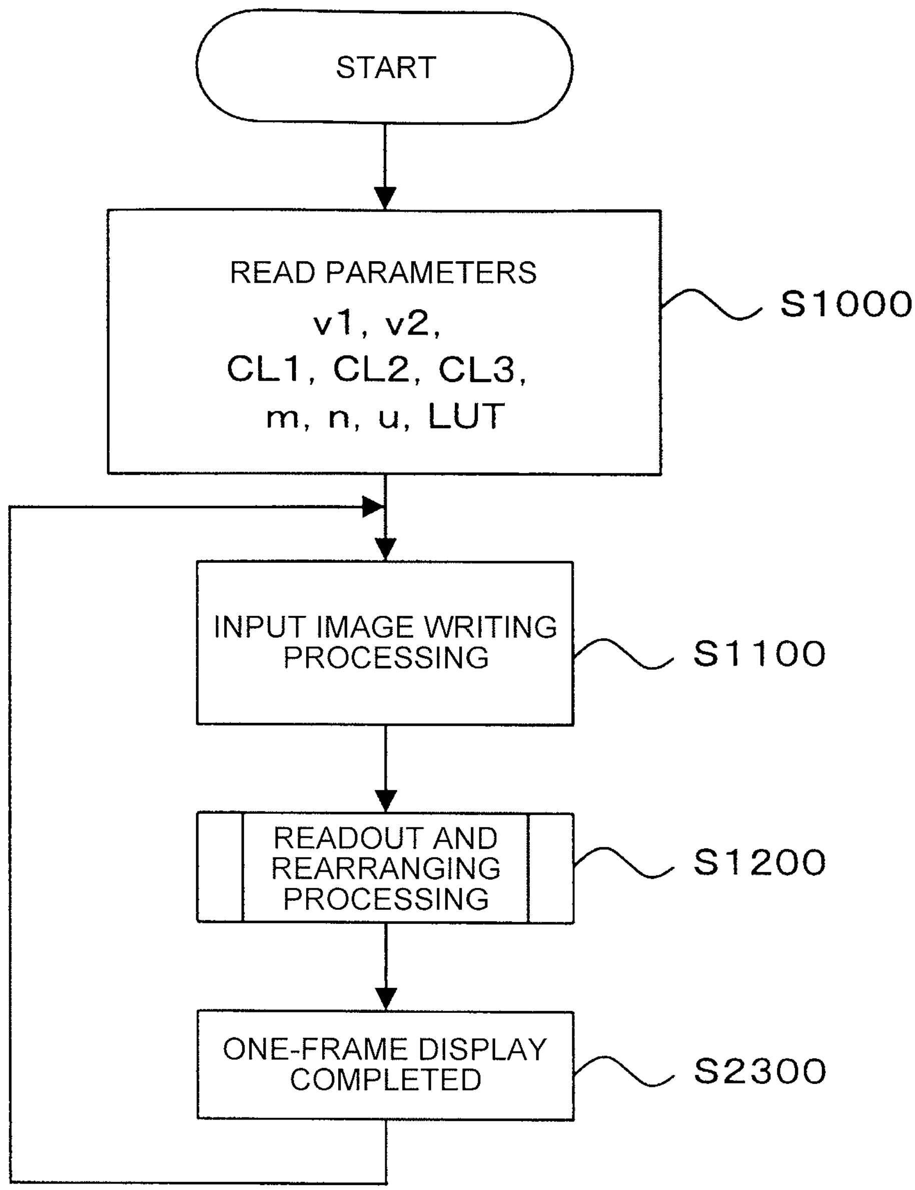
FIG. 30 shows a flowchart of the first exemplary embodiment according to the present invention.

FIG. 30 is a flowchart showing one-frame display action of the display device according to the exemplary embodiment.

(Step S1000)

When the action of the display device according to the exemplary embodiment is started, the parameters required for generating the synthesized image, i.e., the viewpoint v1 of the input image to which the odd-numbered scanning line corresponds, the viewpoint v2 of the input image to which the even-numbered scanning line corresponds, colors CL1, CL2, CL3 of the color filters from the first row to the third row, the row number "m" and the column number "n" having a sub-pixel of the display part 50 as a unit, the facing direction "u" of the sub-pixel positioned on the first row of the first column of the display part 50, and the layout LUT of the up-and-down sub-pixel pairs of the display part 50, are set to the readout control device 130 from the parameter storage device 140 shown in FIG. 2.

(Step S1100)

The image data M1, M2 for each viewpoint configured with image data of i-rows and j-columns and the synchronous signals are inputted to the writing control device 110 from outside. The writing control device generates addresses which make it possible to discriminate each of the pixel data from M1 (1, 1) RGB to M1 (i, j) RGB and from M2 (1, 1) RGB to M2 (i, j) RGB which configure the input image data by utilizing the synchronous signals, and stores the image data and the addresses thereof to the image memory 120. The image memory 120 has regions for two screens of the synthesized image data to be outputted, and alternately uses the readout screen region and the write screen region.

(Step S1200)

The input image data M1 and M2 stored in the image memory 120 are read out according to a prescribed pattern, rearranging processing is performed, and the synthesized image data CM is outputted to the data-line driving circuit 80 of the display panel 20. The actions of the readout and rearranging processing will be described separately by referring to a flowchart shown in FIG. 31.

(Step S2300)

When the readout and rearranging processing is completed, the one-frame display action is completed. The procedure is returned to step S1100, and the above-described actions are repeated.

FIG. 30 is a flowchart of actions for a region of one screen within the image memory. As described in step S1100, the image memory 120 has the regions for two screens. Therefore, actually, the writing processing and the readout and rearranging processing are executed in parallel.

Figure 31:
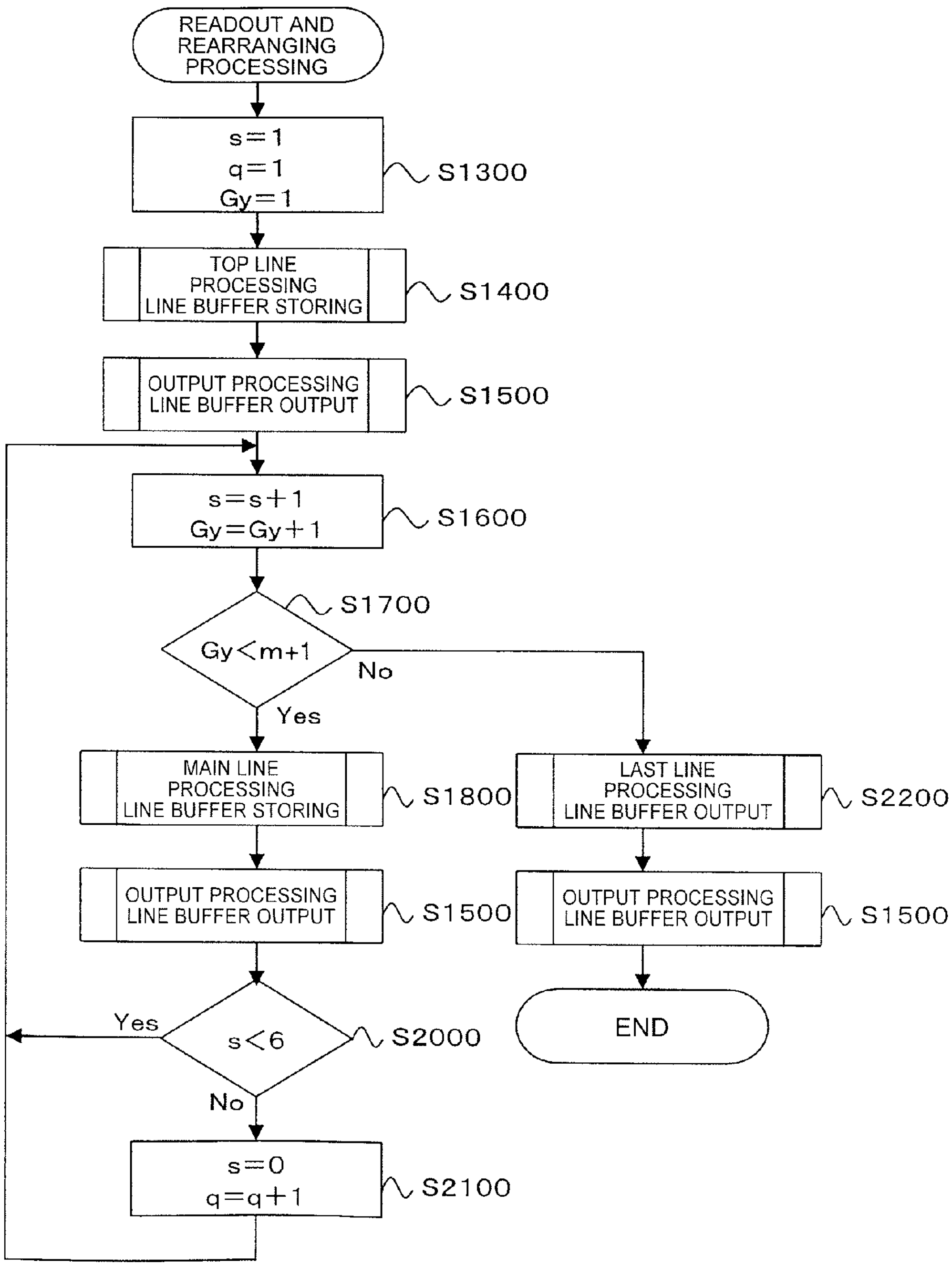
FIG. 31 shows a flowchart of the first exemplary embodiment according to the present invention.

Next, details of the readout and rearranging processing will be described by referring to FIG. 31. FIG. 31 is a flowchart showing the processing contents of step S1200, which shows the processing for each of the scanning lines from G1 to Gm.

(Step S1300)

"1" is given to the variables "Gy", "s", and "q" as an initial value. "Gy" is the variable for counting the number of scanning lines, and the count value corresponds to the scanning line for performing scanning. Further, "s" is the variable for counting the cycle of six scanning lines shown in FIG. 25, and "q" is the variable that is incremented by 1 every time "s" counts 6.

(Step S1400)

This is the data processing part for the data of the top line, i.e., the sub-pixels connected to G1. The detailed contents of the processing of the top line will be described separately by referring to a flowchart shown in FIG. 32. Here, n-pieces of data including the data supplied to the sub-pixels selected by the first scanning line are stored in a line buffer.

(Step S1500)

The data stored in the line buffer for one scanning line is outputted to the data-line driving circuit 80. The detailed contents of the output processing will be described separately by referring to a flowchart shown in FIG. 33. In the output processing, processing for making the n-pieces of data stored in the line buffer corresponded to the data line from D1 to Dn+1 is executed to complete the synthesized image data CM of the scanning line Gy, and the synthesized image data CM is outputted to the data-line driving circuit 80.

(Step S1600)

The count values of "s" and "Gy" are incremented by 1 according to the horizontal synchronous signals from the timing control device 150 shown in FIG. 2.

(Step S1700)

It is judged whether or not the count value of Gy is the last scanning line Gn+1 of the display part. For the judgment, the row number "m" of the display part set in step S1000 is used. When it has not reached to "m+1", it is judged as Yes and the procedure is advanced to step S1800. When it is "m+1", the judgment is No and the procedure is advanced to step S2100.

(Step S1800)

It is the data processing part of the data of the sub-pixels connected to the scanning line Gy except the top line G1 and the last line Gm+1. The detailed contents of the processing of the main line will be described separately by referring to a flowchart shown in FIG. 32. Here, n-pieces of data including the data supplied to the sub-pixels selected by the scanning line Gy are stored in the line buffer. When the processing of step S1800 ends, the procedure is advanced to the output processing of step S1500 where the synthesized image data CM of the scanning line Gy is completed, and the synthesized image data CM is outputted to the data-line driving circuit 80. When the processing of step S1500 ends, the procedure is advanced to step S2000.

(Step S2000)

Judgment by the count value of "s" is executed. When "s" has not reached to 6, it is judged as Yes and the procedure is advanced to step S1600. When "s" is 6, the judgment is No and the procedure is advanced to step S2000.

(Step S2100)

The count value of "s" is returned to "0", the count value of "q" is incremented by 1, and the procedure is advanced to step S1600.

(Step S2200)

This is the data processing part for the data of the last line, i.e., the sub-pixels connected to Gm+1. The detailed contents of the processing of the last line will be described separately by referring to a flowchart shown in FIG. 36. Here, n-pieces of data including the data supplied to the sub-pixels selected by the (m+1)-th line are stored in the line buffer. When the processing of step S2100 ends, the procedure is advanced to the output processing of step S1500 where the synthesized image data CM of the scanning line Gm+1 is completed, and the synthesized image data CM is outputted to the data-line driving circuit 80.

When the output processing of step S1500 following the processing of step S2200 ends, the readout and rearranging processing is completed.

Figure 32:
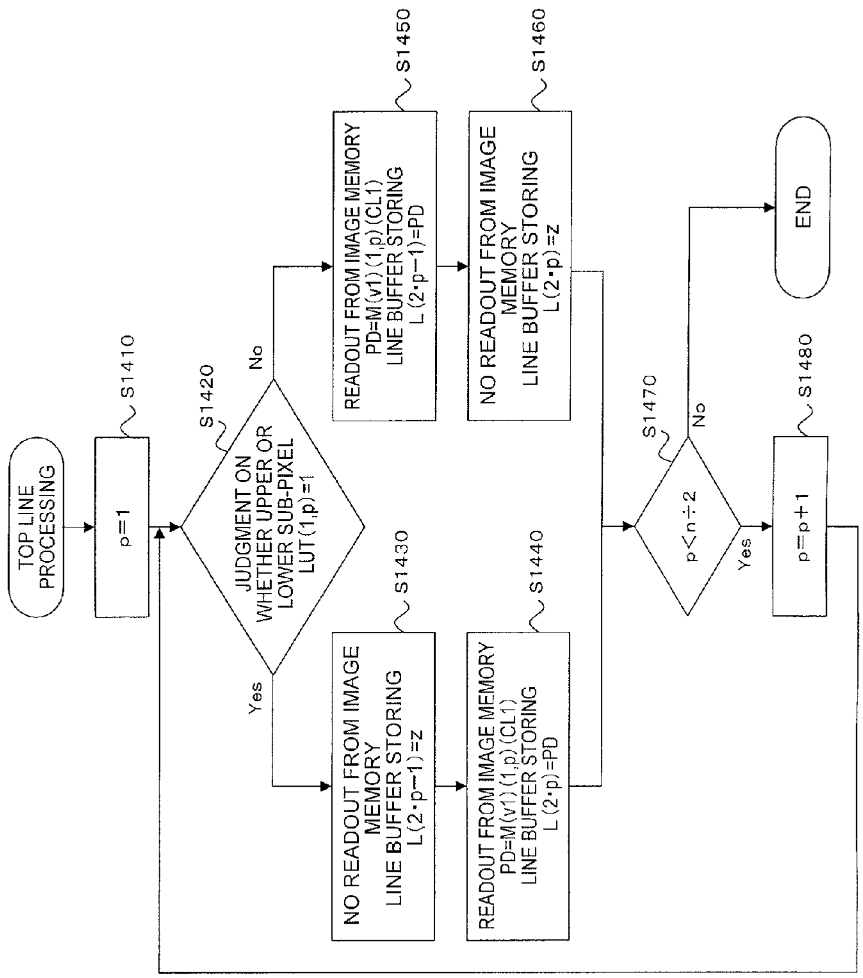
FIG. 32 shows a flowchart of the first exemplary embodiment according to the present invention.

Next, details of the top line processing will be described by referring to FIG. 32. With the top line processing, the input image data corresponding to the scanning line G1 is read out and stored in a readout line buffer L. In the line buffer L, the n-pieces of sub-pixel data for one row of the display part is stored to L(1), L(2), - - - , L(n).

(Step S1410)

"1" is given to the variable "p" as an initial value. The variable "p" is used for designating the up-and-down sub-pixel pair connected to the scanning line G1, for designating the column number of the pixel data to be read out, and for designating the order for storing the data in the line buffer.

(Step S1420)

It is judged whether the sub-pixel connected to the earliest order data line among the data lines is the upward sub-pixel or the downward sub-pixel of the up-and-down sub-pixel pair by using LUT. When LUT (1, p)=1, i.e., when the up-and-down sub-pixel pair connected to the p-th scanning line G1 is P2L, it is judged as Yes and the procedure is advanced to step S1430. When LUT (1, p)=0, i.e., when the up-and-down sub-pixel pair connected to the p-th scanning line G1 is P2R, it is judged as No and the procedure is advanced to step S1450.

(Step S1430)

The data supplied to the upward sub-pixel of the earliest order of data line that is connected to the up-and-down sub-pixel pair P2L is stored in the line memory L (2p−1). On the top line, i.e., on the scanning line G1, there is no upward sub-pixel as can be seen from the layout patterns of FIG. 8-FIG. 11 and FIG. 17 illustrated as the specific examples. Therefore, "z" is stored, even though the data stored in L (2p−1) is not reflected upon the display. Here, "z" is set as "0" as a way of example.

(Step S1440)

Following step S1430, the data supplied to the downward sub-pixel of the last order of data line that is connected to the up-and-down sub-pixel pair P2L is stored in the line memory L (2p). First, the matrix and color of the pixel data of the input image to be read out with "M (v1) (1, p) (CL1)" are designated. Note here that "v1" is the parameter of the viewpoint image of the scanning line G1 (i.e., the odd-numbered scanning line). Since it is the scanning line G1, the row number is "1", the column number is the variable "p", and CL1 is the parameter of the color on the first row. Then, a readout address is decoded from "M (v1) (1, p) (CL1)", and the data is read out from the image memory and stored to PD. This data PD is stored to the line memory L(2p).

(Step S1450)

The data supplied to the downward sub-pixel of the earliest order of data line that is connected to the up-and-down sub-pixel pair P2R is stored in the line memory L (2p−1). As in the case of step S1440, the matrix and color of the pixel data of the input image to be read out are designated by "M (v1) (1, p) (CL1)". Then, a readout address is decoded from M (v1) (1, p) (CL1), and it is stored to a PD from the image memory. This data PD is stored to the line memory L(2p−1).

(Step S1460)

Following step S1450, the data supplied to the upward sub-pixel of the last order of data line that is connected to the up-and-down sub-pixel pair P2R is stored in the line memory L (2p). On the scanning line G1, there is no upward sub-pixel as described in the section of step S1430. Therefore, "z" is stored even though the data stored in L (2p) is not reflected upon the display. Here, "z" is set as "0" as a way of example.

(Step S1470)

It is judged whether or not the processing of the up-and-down sub-pixel pairs for one scanning line has been completed based on the count value of "p". For the judgment, the column number "n" of the display part set in step S1000 is used. When the count value "p" has not reached to "n÷2", it is judged as Yes and the procedure is advanced to step S1480. When it is "n÷2", the judgment is No and the procedure for the top line is ended.

(Step S1480)

The count value of "p" is incremented by 1, and the procedure is advanced to step S1420.

Figure 33:
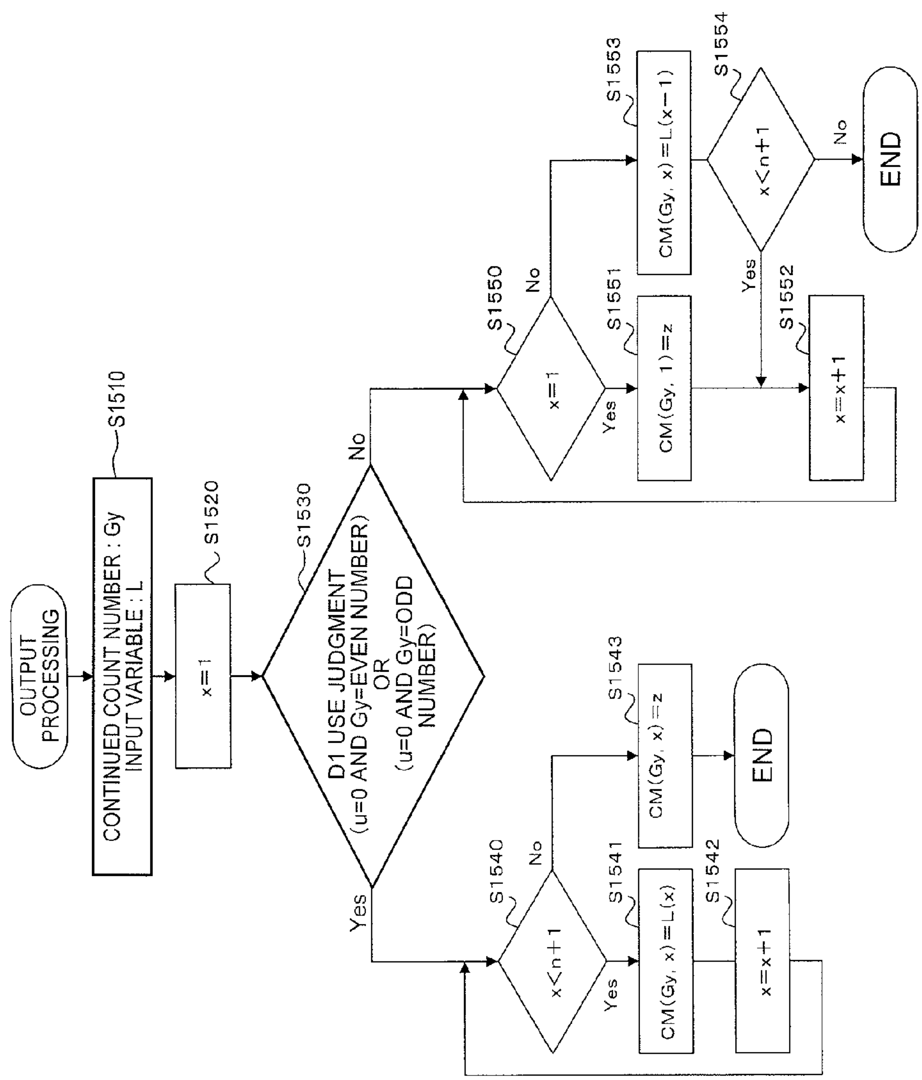
FIG. 33 shows a flowchart of the first exemplary embodiment according to the present invention.

Next, details of the output processing will be described by referring to FIG. 33. In the output processing, processing for having the n-pieces of data stored in the line buffer L corresponded to the data lines from D1 to Dn or from D2 to Dn+1 is executed to complete the synthesized image data CM, and the synthesized image data CM is outputted to the data-line driving circuit 80.

(Step S1510)

This shows that the value of Gy used in the readout and rearranging processing is continuously used and the line buffer L to which the data is stored in the readout and rearranging processing is used, and it is not a step which executes any special processing.

(Step S1520)

"1" is given to "x" as an initial value. Note here that "x" s used to designate the order of the data lines, i.e., used to designate the columns of the synthesized image data CM. It is a count value of a data transfer clock for the data-lien driving circuit 80, which is generated by the timing control device 150 shown in FIG. 2.

(Step S1530)

It is judged whether or not the first data line D1 is connected to the sub-pixel and used for display. For the judgment, the parameter "u" that is the facing direction of the sub-pixel positioned on the first row of the first column of the display part 50 and the count value Gy of the scanning line set in step S1000 are used. As shown in FIG. 26, when u=0 and the scanning line Gy is of an even number or when u=1 and the scanning line Gy is of an odd number, the data line D1 is used. Thus, it is judged as Yes, and procedure is advanced to step S1540. When unmatched to that condition, it is judged as No and the procedure is advanced to step S1550.

(Step S1540)

It is judged whether or not the processing has reached to the last data line Dn +1. For the judgment, the column number "n" of the display part set in step S1000 is used. When the count value of "x" has not reached to "n+1", it is judged as Yes and the procedure is advanced to step S1541. When the count value of "x" is "n+1", the judgment is No and the procedure is advanced to step S1543.

(Step S1541)

The data L(x) of the line buffer is outputted to the synthesized image data CM (Gy, x). This synthesized image data is outputted to the data-line driving circuit 80.

(Step S1542)

The count value of "x" is incremented by 1, and the procedure is advanced to step S1540.

(Step S1543)

At this time, "X=n+1". From judgment made in step S1530, there is no sub-pixel which is connected to the data lien Dn+1. Thus, even though it is not reflected upon display, "z" is outputted to the synthesized image data CM (Gy, n+1). Here, "z" is set as "0" as a way of example. This synthesized image data CM is outputted to the data-line driving circuit 80. Thereby, the output of data up to the data line Dn+1 is completed, so that the output processing is ended.

(Step S1550)

It is judged whether or not the processing is for the first data line D1. When "x=1", it is judged as Yes and the procedure is advanced to step S1551. When "x" is not 1, the judgment is No and the procedure is advanced to step S1553.

(Step S1551)

At this time, "X=1". From judgment made in step S1530, there is no sub-pixel which is connected to the data lien Dn+1. Thus, even though it is not reflected upon display, "z" is outputted to the synthesized image data CM (Gy, n+1). Here, "z" is set as "0" as an example. This synthesized image data CM is outputted to the data-line driving circuit 80.

(Step S1552)

The count value of "x" is incremented by 1, and the procedure is advanced to step S1550.

(Step S1553)

The data L(x−1) of the line buffer is outputted to the synthesized image data CM (Gy, x). This synthesized image data CM is outputted to the data-line driving circuit 80.

(Step S1554)

It is judged whether or not the processing has reached to the last data line Dn +1. When the count value of "x" has not reached to "n+1", it is judged as Yes and the procedure is advanced to step S1552. When the count value of "x" is "n+1", output of the data up to the data line Dn+1 has been completed. Thus, it is judged as No, and the output processing is ended.

Figure 34:
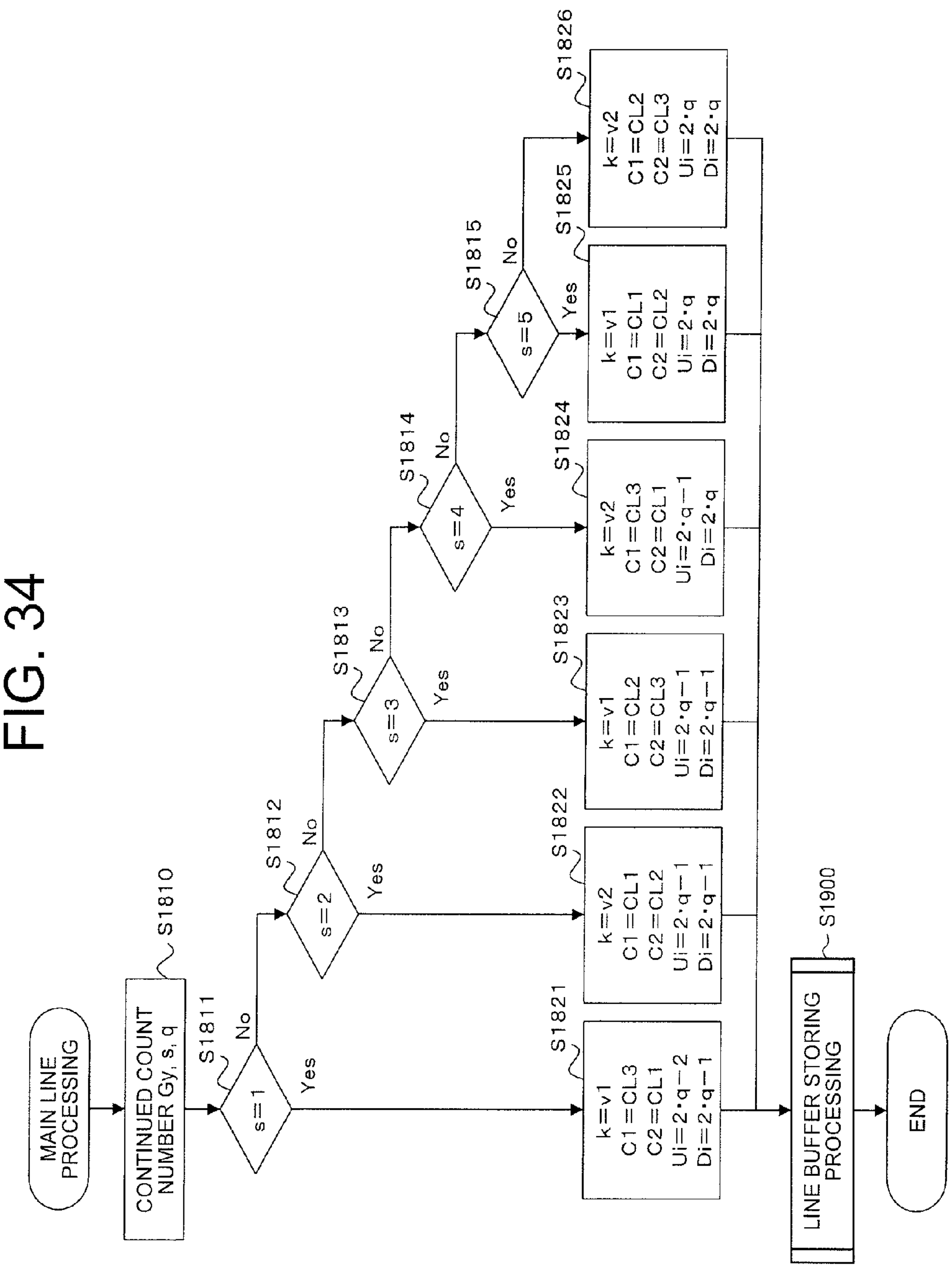
FIG. 34 shows a flowchart of the first exemplary embodiment according to the present invention.

Next, details of the main line processing will be described by referring to FIG. 34. FIG. 34 is a flowchart showing the processing contents of step S1800. With the main line processing, the input image data corresponding to the scanning line Gy is read out according to the regularity in a unit of scanning line shown in FIG. 25, and n-pieces of sub-pixel data for one row are stored in the line buffer L. FIG. 34 shows the processing executed according to the regularity shown in FIG. 25, and the processing for storing the data to the line buffer will be described separately by referring to FIG. 35.

(Step S1810)

This shows that the value of "Gy", the value of "s", and the value of "q" used in the readout and rearranging processing are continuously used, and it is not a step which executes any special processing.

(Step S1811-Step S1815)

Executed herein is divergence of the conditions based on the value of "s" which is the cycle of six scanning lines.

According to the values of "x" from 1 to 6, the procedure is advanced to step S1821-Step S1826.

(Step S1821-Step S1815)

As shown in FIG. 25, information of the viewpoint, color, and row for designating the pixel data to be read out is stored for the respective variables in accordance with the value of "s". The viewpoint is stored as the variable k, the color of the upward sub-pixel is stored as the variable C1, and the color of the downward sub-pixel is stored as the variable C2 by using the parameters set in step S1000. Further, the row of the input image of the upward sub-pixel is calculated and stored as a variable Ui, and the row of the input image of the downward sub-pixel is calculated and stored as a variable Di based on "q".

(Step S1900)

The data corresponding to the scanning line Gy is read out and stored to the line buffer L by using the variables k, Ui, Di, C1, and C2. Details thereof will be separately described by referring to a flowchart shown in FIG. 35. After completing the line buffer processing, the main line processing is ended.

Figure 35:
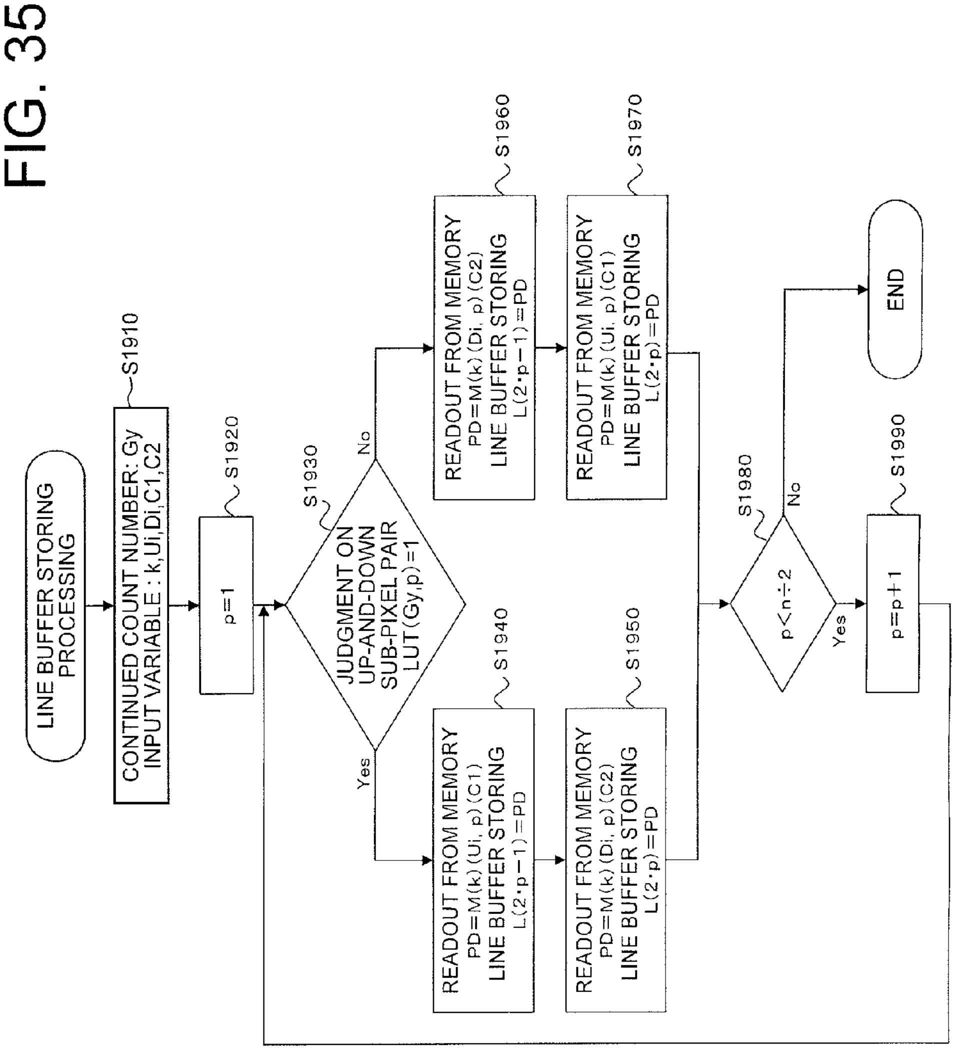
FIG. 35 shows a flowchart of the first exemplary embodiment according to the present invention.

Next, details of line buffer storage processing will be described by referring to FIG. 35. FIG. 35 is a flowchart showing the processing contents of step S1900.

(Step S1910)

This shows that the value of Gy is continuously used and the variables k, Ui, Di, C1, and C2 are also used, and it is not a step which executes any special processing.

(Step S1920)

"1" is given to the variable "p" as an initial value. The variable "p" is used for designating the up-and-down sub-pixel pair connected to the scanning line G1, for designating the column number of the pixel data to be read out, and for designating the order for storing the data in the line buffer.

(Step S1930)

It is judged whether the sub-pixel connected to the earliest order data line among the data lines is the upward sub-pixel or the downward sub-pixel of the up-and-down sub-pixel pair by using LUT. When LUT (Gy, p)=1, i.e., when the up-and-down sub-pixel pair connected to the p-th scanning line Gy is P2L, it is judged as Yes and the procedure is advanced to step S1940. When LUT (Gy, p)=0, i.e., when the up-and-down sub-pixel pair connected to the p-th scanning line Gy is P2R, it is judged as No and the procedure is advanced to step S1960.

(Step S1940)

The data supplied to the upward sub-pixel of the earliest order of data line that is connected to the up-and-down sub-pixel pair P2L is stored in the line memory L(2p−1). The viewpoint, matrix, and color of the pixel data of the input image to be read out are designated by "M(k), (Ui, p) (C1)". Then, a readout address is decoded, and the data is read out to PD from the image memory. This data PD is stored to the line memory L(2p−1).

(Step S1950)

Following step S1940, the data supplied to the downward sub-pixel of the last order of data line that is connected to the up-and-down sub-pixel pair P2L is stored in the line memory L(2p). The viewpoint, matrix, and color of the pixel data of the input image to be read out are designated by M(k), (Di, p) (C2). Then, a readout address is decoded, and the data is read out to PD from the image memory. This data PD is stored to the line memory L(2p). The procedure is advanced to step S1980.

(Step S1960)

The data supplied to the downward sub-pixel of the earliest order of data line that is connected to the up-and-down sub-pixel pair P2R is stored in the line memory L(2p−1). The viewpoint, matrix, and color of the pixel data of the input image to read out are designated by M(k), (Di, p) (C2). Then, a readout address is decoded, and the data is read out to PD from the image memory. This data PD is stored to the line memory L(2p−1).

(Step S1970)

Following step S1960, the data supplied to the upward sub-pixel of the last order of data line that is connected to the up-and-down sub-pixel pair P2R is stored in the line memory L(2p). The viewpoint, matrix, and color of the pixel data of the input image to be read out are designated by M(k), (Ui, p) (C1). Then, a readout address is decoded, and the data is read out to PD from the image memory. This data PD is stored to the line memory L(2p). The procedure is advanced to step S1980.

(Step S1980)

It is judged whether or not the processing of the up-and-down sub-pixel pairs for one scanning line has been completed based on the count value of "p". For the judgment, the column number "n" of the display part set in step S1000 is used. When the count value "p" has not reached to "n÷2", it is judged as Yes and the procedure is advanced to step S1990. When it is "n÷2", the judgment is No and the line buffer storage processing is ended.

(Step S1990)

The count value of "p" is incremented by 1, and the procedure is advanced to step S1930.

Figure 36:
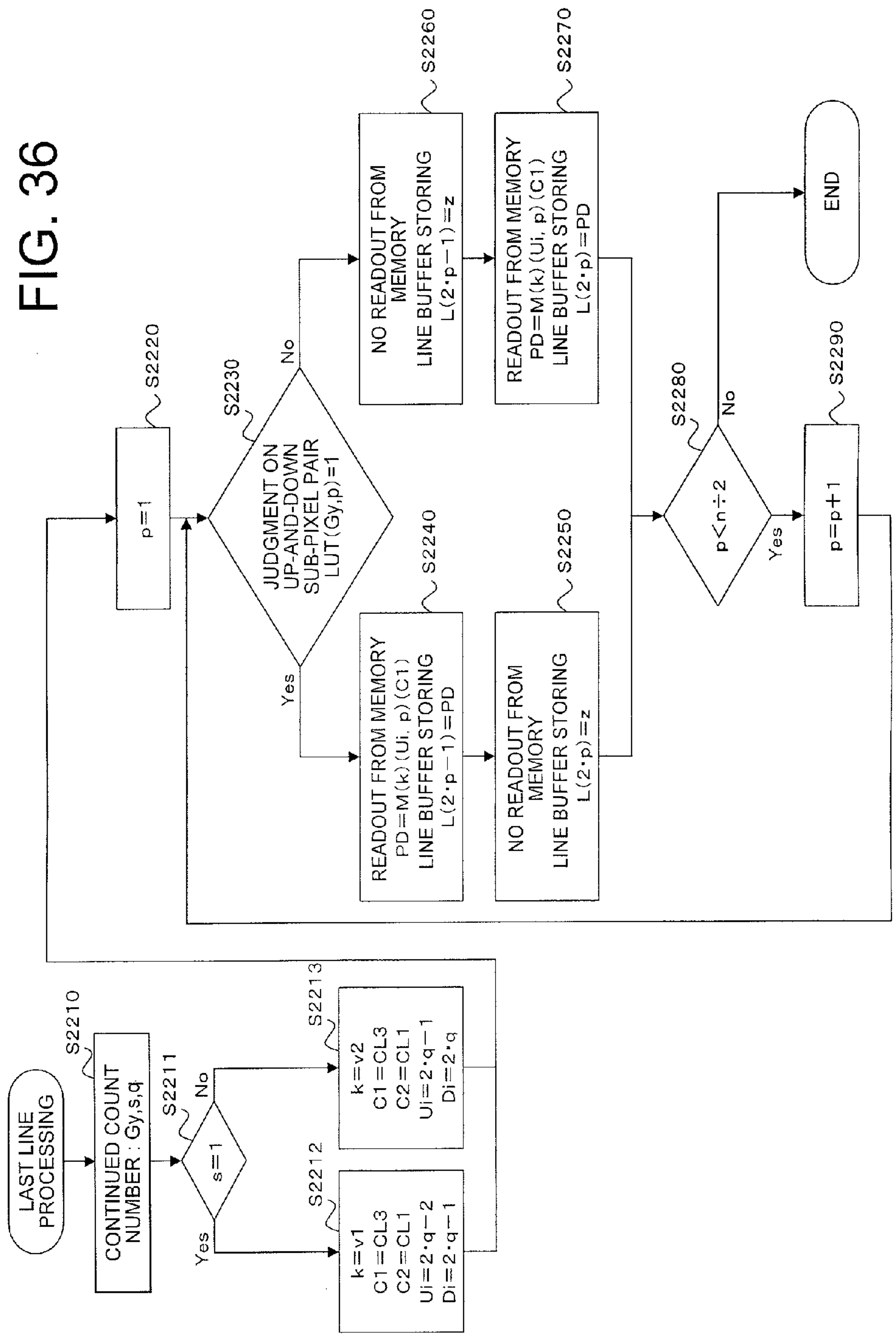
FIG. 36 shows a flowchart of the first exemplary embodiment according to the present invention.

Next, details of the last line processing will be described by referring to FIG. 36. FIG. 36 is a flowchart showing the processing contents of step S2200 shown in FIG. 31. With the last line processing, the input image data corresponding to the scanning line Gm+1 is read out, and it is stored in the line buffer L.

(Step S2210)

This shows that the value of "Gy", the value of "s", and the value of "q" used in the readout and rearranging processing are continuously used, and it is not a step which executes any special processing.

(Step S2211)

Executed is divergence of the conditions based on the value of "s" which is the cycle of six scanning lines. The value of "x" on the last scanning line Gm+1 of the display part becomes s=1 or s=4 since the sub-pixels of the exemplary embodiment are of three colors R/G/B. When it is s=1, the judgment is Yes and the procedure is advanced to step S2212. When it is s=4, the judgment is No and the procedure is advanced to step S2213.

(Step S2212, Step S2213)

As shown in FIG. 25, information of the viewpoint, color, and row for designating the pixel data to be read out is stored as the respective variables in accordance with the value of "s".

The viewpoint is stored as the variable k, the color of the upward sub-pixel is stored as the variable C1, and the color of the downward sub-pixel is stored as the variable C2 by using the parameters set in step S1000. Further, the row of the input image of the upward sub-pixel is calculated and stored as a variable Ui, and the row of the input image of the downward sub-pixel is calculated and stored as a variable Di based on "q". The procedure is advanced to step S2220.

(Step S2220)

"1" is given to the variable "p" as an initial value. The variable "p" is used for designating the up-and-down sub-pixel pair connected to the scanning line Gm+1, for designating the column number of the pixel data to be read out, and for designating the order for storing the data in the line buffer.

(Step S2230)

It is judged whether the sub-pixel connected to the earliest order data line among the data lines is the upward sub-pixel or the downward sub-pixel of the up-and-down sub-pixel pair by using LUT. When LUT (Gy, p)=1, i.e., when the up-and-down sub-pixel pair connected to the p-th scanning line Gy is P2L, it is judged as Yes and the procedure is advanced to step S2240. When LUT (Gy, p)=0, i.e., when the up-and-down sub-pixel pair connected to the p-th scanning line Gy is P2R, it is judged as No and the procedure is advanced to step S2260.

(Step S2240)

The data supplied to the upward sub-pixel of the earliest order of data line that is connected to the up-and-down sub-pixel pair P2L is stored in the line memory L(2p−1). The viewpoint, matrix, and color of the pixel data of the input image to be read out are designated by M(k), (Ui, p) (C1). Then, a readout address is decoded, and the data is read out to PD from the image memory. This data PD is stored to the line memory L(2p−1).

(Step S2250)

Following step S2240, the data supplied to the downward sub-pixel of the last order of data line that is connected to the up-and-down sub-pixel pair P2L is stored in the line memory L (2p). However, as can be seen from the layout patterns of FIG. 8-FIG. 11 and FIG. 17 illustrated as the specific examples, there is no downward sub-pixel on the scanning line Gm+1. Therefore, “z” is stored even though the data stored in L (2p) is not reflected upon the display. Here, “z” is set as “0” as a way of example. The procedure is advanced to step S2280.

(Step S2260)

The data supplied to the downward sub-pixel of the earliest order of data line that is connected to the up-and-down sub-pixel pair P2R is stored in the line memory L (2p−1).

However, as described in the section of step S2250, there is no downward sub-pixel on the scanning line Gm+1. Therefore, “z” is stored even though the data stored in L (2p−1) is not reflected upon the display. Here, “z” is set as “0” as a way of example.

(Step S2270)

Following step S2260, the data supplied to the upward sub-pixel of the last order of data line that is connected to the up-and-down sub-pixel pair P2R is stored in the line memory L(2p). The viewpoint, matrix, and color of the pixel data of the input image to be read out are designated by M(k), (Ui, p) (C1). Then, a readout address is decoded, and the data is read out to PD from the image memory. This data PD is stored to the line memory L(2p). The procedure is advanced to step S2280.

(Step S2280)

It is judged whether or not the processing of the up-and-down sub-pixel pairs for one scanning line has been completed based on the count value of “p”. For the judgment, the column number “n” of the display part set in step S1000 is used. When the count value “p” has not reached to “n÷2”, it is judged as Yes and the procedure is advanced to step S2290. When it is “n÷2”, the judgment is No and the last line processing is ended.

(Step S2290)

The count value of “p” is incremented by 1, and the procedure is advanced to step S2230.

As described, through executing the processing of the flowcharts shown in FIG. 30-FIG. 36, it becomes possible to generate the image data CM by synthesizing image data and rearranging the pixel data from the image data for two viewpoints inputted from outside by applying the regularity in a unit of six scanning lines and the layout pattern of the up-and-down sub-pixel pairs, and to display the image data CM on the display panel. The processing of the exemplary embodiment described above is merely an example, and the processing is not limited only to that. For example, since there is no input image data corresponding to NP, the processing for the top line and the last line where there is the up-and-down sub-pixel pair including NP is executed as separate processing from the main processing. However, the input image data is written to the image memory, and the data for generating the image data CM is read out by designating the addresses to the image memory. This, when it is possible to designate the address of the outside the input image data region and possible to read out the data corresponding to NP, the processing of NP can be executed with the main processing. The data supplied to NP is invalid for the display. Thus, if the processing for designating the address of NP can be executed, the main line processing can also e applied as it is without separating the processing for the top and last lines.

Regarding the output from the line buffer to the data-line driving circuit, described is the processing flow which outputs the data for every sub-pixel data. However, it depends on the interface specifications of the data-line driving circuit. For example, the data may be outputted from the line buffer by a unit of three sub-pixels or by a unit of six sub-pixels.

The structures and the actions of the first exemplary embodiment have been described heretofore.

Figure 37A:
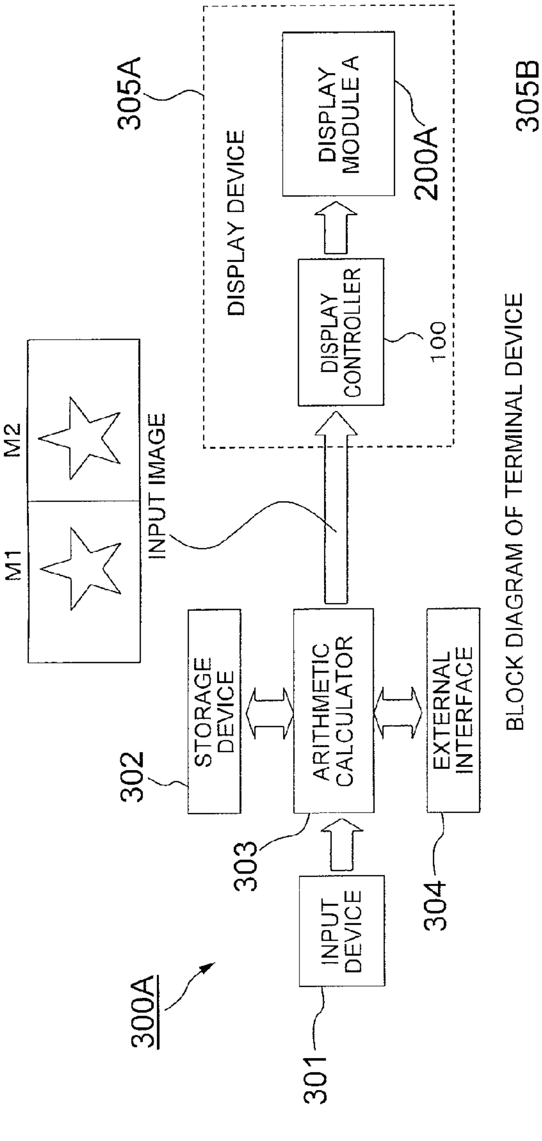
FIGS. 37A and 37B are block diagrams of a terminal device as an example to which the display device of the present invention is applied.

FIG. 37 is a block diagram showing a terminal device that is an example to which the display device of the exemplary embodiment is applied. The terminal device 300A shown in FIG. 37A is configured, including an input device 301, a storage device 302, an arithmetic calculator 303, an external interface 304, a display device 305A of the exemplary embodiment, and the like. As described above, the display device 305A includes a display controller 100, so that data for two images may be transmitted as in a case where the image data is transmitted from the arithmetic calculator 303 to a typical display device. The two pieces of image data may be the image data which is displayed two dimensionally on a typical display panel. That is, the display device 305A of the exemplary embodiment includes the display controller 100, so that the arithmetic calculator 303 does not need to execute some kind of processing on the two pieces of image data to be outputted. Thus, there is no load imposed upon the arithmetic calculator 303 in this respect. Further, the display controller 100 of the exemplary embodiment includes an image memory 120 (FIG. 2). Thus, the two pieces of image data outputted by the arithmetic calculator 303 are not limited to be in a form where the image data are lined in the horizontal direction whose image is shown in FIG. 37 (the so-called side-by-side form), but may be in a form where the image data are lined in the vertical direction (the so-called dot-by-dot form) or in a frame sequential form.

Figure 37B:
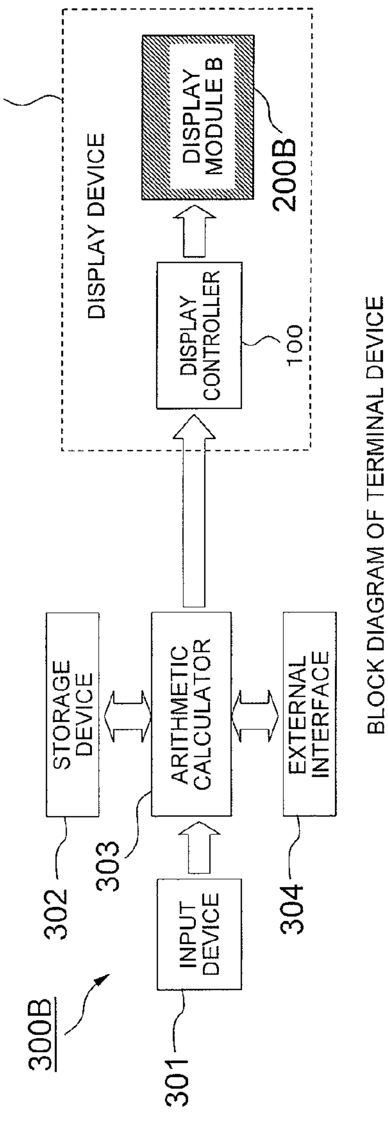

A terminal device 300B shown in FIG. 37(B) is in a structure in which a display module 200B is different from that of the terminal device 300A. For example, the display module 200B is different from the display module 200A in terms of the layout of the image separating device, the order of the color filters, the layout patterns of the up-and-down sub-pixel pairs, and the like. Specifications of the display modules 200A and 200B are determined depending on the various factors required to the display devices 305A, 305B from the terminal devices 300A, 300B to be loaded, respectively, such as the image quality, cost, size, and resolution. When the display module 200A is changed to the display module 200B, the synthesized image data to be inputted to the display module 200B needs to be changed. However, as described above, the display device 305B of the exemplary embodiment includes the parameter storage device 140 (FIG. 2) which is provided to the display controller 100. Thus, even when the display module is changed to the display module 200B, the same display controller 100 can be used. This makes it possible to decrease the number of designing steps for the display devices 305A, 305B, and to decrease the cost for the display devices 305A, 305B.

While the exemplary embodiment has been described by referring to the case of the stereoscopic display device which provides different images to both eyes of the observer, the present invention may also be applied to a two-viewpoint display device which provides different images depending on the observing positions.

Further, while the exemplary embodiment has been described by referring to the case where the lenticular lens is used for the optical image separating device and the lenticular lens is disposed on the observer side of the display panel, the lenticular lens may be disposed on the opposite side from the observer. Furthermore, as the optical image separating device, it is also possible to employ a parallax barrier.

Further, the display panel of the exemplary embodiment has been described as the liquid crystal display panel using liquid crystal molecules. However, as the liquid crystal display panel, not only a transmissive liquid crystal display panel but also a reflective liquid crystal display panel, a transflective liquid crystal display panel, a slight-reflective liquid crystal display panel in which the ratio of the transmissive region is larger than that of the reflective region, a slight-transmissive liquid crystal panel in which the ratio of the reflective region is larger than the transmissive region, and the like can be applied. Further, the driving method of the display panel can be applied to the TFT method in a preferable manner.

For the TFTs of the TFT method, not only those using amorphous silicon, low-temperature polysilicon, high-temperature polysilicon, single crystal silicon, but also those using an organic matter, oxide metal such as zinc oxide, and carbon nanotube can also be employed. Further, the present invention does not depend on the structures of the TFTs. A bottom gate type, a top gate type, a stagger type, an inverted stagger type, and the like can also be employed in a preferable manner.

Further, the exemplary embodiment has been described by referring to the case where the sub-pixel of the up-and-down sub-pixel pairs is in a substantially trapezoid shape. However, the shape of the sub-pixel is not limited to the trapezoid, as long as it is a shape which can maintain the optical property of the up-and-down sub-pixel pairs and the connecting relation thereof with respect to the scanning lines and the data lines. Other polygonal shapes may also be employed. For example, when the top side of the trapezoid described in the exemplary embodiment is shortened, the shape turns out as a triangle. Further, when the upward sub-pixel and the downward sub-pixel are rotationally symmetric by 180 degrees, a hexagonal shape, an octagonal shape, and the like with the bent scanning lines may also be employed. Further, the display part of the exemplary embodiment has been described to be configured with m-rows of sub-pixels in the vertical direction and n-columns of sub-pixels in the horizontal direction. However, the layout relation of the scanning lines and the data lines may be switched by arranging the sub-pixels in n-rows in the vertical direction and m-columns in the horizontal direction.

Further, for the display panel, it is possible to employ those other than the liquid crystal type. For example, it is possible to employ an organic electroluminescence display panel, an inorganic electroluminescence display panel, a plasma display panel, a field emission display panel, or PALC (Plasma Address Liquid Crystal).

As an exemplary advantage according to the invention, it is possible to find the scanning line and the data line connected to the sub-pixel arranged in an arbitrary row and an arbitrary column without actually designing the layout, since the regularity in the connection patterns of scanning lines and the data lines for the matrix of the sub-pixels has found. Further, synthesized image data can be easily generated from the found regularity, the placing condition of the image separating device, the arranging order of the colors of the sub-pixels, the layout pattern of the up-and-down sub-pixel pair as the minimum unit, and the like. This makes it possible to use the input image data in a same form as that of a typical flat display device, so that there is no load (e.g., being required to rearrange the output image data) imposed upon the device that employs the present invention. Furthermore, the present invention puts the condition for generating the synthesized image data into parameters, and uses a device for storing the parameters. Thus, when there is a change in the display module, it simply needs to change the parameters and does not need to change the video signal processing device. This makes it possible to decrease the number of designing steps and to reduce the cost.

Further, the present invention includes the image separating device which directs the light emitted from the sub-pixels to a plurality of viewpoints, and it is possible with the present invention to use the input image data in a same transfer form as that of a typical flat display device for the display module in which the issues caused due to the light-shield part and the like are suppressed. Therefore, it is not necessary to execute rearranging processing of the image data and any special processing for the transfer, so that there is no load imposed upon the arithmetic calculator, for example, which outputs the image data to the display device that employs the present invention. Furthermore, the conditions for generating the synthesized image data is made into parameters, and the parameters are stored so as to be able to correspond to the changes in the display module by changing the parameters. Thus, it is unnecessary to change the video signal processing device, thereby making it possible to decrease the number of designing steps and to reduce the cost.

Second Exemplary Embodiment

The structure of a display device according to a second exemplary embodiment of the present invention will be described. It is a display device which provides different images to a plurality of N-viewpoints, and it is a feature of this display device that N is 4 or larger while N is 2 with the display device of the first exemplary embodiment. Hereinafter, the second exemplary embodiment will be described by referring to a case of stereoscopic display device which provides different images to four viewpoints (N=4).

First, the outline of the second exemplary embodiment will be described by mainly referring to FIG. 44. A display controller 102 of this exemplary embodiment further includes an input data rearranging device 160 which rearranges viewpoint image data for four viewpoints or more inputted from outside into viewpoint image for two viewpoints. A writing control device 110 has a function of writing the viewpoint image data rearranged by the input data rearranging device 160 into the image memory 120, instead of the viewpoint image inputted from outside. Hereinafter, the second exemplary embodiment will be described in detail.

The display part of the second exemplary embodiment is configured with up-and-down sub-pixel pairs whose structure and equivalent circuits are shown in FIG. 4 and FIG. 5. Explanations of the up-and-down sub-pixel pairs are omitted, since those are the same as the case of the first exemplary embodiment.

Figure 38:
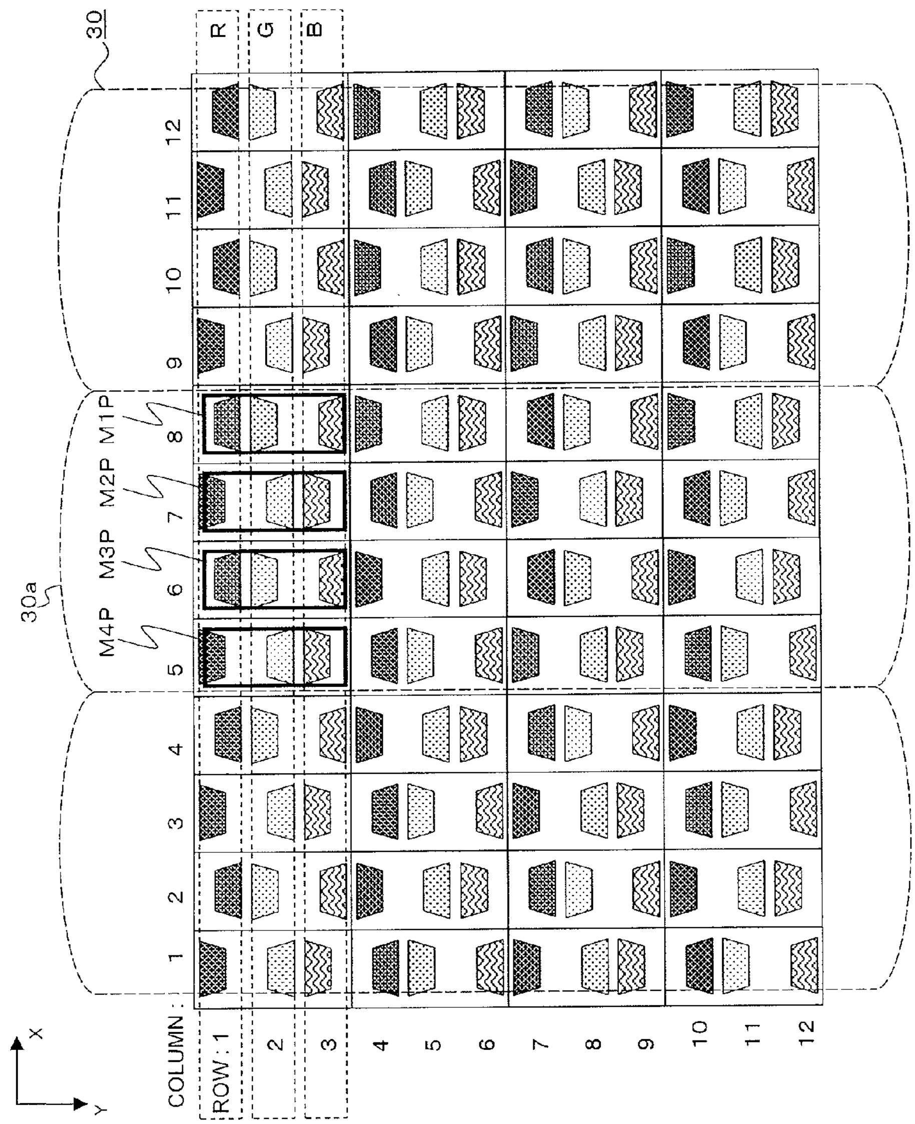
FIG. 38 shows an example of layout of an image separating device according to a second exemplary embodiment of the present invention.

FIG. 38 is an example showing the relation between the image separating device and the display part according to the second exemplary embodiment. Regarding the XY axes in the drawing, X shows the horizontal direction and Y shows the vertical direction. Trapezoids arranged in twelve rows in the vertical direction and in twelve columns in the horizontal direction are the sub-pixels, and shadings are the colors in a pattern in which R, G, and B are repeated in this order by each row from the first row. As the image separating device, a cylindrical lens 30*a* configuring a lenticular lens 30 corresponds to a unit of four columns of sub-pixels, and it is so arranged that the longitudinal direction thereof becomes in parallel to the vertical direction so as to exhibit the lens effect for the horizontal direction. Light rays emitted from the sub-pixels are separated to different directions of four-column cycles in a column unit, and form four viewpoint images at positions distant from the lens plane due to the lens effect of the cylindrical lenses 30*a*. The pixel as the structural unit of each of the four viewpoint images is configured with three sub-pixels of RGB lined in the vertical direction in a column unit. In FIG. 38, the pixel of the first viewpoint image is shown as M1P, the pixel of the second viewpoint image is shown as M2P, the pixel of the third viewpoint image is shown as M3P, and the pixel of the fourth viewpoint image is shown as M4P.

Figure 39:
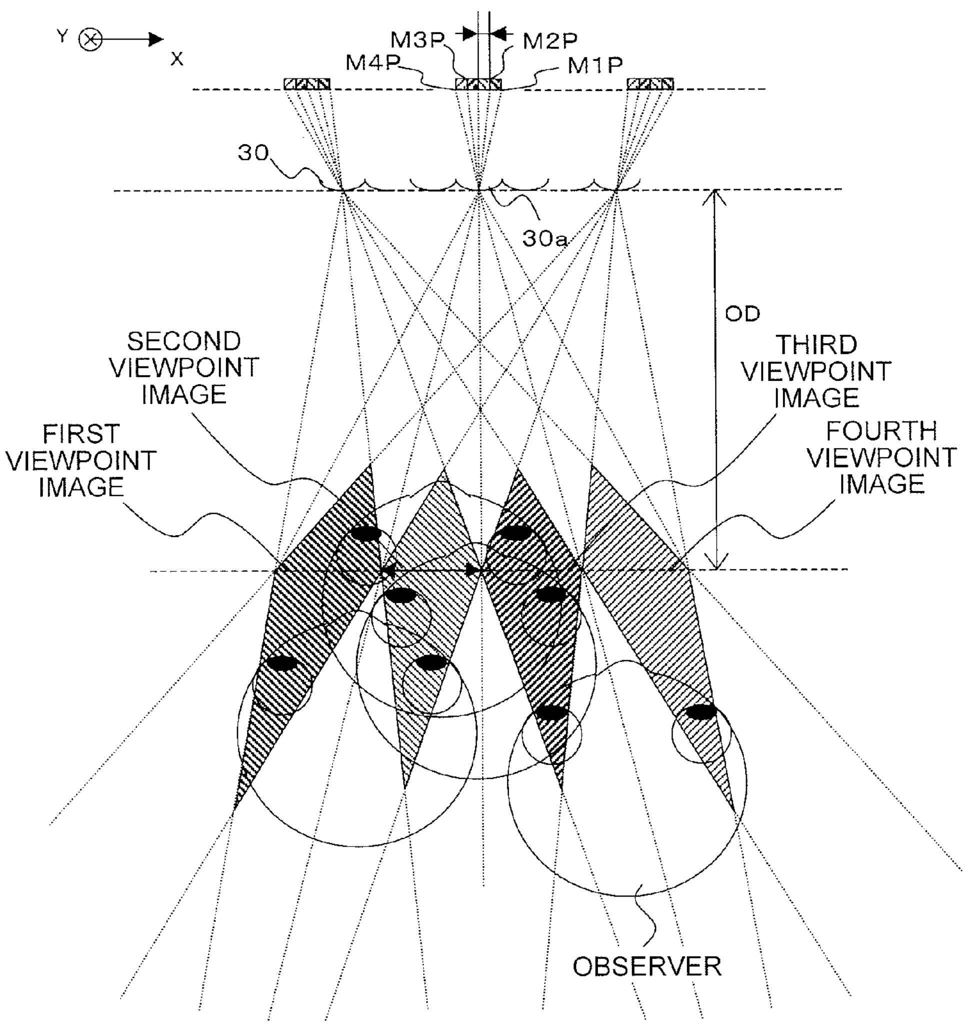
FIG. 39 is an optical model according to the second exemplary embodiment of the present invention.

FIG. 39 shows an optical model of each viewpoint image formed by the light rays emitted from the pixels M1P-M4P for each viewpoint. As shown in FIG. 39, the lenticular lens 30 is disposed on the observer side of the display panel, and also disposed in such a manner that the projected images from all M1P of the display part are superimposed at a plane away from the lens plane by a distance OD, and also projected images from M2P, M3P, and M4P are superimposed and the width of the superimposed projected images in the X direction becomes the maximum. With this layout, the regions of the first viewpoint image, the second viewpoint image, the third viewpoint image, and the fourth viewpoint image are formed in the horizontal direction in order from the left when viewed from the observer.

Figure 40:
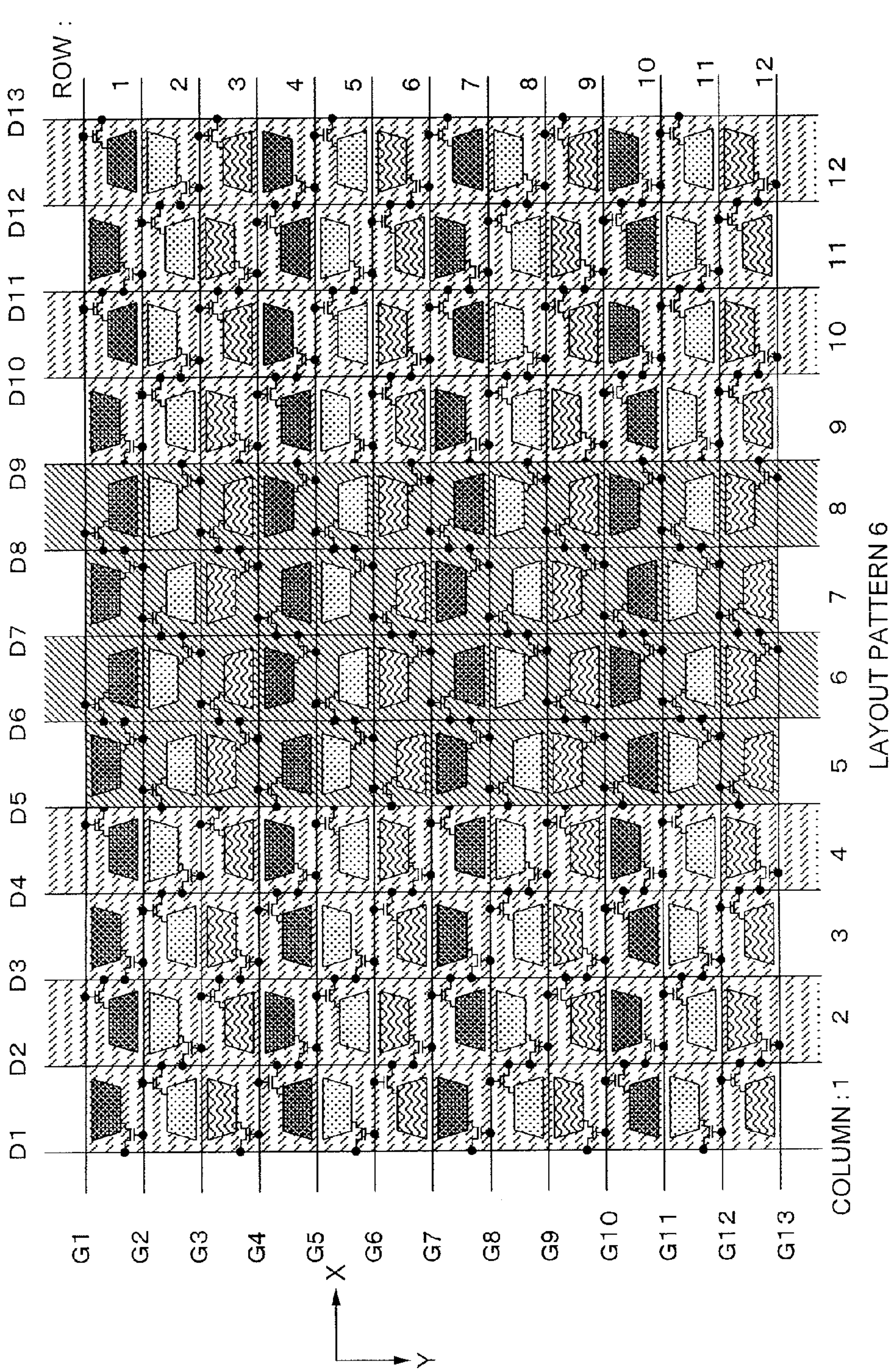
FIG. 40 shows a layout pattern 6 of a display part according to the second exemplary embodiment of the present invention.

Next, the connecting relation regarding the sub-pixels shown in FIG. 38 and scanning lines as well as data lines will be described. FIG. 40 is an example of the display part of the second exemplary embodiment shown in FIG. 38 which is configured with up-and-down sub-pixel pairs P2R and P2L. This is a pattern in which four columns configured with P2L and four columns configured with P2R are repeated alternately, and it is called a layout pattern 6. The layout pattern 6 is capable of providing a high image quality when vertical 2-dot inversion drive is applied to the polarity inversion driving method.

Figure 41:
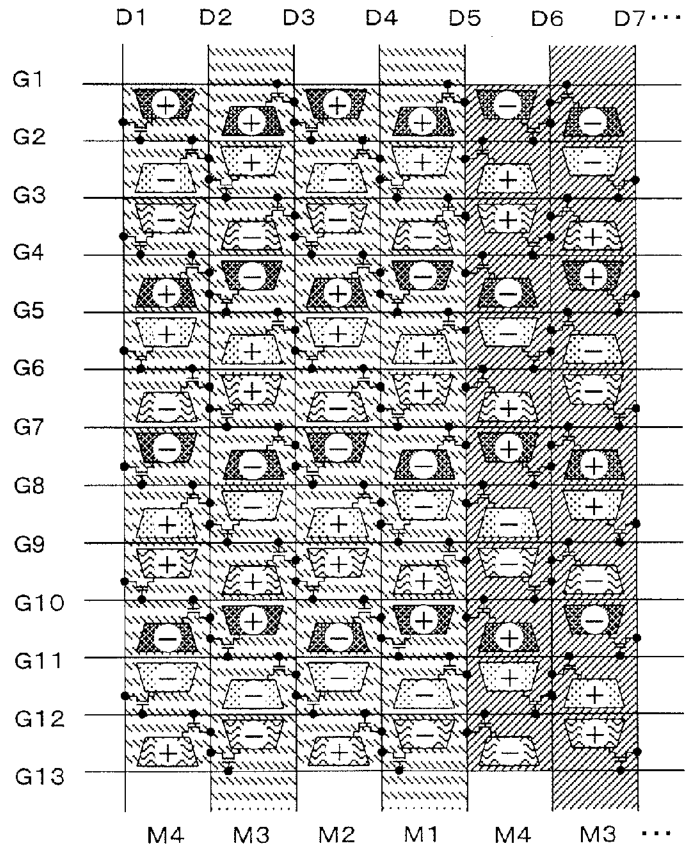
FIG. 41 shows polarity distributions of vertical 2-dot inversion drive in the layout pattern 6 of the second exemplary embodiment according to the present invention.

FIG. 41 shows the polarity distribution of the display part when the vertical 2-dot inversion drive is applied to the layout pattern 6 shown in FIG. 40, and shows the data line polarity for each scanning line under the vertical 2-dot inversion drive. As described in FIG. 38, with the second exemplary embodiment, each viewpoint image is provided in a four-column cycle. As shown in FIG. 41, through alternately arranging the up-and-down sub-pixel pairs P2R and P2L in a four-column cycle by corresponding to the periodicity of the viewpoint images, the polarities of the sub-pixels neighboring to each other in the horizontal direction are inverted in each of the separated viewpoint images. Further, for the polarity distribution within the column, the polarities of the vertically-neighboring pixel electrodes of the up-and-down sub-pixel pairs P2L and the up-and-down sub-pixel pairs P2R become the same polarities, and the polarities are inverted by every two rows. Thus, as in the case of FIG. 15 of the first exemplary embodiment, it is possible to suppress abnormal alignment of the liquid crystal molecules in the vicinity of the bottom sides. Therefore, the effect for suppressing flickers is great, thereby making it possible to provide a high image quality.

Next, described is synthesized image data that is supplied to the display part of the second exemplary embodiment which is configured with the layout pattern 6 and in which the imaging device is disposed as in FIG. 38. FIG. 42 shows image data for four viewpoints inputted from outside, and FIG. 43 shows synthesized image data of the layout pattern 6, which is synthesized from the input data shown in FIG. 42. FIG. 42 shows charts of the image data from the first viewpoint image data to the fourth viewpoint image data configured with pixels of 4 rows×3 columns. As described in FIG. 6 in the section of the first exemplary embodiment, regarding "Mk (i, j) RGB", "k" indicates the viewpoint, "i" is the row number within an image, "j" is the column number within the image, and "RGB" means that it carries luminance information of each of the colors R: red, G: green, and B: blue.

As in the case of the first exemplary embodiment, the synthesized image data of FIG. 43 can be generated from the connection regularity of the up-and-down sub-pixel pairs in a unit of scanning line and the regularity in a unit of data line based on the image separating device, the setting parameters of the color layout of the color filters, and the setting parameters of the layout patterns.

Figure 44:
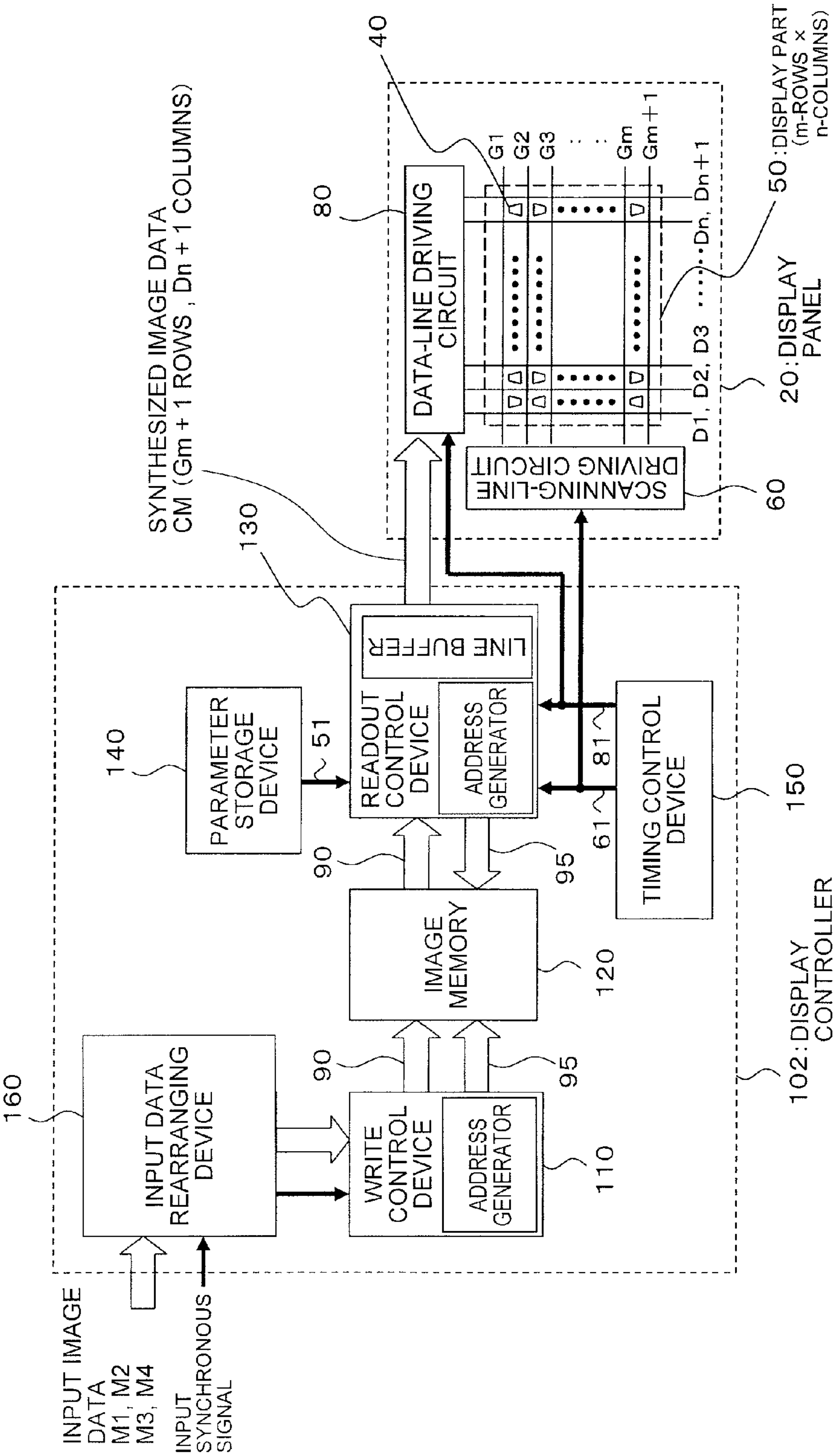
FIG. 44 is a functional block diagram of the second exemplary embodiment according to the present invention.

FIG. 44 shows a functional block diagram of the second exemplary embodiment. As in the case of the first exemplary embodiment, it is configured with: a display controller 102 which generates synthesized image data CM from the image data for each viewpoint inputted from outside; and a display panel 20 which is a display device of the synthesized image data CM. The structure of the display panel 20 is the same as that of the first exemplary embodiment, so that explanations thereof are omitted by applying the same reference numerals. The structure of the display panel 102 is different from that of the first exemplary embodiment in respect that the second exemplary embodiment includes the input data rearranging device 160. However, the other structural elements are the same, so that explanations thereof are omitted by applying the same reference numerals.

The input data rearranging device 160 performs processing for rearranging the image data for N-viewpoints (N=4 in FIG. 44) into a data form of two input images as described in the first exemplary embodiment. A specific example will be described by referring to FIG. 45.

Figure 45:
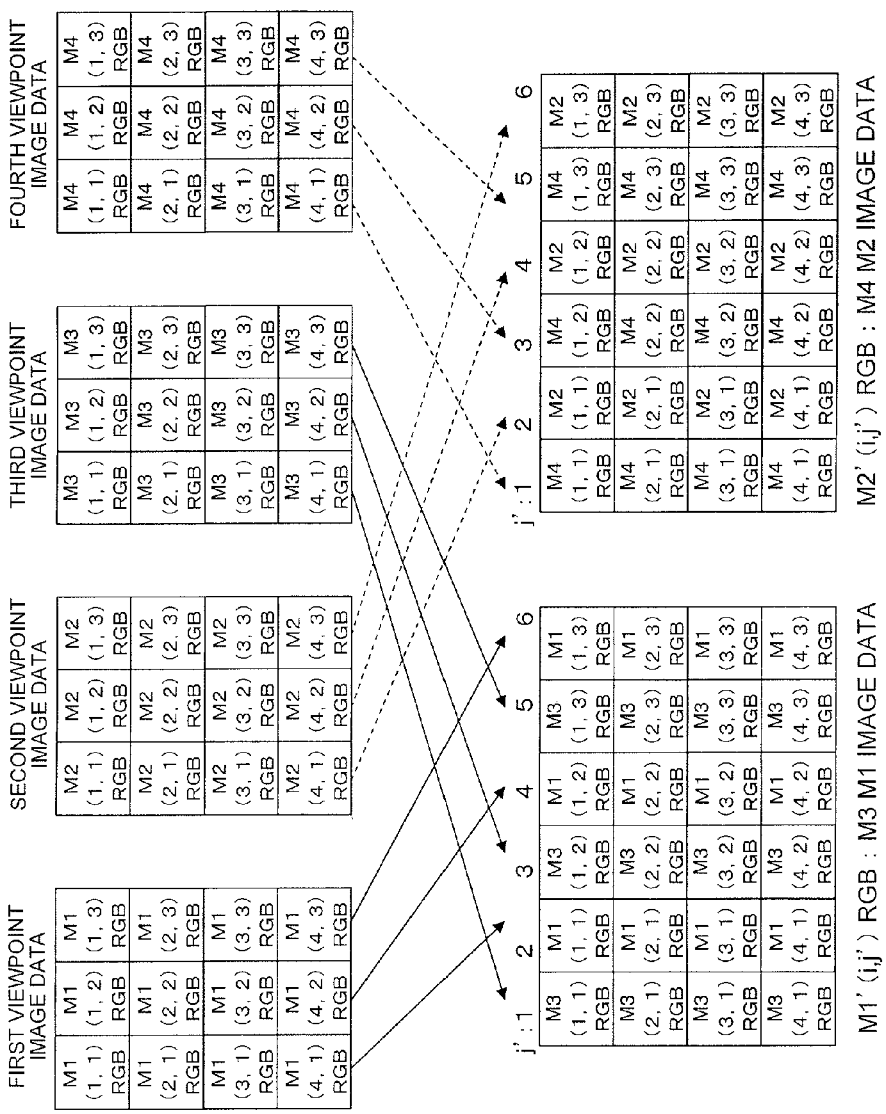
FIG. 45 is an illustration showing rearrangement of input data according to the second exemplary embodiment of the present invention.

As shown in FIG. 45, "M1' (, j') RGB" is generated from the first viewpoint image M1 and the third viewpoint image, and "M2' (i, j') RGB" is generated from the second viewpoint image and the fourth viewpoint image, respectively. Those are rearranged in a column unit, and followings are obtained.

M1' (i, 1) RGB=M3 (i, 1) RGB
M1' (i, 2) RGB=M1 (i, 1) RGB,
M1' (i, 3) RGB=M3 (i, 2) RGB,
- - -
M1' (i, 6) RGB=M1 (i, 3) RGB

Similarly, rearrangement is done as follows.

M2' (i, 1) RGB=M4 (i, 1) RGB
M2' (i, 2) RGB=M2 (i, 1) RGB
M2' (i, 3) RGB=M4 (i, 2) RGB
- - -
M2' (i, 6) RGB=M2 (i, 3) RGB

By transmitting the image data "M1' (i, j') RGB" and "M2' (i, j') RGB" generated in this manner to the writing control device 110, the synthesized image data shown in FIG. 43 can be generated though the processing actions described in the first exemplary embodiment.

In FIG. 44, the input data rearranging device 160 is illustrated separately from the writing control device 110. However, it is so illustrated to describe the structure, and the input data rearranging device 160 may be included in the writing control device 110. This is because the same processing as the input data rearranging processing shown in the drawing can be executed through controlling the generated addresses by a column unit of each viewpoint image by the writing control device 110.

Further, while the stereoscopic display device which provides different images for the four viewpoints (N=4) has been described as the example of the second exemplary embodiment, the number of viewpoint is not limited to be four. It is possible to be applied to a still larger number of viewpoints.

(Effects)

As shown in FIG. 39, the number of viewpoints can be increased with the second exemplary embodiment. Thus, the observer can enjoy stereoscopic images from different angles by changing the observing positions. Further, motion parallax is also provided at the same time, which can give a higher stereoscopic effect to the images.

Third Exemplary Embodiment

The structure of a display device according to a third exemplary embodiment of the present invention will be described.

Figure 46:
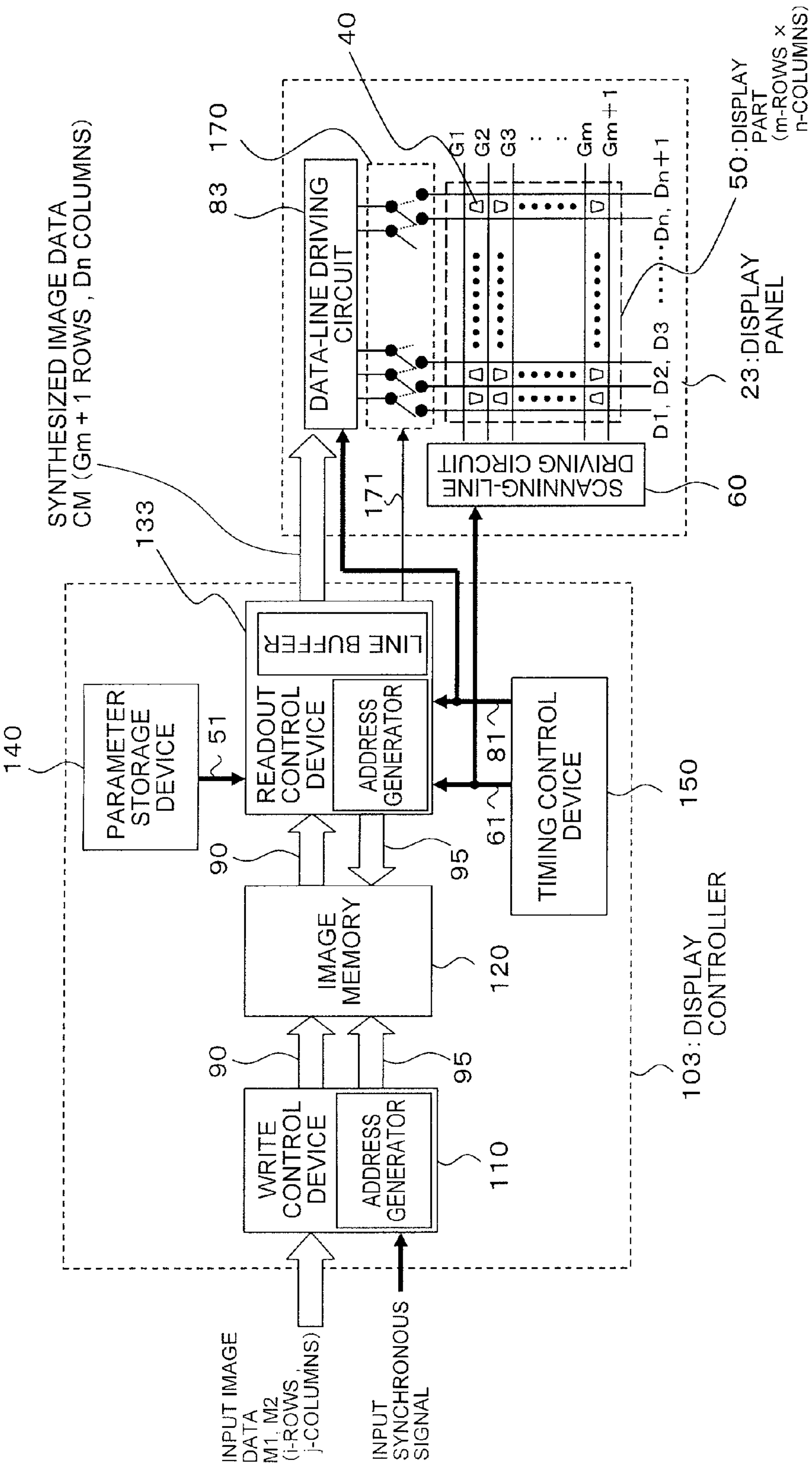
FIG. 46 is a functional block diagram of a third exemplary embodiment according to the present invention.

FIG. 46 is a functional block diagram of the third exemplary embodiment. The third exemplary embodiment is different from the first exemplary embodiment in respect that a display panel 23 includes a data-line selecting switch 170 which is controlled by a data-line selection signal 171 outputted from a readout control device 133 of a display controller 130. Other structural elements are the same as those of the first exemplary embodiment, so that explanations thereof are omitted by applying the same reference numerals.

The data-line selecting switch 170 has a function of switching n-pieces of outputs of a data-line driving circuit 83 to data lines D1-Dn or D2-Dn+1 of a display part 50. With the use of this function, the data processing for making the n-pieces of data stored in the line buffer corresponded to the data lines D1-Dn or D2-Dn+1, which is executed in the output processing described in the flowchart shown in FIG. 32 of the first exemplary embodiment, becomes unnecessary. That is, with the third exemplary embodiment, the n-pieces of data stored in the line buffer may be outputted directly to the data-line driving circuit, and the switching signal may be supplied to the data-line selection signal 171. Thus, the synthesized image data is in a data structure of (Gm+1) rows×n columns.

It is also possible to add the structure of the second exemplary embodiment to the structure of the third exemplary embodiment described above to make it into a multi-viewpoint device.

(Effects)

With the third exemplary embodiment, the processing of the readout control device can be omitted. Thus, the circuit scale of the display controller 103 can be reduced compared to that of the first exemplary embodiment. Further, when a drive IC is used for the data-line driving circuit 83, it only needs to have n-pieces of outputs, which is the same number as the column number of the sub-pixels configuring the display part. An alternative for using the drive IC can be increased, so that there is an effect of making it possible to reduce the cost.

Fourth Exemplary Embodiment

The structure of a display device according to a fourth exemplary embodiment of the present invention will be described. It is a stereoscopic display device which includes one more image separating device in addition to the structure of the first exemplary embodiment.

First, the outline of the fourth exemplary embodiment will be described by mainly referring to FIG. 47 and FIG. 48. A display controller 104 of this exemplary embodiment further includes an input data vertical-lateral conversion device 164 which rearranges viewpoint image data inputted from outside into an image that is rotated by 90 degrees clockwise or counterclockwise. A display module 201 includes a second image separating device configured with an electro-optic element 180, which directs light emitted from sub-pixels 40 to a plurality of viewpoints by a unit of sub-pixel 40. The direction connecting the plurality of viewpoints towards which the electro-optic element 180 directs the light is orthogonal to the direction connecting the plurality of viewpoints towards which a lenticular lens 30 directs the light. A writing control device 110 has a function of writing the viewpoint image data rearranged by the input data vertical-lateral conversion device 164 to an image memory 120, instead of the viewpoint image data inputted from outside. Hereinafter, the fourth exemplary embodiment will be described in more detail.

Figure 47:
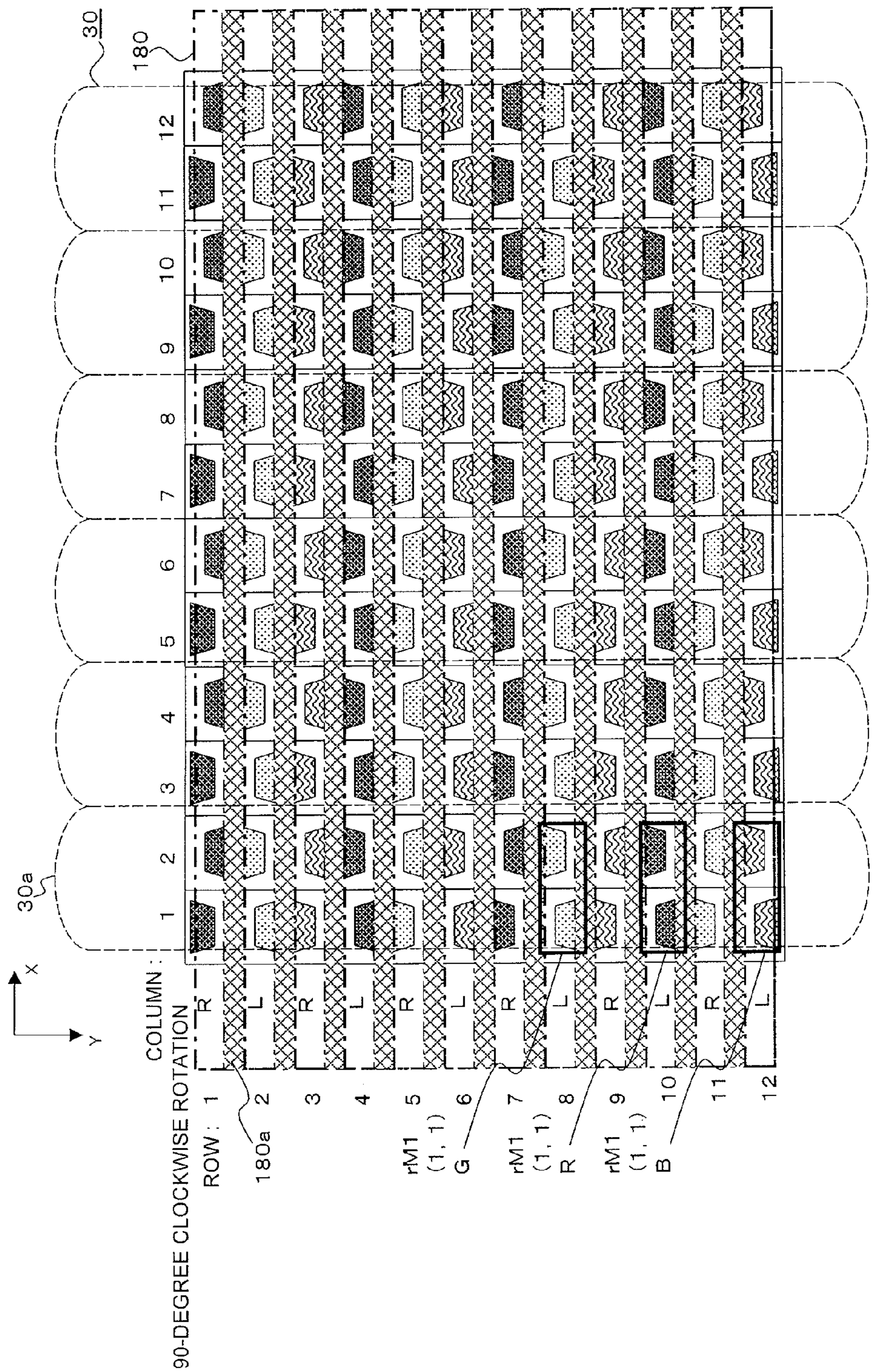
FIG. 47 shows layout of an image separating device according to a fourth exemplary embodiment of the present invention.

FIG. 47 is an example showing the relation between the image separating device and the display part according to the fourth exemplary embodiment. Regarding the XY axes in the drawing, X shows the horizontal direction and Y shows the vertical direction. In FIG. 47, sub-pixels configuring the display part are shown with trapezoids which are arranged in twelve rows in the vertical direction and in twelve columns in the horizontal direction. Shadings of the trapezoids showing the sub-pixels indicate the colors of the respective sub-pixels functioning by color filters, and an arrangement of three colors is repeated in order of R, G, and B by each row from the first row. Connections between the sub-pixels and the scanning lines as well as the data lines are determined depending on the layout of the up-and-down sub-pixel pairs as in the case of the first exemplary embodiment. The sub-pixel pitch of every two columns and the sub-pixel pitch of every three rows are equal.

As in the case of the first exemplary embodiment, the lenticular lens 30 configured with cylindrical lenses **30*a*** is disposed on the observer side of the display panel in such a manner that the lens effect is achieved in the horizontal direction and the light rays emitted from the sub-pixels on the even-numbered columns and odd-numbered columns are separated towards different directions.

As the second image separating device, the electro-optic element 180 which displays a parallax barrier pattern is disposed to the display panel on the opposite side of the observer. As the electro-optic element 180, a transmissive liquid crystal panel is applicable, for example, and it is disposed in such a manner that the transmission part functioning as a slit **180*a* becomes in parallel to the display panel when the parallax barrier pattern is displayed. Further, it is disposed in such a manner that the light rays emitted from the sub-pixels on the even-numbered rows and the odd-numbered rows are separated towards different directions when the parallax barrier pattern is displayed. That is, it is so disposed that, when the display panel is rotated by 90 degrees clockwise from the position of FIG. 46 in a state where both eyes of the observer are located in the horizontal direction, the odd-numbered rows function as the right-eye sub-pixels: R, and the even-numbered rows function as the left-eye sub-pixels: L. In the drawing, the slits 180***a* are illustrated with shading for highlight for convenience. When the electro-optic element 180 actually displays a barrier pattern, the shaded parts (slits 180*a*) are the transmission parts, and the other parts are the light-shield parts. When the display panel is rotated by 90 degrees counterclockwise from the observer side, R and L showing the functions of the sub-pixels are switched.

Figure 48:
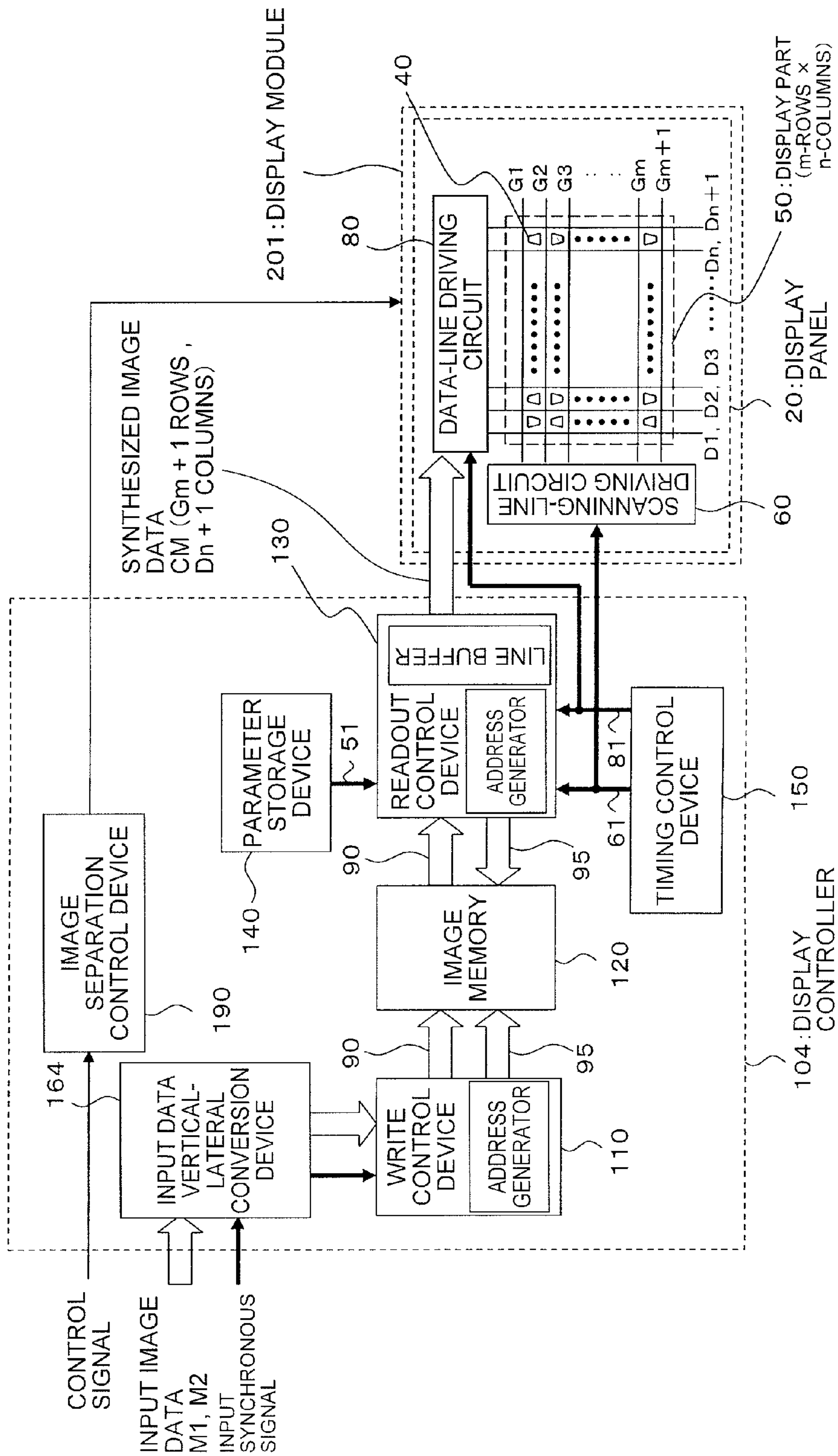
FIG. 48 is a functional block diagram of the fourth exemplary embodiment according to the present invention.

FIG. 48 shows a functional block diagram of the fourth exemplary embodiment. It is different from the first exemplary embodiment in respect that the display controller 104 includes the input data vertical-lateral conversion device 164 and an image separation control device 190. Other structural elements are the same as those of the first exemplary embodiment, so that explanations thereof are omitted by applying the same reference numerals. Further, the structure of the sub-pixels 40 configuring the display part is the same as the structure of the up-and-down sub-pixel pairs described in FIG. 4 and FIG. 5 of the first exemplary embodiment, and the layout of the display part 50 is also formed with the up-and-down sub-pixel pairs as in the case of the first exemplary embodiment.

The input data vertical-lateral conversion device 164 performs processing for converting the image data M1 and M2 inputted from outside into a data form of two input images as described in the first exemplary embodiment, when the display panel is rotated by 90 degrees.

The image separation control device 190 controls display/non-display of the barrier pattern shown in FIG. 47 on the second image separating device (not shown) according to the control signal to be inputted.

The vertical-lateral conversion executed by the input data vertical-lateral conversion device 164 will be described by referring to the drawing.

FIG. 49 shows charts for describing the processing of a case where the barrier pattern is not displayed when the display panel is rotated by 90 degrees, i.e., a case of flat display. The display panel shown in FIG. 47 is configured with 4 rows×6 columns of a pixel unit carrying color information. Thus, when the panel is rotated by 90 degrees clockwise, it turns out as a panel of 6 rows×4 columns. FIG. 49 shows an input image data rM of 6 rows×4 columns.

Since the display panel is rotated by 90 degrees clockwise, the input data vertical-lateral conversion device 164 rotates the rows and columns of the input image data rM by 90 degrees counterclockwise to convert the data rM into a data form (illustrated in the drawings in 4 rows×6 columns) of two input images as described in the first exemplary embodiment.

FIG. 49 shows the data "M1' (i', j') RGB" and "M2' (i', j') RGB", which are converted from the input image data rM. The data rM is rearranged as follows.

M1' (1, 1) RGB=rM (1, 4) RGB
M1' (1, 2) RGB=rM (2, 4) RGB
M1' (1, 3) RGB=rM (3, 4) RGB
- - -
M1' (1, 6) RGB=rM (6, 4) RGB
M1' (2, 1) RGB=rM (1, 3) RGB
M1' (2, 6) RGB=rM (6, 3) RGB
- - -
M1' (4, 6) RGB=rM (6, 1) RGB

"M2' (i', j') RGB" is in the same data layout as that of "M1' (i', j') RGB".

By transmitting the image data "M1' (i, j') RGB" and "M2' (i, j') RGB" converted in this manner to the writing control device 110, the synthesized image data shown in FIG. 48 can be generated according to the display panel though the processing actions described in the first exemplary embodiment. With the generated synthesized image, the input image rM can be displayed on the display panel shown in FIG. 47. The observer can observe the input image rM in a state where the display panel of FIG. 47 is rotated by 90 degrees clockwise.

Next, described is processing of a case where a barrier pattern is displayed while the display panel is rotated by 90 degrees clockwise, i.e. processing of a case where stereoscopic display is performed by using the second image separating device. The display panel shown in FIG. 47 is configured with 4 rows×6 columns of pixel units which carries color information. With the barrier display, the sub-pixels neighboring along the Y direction function as a left-eye sub-pixel and a right-eye sub-pixel alternately. Thus, the resolution in the Y direction becomes one half. That is, in the case of FIG. 47, the separated left-eye image or right-eye image is an image of 6 rows×2 columns.

Figure 50:
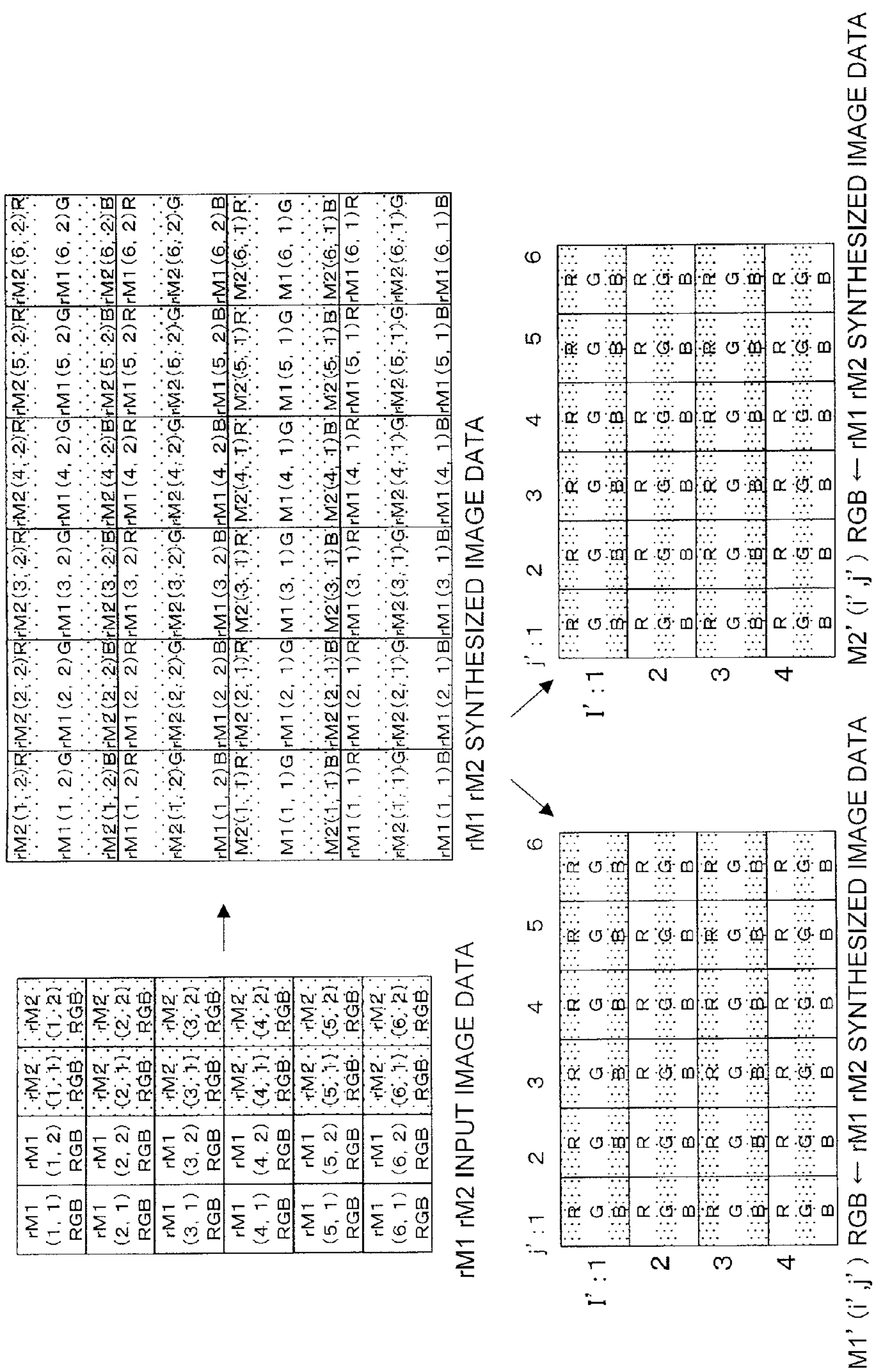
FIG. 50 is an illustration for describing vertical-lateral conversion (stereoscopic display) according to the fourth exemplary embodiment.

FIG. 50 shows the input image data for the display panel shown in FIG. 47, i.e., the left-eye image data rM1 and the right-eye image data rM2. As shown in FIG. 50, in rM1 and rM2, the pixel data carrying the color information of R: red, G: green, and B: blue are arranged in 6 rows×2 columns. Since the display panel is rotated by 90 degrees clockwise, the input data vertical-lateral conversion device 164 rotates the rows and columns of the input image data rM1 and rM2 by 90 degrees counterclockwise. At this time, the left-eye image data and the right-eye image data are arranged alternately in a color unit to be synthesized. As shown in FIG. 47, it is because the sub-pixels of each color arranged in the Y direction become the sub-pixel for the left eye and the sub-pixel for the right eye alternately in this case. Specifically, as shown in FIG. 47, regarding the pixel (1, 1) of the M1 image, the sub-pixels on the tenth row of the first and second columns become "rM1 (1, 1) R", the sub-pixels on the eighth row of the first and second columns become "rM1 (1, 1) G", and the sub-pixels on the twelfth row of the first and second columns become "rM1 (1, 1) B".

As described above, "rM1 mM2" synthesized image data shown in FIG. 50 is generated, and it is outputted as "M1' (i', j') RGB" and "M2' (i', j') RGB", which suit the data form of two input images described in the first exemplary embodiment, to the writing control device 110.

The synthesized image data in accordance with the display panel is generated in this manner through the processing actions described in the first exemplary embodiment, and the synthesized image of the input images "Mr1Mr2" can be displayed on the display panel shown in FIG. 47. Thereby, when the input images "rM1mM2" are parallax images, the observer can observe the stereoscopic display in a state where the display panel of FIG. 47 is being rotated by 90 degrees clockwise.

In the above, the structures and actions of the fourth exemplary embodiment have been described regarding the vertical-lateral conversion of the case where the display panel is rotated by 90 degrees clockwise. The exemplary embodiment is not limited only to the case of the clockwise 90-degree rotation but also applicable to the case of counterclockwise 90-degree rotation. In the case of counterclockwise 90-degree rotation, the conversion of the rows and columns of the input image data executed in the case of the clockwise 90-degree rotation may be changed from the clockwise 90-degree rotation to counterclockwise 90-degree rotation.

(Effects)

In addition to the effects of the first exemplary embodiment, it is possible with the fourth exemplary embodiment to enjoy the stereoscopic display also when the display panel is rotated by 90 degrees.

Fifth Exemplary Embodiment

The structure of a display device according to a fifth exemplary embodiment of the present invention will be described. The display device according to the fifth exemplary embodiment is structured in a form in which the image memory provided to the display controller according to the first exemplary embodiment is not formed by a frame memory but by a plurality of line memories to reduce the memory region provided in the display controller.

Figure 51:
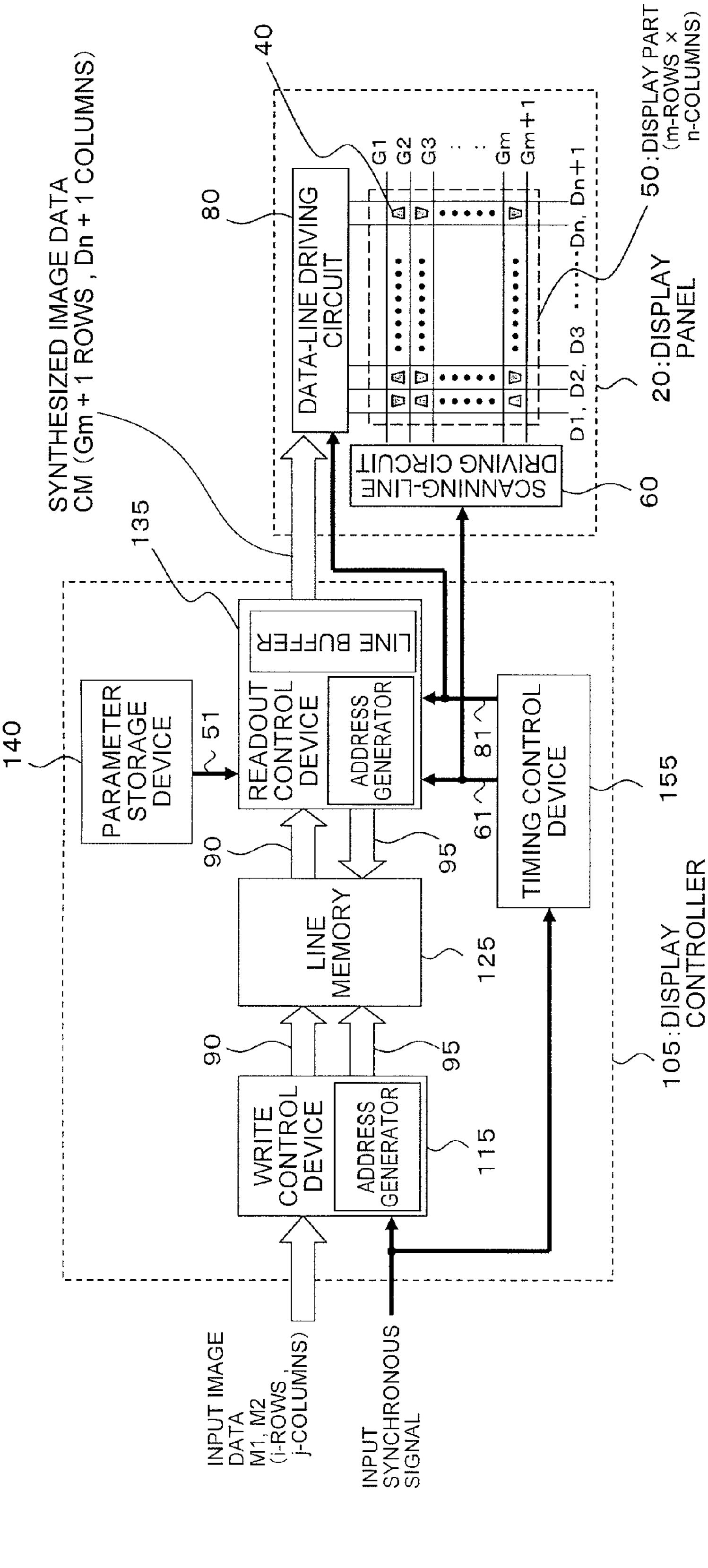
FIG. 51 is a functional block diagram of a fifth exemplary embodiment according to the present invention.

FIG. 51 shows a functional block diagram of the fifth exemplary embodiment. As in the case of the first exemplary embodiment, it is configured with: a display controller 105 which generates synthesized image data CM from image data for each viewpoint inputted from outside; and a display panel 20 which is a display device of the synthesized image data. The structure of the display panel 20 is the same as that of the first exemplary embodiment, so that explanations thereof are omitted by applying the same reference numerals. The display controller 105 includes: a line memory 125; a writing control device 115 which has a function of writing input image data to the line memory 125; a readout control device 135 which has a function of reading out the data from the line memory 125; and a timing control device 155 which generates each control signal by using an input synchronous signal. Other structural elements of the display controller 105 are the same as those of the first exemplary embodiment, so that explanations thereof are omitted by applying the same reference numerals.

As described, in the fifth exemplary embodiment, the image memory is not the so-called frame memory with which all the input image data can be written and saved. Thus, there is a restriction in the transfer form of the input image data, and the timing between the input data and the output data. Actions of the fifth exemplary embodiment will be described by referring to a timing chart shown in FIG. 52.

Figure 52:
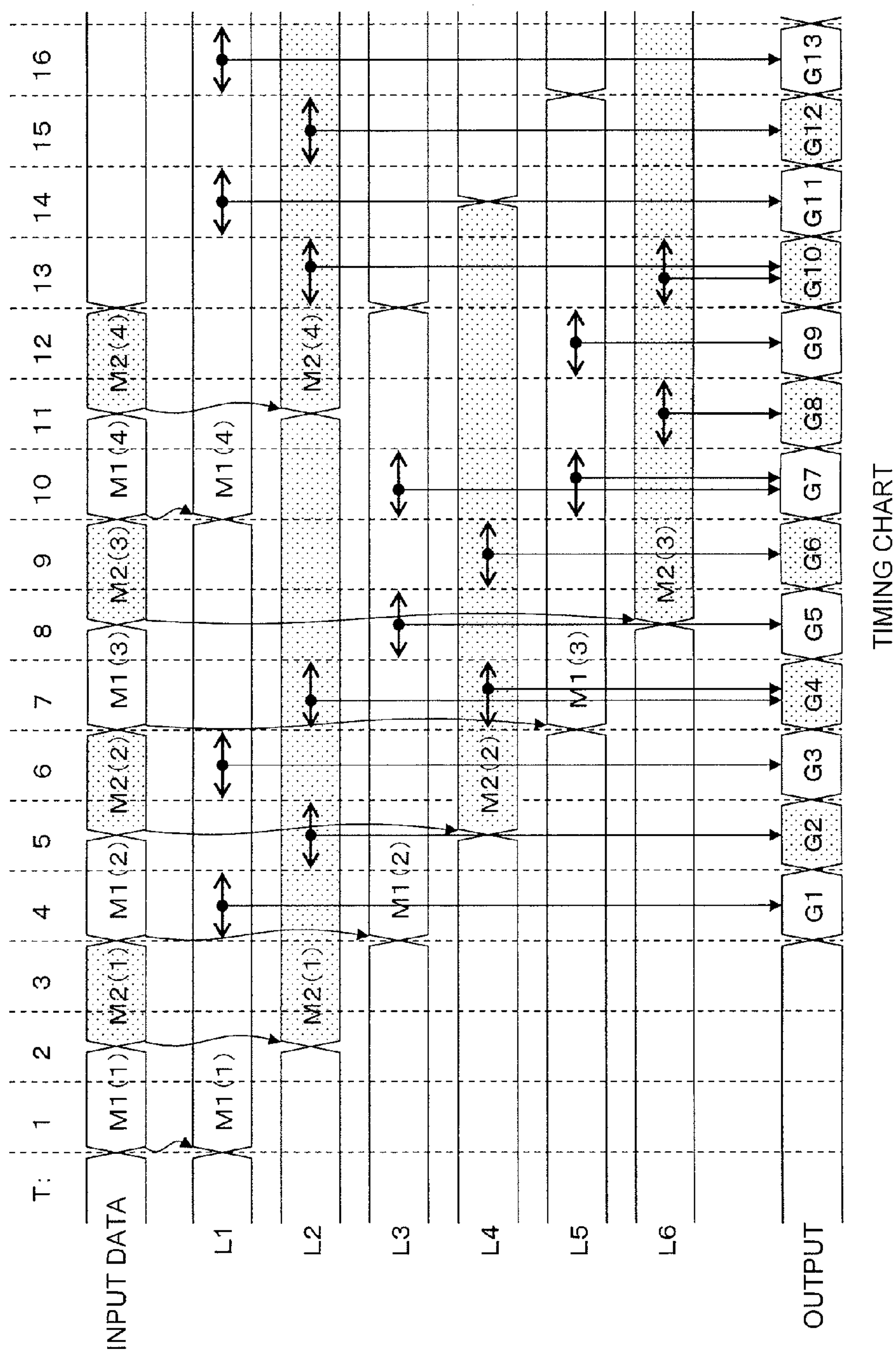
FIG. 52 is a timing chart showing a first example of actions of the fifth exemplary embodiment of the present invention.
Figure 57:
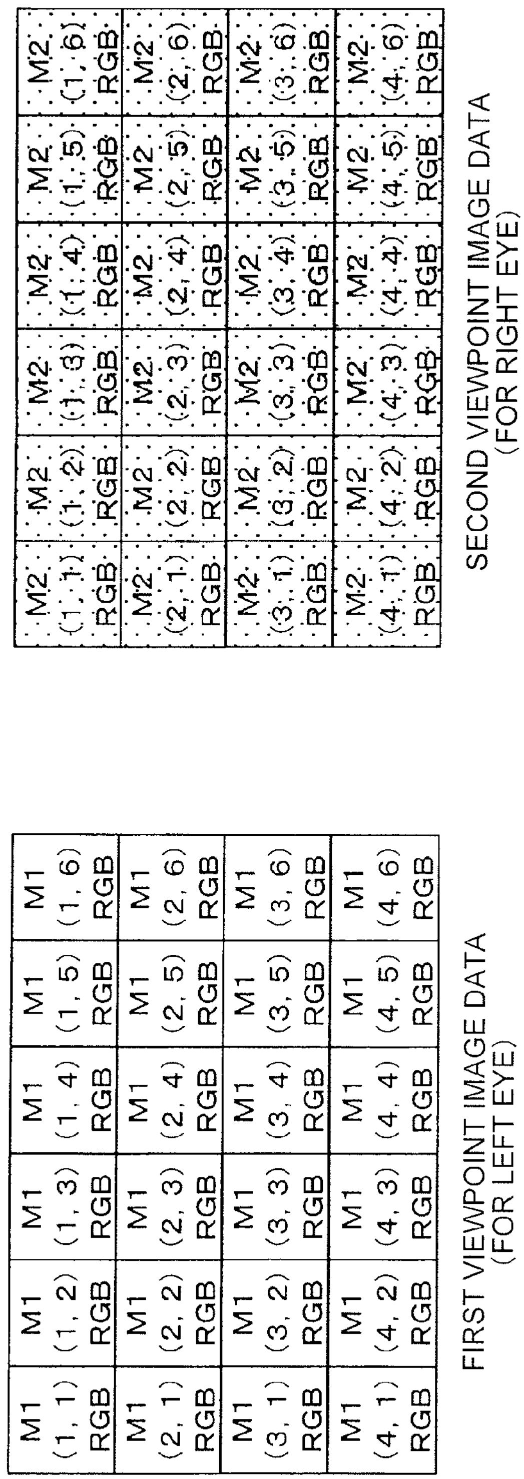
FIG. 57 shows an example of input image data according to the fifth exemplary embodiment to an eighth exemplary embodiment of the present invention.

FIG. 52 is a chart showing timings when outputting the input image data (generating the synthesized image data) shown in FIG. 57 to the display part in the layout pattern 1 shown in FIG. 8 where the image separating device shown in FIG. 7 is disposed. In the case of FIG. 52, as the transfer form of the input image data, employed is the so-called side-by-side form with which the image data for a plurality of viewpoints are transferred by each row.

"T" shown in FIG. 52 shows one horizontal period of the display panel, input data M1 and M2 are pixel data of 4 rows×6 columns shown in FIG. 57, and input data M1(1) and M2(1) indicate the first row of the first viewpoint image data M1 and the second row of the second viewpoint image data M2. From L1 to L6 are line memories which can store one-row of each inputted viewpoint image data, and L1, L3, L5 store the first viewpoint image data while L2, L4, L6 store the second viewpoint image data. Outputs G1, G2, - - - , G13 show the data outputs to the sub-pixels connected to each scanning line by corresponding to the scanning line number of the display part shown in FIG. 8. Three horizontal periods of the display panel output and the total periods of the input period for inputting one row of M1 and the input period for inputting one row of M2 are set to be the same so as to uniformanize updates of input/output images by a frame unit. Even though not shown in the timing chart, the output horizontal period and the input periods described above are cycles of synchronous signals, and include the so-called blanking periods where there is no valid data.

Details of the actions will be described by referring to FIG. 52. In the period of T1-T3, the input data M1(1) is stored to L1 and the input data M2(1) is stored to L2. In T4, M1(2) is stored to L3 and, at the same time, processing is executed for reading out data of the sub-pixel to which the scanning line G1 is connected from L1 in which M1(1) is stored, as described in the first exemplary embodiment. Information regarding the image separating device of FIG. 7 and the layout pattern 1 of FIG. 8 stored in the parameter storage device 140 and the data M1(1)R which is determined based on the regularity and to be supplied to the scanning line G1 are readout from L1, processing is executed thereon, and it is outputted to the display panel. Similarly, in T5, the data M2(1) R, G to be supplied to the scanning line G2 is read out from L2, processing is executed thereon, and it is outputted to the display panel. Further, in the middle of T5, a storing action of the input image data M2(2) to L4 is started. In T6, the data M1(1) G, B to be supplied to the scanning line G3 is read out from L1, processing is executed thereon, and it is outputted to the display panel. In T7, M1(3) is stored to L5 and, at the same time, M2(1) B is read out from L2 and M2(2) R is readout from L4 as the data to be supplied to the scanning line G4, processing is executed thereon, and the data are outputted to the display panel. In T8, the data M2(1) R, G to be supplied to the scanning line G5 is read out from L3, processing is executed thereon, and it is outputted to the display panel. Further, in the middle of T8, a storing action of the input image data M2(3) to L6 is started. In T9, the data M2(2) G, B to be supplied to the scanning line G6 is read out from L4, processing is executed thereon, and it is outputted to the display panel. In T10, M1(4) is stored to L1. The reason that M1(4) can be stored to L1 is that M1(1) stored in L1 is already read out in T6, so that it is not necessary to keep M1(1) any longer. At the same time, in T10, M1(2) B is read out from L3 and M1(3) R is readout from L5 as the data to be supplied to the scanning line G7, processing is executed thereon, and the data are outputted to the display panel. As shown in FIG. 52, the same processing is repeated for each scanning line, and output to the display panel is repeated in the manner described above.

As in the above, the fifth exemplary embodiment uses the line memories from L1 to L6 for the image memory. Thereby, as in the case of the first exemplary embodiment, synthesized image data can be generated from the information saved in the parameter storage device and the regularity. As has been described earlier, readout action of M1(1) stored in L1 is completed in T6, so that it is possible to store M1(3) that is inputted in T7 to L1. However, unlike this storing relation between storing action of M1(1) to L1 and following storing action of M1(3), it is not possible to store M1(4) to L3 following M1(2). This is because in T10 where M1(4) is inputted, readout action of M1(2) B stored in L3 is executed simultaneously, as shown in FIG. 52. Thus, L5 for storing M1(3) is provided, and M1(4) is designed to be stored to L1 following M1(1).

Figure 60:
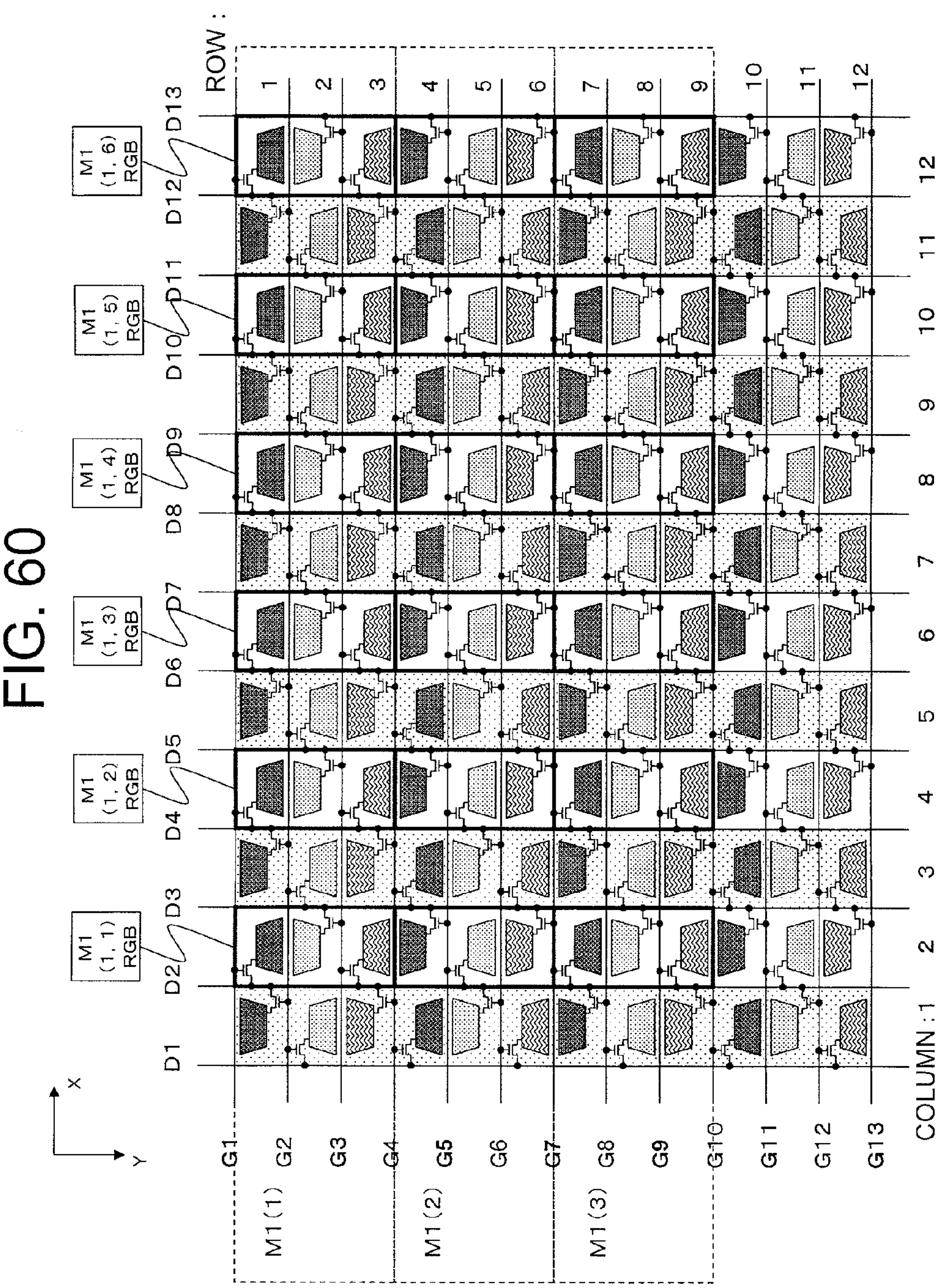
FIG. 60 is an illustration showing corresponding relations between input data and sub-pixels of the display part according to the present invention.

The line memories from L1 to L6 are the line memories which can store one row of inputted image data for each viewpoint, as described above. The regions of those line memories are expressed with the number of sub-pixels which configure the display part. A single piece of inputted pixel data carries information of RGB, so that it is formed to be for three sub-pixels. Thus, in the case of FIG. 52 using the input image data which is configured with six-column pixel data on one row, the data saving regions of six line memories in a sub-pixel unit are for one hundred and eight sub-pixels (6×3×6=108). Further, regarding the case of FIG. 52, a corresponding relation between three rows of input image data M1 shown in FIG. 52 and the display panel is shown in FIG. 60. As shown in FIG. 60, 3 rows×6 columns of M1 correspond to the sub-pixels on the nine rows of the even-numbered columns, and 3 rows×6 columns of M2 (not shown) correspond to the sub-pixels of the odd-numbered columns. Therefore, the data saving regions for six line memories mentioned above can be expressed as the number of sub-pixels on the 9 rows×12 columns of the display part (9×12=108). Further, the regions of the line memories required for the display panel which has the display part where the sub-pixels are arranged in m-rows and n-columns can be expressed as the regions for 9 rows×n-columns of the sub-pixels.

While the actions of the fifth exemplary embodiment has been described by referring to the case of the display panel in the layout pattern 1 of FIG. 8 including the image separating device shown in FIG. 7, the exemplary embodiment is not limited only to that. As in the case of the first exemplary embodiment, the fifth exemplary embodiment can be applied to various layout patterns by setting the parameters in accordance with the timings shown in FIG. 52.

Figure 53:
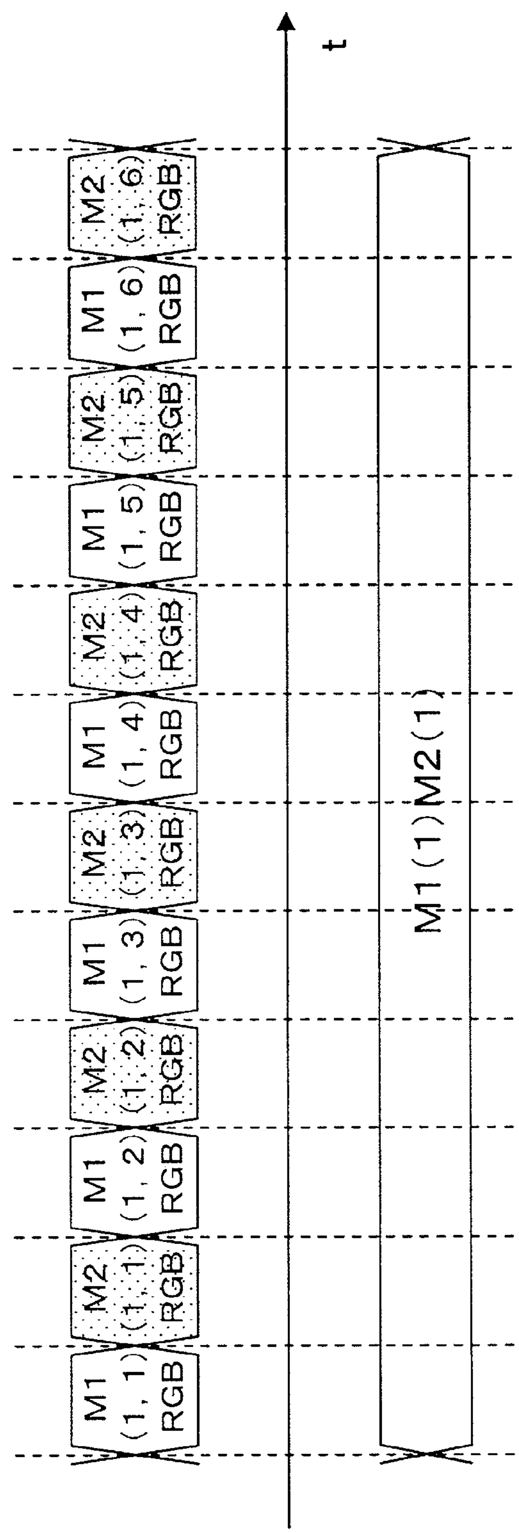
FIG. 53 is an explanatory diagram of dot-by-dot data transfer used in the present invention.
Figure 54:
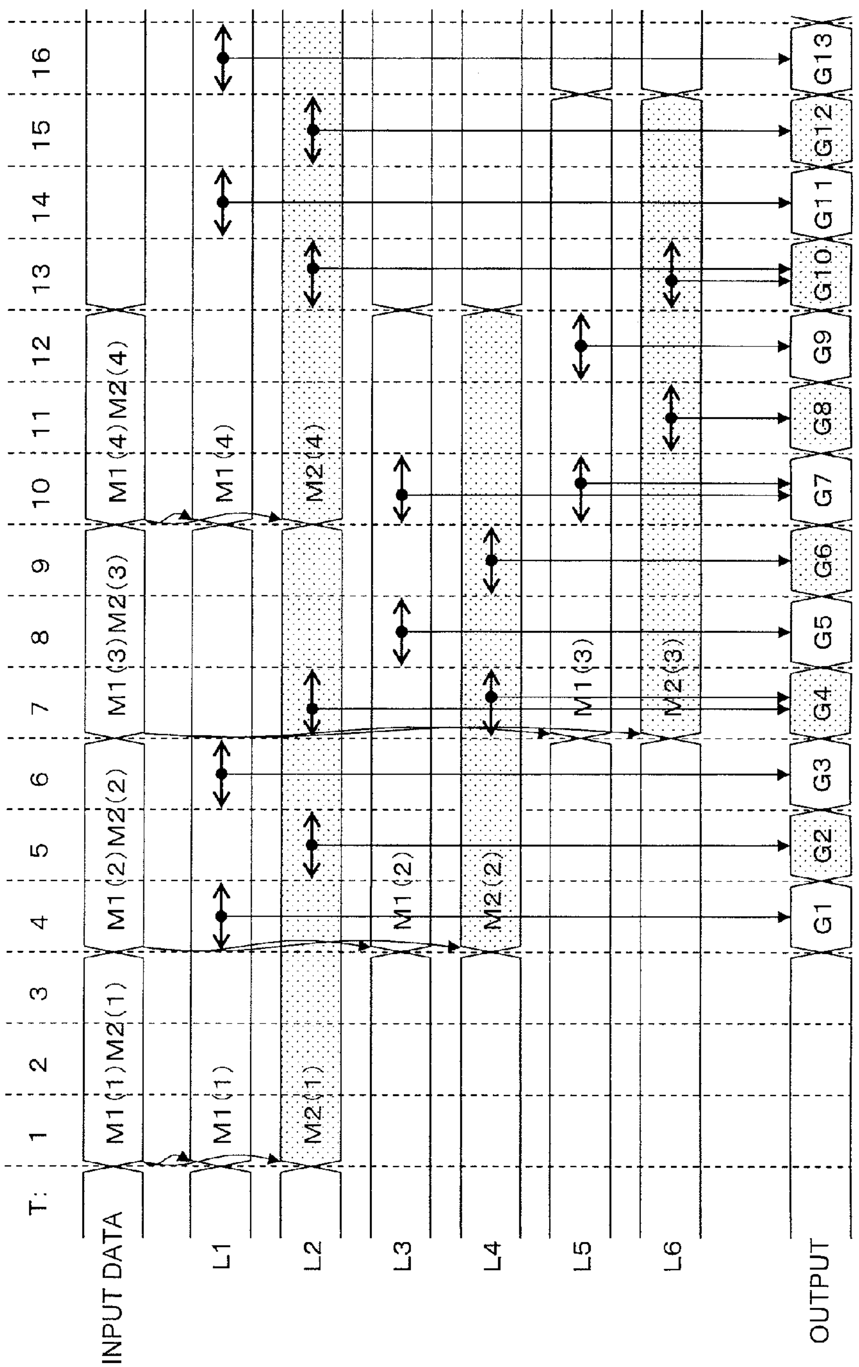
FIG. 54 is a timing chart showing a second example of actions of the fifth exemplary embodiment of the present invention.

Further, while the so-called side-by-side form with which the image data for a plurality of viewpoints are transferred by each row is used as the transfer form of the input image data in the case of FIG. 52, the so-called dot-by-dot form with which the image data for a plurality of viewpoints are transferred by each pixel may also be used. As shown in FIG. 53, with the dot-by-dot form, the input image data M1 and M2 shown in FIG. 57 are transferred alternately in a pixel data unit as in "M1 (1, 1) RGB", "M2 (1, 1) RGB", "M1 (1, 2) RGB", "M2 (1, 2) RGB", - - - . Data transfer of a row unit with the dot-by-dot form is expressed with M1 (row number) M2 (row number) as in M1(1) M2(2) shown in FIG. 53, and FIG. 54 shows a timing chart for describing the actions. As in the case of FIG. 52, FIG. 54 is a chart showing timings when outputting the input image data shown in FIG. 57 to the display part in the layout pattern 1 shown in FIG. 8 where the image separating device shown in FIG. 7 is disposed. As shown in FIG. 54, when the dot-by-dot form is used, actions other than the storage timings of M2 to the line memories shown in FIG. 52 are the same as the case of using the side-by-side form (FIG. 52). Thus, the synthesized image data can be generated by using the line memories from L1 to L6. Even in a case where the transfer form of input images is the so-called line-by-line form with which the viewpoint image data for a plurality of viewpoints are transferred by each column, the exemplary embodiment can also be applied in the same manner as it is evident from the explanations of the actions shown in FIG. 53 and FIG. 54.

Further, the fifth exemplary embodiment can be applied to the N-viewpoint panel as described in the second exemplary embodiment. In the N-viewpoint panel, 3×N pieces of line memories for one row of each viewpoint image are prepared and applied under a condition where the periods obtained by adding N-numbers of data input periods for one row of each viewpoint image matches with the driving period of three scanning lines of the display panel. Note here that "N" needs to be an even number.

(Effects)

For the image memory, the fifth exemplary embodiment uses not the frame memory but the line memories which store the data of sub-pixels on nine rows of the display part. That is, the image memory provided to the display panel having the display part in which the sub-pixels are arranged in m-rows and n-columns may only need to have the storage regions for at least 9 rows×n-columns of sub-pixels. Therefore, compared to the display controller having a frame memory, the circuit scale can be reduced greatly, thereby resulting in cutting the cost. Further, the size can also be reduced. For example, the number of alternatives regarding the places to have the display controller loaded can be increased, e.g., the display controller can be built-in to the data-line driving circuit.

Sixth Exemplary Embodiment

The structure of a display device according to a sixth exemplary embodiment of the present invention will be described. In the display device according to the sixth exemplary embodiment, the region of the line memories provided to the display controller as the image memory in the fifth exemplary embodiment is reduced further.

Figure 55:
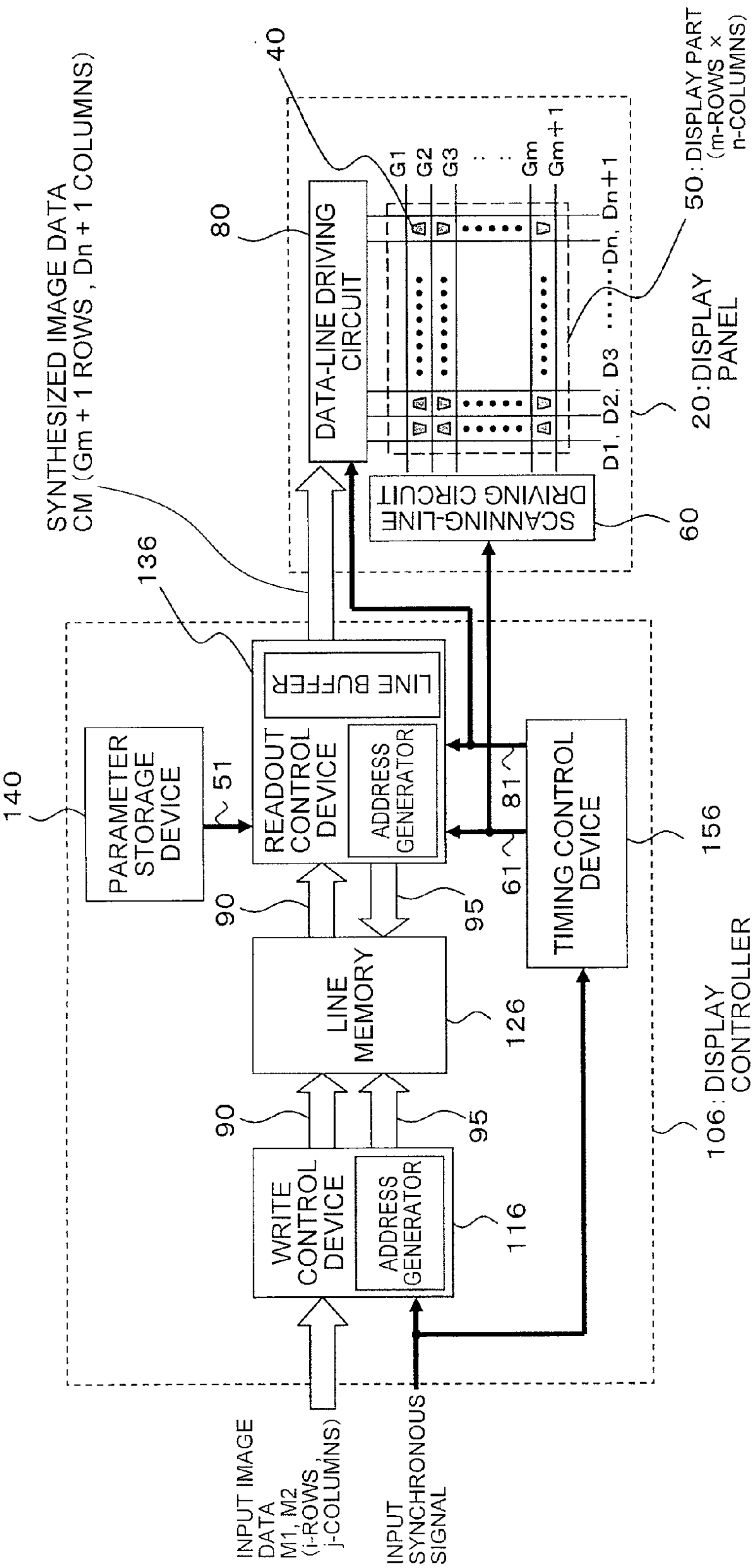
FIG. 55 is a functional block diagram of a sixth exemplary embodiment according to the present invention.

FIG. 55 shows a functional block diagram of the sixth exemplary embodiment. As in the case of the fifth exemplary embodiment, it is configured with: a display controller 106 which generates synthesized image data CM from image data for each viewpoint inputted from outside; and a display panel 20 which is a display device of the synthesized image data. The structure of the display panel 20 is the same as that of the first exemplary embodiment, so that explanations thereof are omitted by applying the same reference numerals. The display controller 106 includes: as the image memory, a line memory 126 in a smaller number than the case of the fifth exemplary embodiment; a writing control device 116 which has a function of writing input image data to the line memory 126; a readout control device 136 which has a function of reading out the data from the line memory 126; and a timing control device 156 which generates each control signal by using an input synchronous signal. Other structural elements of the display controller 106 are the same as those of the fifth exemplary embodiment, so that explanations thereof are omitted by applying the same reference numerals.

As in the case of the fifth exemplary embodiment, the sixth exemplary embodiment uses the line memories for the image memory and uses, as the transform form of the input image data, the so-called side-by-side form with which the image data for a plurality of viewpoints are transferred by each row.

The display part of the sixth exemplary embodiment is the same structure as that of the first exemplary embodiment, as in the case of the fifth exemplary embodiment. For example, it is formed with the layout pattern 1 of FIG. 8 where the image separating device shown in FIG. 7 is disposed. Therefore, as described in the first exemplary embodiment, regarding the relation between the rows of the input image and the scanning lines, there is a periodicity in a unit of six scanning lines and there exists the regularity shown in FIG. 25. Thus, for transfer of the input image data with the side-by-side form, the line memories provided as the image memory only need to have the regions for saving the data supplied to the sub-pixels of six scanning lines as the minimum.

When the data saving regions required for connecting the six up-and-down sub-pixel pairs to a single scanning line is calculated specifically by using the case of FIG. 8, it can be expressed with the number of sub-pixels configuring the display part 50 as "6×6×2=72".

An example of the actions of the sixth exemplary embodiment using the line memories having such data saving regions will be described by referring to a timing chart shown in FIG. 56.

Figure 56:
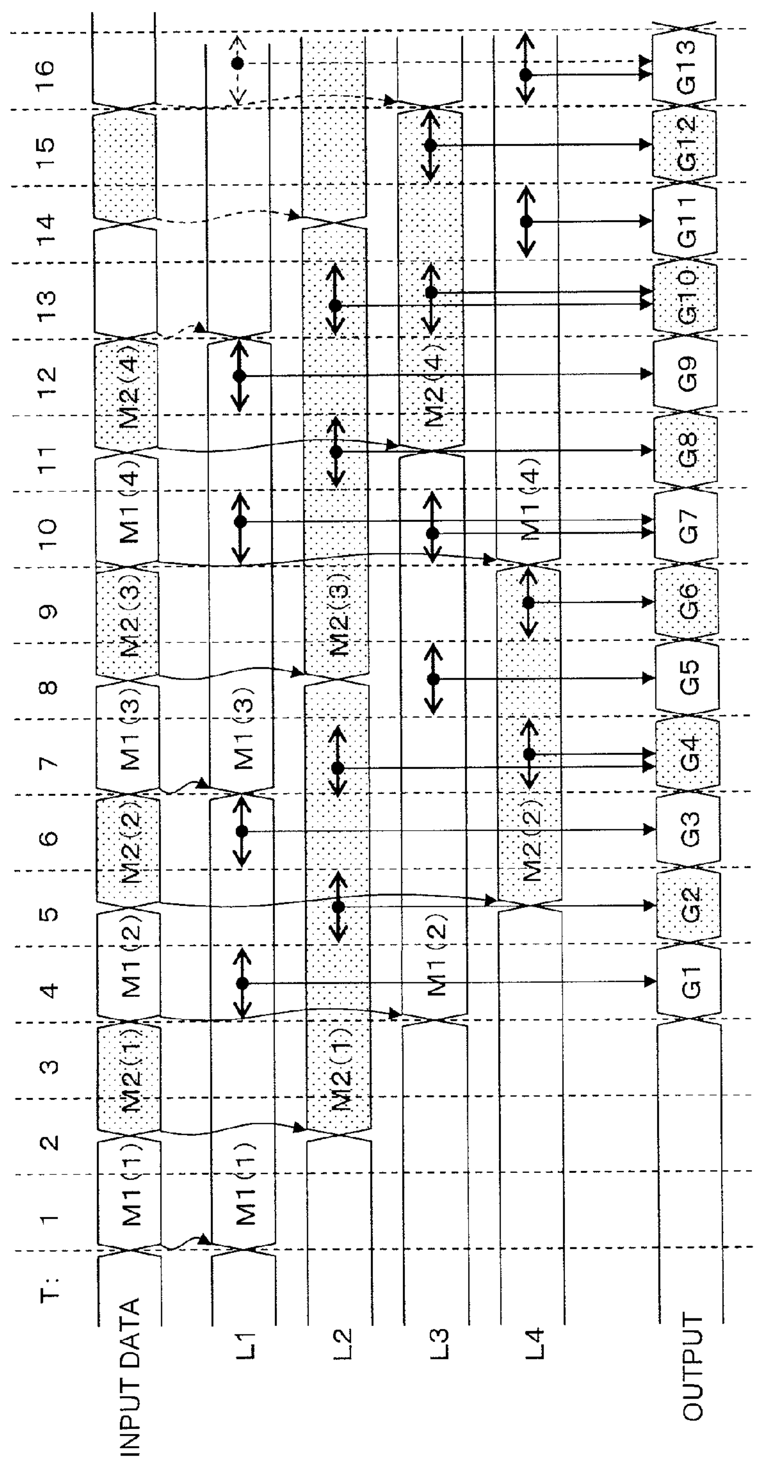
FIG. 56 is a timing chart showing actions of the sixth exemplary embodiment of the present invention.

FIG. 56 is a chart showing timings when outputting the input image data (generating the synthesized image data) shown in FIG. 57 to the display part of the layout pattern 1 shown in FIG. 8 where the image separating device shown in FIG. 7 is disposed, as in the case of the fifth exemplary embodiment. "T" shows one horizontal period of the display panel, input data M1 and M2 are pixel data of 4 rows×6 columns shown in FIG. 57. From L1 to L4 are line memories which can store each inputted viewpoint image data for one row. Since the inputted pixel data carries information RGB, it corresponds to three sub-pixels. Thus, the data saving regions of four line memories for storing one-row of input image data can be expressed as "4×3×6=72" in a sub-pixel unit, which matches with the saving regions mentioned above.

Compared to the case of the fifth exemplary embodiment, the actions of the sixth exemplary embodiment are different in respect that the sixth exemplary embodiment does not have each line memory corresponded to each viewpoint image, and stores the input image regardless of its viewpoint to the line memory from which data has been already read out. Further, in accordance with this, designation of the line memory to be read out becomes different. Hereinafter, the actions of the sixth exemplary embodiment will be described by referring to FIG. 56.

Actions of the period from T1 to T6 shown in FIG. 56 are the same as the case of the fifth exemplary embodiment. After readout processing of T6 is completed, the data of M1(1) stored in L1 becomes unnecessary. Thus, in a next period T7, data of M1(3) is stored to L1. In T7, simultaneously with the storing action of the data of M1(3) to L1, M2(1) B to be supplied to the scanning line G4 is read out from L2 and M2(2) R is read out from L4, processing is executed thereon, and the data are outputted to the display panel. In T8, M1(2) R, G is read out from L3 as the data to be supplied to the scanning line G5, processing is executed thereon, and it is outputted to the display panel. Further, since readout action of M2(1) stored in L2 is completed in T7 and the data of M2(1) stored in L2 is unnecessary, storing action of the input image data M2(3) to L2 is started in the middle of T8. In T9, as in the case of the fifth exemplary embodiment, M2(2) G, B to be supplied to the scanning line G6 is read out from L4, processing is executed thereon, and it is outputted to the display panel. After the readout processing in T9 is completed, the data of M2(2) stored in L4 becomes unnecessary. Thus, in T10, the data of M1(4) is stored to L4. Further, in T10, M1(2) B to be supplied to the scanning line G7 is read out from L3 and M1(3) R is read out from L1, processing is executed thereon, and the data are outputted to the display panel. In T11, M2(3) R, G to be supplied to the scanning line G8 is read out from L2, processing is executed thereon, and it is outputted to the display panel. Further, since readout action of M1(2) stored in L3 is completed in T10 and the data of M1(2) stored in L3 is unnecessary, storing action of the input image data M2(4) to L3 is started in the middle of T11. As shown in FIG. 56, the same processing is repeated for each scanning line, and output to the display panel is repeated in the manner described above. The input data of this case are M1 and M2 configured with pixel data of 4 rows×6 columns shown in FIG. 57, so that there is no input data after T13 of FIG. 56. However, as an example of the actions of a case where there area larger number of rows than the case of this exemplary embodiment, data storing and readout actions are shown with broken lines.

As described above, in the sixth exemplary embodiment, input data regardless of its viewpoint is stored to the line memory from which data has already been read out. As a specific example, as the data stored in L3 and L4, M1 and M2 are stored alternately. With this, compared to the case of the fifth exemplary embodiment, designation of the line memory for storing the input data and designation of the line memory for reading out data become slightly complicated. However, it is possible with the sixth exemplary embodiment to operate with still smaller number of line memories.

While the actions of the sixth exemplary embodiment has been described by referring to the case of the display panel in the layout pattern of FIG. 8 including the image separating device shown in FIG. 7, the exemplary embodiment is not limited only to that. As in the case of the first exemplary embodiment, the sixth exemplary embodiment can be applied to various layout patterns by setting the parameters in accordance with the timings shown in FIG. 56. The regions of the line memories required for the display panel which has the display part where the sub-pixels are arranged in m-rows and n-columns are the regions for 6 rows×n-columns of the sub-pixels. Further, as in the case of the fifth exemplary embodiment, for the panel of N-viewpoints as the one shown in the second exemplary embodiment, 2×N pieces of line memories for one row of each viewpoint image are prepared and applied under a condition where the data input period for one row of each viewpoint image matches with the driving period of three scanning lines of the display panel. Note here that "N" needs to be an even number.

(Effects)

For the image memory, the sixth exemplary embodiment uses not the frame memory but the line memories which store the data of sub-pixels for six scanning lines. That is, the image memory provided to the display panel having the display part in which the sub-pixels are arranged in m-rows and n-columns may need to have the storage regions for at least 6 rows×n-columns of sub-pixels. Therefore, in addition to the effects of the fifth exemplary embodiment, the circuit scale of the line memories can be reduced further, thereby making it possible to cut the cost and reduce the size.

Seventh Exemplary Embodiment

The structure of a display device according to a seventh exemplary embodiment of the present invention will be described. The display device according to the seventh exemplary embodiment is the same as those of the fifth and sixth exemplary embodiments in respect that it uses not a frame memory but a plurality of line memories for the image memory. However, the transfer method of the input image data and the driving method of the display panel are different. With the seventh exemplary embodiment, the required line memory regions can be reduced further compared to the case of the sixth exemplary embodiment.

Figure 58:
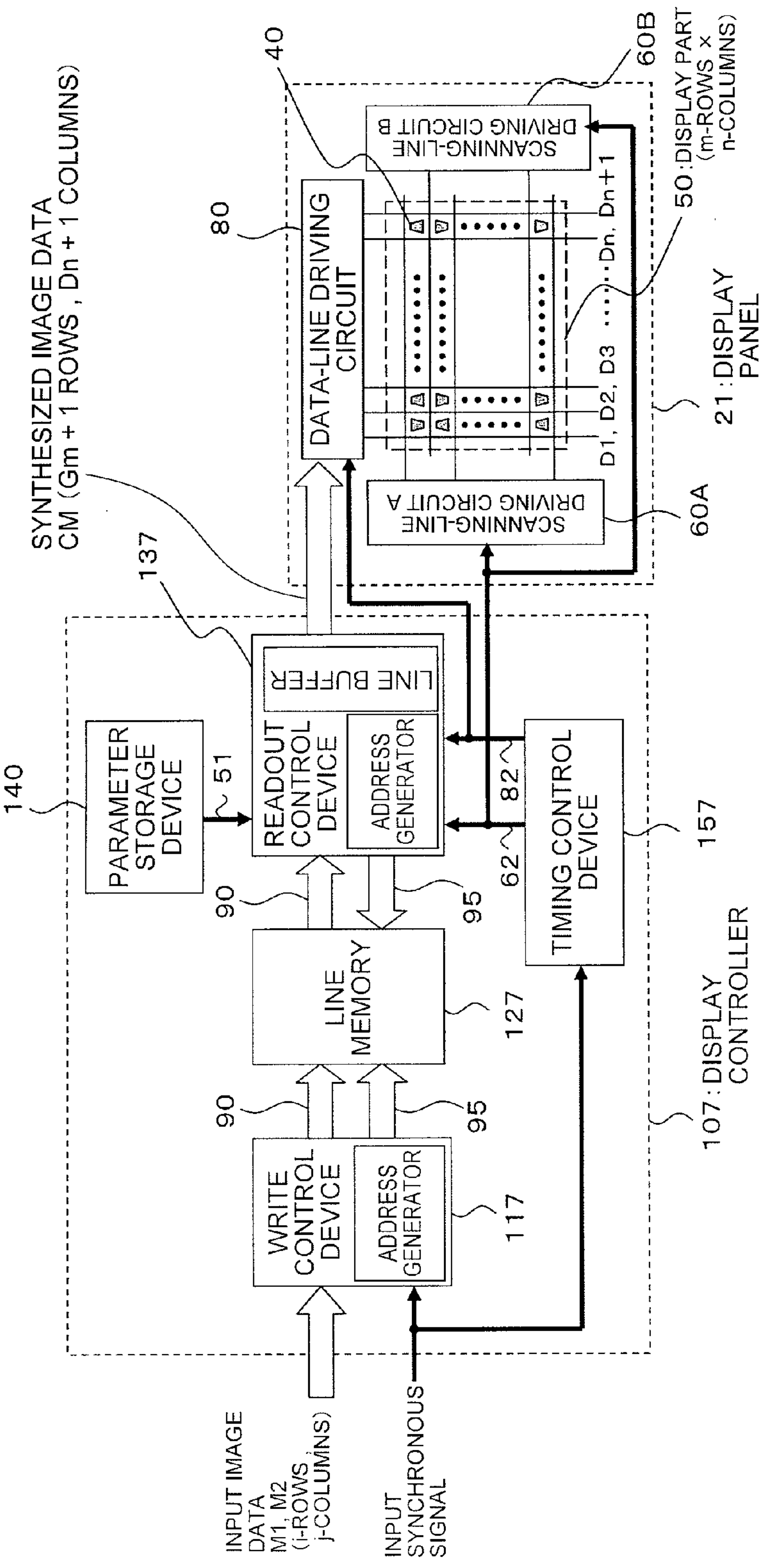
FIG. 58 is a functional block diagram of a seventh exemplary embodiment according to the present invention.

FIG. 58 shows a functional block diagram of the seventh exemplary embodiment. As in the case of the first exemplary embodiment, it is configured with: a display controller 107 which generates synthesized image data CM from image data for each viewpoint inputted from outside; and a display panel 21 which is a display device of the synthesized image data. For the structure of the display panel 21, the display part 50 and the data-line driving circuit 80 are the same as those of the first exemplary embodiment while the scanning-line driving circuit is different. The scanning-line driving circuit configuring the seventh exemplary embodiment includes scanning circuits which are capable of performing scanning on even-numbered columns and on odd-numbered columns of the display part which is configured with sub-pixels of m-rows× n-columns. As an example of the scanning-line driving circuit of the seventh exemplary embodiment, a scanning-line driving circuit A (60A) which sequentially drives the odd-numbered scanning lines G1, G3, G5, - - - and a scanning-line driving circuit B (60B) which sequentially drives the eve-numbered scanning lines G2, G4, G6, - - - are shown in FIG.

58. The display controller 107 includes: a line memory 127; a control device 117 which has a function of writing input image data to the line memory 127; and a readout control device 137 which has a function of reading out the data from the line memory 127. Further, the display controller 107 includes: a timing control device 157 which generates a vertical control signal 62 and a horizontal driving signal 82 for driving the display panel 21 by synchronizing with the input synchronous signal, and outputs those control signals to the readout control device 137, the scanning-line driving circuits 60A, 60B, and the data-line driving circuit 80; and a parameter storage device 140 which has a function of storing parameters required for rearranging the data in accordance with the layout of the display part 50 as in the case of the first exemplary embodiment.

As described, the seventh exemplary embodiment does not use a frame memory as the image memory as in the case of the fifth exemplary embodiment. Thus, there is a restriction in the transfer form of the input image data, and the timing between the input data and the output data. As an example of the actions of the seventh exemplary embodiment, FIG. 59 shows a timing chart when driving the display panel in the layout pattern 1 of FIG. 8 which includes the image separating device shown in FIG. 7.

Figure 59:
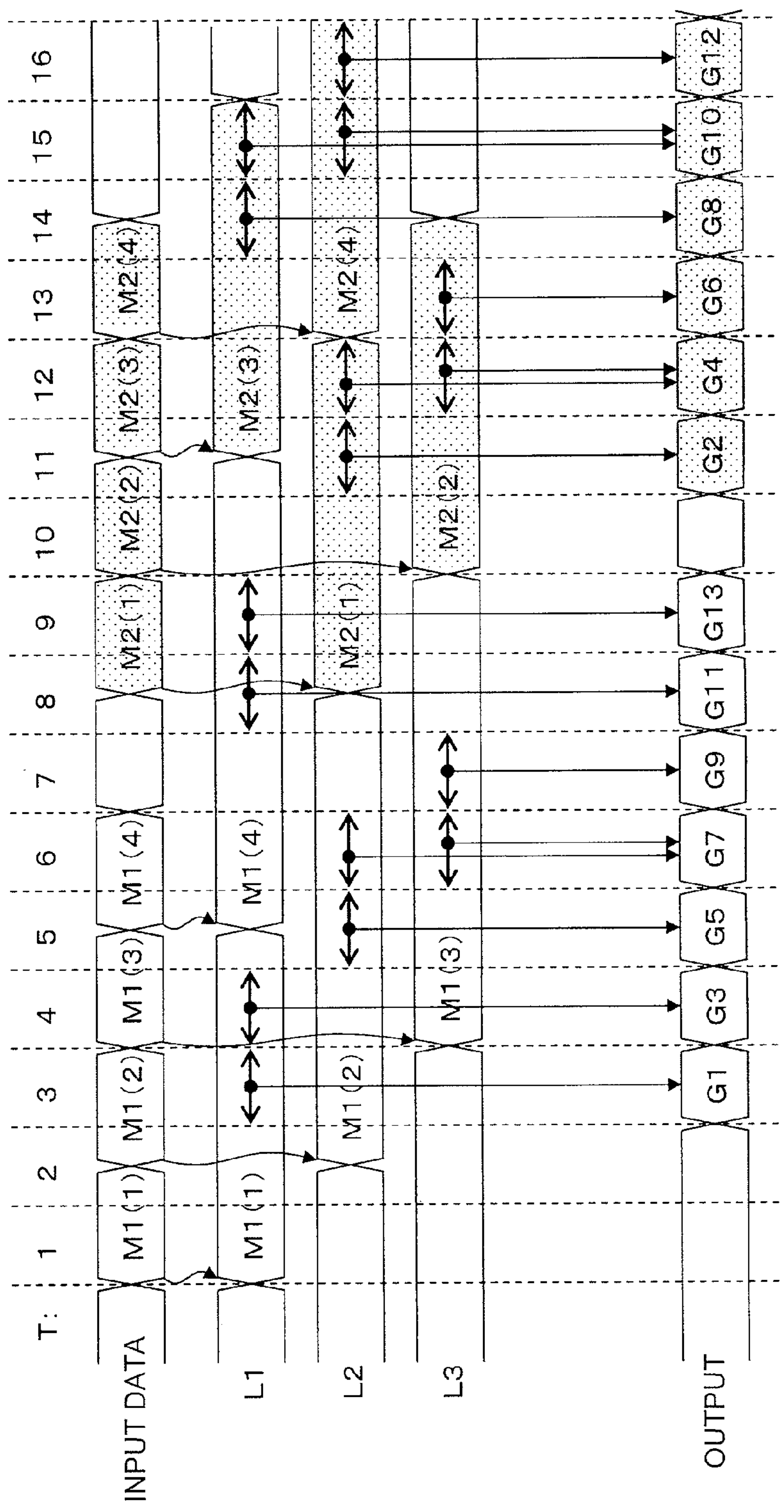
FIG. 59 is a timing chart showing actions of the seventh exemplary embodiment of the present invention.

"T" shown in FIG. 59 shows one horizontal period of the display panel, and input data M1 and M2 are pixel data of 4 rows×6 columns shown in FIG. 57. Input data M1(1) and M2(1) shown in FIG. 59 indicate the first row of the first viewpoint image data M1 and the second row of the second viewpoint image data. The transfer form of the first viewpoint image shown in the seventh exemplary embodiment is the so-called frame sequential method with which the input data for one viewpoint is transferred and the other input image data is transferred thereafter, as shown in FIG. 59. The seventh exemplary embodiment does not use a frame memory, so that outputs to the display panel are executed for each sub-pixel corresponding to the viewpoint of the input image data. As described in the first exemplary embodiment, the viewpoint images to which the sub-pixels of the display part correspond are determined depending on the layout of the image separating device as in the cases of FIG. 7 and FIG. 24, and the sub-pixels corresponding to each viewpoint can be selected with even/odd of the scanning lines to be connected as in the cases of FIG. 8 and FIG. 18. Thus, with the seventh exemplary embodiment, the scanning lines are classified into odd and even numbered lines, and odd-numbered lines and even-numbered lines are scanned sequentially. Outputs G1, G3, - - - , G13 shown in FIG. 59 show the data outputs to the sub-pixels connected to the odd-numbered scanning lines of the display part shown in FIG. 8, and outputs G2, G4, - - - , G12 show the data outputs to the sub-pixels connected to the even-numbered scanning lines of the display part shown in FIG. 8. Further, in order to minimize the storage regions of the line memories used instead of the frame memory, the input period for two rows of input image data for each viewpoint and three horizontal periods of the display panel output are set to be the same.

From L1 to L3 shown in FIG. 59 are line memories used as the image memory in the seventh exemplary embodiment, which can store each inputted viewpoint image data for one row. Since the inputted pixel data carries information RGB, one row of each inputted viewpoint pixel data corresponds to sub-pixels of 3 rows×n/2-columns. FIG. 60 shows a corresponding relation regarding input data M1(1), input data M1(2), input data M1(3), and the sub-pixels of the display part shown in FIG. 8. As can be seen from FIG. 60, the data saving regions of four line memories for storing one-row of input image data can be expressed as "3×3×6=54" in a sub-pixel unit.

Details of the actions of the seventh exemplary embodiment will be described by referring to FIG. 59. In the period of T1-T3, the input data M1(1) is stored to L1 and the input data M2(1) is stored to L2. Further, in the period of T3, in parallel to the storing action of M1(1) to L2, the data for the scanning line G1 is read out from L1 where M1(1) is stored, and the same data as the synthesized image data described in the first exemplary embodiment is outputted by executing the rearranging processing based on the information of the display panel and the regularity described in the first exemplary embodiment. Specifically, data of R is read out from M1(1) to G1, rearranging processing is executed thereon, and it is outputted to the display panel. Then, in T4, storing action of M1(3) to L3 is started and, at the same time, data M1(1) G, R to be supplied to the scanning line G3 is read out from L1, the rearranging processing is executed thereon, and it is outputted to the display panel. In T5, data M1(2) G, R to be supplied to the scanning line G5 is read out from L2, the rearranging processing is executed thereon, and it is outputted to the display panel. Further, when T4 ends, all the data M1(1) stored in L1 are readout and become unnecessary. Thus, storing action of M1(4) to L1 is started in the middle of T5. In T6, in parallel to storing action of M1(4) to L1, data M1(2) B to be supplied to the scanning line G7 is read out from L2 and M1(3) R is read out from L3, the rearranging processing is executed thereon, and the data are outputted to the display panel. In T7, data M1(3) G, B to be supplied to the scanning line G9 is read out from L3, the rearranging processing is executed thereon, and the data are outputted to the display panel. Data input of M1 is completed in T6, so that the period of T7 regarding input data is a blanking period. In T8, data M1(4) R, G to be supplied to the scanning line G11 is read out from L1, the rearranging processing is executed thereon, and it is outputted to the display panel. Further, storing action of input data M2(1) to L2 is started in the middle of T8. In T9, in parallel to the storing action of M2(1) to L2, data M1(4) B to be supplied to the scanning line G13 is read out from L1, the rearranging processing is executed thereon, and it is outputted to the display panel. Storing action of input data M2(2) to L3 is started in T10. The data output to the odd-numbered scanning lines is completed in T9, so that the period of T10 regarding output is a blanking period. In T11, data M2(1) R, G to be supplied to the scanning line G2 is read out from L2, the rearranging processing is executed thereon, and it is outputted to the display panel. Storing action of input data M2(3) to L1 is started in the middle of T11. In T12, in parallel to the storing action of M2(3) to L1, M2(1) B to be supplied to the scanning line G4 is read out from L2 and M2(2) R is read out from L3, the rearranging processing is executed thereon, and the data are outputted to the display panel. When the readout processing in T12 is ended, the data of M2(1) stored in L2 becomes unnecessary. Thus, in a next period T13, M2(4) is stored to L2. In T13, in parallel to storing action of M2(4) to L2, M2(2) G, B to be supplied to the scanning line 6 is read out from L3, the rearranging processing is executed thereon, and it is outputted to the display panel. In T14, in parallel to the storing action of M2(4), data M2(3) R, G to be supplied to the scanning line G8 is read out from L1, the rearranging processing is executed thereon, and it is outputted to the display panel. The storing action of M2(4) to L2 is ended in the middle of T14, so that the periods thereafter regarding input data become blanking periods. In T15, M2(3) B to be supplied to the scanning line G10 is read out from L1 and M2(4) R is read out from L2, the rearranging processing is executed thereon, and the data are outputted to the display panel. In T16, M2(4) G, B to be supplied to the scanning line G12 is read out from L2, the rearranging processing is executed thereon, and it is outputted to the display panel.

While the actions of the seventh exemplary embodiment has been described by referring to the case of the display panel in the layout pattern 1 of FIG. 8 including the image separating device shown in FIG. 7, the exemplary embodiment is not limited only to that. As in the case of the first exemplary embodiment, the seventh exemplary embodiment can be applied to various layout patterns by using the regularity of the sub-pixel layout described in the first exemplary embodiment and by parameter setting. Further, while the scanning circuits used in the seventh exemplary embodiment are expressed as the scanning-line driving circuit A which scans the odd-numbered scanning lines and the scanning-line circuit B which scans the even-numbered scanning lines, it is also possible to achieve the driving actions shown in FIG. 59 by connecting the outputs of a single scanning-line driving circuit first to the odd-numbered scanning lines and then to the even-numbered scanning lines sequentially. Further, it is also possible to employ a structure which uses a single scanning-line drive IC which can scan the odd-numbered outputs and the even-numbered outputs, respectively.

(Effects)

With the seventh exemplary embodiment, the image memory provided to the display panel having the display part in which the sub-pixels are arranged in m-rows and n-columns may only need to have the storage regions for at least 9 rows×(n/2) columns of sub-pixels. Therefore, compared to the display controller having a frame memory, the circuit scale can be reduced greatly, thereby resulting in cutting the cost. Further, the size can also be reduced. For example, the number of alternatives regarding the places to have the display controller loaded can be increased, e.g., the display controller can be built-in to the data-line driving circuit.

Eighth Exemplary Embodiment

The structure of a display device according to an eighth exemplary embodiment of the present invention will be described. The display device according to the eighth exemplary embodiment is the same as that of the seventh exemplary embodiment in respect that it uses not a frame memory but a plurality of line memories for the image memory and that the transfer form of input image data is the so-called frame sequential method. However, the driving method of the display panel is different. The eighth exemplary embodiment includes a scanning circuit which can scan all the scanning lines of the display panel twice in a transfer period of two inputted viewpoint images for the left and right, so that it is unnecessary to use the scanning-line driving circuit which scans the scanning lines separately for the odd-numbered lines and the even-numbered lines as in the case of the seventh exemplary embodiment.

Figure 61:
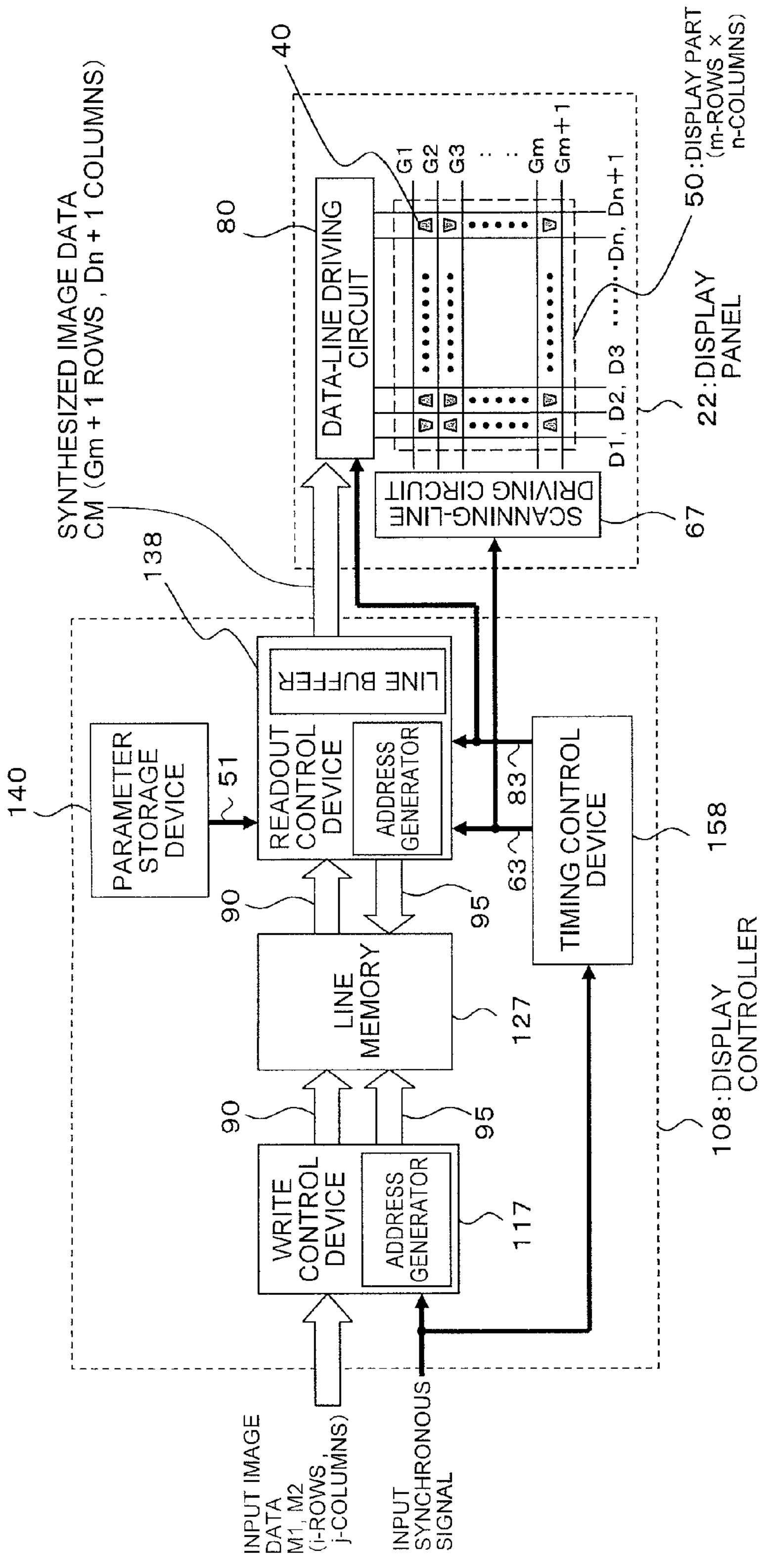
FIG. 61 is a functional block diagram of an eighth exemplary embodiment according to the present invention.

FIG. 61 shows a functional block diagram of the eighth exemplary embodiment. As in the case of the sixth exemplary embodiment, it is configured with: a display controller 108 which generates synthesized image data CM from image data for each viewpoint inputted from outside; and a display panel 22 which is a display device of the synthesized image data. For the structure of the display panel 22, the display part 50 and the data-line driving circuit 80 are the same as those of the seventh exemplary embodiment but the scanning-line driving circuit is different. The scanning-line driving circuit 67 configuring the eighth exemplary embodiment includes a function which can perform scanning twice on all the scanning lines of the display part within a transfer period of two viewpoint images for the left and right inputted by the frame sequential method. The display controller 108 includes a line memory 127 and a control device 117 which has a function of writing input image data to the line memory 127, as in the case of the seventh exemplary embodiment. Further, the eighth exemplary embodiment includes a readout control device 138 which has: a function of reading out and rearranging the data from the line memory 127 at a double speed compared to the case of the seventh exemplary embodiment under a condition that the transfer rate of input data is the same; and a function which supplies data with which a viewpoint display image with no input data becomes black. Further, the display controller 108 includes: a timing control device 158 which generates a vertical control signal 63 and a horizontal driving signal 83 for driving the display panel 22 by synchronizing with the input synchronous signal and outputs those control signals to the readout control device 138, the scanning-line driving circuit 67, and the data-line driving circuit 80; and a parameter storage device 140 which has a function of storing parameters required for rearranging the data in accordance with the layout of the display part 50 as in the case of the first exemplary embodiment.

The eighth exemplary embodiment does not use a frame memory as the image memory as in the case of the fifth-seventh exemplary embodiments. Thus, there is a restriction in the transfer form of the input image data, and the timing between the input data and the output data. As an example of the actions of the eighth exemplary embodiment, FIG. 62 shows a timing chart when driving the display panel in the layout pattern 1 of FIG. 8 which includes the image separating device shown in FIG. 7.

Figure 62:
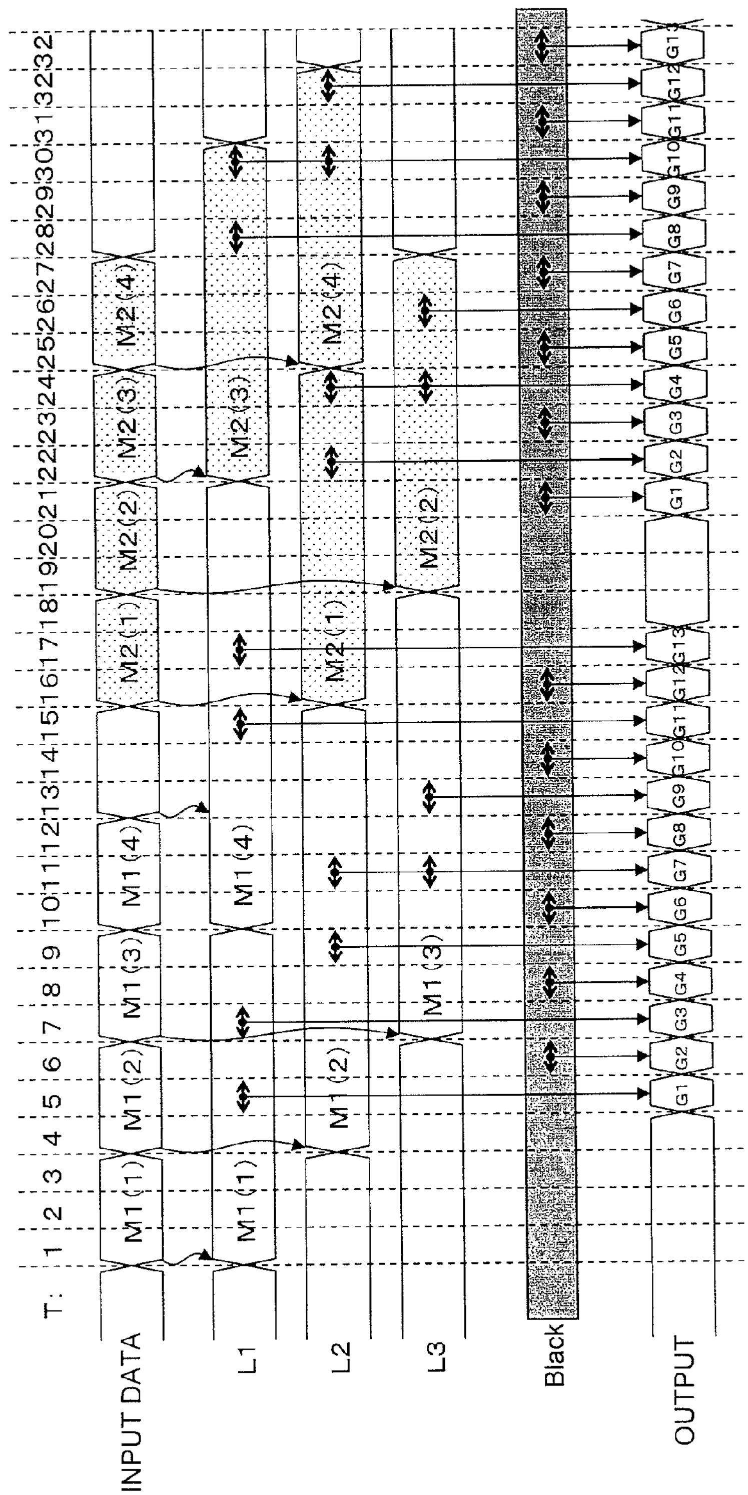
FIG. 62 is a timing chart showing actions of the eighth exemplary embodiment of the present invention.

As in the cases of the fifth-seventh exemplary embodiments, "T" shown in FIG. 62 shows one horizontal period of the display panel, and input data M1 and M2 are pixel data of 4 rows×6 columns shown in FIG. 57. Further, input data M1(1) and M2(1) shown in FIG. 62 indicate the first row of the first viewpoint image data M1 and the second row of the second viewpoint image data. As in the cases of the fifth-seventh exemplary embodiments, the transfer form of the first viewpoint image shown of the eighth exemplary embodiment is the so-called frame sequential method with which the input data for one viewpoint is transferred and the other input image data is transferred thereafter, as shown in FIG. 62. Outputs G1, G2, G3, - - - , G12, G13 shown in FIG. 62 show the data outputs to the sub-pixels connected to the odd-numbered scanning lines of the display part shown in FIG. 8. In the eighth exemplary embodiment, as shown in FIG. 62, all the scanning lines of the display part are scanned by corresponding to the transfer period of the input data M1, and all the scanning lines of the display part are scanned by corresponding to the transfer period of the input data M2. That is, all the scanning lines of the display part are scanned twice within the transfer period of the two viewpoint images for the left and right. In the eighth exemplary embodiment, regarding the data outputted in accordance with the scanning, as in the case of the seventh exemplary embodiment, the data read out from the line memory and on which rearranging processing is executed is supplied to the pixel which displays the viewpoint image to which the input data corresponds, and data for displaying black is supplied to the pixel which displays the viewpoint image to which the input data does not correspond. In the case of FIG. 62, the first viewpoint image data M1 is inputted in a period of T1-T2, and stored to the line memory. FIG. 62 is a driving example of the display panel shown in FIG. 7 and FIG. 8, so that the odd-numbered scanning lines (G1, G3, - - - , G13) are connected to the pixels for displaying M1. Therefore, regarding the output to the display panel in T5-T17, as in the case of the fifth exemplary embodiment, the data read out from the line memories and to which the rearranging processing is executed is supplied to the outputs to which the odd-numbered scanning lines (G1. G3, - - - , G13) correspond, and the data for providing black display is supplied to the output corresponding the even-numbered scanning lines (G2, G4, - - - , G12). Further, in the case of FIG. 62, the second viewpoint image data M2 is inputted in a period of T16-T17, and stored to the line memory. As described earlier, in this case, the even-numbered scanning lines (G2, G4, - - - , G12) are connected to the pixels for displaying M2. Therefore, regarding the output to the display panel in T21-T33, the data for providing black display is supplied to the outputs to which the odd-numbered scanning lines (G1, G3, - - - , G13) correspond, and the data read out from the line memories and to which the rearranging processing is executed is supplied to the output corresponding the even-numbered scanning lines (G2, G4, - - - , G12), as in the case of the fifth exemplary embodiment.

As shown in FIG. 62, in order to minimize the storage regions of the line memories used instead of the frame memory, the input period for one row of input image data for each viewpoint and three horizontal periods of the display panel output are set to be the same. The line memories from L1 to L3 store one row of each viewpoint pixel data inputted respectively, as in the case of the seventh exemplary embodiment. Further, the saving regions required for the line memories from L1 to L3 can be expressed as "3×3×6=54" in a sub-pixel unit as in the case of the seventh exemplary embodiment.

(Effects)

With the eighth exemplary embodiment, as in the case of the seventh exemplary embodiment, the image memory provided to the display panel having the display part in which the sub-pixels are arranged in m-rows and n-columns may only need to have the storage regions for at least 9 rows×(n/2) columns of sub-pixels. Therefore, the same effects as those of the sixth exemplary embodiment can be achieved. Further, since it is unnecessary to scan the odd-numbered and even-numbered scanning lines separately, the structure of the display panel can become simpler and easier to be designed compared to the case of the seventh exemplary embodiment.

The present invention can also be structured as follows.

The present invention is a display controller for outputting synthesized image data to a display module which includes: a display part in which sub-pixels connected to data lines via switching devices controlled by scanning lines are arranged in m-rows and n-columns, which is driven by (m+1) pieces of the scanning lines and at least n piece of the data line; and a first image separating device which directs light emitted from the sub-pixels towards at least two spaces viewpoints in a sub-pixel unit. The display controller includes: an image memory which stores at least two pieces of viewpoint image data; a writing control device which writes at least the two pieces of viewpoint image data inputted from outside to the image memory; a parameter storage device which stores a positional relation between the first image separating device and the display part; and a readout control device which reads out the viewpoint image data from the image memory according to a readout order that is obtained by applying the parameters to a repeating regulation that is determined based on layout of the sub-pixels, number of colors, and layout of the colors, and outputs the readout data to the display module as the synthesized image data.

Further, the present invention is an image processing method for generating synthesized image data to be outputted to a display module which includes: a display part having sub-pixels connected to data lines via switching devices controlled by scanning lines are arranged in m-rows in the vertical direction and in n-columns in the horizontal direction, which is driven by (m+1) pieces of scanning lines and (n+1) pieces of data lines; and an image separating device which directs light emitted from a plurality of sub-pixels of the display towards at least two spaces in a unit of the sub-pixel. The image processing method includes: a parameter reading step which reads parameters showing a positional relation between the image separating device and the display part of the display module; a writing step which writes at least two viewpoint images inputted from outside into the image memory; and a readout step which reads out the viewpoint image from the image memory and outputs the read out data as the synthesized image data to the display module in accordance with an readout order obtained by applying the parameters to a prescribed repeating rule that is determined depending on layout and number of colors of the sub-pixels.

The present invention makes it possible to arrange the wirings and TFTs efficiently for each pixel having substantially a trapezoid aperture of the display device to which the image distributing optical device such as a lenticular lens or a parallax barrier is provided. Thus, it is possible to achieve high numerical aperture and high image quality. In achieving the high image quality, the connecting pattern regarding the scanning lines as well as the data lines with respect to the rows and columns of the sub-pixels becomes different from the case of a typical panel. However, because the regularity has been found, the scanning lines and the data lines connected to the sub-pixels arranged in arbitrary number of rows and columns can be found without actual designing. Further, it is possible to generate synthesized image data from the found regularity, layout of the image separating device, coloring orders of the color filter, and the layout pattern of the up-and-down sub-pixel pair as the minimum unit. Through providing the video signal processing device which generates the synthesized image data, the device for creating the synthesized image data and the method for creating the synthesized image data can be provided. This makes it possible to use the input image data of a same transfer form as that of a typical flat display device, so that there is no load)rearrangement of the output image data, for example) imposed upon the devices to which the display device is employed. Furthermore, since the conditions for generating the synthesized image data are put into parameters and the device for storing the parameters is provided, it only needs to change the parameters when there is a change in the display module and does not need to change the video signal processing device. Therefore, the number of designing steps and the cost thereof can be reduced.

Next, ninth to thirteenth exemplary embodiments of the present invention will be described. It is noted that the structures of the up-and-down sub-pixel pairs, the layout pattern, LUT, and the synthesized image data of the ninth to thirteenth exemplary embodiments are different from those of the up-and-down sub-pixel pairs, the layout pattern, LUT, and the synthesized image data of the first to eighth exemplary embodiments; however, the same reference numerals are applied for convenience's sake.

The display module of the display device which uses the display controller of the present invention is the display module which includes an image separating device which directs light emitted from sub-pixels towards a plurality of viewpoints in an extending direction of the data lines. The display module achieves the high numerical aperture and high image quality by the characteristic connecting relation regarding the scanning lines as well as the data lines with respect to the switching devise of each sub-pixel. The inventors of the present invention have found the regularity in the characteristic connecting relation regarding the sub-pixels and the scanning lines as well as the data lines of the display module. Further, the inventors of the present invention have invented the display controller which creates the synthesized image data from the found regularity, the placement condition of the image separating device, coloring order of the sub-pixels, and the layout pattern of the up-and-down sub-pixel pairs.

Hereinafter, the exemplary embodiments of the present invention will be described. In the explanations of the ninth exemplary embodiment to the thirteenth exemplary embodiment hereinafter, the array of the pixel electrodes along the horizontal direction of the display panel is called "row" and the array of the pixel electrodes along the vertical direction is called "column". Further, in the display panel of the present invention, the scanning lines are arranged along the horizontal direction, the data lines are arranged along the vertical direction, and the image distributing direction by the image separating device is the horizontal direction.

Ninth Exemplary Embodiment

First, the outline of a ninth exemplary embodiment will be described. A display module (400) includes a display part (250) and an image separating device (230). In the display part (250), sub-pixels (240) connected to data lines (D1, - - - ) via switching devices (246) controlled by scanning lines (G1, - - - ) are arranged in m-rows and n-columns (m and n are natural numbers), and the sub-pixels (240) are driven by m+1 pieces of scanning lines (G1, - - - ) and at least n+1 pieces of data lines (D1, - - - ). The image separating device (230) directs the light emitted from the sub-pixels (240) to a plurality of viewpoints in the extending direction of the data lines (D1, - - - ) by a unit of the sub-pixel (240).

Further, the display controller (300) includes an image memory (320), a writing control device (310), and a readout control device (330), and outputs synthesized image data (CM) to the display module (400). The image memory (320) stores viewpoint image data for a plurality of viewpoints. The writing control device (310) writes viewpoint image data inputted from outside into the image memory (320). The readout control device (330) reads out the viewpoint image data from the image memory (320) in accordance with the readout order corresponding to the display module (400), and outputs it to the display module (400) as the synthesized image data (CM).

The readout order corresponding to the display module (400) may be the readout order that is obtained based on the positional relation between the image separating device (230) and the display part (250), the layout of the sub-pixels (240), the number of colors, and the layout of the colors.

The display controller (300) may further include a parameter storage device (340) which stores parameters showing the positional relation between the image separating device (230) and the display part (250), the layout of the sub-pixels (240), the number of colors, and the layout of the colors.

The display part (250) may be formed by having an up-and-down sub-pixel pair (P2R, P2L) configured with two sub-pixels (240) arranged by sandwiching a single data line (D1, - - - ) as a basic unit. In this case, the switching devices (246) provided to each of the two sub-pixels (240) is connected in common to the data line (D1, - - - ) sandwiched by the two sub-pixels (240), and controlled in common by different scanning lines (G1, - - - ). The up-and-down sub-pixel pairs (P2R, P2L) neighboring to each other in the extending direction of the data lines (D1, - - - ) are so arranged to be connected to different data lines (D1, - - - ).

As for the number of colors of the sub-pixels (240), there are three colors such as a first color, a second color, and a third color. The first color, the second color, and the third color are one of the colors R (red), G (green), and B (blue), for example, and are different from each other. In this case, the display part (250) may be formed as follows. Provided that "y" is a natural number, regarding the two sub-pixels (240) of the up-and-down sub-pixel pair (P2R, P2L) connected to the y-th data line (Dy), the color of one of the two sub-pixels is the first color while the other is the second color, and forms either an even column or an odd column of the display part (250). Regarding the two sub-pixels (240) of the up-and-down sub-pixel pair (P2R, P2L) connected to the (y+1)-th data line (Dy+1), the color of one of the two sub-pixels is the second color while the other is the third color, and forms the other one of the even column or the odd column of the display part (250). Regarding the two sub-pixels (240) of the up-and-down sub-pixel pair (P2R, P2L) connected to the (y+2)-th data line (Dy+2), the color of one of the two sub-pixels is the third color while the other is the first color, and forms one of the even column or the odd column of the display part (250). Regarding the two sub-pixels (240) of the up-and-down sub-pixel pair (P2R, P2L) connected to the (y+3)-th data line (Dy+3), the color of one of the two sub-pixels is the first color while the other is the second color, and forms the other one of the even column or the odd column of the display part (250). Regarding the two sub-pixels (240) of the up-and-down sub-pixel pair (P2R, P2L) connected to the (y+4)-th data line (Dy+4), the color of one of the two sub-pixels is the second color while the other is the third color, and forms one of the even column or the odd column of the display part (250). Regarding the two sub-pixels (240) of the up-and-down sub-pixel pair (P2R, P2L) connected to the (y+5)-th data line (Dy+5), the color of one of the two sub-pixels is the third color while the other is the first color, and forms the other one of the even column or the odd column of the display part (250).

At this time, the readout control device (330) may read out the viewpoint image data from the image memory (320) according to the readout order as follows. That is, the colors read out by corresponding to the y-th data line (Dy) are the first color and the second color, and the readout viewpoint image is the image which corresponds to either an even column or an odd column of the display part (250). The colors read out by corresponding to the (y+1)-th data line (Dy+1) are the second color and the third color, and the viewpoint image is the image which corresponds to the other one of the even column or the odd column of the display part (250). The colors read out by corresponding to the (y+2)-th data line (Dy+2) are the third color and the first color, the viewpoint image is the image which corresponds to either the even column or the odd column of the display part (250). The colors read out by corresponding to the (y+3)-th data line (Dy+3) are the first color and the second color, and the viewpoint image is the image which corresponds to the other one of the even column or the odd column of the display part (250). The colors read out by corresponding to the (y+4)-th data line (Dy+4) are the second color and the third color, and the viewpoint image is the image which corresponds to either the even column or the odd column of the display part (250). The colors read out by corresponding to the (y+5)-th data line (Dy+5) are the third color and the first color, and the viewpoint image is the image which corresponds to the other one of the even column or the odd column of the display part (250).

An image processing method according to the exemplary embodiment is achieved by actions of the display controller (300) of the exemplary embodiment. That is, the image processing method of the exemplary embodiment is a method for generating the synthesized image data CM to be outputted the display module (400), which includes the following steps of 1-3. 1: A step which writes viewpoint image data for a plurality of viewpoints inputted from outside into the image memory (320). 2: A step which reads out the viewpoint image data from the image memory (320) according to the readout order corresponding to the display module (400). 3: A step which outputs the read out viewpoint image data to the display module (400) as the synthesized image data (CM). Details of the image processing method according to the exemplary embodiment conform to the actions of the display controller (300) according to the exemplary embodiment. Image processing methods according to other exemplary embodiments are achieved by the actions of the display controllers of the other exemplary embodiments as in the case of the first exemplary embodiment, so that explanations thereof are omitted.

An image processing program according to the exemplary embodiment is for causing a computer to execute the actions of the display controller (300) of the exemplary embodiment. When the display controller (300) includes a computer formed with a memory, a CPU, and the like, the image processing program of the exemplary embodiment is stored in the memory, and the CPU reads out, interprets, and executes the image processing program of the exemplary embodiment. That is, the image processing program of the exemplary embodiment is a program for generating the synthesized image data (CM) to be outputted to the display module (400), which causes the computer to execute following procedures 1-3. 1: A procedure which writes viewpoint image data for a plurality of viewpoints inputted from outside into the image memory (320). 2: A procedure which reads out the viewpoint image data from the image memory (320) according to the readout order corresponding to the display module (400). 3: A procedure which outputs the read out viewpoint image data to the display module (400) as the synthesized image data (CM). Details of the image processing program according to the exemplary embodiment conform to the actions of the display controller (300) according to the exemplary embodiment. Image processing programs according to other exemplary embodiments are causing the computer to execute the actions of the display controllers of the other exemplary embodiments as in the case of the first exemplary embodiment, so that explanations thereof are omitted.

The use of the exemplary embodiment makes it possible to use input image data in the same transfer form as that of a typical flat display device for the display module which includes the image separating device that directs the light emitted from the sub-pixels to a plurality of viewpoints in the extending direction of the data lines. Thus, it is unnecessary to execute the image data rearranging processing and any special processing for transfer, so that there is no load imposed upon an arithmetic operation device, for example, which outputs the image data to the display device of the present invention which includes the display controller. Furthermore, the condition for generating the synthesized image data CM is put into parameters, and the parameter storage device for storing the parameter is provided. Thus, when there is a change in the display module, it simply needs to change the parameters. This makes it possible to decrease the number of designing steps and to reduce the cost. Hereinafter, the ninth exemplary embodiment will be described in more details.

(Explanation of Structures)

Structures of the display device according to the ninth exemplary embodiment of the present invention will be described.

Figure 64:
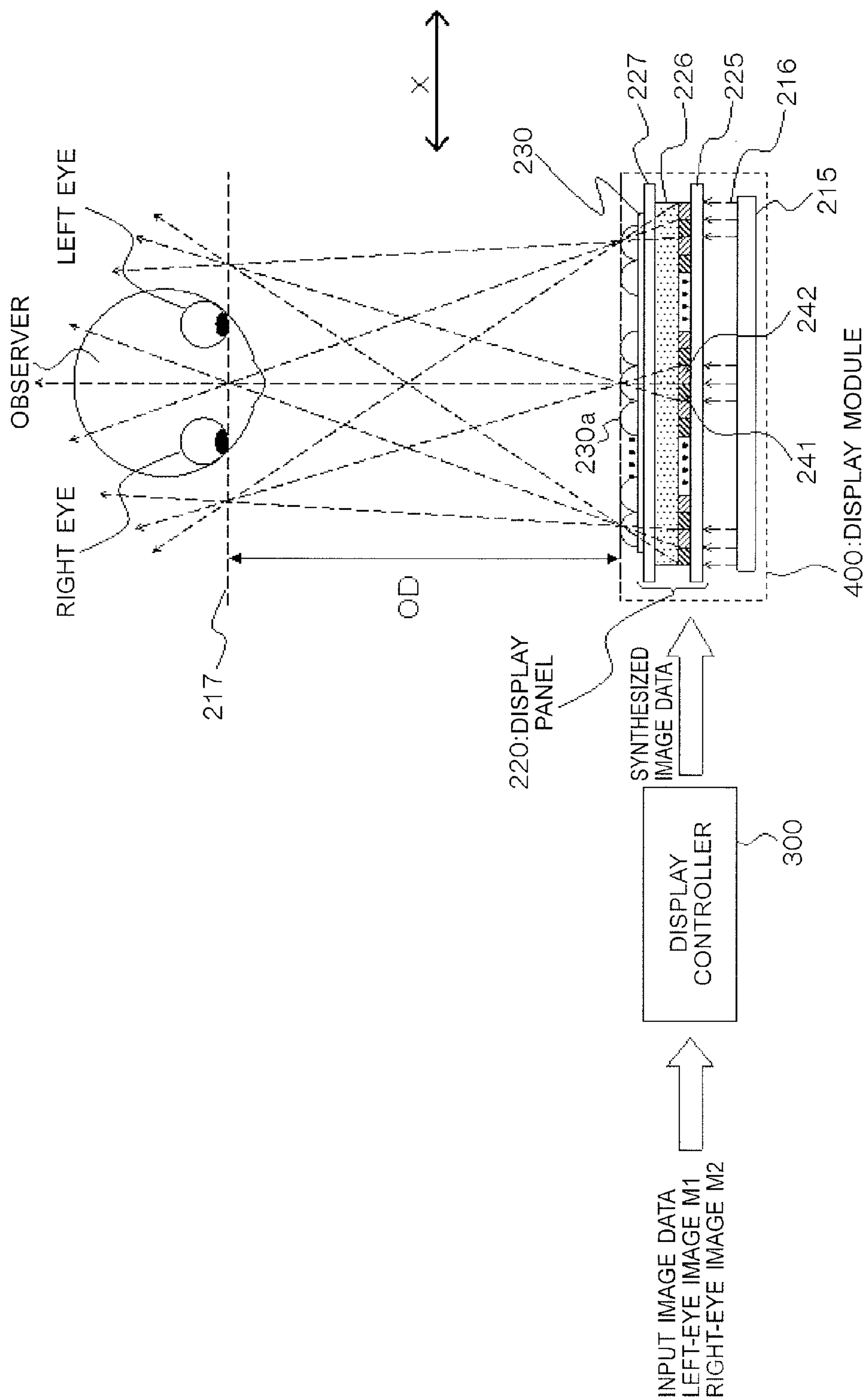
FIG. 64 is a schematic block diagram showing the ninth exemplary embodiment.

FIG. 64 is a schematic block diagram of a stereoscopic display device of the exemplary embodiment, which shows an optical model viewed above the head of an observer. The outline of the exemplary embodiment will be described by referring to FIG. 64. The display device according to the exemplary embodiment is formed with the display controller 300 and the display module 400. The display controller 300 has a function which generates synthesized image data CM from a first viewpoint image data (left-eye image data) M1 and a second viewpoint image data (right-eye image data) inputted from outside. The display module 400 includes a lenticular lens 230 as an optical image separating device of displayed synthesized image and a backlight 215 provided to the display panel 220 which is the display device of the synthesized image data CM.

Referring to FIG. 64, the optical system of the exemplary embodiment will be described. The display panel 220 is a liquid crystal panel, and it includes the lenticular lens 230 and the backlight 215. The liquid crystal panel is in a structure in which a glass substrate 225 on which a plurality of sub-pixels 241 and 242 as the minimum display unit are formed and a counter substrate 227 having color filters (not shown) and counter electrodes (not shown) are disposed by sandwiching a liquid crystal layer 226. On the faces of the glass substrate 225 and the counter substrate 227 on the opposite sides of the liquid crystal layer 226, polarization plate (not shown) is provided, respectively. Each of the sub-pixels 241 and 242 is provided with a transparent pixel electrode (not shown). The polarization state of the transmitted light is controlled by applying voltages to the liquid crystal layer 226 between the respective pixel electrodes and the counter electrodes of the counter substrate 227. Light rays 216 emitted from the backlight 215 pass through the polarization plate of the glass substrate 225, the liquid crystal layer 226, the color filters of the counter substrate 227, and the polarization plate, thereby intensity modulation and coloring can be done.

The lenticular lens 230 is formed with cylindrical lenses 230*a* exhibiting the lens effect to one direction arranged on a plurality of columns along the horizontal direction. The lenticular lens 230 is arranged in such a manner that projected images from all the sub-pixels 241 overlap with each other and the projected images from all the sub-pixels 242 overlap with each other at an observing plane 217 that is away from the lens by a distance OD, by alternately using the plurality of sub-pixels on the glass substrate 225 as the first viewpoint (left-eye) sub-pixel 241 and the second viewpoint (right-eye) sub-pixel 242. With the above-described structure, a left-eye image formed with the sub-pixels 241 is provided to the left eye of the observer at the distance OD and the right-eye image formed with the sub-pixels 242 is provided to the right eye.

Figure 63:
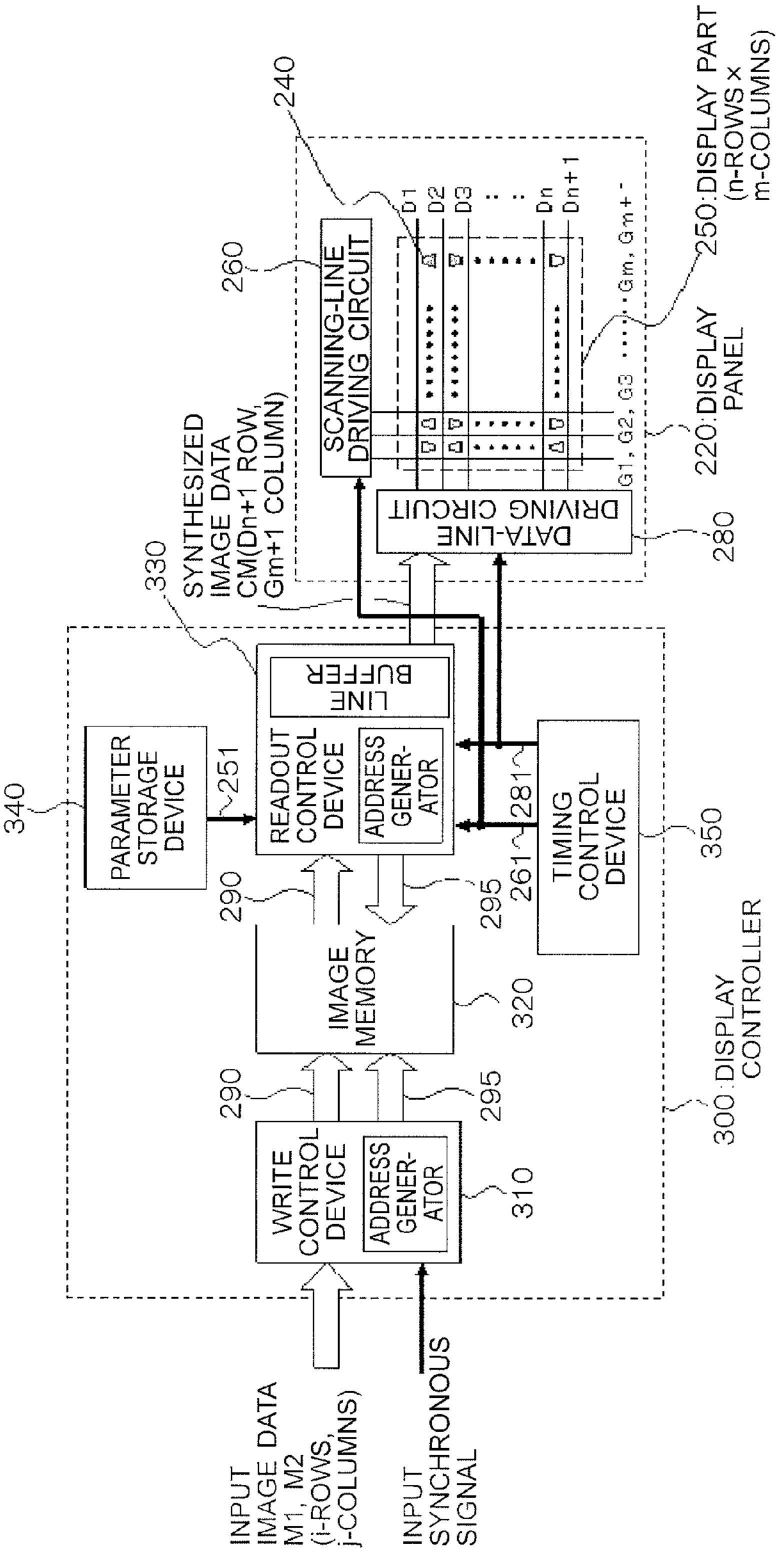
FIG. 63 is a functional block diagram showing a ninth exemplary embodiment.

Next, details of the display controller 300 and the display panel 220 shown in FIG. 64 will be described. FIG. 63 is a block diagram of this exemplary embodiment showing the functional structures from image input to image display.

The input image data inputted from outside has viewpoint images M1, M2, and each of the viewpoint mages M1, M2 is configured with i-rows and j-columns of pixel data. Each pixel data carries three-color luminance information regarding R (red) luminance, G (green) luminance, and B (blue) luminance. The image data is inputted along with a plurality of synchronous signals, the position of each pixel data within the image (i.e., the row number and the column number) is specified based on the synchronous signals. Hereinafter, a pixel configuring an arbitrary row and an arbitrary column of input image data is expressed as Mk (row, column) RGB (k shows the viewpoint number (left/right). That is, M1 is an aggregate of the pixel data from M1 (1, 1) RGB, M1 (1, 2) RGB, to M1 (i, j) RGB. M2 is an aggregate of the pixel data from M2 (1, 1) RGB, M2 (1, 2) RGB, to M2 (i, j) RGB. For example, "R" corresponds to the first color, "G" corresponds to the second color, and "B" corresponds to the third color.

The display controller 300 includes the writing control device 310, the image memory 320, the readout control device 330, the parameter storage device 340, and the timing control device 350.

The writing control device 310 has a function which generates a writing address given to the inputted image data {Mk (row, column) RGB} in accordance with the synchronous signal inputted along the image data. Further, the writing control device 310 has a function which gives the writing address to an address bus 295, and writes the input image data formed with the pixel data to the image memory 320 via a data bus 290. While the synchronous signal inputted from outside is illustrated with a single thick-line arrow in FIG. 63 for convenience's sake, the synchronous signals are formed with a plurality of signals such as vertical/horizontal synchronous signal, data clock, data enable, and the like.

The readout control device 330 includes: a function which generates a readout address according to a prescribed pattern in accordance with parameter information 251 of the display part 250 supplied from the parameter storage device 340, and a control signal 261 of a scanning-line driving circuit 260 as well as a control signal 281 of a data-line driving circuit 280 from the timing control device 350; a function which gives the readout address to the address bus 295, and reads out pixel data via the data bus 290; and a function which outputs the read out data to the data-line driving circuit 280 as the synthesized image data CM.

The parameter storage device 340 includes a function which stores the parameters required for rearranging data in accordance with the layout of the display part 250 to be described later in more details.

The timing control device 350 includes a function which generates the control signals 261, 281 to be given to the scanning-line driving circuit 260 and the data-line driving circuit 280 of the display panel 220, and outputs those to the readout control device 330, the scanning-line driving circuit 260, and the data-line driving circuit 280. While each of the control signals 261 and 281 is illustrated by a single thick-line arrow in FIG. 63 for the convenience' sake, the signals include a plurality of signals such as a start signal, a clock signal an enable signal, and the like.

The display panel 220 includes: a plurality of scanning lines G1, G2, - - - , Gm, Gm+1 and the scanning-line drive circuit 260; a plurality of data lines D1, D2, - - - , Dn, Dn+1 and the data-line driving circuit 280; and the display part 250 which is formed with a plurality of sub-pixels 240 arranged in n-rows×m-columns.

FIG. 63 is a schematic illustration of the functional structures, and the shapes and the connecting relations of the scanning lines G1, - - - , the data lines D1, - - - , and the sub-pixels 240 will be described later. Although not shown, the sub-pixel 240 includes a TFT as a switching device and a pixel electrode. The gate electrode of the TFT is connected to the scanning line G1, - - - , the source electrode is connected to the pixel electrode, and the drain electrode is connected to the data line D1, - - - . The TFT turns ON/OFF according to the voltages that are supplied to the arbitrary connected scanning lines Gx sequentially from the scanning-line driving circuit 260. When the TFT turns ON, the voltage is written to the pixel electrode from the data line D1, - - - . The data-line driving circuit 280 and the scanning-line driving circuit 260 may be formed on the glass substrate where the TFTs are formed or may be loaded on the glass substrate or separately from the glass substrate by using driving ICs.

In the display part 250 of the display panel 220 of this exemplary embodiment, the data lines D1, - - - are disposed by having the extending direction thereof along the horizontal direction and the scanning lines G1, - - - are disposed by having the extending direction thereof along the vertical direction. This layout relation has an effect of reducing the region other than the display part 250 which contributes to image display (the region so-called "frame"), in a case where the display part 250 is a landscape type (for example, when it is in a laterally long shape of 16:9). Further, there are also effects of increasing the number of sub-pixels of the display part 250 for enabling high resolution and of cutting the cost when the high resolution is achieved. Hereinafter, the reasons thereof will be described by referring to FIG. 66.

FIG. 66 is an example of the display panel having the landscape (laterally long shape) display part 250, which includes driving ICs 280*a*, 280*b* as the data-line driving circuit 280 (FIG. 63) and scanning circuits 260*a*, 260*b* as the scanning-line driving circuit 260 (FIG. 63) formed on the glass substrate (not shown) of the display panel. The scanning circuits 260*a* and 260*b* are formed by using TFTs that are formed by the same process as that of the TFTs used for the switching devices.

Figures 66A, 66B:
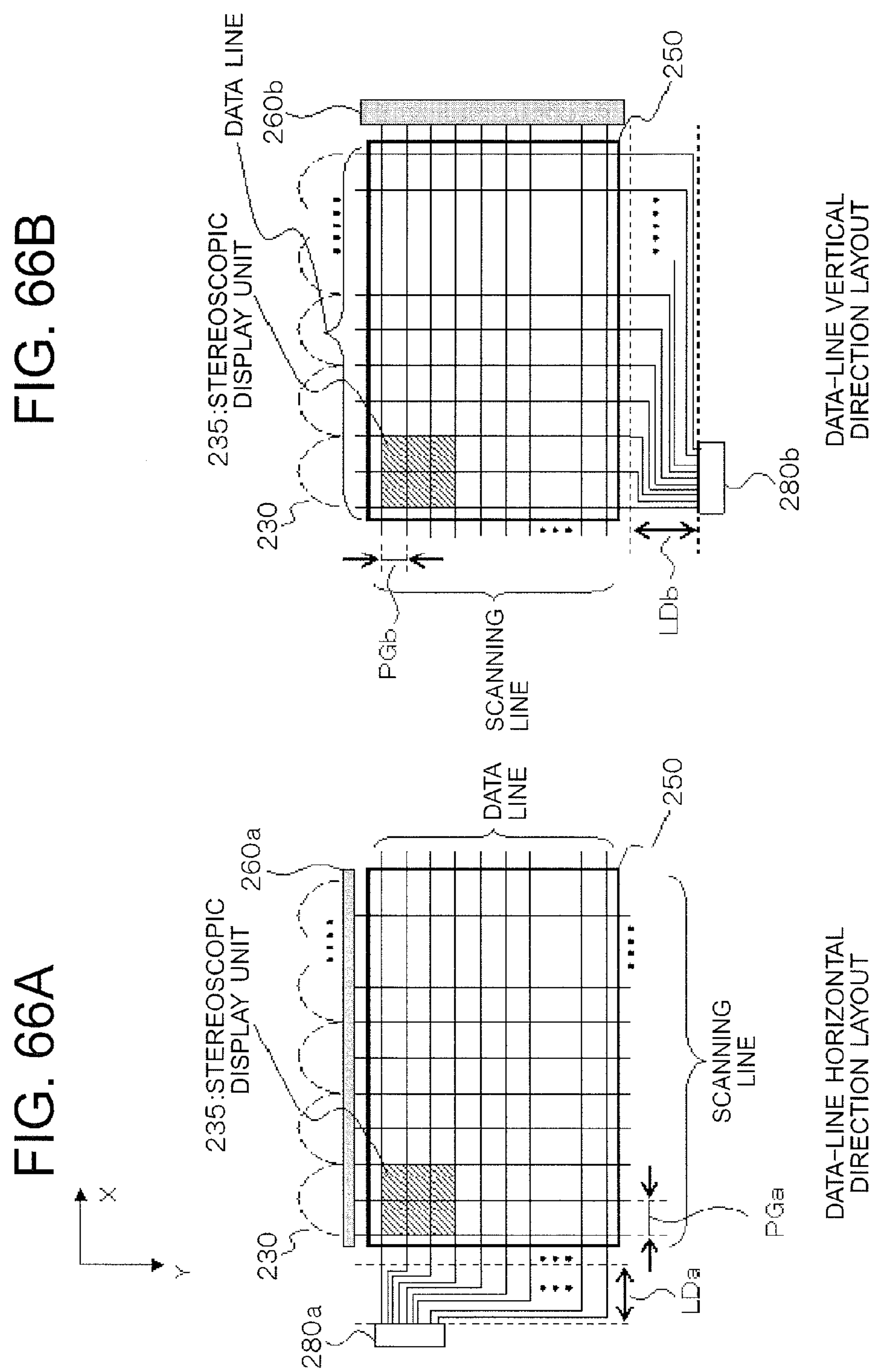
FIGS. 66A and 66B are explanatory diagrams showing the arranging direction of data lines on the display part of the ninth exemplary embodiment.

FIG. 66A shows an example where the data lines are arranged in the horizontal direction (X direction) as in the case of this exemplary embodiment. FIG. 66B shows an example where the data lines are arranged in the vertical direction (Y direction). In both cases of FIG. 66A and FIG. 66B, the lenticular lenses 230 as the image separating devices are so disposed that the image separating direction becomes the horizontal direction (X direction). Further, the sub-pixels (not shown) are disposed in the regions surrounded by the scanning lines and the data lines. The light emitted from the sub-pixels are colored in R (red), G (green), or B (blue) by the color filters (not shown).

In the display device of the ninth exemplary embodiment, the display unit of the first viewpoint image (for the left eye) is formed with sub-pixels of R (red), G (green), and B (blue) and, similarly, the display unit of the second viewpoint image (for the right eye) is formed with sub-pixels of R (red), G (green), and B (blue). Thus, as shown in FIG. 66, a stereoscopic display unit 235 is configured with a total of six sub-pixels, and the pitches of the stereoscopic display unit in the horizontal direction (X direction) and in the vertical direction (Y direction) are the same.

Output pins of the driving ICs 280*a* and 280*b* are connected to the data lines of the display part 250, respectively. In general, the pitch of the output pins of the driving ICs used as the data-line driving circuits are narrower than the pitch of the data lines. Thus, the wirings from the output pins of the driving ICs to each data line exhibits expansions, so that there requires distance LDa, LDb from the display part 250 to the driving ICs 280*a*, 280*b* for the wirings. The distance from the display part to the driving IC can be shortened as the number of the data lines to be connected becomes less, provided that the pitch of the output pins of the driving IC is the same. In a case where the display part is a landscape (laterally long shape) type, there are smaller number of data lines in the case of FIG. 66A where the data liens are arranged in the horizontal direction than the case of FIG. 66B where the data lines are arranged in the vertical direction. Thus, regarding the distance from the display part to the driving IC, the distance LDa is shorter than the distance LDb. That is, the frame can be made smaller by arranging the data lines in the horizontal direction.

Regarding the pitch of the scanning lines, pitch PGa of the scanning lines shown in FIG. 66A is larger than pitch PGb of the scanning line shown in FIG. 66B, since the stereoscopic display unit 235 shown in FIG. 66 is substantially a square shape as described above. When the circuits for driving a single scanning line are configured with the same number of TFTs for the scanning-line driving circuits 260*a* and 260*b* formed by using the TFTs on the glass substrate, the TFTs need to be disposed in the horizontal direction in the case of FIG. 66B where the pitch of the scanning lines is narrower. Further, the number of sub-pixels connected to a single scanning line is larger in the case of FIG. 66B than the case of FIG. 66A, so that the driving power needs to be increased in the case of FIG. 66B. Due to the reasons described above, the short side of the rectangle showing the scanning-line driving circuit 260*a* becomes shorter than the shot side of the scanning-line driving circuit 260*b* when the scanning-line driving circuits 260*a* and 260*b* are schematically expressed with rectangles as in FIG. 66. That is, through arranging the data lines along the horizontal direction, the size of the frame can be reduced.

Further, with the landscape (laterally long shape) display part, the scanning lines can be in shorter lengths compared to the case of FIG. 66B when the scanning lines are arranged in the vertical direction (Y direction) as in the case of FIG. 66A. Thus, when the scanning lines are formed with a metal film of a same width for the cases of FIG. 66A and FIG. 66B, delay time of signal transmission from the scanning-line driving circuit 260*a*, 260*b* generated due to wiring resistance is smaller in the case of FIG. 66A than the case of FIG. 66B. Therefore, the width of the scanning lines can be made narrower in the case of FIG. 66A, thereby making it possible to increase the number of scanning lines per unit area, i.e., making it possible to achieve high resolution.

Furthermore, in a case where the ratio of the horizontal direction and the vertical direction of the stereoscopic display unit 235 forming the display part 250 is 3:2 or more (e.g., laterally long shape of 16:9), the number of sub-pixels driven by the scanning lines becomes less in the case of FIG. 66A than in the case of FIG. 66B. Therefore, with the case of FIG. 66A, the capacitance load becomes smaller than that of FIG. 66B, so that the higher resolution can be achieved. Further, in this case, the number of data lines becomes less in the case of FIG. 66A where the data lines are arranged in parallel. Therefore, when the display part is formed with 1920×1080 of stereoscopic display units, for example, 3,241 (=1080×3+1) data lines are required for the case of FIG. 66A where the data lines are arranged horizontally, while 3,841 (=1920×2+1) data lines are required for the case of FIG. 66B where the data lines are arranged vertically.

When the driving IC of 720 outputs is used for the data-line driving circuit 280, six driving ICs are required with the case of FIG. 66B while only five driving ICs are required for the case of FIG. 66A. That is, the number of driving ICs can be reduced with the case of FIG. 66A where the data lines are arranged horizontally, so that there is an effect of reducing the cost.

Figure 65:
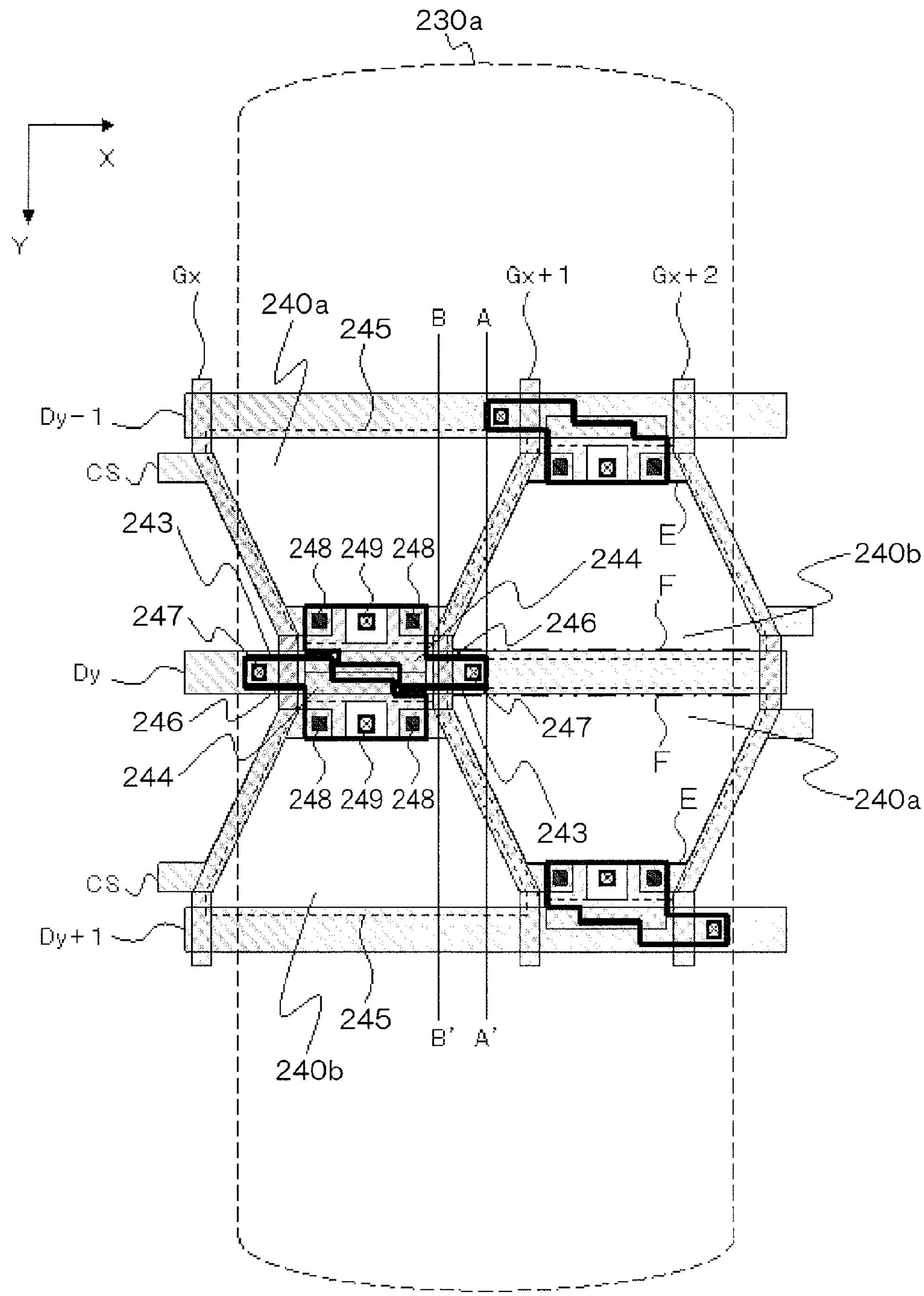
FIG. 65 is a plan view showing a first example of the structure of four sub-pixels which configure a part (2 rows and 2 columns) of a display part according to the ninth exemplary embodiment.

Next, the structure of the sub-pixel 240 which configures the display part 250 will be described by referring to the drawing. FIG. 65 is a top view taken from the observer for describing the structure of the sub-pixel 240 of the exemplary embodiment. The sizes and reduced scales of each structural element are altered as appropriate for securing the visibility in the drawing. In FIG. 65, the sub-pixels 240 are illustrated in two types of sub-pixels 240*a* and 240*b* depending on the facing direction of its shape.

Further, FIG. 65 shows an example in which four sub-pixels forms 2 rows×2 columns of the display part 250 shown in FIG. 63. Regarding the XY axes in FIG. 65, X shows the horizontal direction, and Y shows the vertical direction. Furthermore, in order to describe the image separating direction, the cylindrical lens 230*a* configuring the lenticular lens is illustrated in FIG. 65. The cylindrical lens 230*a* is a one-dimensional lens having a semicylindrical convex part, which does not exhibit the lens effect for the longitudinal direction but exhibits the lens effect for the lateral direction. In this exemplary embodiment, the longitudinal direction of the cylindrical lens 230*a* is arranged along the Y-axis direction to achieve the lens effect for the X-axis direction. That is, the image separating direction is the horizontal direction X.

The aperture part of a total of four sub-pixels 240*a* and 240B shown in FIG. 65 are substantially in a trapezoid form surrounded by three data lines Dy−1, Dy, Dy+1 arranged in parallel in the horizontal direction X and three scanning lines Gx, Gx+1, Gx+2 which are repeatedly bent to the horizontal direction that is the image separating direction. Hereinafter, the substantially trapezoid form is considered a trapezoid, and the short side out of the parallel two sides along the data lines Dy−1, - - - , Dy+1 is called the top side E while the long side is called a bottom side F. That is, regarding the sub-pixel 240*a* and the sub-pixel 240*b*, the trapezoids thereof face towards the opposite directions form each other with respect to the vertical direction Y, i.e., the directions from the respective top sides E to the respective bottom sides F are in an opposite relation.

Each of the sub-pixels 240*a* and 240*b* has a pixel electrode 245, a TFT 246, and a storage capacitance 247. The TFT 246 is formed at the intersection between a semiconductor layer 243 whose shape is shown with a thick line in FIG. 65 and the scanning lines Gx, - - - , Gx+2, and includes a drain electrode, a gate electrode, and a source electrode, not shown. The gate electrode of the TFT 246 is formed at the intersection between the scanning lines Gx, - - - , Gx+2 and the semiconductor layer 243, and connected to the data lines Dy−1, - - - , Dy+1 via a contact hole 47. The source electrode is connected to the pixel electrode 245 whose shape is shown with a dotted line in FIG. 65 via a contact hole 249.

For the source electrode side of the semiconductor layer 243, a storage capacitance is formed by disposing a metal film of the same layer as that of the scanning lines via an insulating film. That is, one of the electrodes forming the storage capacitance 244 is the semiconductor layer 243, and the other electrode is the metal film of the same layer as that of the scanning lines. The other electrode of the storage capacitance 244 is connected to the storage capacitance line CS formed by a metal film of the same layer as that of the data line via the contact hole 248. The storage capacitance lines CS are arranged along the scanning lines and connected to the respective storage capacitances 244 of each of the sub-pixels neighboring along the horizontal direction (X direction) via the contact holes 248.

Further, in a first structural example of the sub-pixels 240 shown in FIG. 65, FIG. 67, and FIG. 68, the other electrodes of the storage capacitances 244 of the sub-pixels neighboring to each other along the vertical direction (Y direction) and connected to the common data line are connected. Therefore, in the first structural example of the sub-pixels 240, the storage capacitance lines CS are electrically connected to the storage capacitances 244 of the sub-pixels lined in both the horizontal and vertical directions as shown in the equivalent circuits of FIG. 67 and FIG. 68.

As shown in FIG. 65, regarding the sub-pixel 240*a* and the sub-pixel 240*b*, the shapes, layouts, and connecting relations of the respective pixel electrodes 245, TFTs 246, contact holes 247, 248, 249, and storage capacitances 244 are in a point-symmetrical relations with each other. That is, on an XY plane, when the sub-pixel 240*a* including each structural element is rotated by 180 degrees, the structural shape thereof matches with that of the sub-pixel 240*b*.

Further, regarding the aperture parts of the sub-pixels 240*a* and 240*b* arranged in the manner described above, it is desirable for the proportions of the aperture parts and the light-shield parts in the Y-axis direction orthogonal to the image separating direction to be substantially constant for the X-axis direction that is the image separating direction. The aperture part is an area contributing to display, which is surrounded by the scanning line, the data line, the storage capacitance line CS, and the semiconductor layer 243. The area other than the aperture part is the light-shield part. Thus, the proportion of the aperture part and the light-shield part in the Y direction is the one-dimensional numerical aperture which is obtained by dividing the length of the aperture part when the sub-pixel 240*a* or the sub-pixel 240*b* is cut in the Y-axis direction by the pixel pitch in the Y-axis direction. Hereinafter, the one-dimensional numerical aperture in the direction orthogonal to the image separating direction is called a longitudinal numerical aperture.

Therefore, "the proportions of the aperture parts and the light-shield parts in the Y-axis direction are substantially constant for the X direction" specifically means that it is so designed that the longitudinal numerical aperture along the line B-B' shown in FIG. 65 becomes almost equivalent to the longitudinal numerical aperture along the line A-A'. The longitudinal numerical aperture along the line B-B' is the value obtained by dividing the length of the aperture of the sub-pixel 240*a* along the line B-B' by the distance between the data line Dy−1 and Dy, and the longitudinal numerical aperture along the line A-A' is the value obtained by dividing the sum of the length of the aperture part of the sub-pixel 240*b* and the length of the aperture part of the sub-pixel 40*a* along the line A-A' by the distance between the data lines Dy−1 and Dy.

The display part of the present invention is configured with the sub-pixels 240*a* and 240*b* having the above-described structure and the features. In the present invention, two sub-pixels 240*a* and 240*b* facing towards the different directions are treated as one structural unit, and the sub-pixels 240*a* and 240*b* which are connected to the common data line and lined in the vertical direction are called "up-and-down sub-pixel pair". Specifically, the sub-pixel 240*a* connected to the scanning line Gx+1 and the sub-pixel 240*b* connected to the scanning line Gx, which are connected to the data line Dy shown in FIG. 65 and arranged along the vertical direction are defined as the "up-and-down sub-pixel pair" and treated as the structural unit of the display part.

Figures 67A, 67B, 67C:
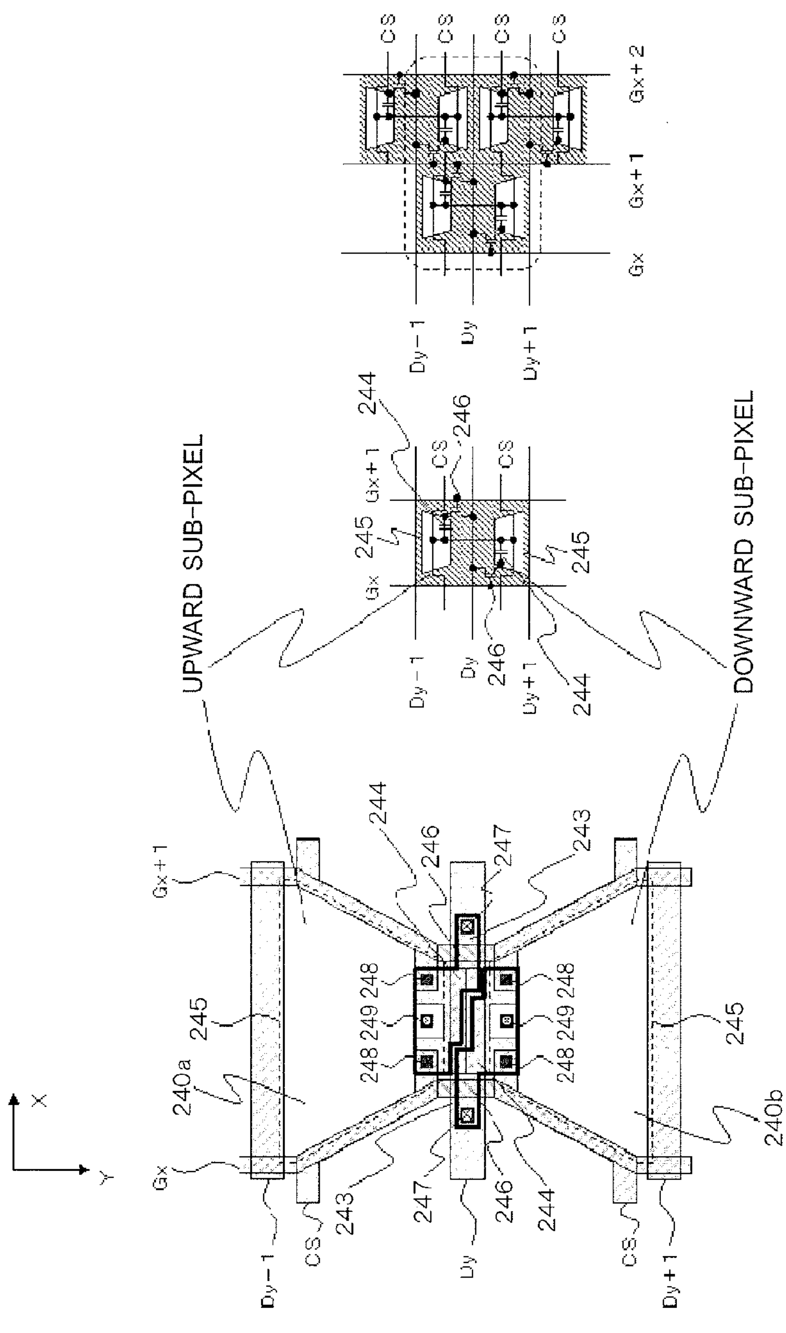
FIGS. 67A, 67B and 67C show a plan view which illustrates a first example of the structure of an up-and-down sub-pixel pair P2R according to the ninth exemplary embodiment, and show circuit diagrams of equivalent circuit 1.

FIG. 67A is a plan view showing the up-and-down sub-pixel pair, which is a block diagram of the up-and-down sub-pixel pair taken from FIG. 65. FIG. 67B is an equivalent circuit of the up-and-down sub-pixel pair shown in FIG. 67A, in which the scanning lines Gy, - - - , the data lines Dx, the pixel electrodes 245, and the TFTs 246 are shown in same reference numerals. The up-and-down sub-pixel pair shown in FIG. 67 is named as the up-and-down sub-pixel pair P2R. FIG. 67C is an illustration which shows FIG. 65 with an equivalent circuit of the up-and-down sub-pixel pair P2R, and the four sub-pixels surrounded by a dotted line correspond to FIG. 65. As shown in FIG. 67C, the four sub-pixels neighboring to each other in FIG. 65 are configured with three up-and-down sub-pixel pairs. This is because the up-and-down sub-pixel pairs neighboring to each other along the extending direction of the data lines Dy, - - - are connected to different data lines Dy, - - - with respect to each other.

The reasons why the exemplary embodiment employing the display part configured with the up-and-down sub-pixel pairs can achieve the high numerical aperture and high image quality in the stereoscopic display device will be described. In order to achieve the high numerical aperture and the high image quality, it is necessary to increase the longitudinal numerical aperture while keeping the constant longitudinal numerical aperture of the pixels regardless of the positions in the image separating direction.

First, it is preferable for the scanning lines and the data lines to be disposed in the periphery of each pixel electrode. This is because there may be dead space that does not contribute to display generated between the wirings, thereby decreasing the numerical aperture, if there is no pixel electrode between scanning lines or the data lines. In this exemplary embodiment, as shown in FIG. 65, the scanning lines Gy, - - - and the data lines Dx. - - - - are disposed in the periphery of each pixel electrode 245.

Further, each of the TFTs 246 of the up-and-down sub-pixel pairs is connected to the respective scanning lines Gx, - - - which are different from each other. Furthermore, regarding the layout of the up-and-down sub-pixel pairs in the horizontal direction, i.e., the layout in the extending direction of the data lines Dy, - - - , the pairs are arranged neighboring to each other while being shifted from each other by one sub-pixel in the vertical direction. Thus, the up-and-down sub-pixel pairs neighboring to each other in the extending direction of the data lines Dy, - - - are connected to the respective data lines Dy, - - - which are different from each other.

With the layout and the connecting relations described above, it becomes possible to suppress the number of necessary wirings and to improve the numerical aperture. Further, the scanning lines are bent towards the image separating direction in order to have the constant longitudinal numerical aperture regardless of the positions along the image separating direction.

As described, the layout of the sub-pixels according to this exemplary embodiment shown in FIG. 65 takes the up-and-down sub-pixel pair shown in FIG. 67 as the structural unit. The display part of this exemplary embodiment configured with a plurality of up-and-down sub-pixel pairs is capable of achieving the high numerical aperture and the high image quality in the stereoscopic display device.

Figures 68A, 68B:
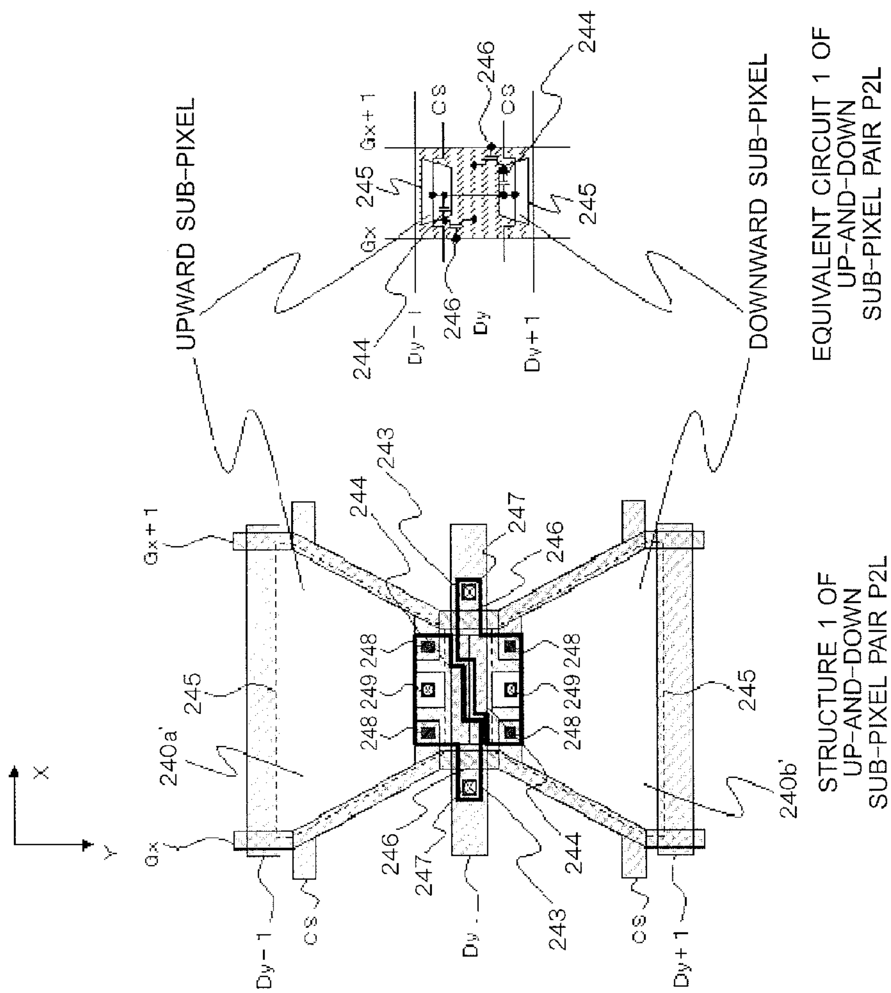
FIGS. 68A and 68B show a plan view which illustrates a first example of the structure of an up-and-down sub-pixel pair P2L according to the ninth exemplary embodiment, and shows circuit diagrams of equivalent circuit 1.

While the structure of the display part according to the exemplary embodiment has been described heretofore by referring to the structure shown in FIG. 63 and FIG. 67, it is also possible to employ the structure of the display part which uses the up-and-down sub-pixel pair P2L that is minor symmetrical with the up-and-down sub-pixel pair P2R shown in FIG. 67. FIG. 68A shows a plan view of the structure of the up-and-down sub-pixel pair P2L, and FIG. 68B shows an equivalent circuit of the up-and-down sub-pixel pair P2L. As shown in FIG. 68A, sub-pixels 240*a*' and 240*b*' configuring the up-and-down sub-pixel pair P2L are line-symmetrical with the sub-pixels 240*a* and 240*b* shown in FIG. 67A with respect to the Y-axis in terms of the shapes, layouts, and connecting relations of the pixel electrodes 245, the TFTs 246, the contact holes 247, 248, 249, the semiconductor layer 243, and the storage capacitances 244 as the structural elements. That is, the up-and-down sub-pixel pair P2R and the up-and-down sub-pixel pair P2L are line-symmetrical with respect to the Y-axis, line-symmetrical with respect to the X-axis, and in a relation of the mirror symmetrical with respect to each other. Therefore, when the up-and-down sub-pixel pairs P2L shown in FIG. 68 configure the display part, it is possible to achieve the same high numerical aperture and high image quality as in the case of the display part configured with the up-and-down sub-pixel pairs P2R.

Note here that the sub-pixels configuring the up-and-down sub-pixel pair connected to a common scanning line are called as "upward sub-pixel" and as "downward sub-pixel" according to the facing direction of the bottom side F of the trapezoid, and the terms are used in the following explanations. That is, within the up-and-down sub-pixel pair P2R shown in FIG. 67, the sub-pixel 240*a* is the "upward sub-pixel", and the sub-pixel 240*b* is the "downward sub-pixel". Similarly, within the up-and-down sub-pixel pair P2L shown in FIG. 68, the sub-pixel 240*a'* is the "upward sub-pixel", and the sub-pixel 240*b'* is the "downward sub-pixel". As described above, the optical effects obtained due to the structures thereof are the same for the up-and-down sub-pixel pairs P2R and P2L. However, the scanning lines Gx, Gx+1 to which the upward sub-pixel pair and the downward sub-pixel pair are connected are inverted. That is, while the sub-pixel 240*a* is connected to the scanning line Gx+1 and the sub-pixel 240*b* is connected to the scanning line Gx, the sub-pixel 240*a'* is connected to the scanning line Gx and the sub-pixel 240*b'* is connected to the scanning line Gx+1.

The display part of the exemplary embodiment may be configured with the up-and-down sub-pixel pairs P2R or with the up-and-down sub-pixel pairs P2L. Further, the display part may be configured by combining the up-and-down sub-pixel pairs P2R and the up-and-down sub-pixel pairs P2L. Hereinafter, a structural example of the display part 250 of the exemplary embodiment shown in FIG. 63 will be described by referring to a case which displays a first viewpoint image (left-eye image) and a second viewpoint image (right-eye image) configured with 4 rows×6 column of pixels. First, input image data will be described by referring to FIG. 69, and the color arranging relation and the image separating device of the display part according to the exemplary embodiment will be described by referring to FIG. 70. A specific example of the display part will be provided after the explanations of FIG. 69 and FIG. 70.

FIG. 69 shows charts of image data of the first viewpoint image (left-eye image) and the second viewpoint image (right-eye image) configured with 4 rows×6 columns of pixels. As described above, M1 is an aggregate of the pixel data from M1 (1, 1) RGB, M1 (1, 2) RGB, to M1 (i, j) RGB. M2 is an aggregate of the pixel data from M2 (1, 1) RGB, M2 (1, 2) RGB, to M2 (i, j) RGB. "1–i" are the row numbers within the image, and "1–j" are the column numbers within the image. In the case of FIG. 69, i=4 and j=6. "RGB" means that it carries the color information of R: red, G: green, and B: blue.

Figure 70:
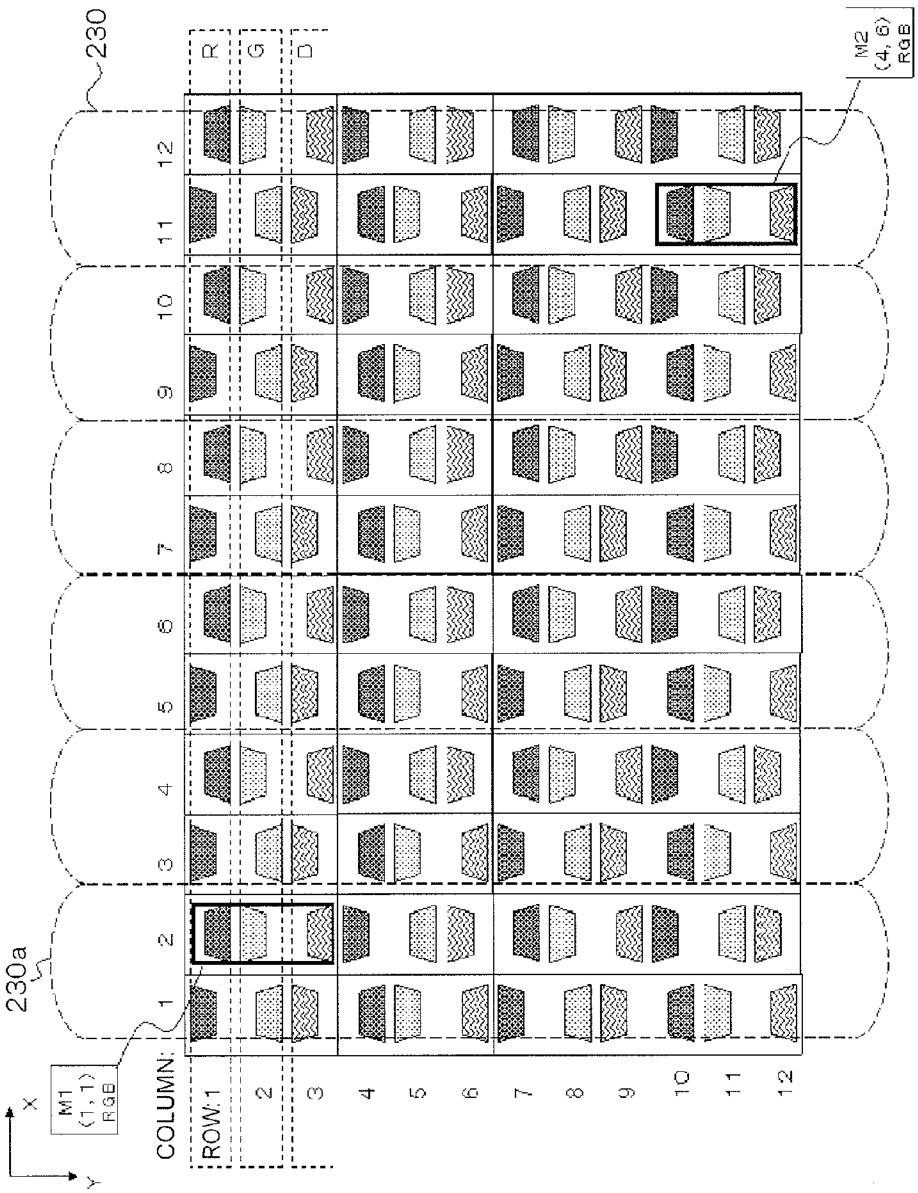
FIG. 70 is a schematic plan view showing a first example of the image separating device layout and the color layout relation according to the ninth exemplary embodiment.

FIG. 70 is an example of the display part 250 which displays two images shown in FIG. 69, showing the layout of the image separating device and the colors of the sub-pixels. Regarding the XY axes in the drawing, X shows the horizontal direction and Y shows the vertical direction.

In FIG. 70, the sub-pixel is illustrated with a trapezoid, and shows examples of colors by applying shadings. Specifically, a red (R) color filter is arranged on a counter substrate of the sub-pixel lined on the first row in the horizontal direction, and the first row functions as the sub-pixels which display red. A green (G) color filter is arranged on a counter substrate of the sub-pixel lined on the second row in the horizontal direction, and the second row functions as the sub-pixels which display green. A blue (B) color filter is arranged on a counter substrate of the sub-pixel lined on the third row in the horizontal direction, and the third row functions as the sub-pixels which display blue. In the same manner, the sub-pixels on the fourth row and thereafter function in order of red, green, and blue with a row unit. The exemplary embodiment can be adapted to arbitrary color orders. For example, the colors may be arranged in order of blue, green, and red from the first row to the third row, and those may be repeated on the rows thereafter.

For the image separating device, the cylindrical lens 230*a* configuring the lenticular lens 230 corresponds to the sub-pixels of two-column unit, and it is arranged in such a manner that the longitudinal direction thereof exhibiting no lens effect is in parallel to the vertical direction, i.e., in parallel to the columns. Thus, due to the lens effect of the cylindrical lenses 230*a* in the X direction, light rays emitted from the sub-pixels on the even-numbered columns and the odd-numbered columns are separated to different directions from each other. That is, as described by referring to FIG. 64, at a position away from the lens plane, the light rays are separated into an image configured with the pixels of the even-numbered columns and an image configured with the pixels of odd-numbered columns. As an example, with this exemplary embodiment in the layouts of FIG. 70 and FIG. 64, the sub-pixels on the even-numbered columns function as the image for the left eye (first viewpoint) and the sub-pixels on the odd-numbered columns function as the image for the right eye.

The color filters and the image separating device are disposed in the above-described manner, so that one pixel of the input image shown in FIG. 69 is displayed with three sub-pixels of red, green, and blue lined on one column shown in FIG. 70. Specifically, the three sub-pixels on the first, second, and third rows of the second column display the upper-left corner pixel data: M1 (1, 1) RGB of the left-eye (first viewpoint) image, and the three sub-pixels on the tenth, eleventh, and twelfth rows of the eleventh column display the lower-right corner pixel data: M2 (4, 6) RGB of the right-eye (second viewpoint) image. Further, it is desirable for the sub-pixel pitch of every two columns and the sub-pixel pitch of every three rows to be equal. It is because there is no degradation in the image quality due to the changes in the resolution under such pitch condition, since the resolution at the time of stereoscopic display that has inputted left and right images as parallax images and the resolution at the time of flat display that has the inputted left and right images as the same images are equal. Further, the same colors are arranged in the direction of the lens effect (i.e., in the image separating direction), so that there is no color separation generated by the image separating device. This makes it possible to provide the high image quality.

Figure 71:
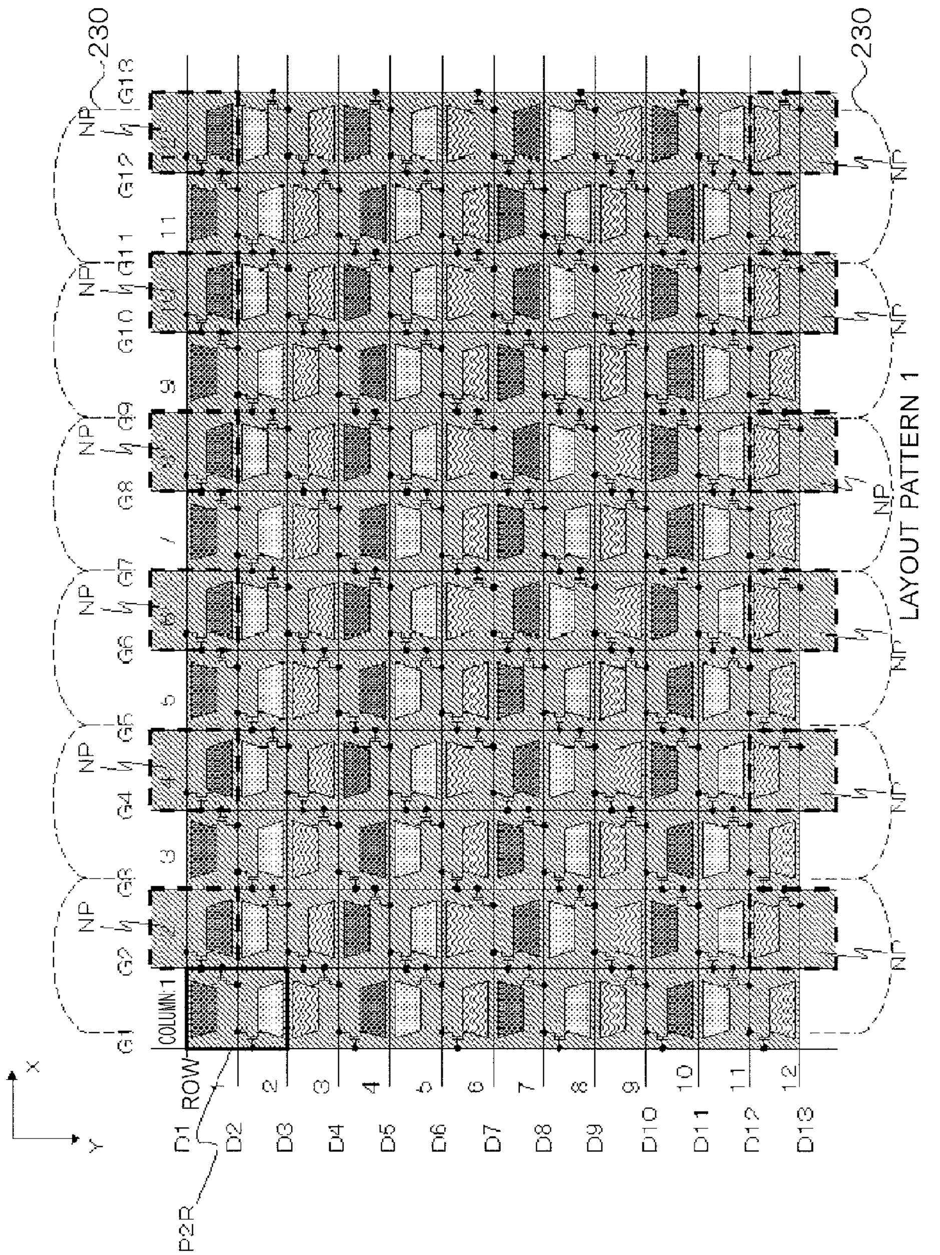
FIG. 71 is a schematic plan view showing a layout pattern 1 of the display part according to the ninth exemplary embodiment.
Figure 72:
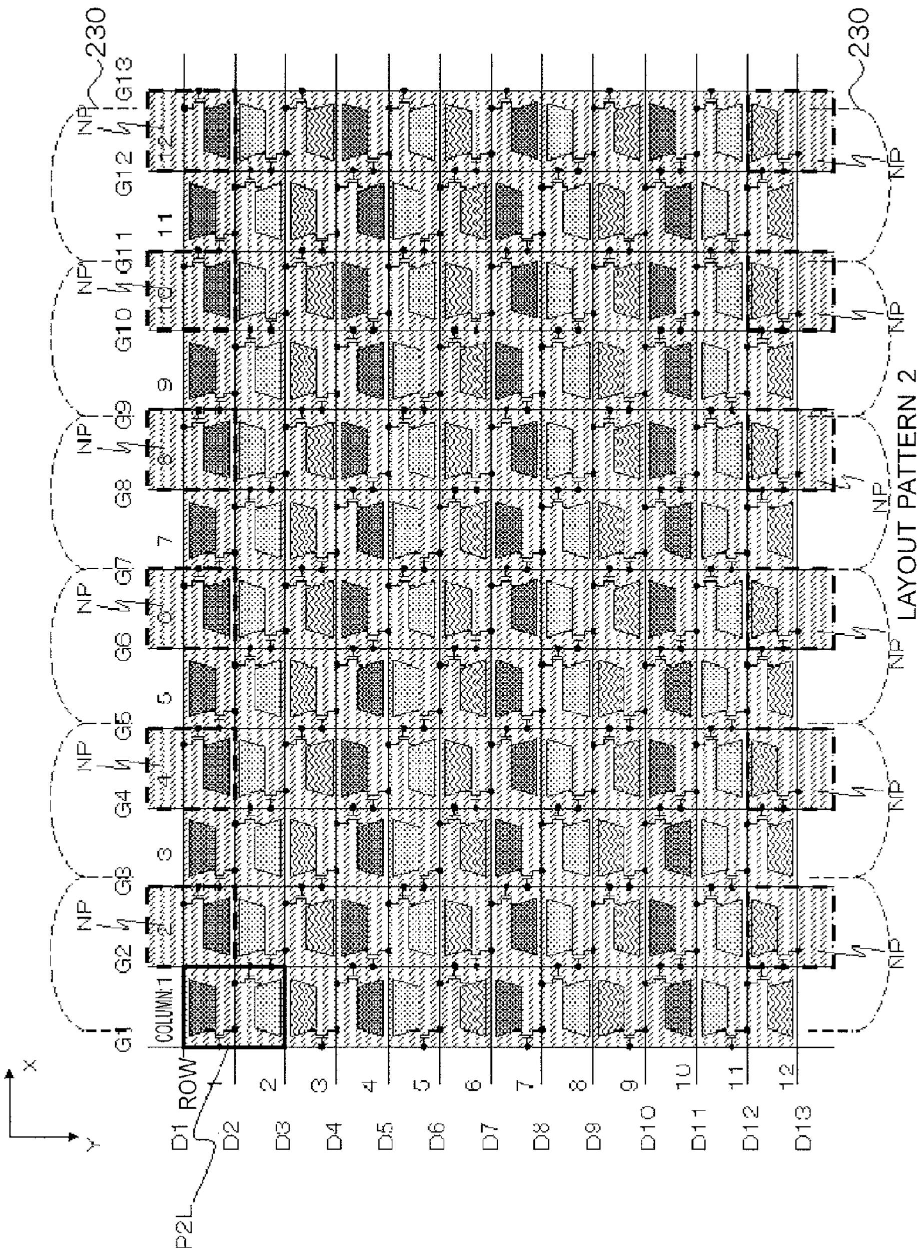
FIG. 72 is a schematic plan view showing a layout pattern 2 of the display part according to the ninth exemplary embodiment.
Figure 73:
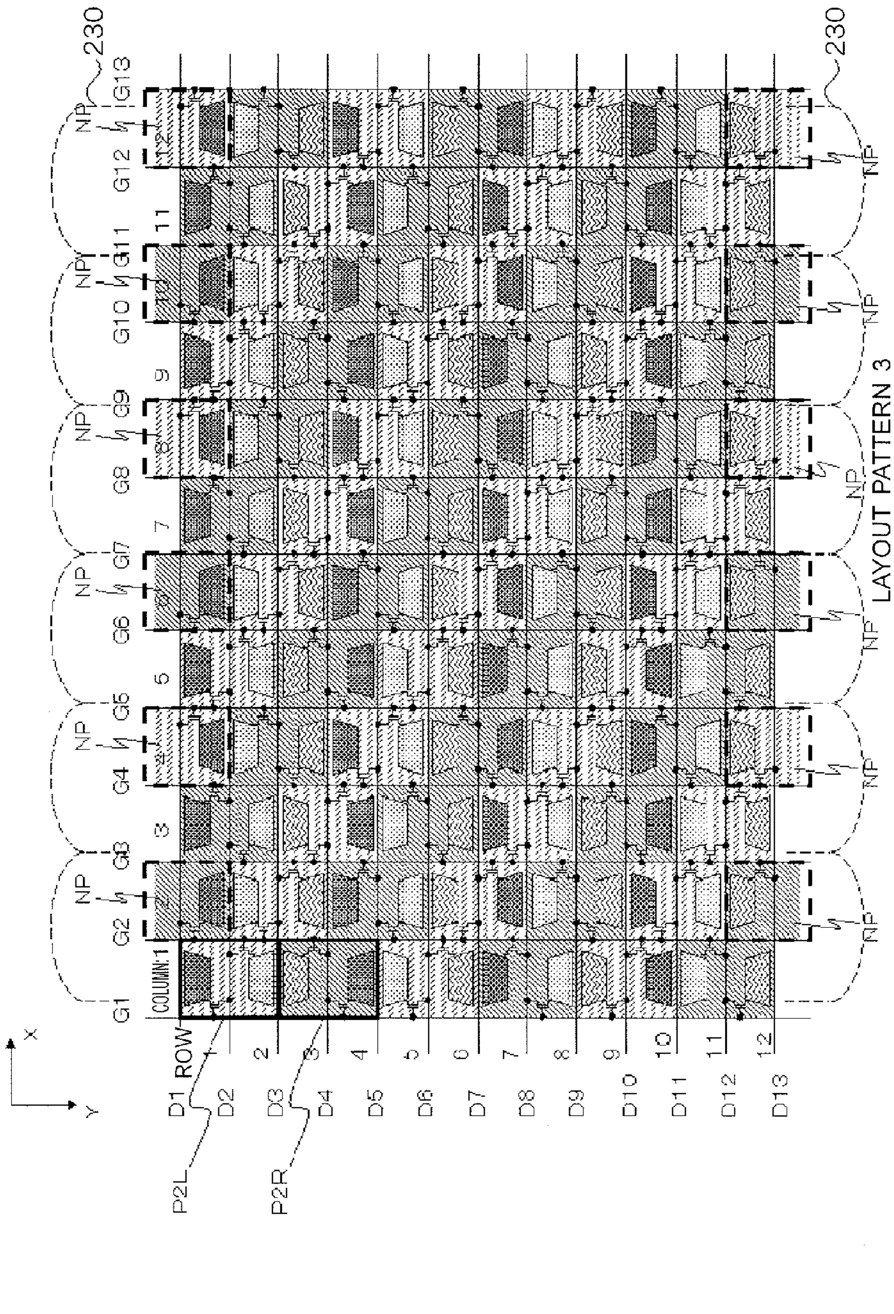
FIG. 73 is a schematic plan view showing a layout pattern 3 of the display part according to the ninth exemplary embodiment.

The connecting relations regarding a plurality of sub-pixels arranged in the matrix shown in FIG. 70 and the scanning lines as well as the data lines, i.e., a specific example for configuring the display part from the up-and-down sub-pixel pairs shown in FIG. 67 and FIG. 68, are shown in FIG. 71-FIG. 73 and will be described hereinafter.

FIG. 71 shows a layout pattern 1 of the display part which is formed with the up-and-down sub-pixel pairs P2R shown in FIG. 67. By having the position where the upward sub-pixel of the up-and-down sub-pixel pair P2R comes on the first row of the first column as the start point, the up-and-down sub-pixel pairs P2R are disposed in the layout pattern 1. At this time, the downward sub-pixels of the up-and-down sub-pixel pairs P2R are disposed on the first row of the even-numbered columns, and the upward sub-pixels of the up-and-down sub-pixel pairs P2R do not configure the display part. Similarly, the upward sub-pixels of the up-and-down sub-pixel pairs are disposed on the twelfth row of the even-numbered columns, and the downward sub-pixels of the up-and-down sub-pixel pairs P2R do not configure the display part. "NP" shown in FIG. 71 shows that sub-pixels that do not configure the display part are not disposed. Further, FIG. 71 corresponds to FIG. 70, shading in each pixel shows the display color, and the sub-pixels on the even-numbered columns function as the left-eye (first viewpoint) sub-pixels while the sub-pixels on the odd-numbered columns function as the right-eye (second viewpoint) sub-pixels by the lenticular lens 230 as optical separating device.

FIG. 72 shows a layout pattern 2 of the display part which is formed with the up-and-down sub-pixel pairs P2L shown in FIG. 68. The layout pattern 2 shown in FIG. FIG. 72 is the same as the layout pattern 1 of FIG. 71 except that the up-and-down sub-pixel pairs P2R are changed to the up-and-down sub-pixel pairs P2L, so that explanations thereof are omitted.

FIG. 73 shows an example of layout pattern 3 which configures the display part with a combination of the up-and-down sub-pixel pairs P2R shown in FIG. 67 and the up-and-down sub-pixel pairs P2L shown in FIG. 68. As shown in FIG. 73, on the first column, by having the position where the upward sub-pixel of the up-and-down sub-pixel pair P2L comes on the first row of the first column as the start point, the up-and-down sub-pixel pair P2L and the up-and-down sub-pixel pair P2R are repeatedly disposed in the Y-axis direction that is the vertical direction. On the second column, by having the position where the downward sub-pixel of the up-and-down sub-pixel pair P2R comes on the first row of the second column as the start point, the up-and-down sub-pixel pair P2R and the up-and-down sub-pixel pair P2L are repeatedly disposed in the Y-axis direction that is the vertical direction. On the third column, by having the position where the upward sub-pixel of the up-and-down sub-pixel pair P2R comes on the first row of the third column as the start point, the up-and-down sub-pixel pair P2R and the up-and-down sub-pixel pair P2L are repeatedly disposed in the Y-axis direction that is the vertical direction. On the fourth column, by having the position where the downward sub-pixel of the up-and-down sub-pixel pair P2L comes on the first row of the fourth column as the start point, the up-and-down sub-pixel pair P2L and the up-and-down sub-pixel pair P2R are repeatedly disposed in the Y-axis direction that is the vertical direction. On the fifth column and thereafter, the layout pattern from the first column to the fourth column is repeated. This layout pattern 3 has an effect of achieving the high image quality in a case where the dot inversion driving method is applied to the polarity inversion driving method. Details thereof will be described later.

As shown in FIG. 71-FIG. 73, the display part configured with 12 rows×12 columns of sub-pixels takes the up-and-down sub-pixel pair as the structural unit, so that it is necessary to have thirteen data lines from D1 to D13 and thirteen scanning lines from G1 to G13. That is, the display part of the exemplary embodiment configured with n-rows×m-columns of sub-pixels is characterized to be driven by (n+1) pieces of data lines and (m+1) pieces of scanning lines. Further, the display part of the exemplary embodiment is formed by having the up-and-down sub-pixel pairs shown in FIG. 67 and FIG. 68 as the structural unit, and it is possible to be structured with various layout patterns other than those shown in FIG. 71-FIG. 73.

However, the difference in the layout pattern influences the polarity distribution of the display part when the liquid crystal panel is driven with the polarity inversion drive. Thus, it is possible to improve the image quality (e.g., suppression of flickers) due to the polarity distribution by selecting the layout patterns. However, as can be seen from FIG. 71-FIG. 73, in the display part of the present invention, the sub-pixels lined on one row in the horizontal direction are connected to two data lines alternately, and the sub-pixels lined on one column in the vertical direction are connected to two scanning lines with a regularity according to the layout pattern. Thus, the polarity distribution thereof obtained according to the polarity inversion driving method is different from that of a typical liquid crystal panel in which the sub-pixels on one row are connected to one scanning line and the sub-pixels on one column are connected to one data line, so that the effect obtained thereby is different as well. Hereinafter, details of the effects obtained for each of the layout patterns of the exemplary embodiment when the polarity inversion driving method of the typical liquid crystal panel is employed will be described.

Figure 74:
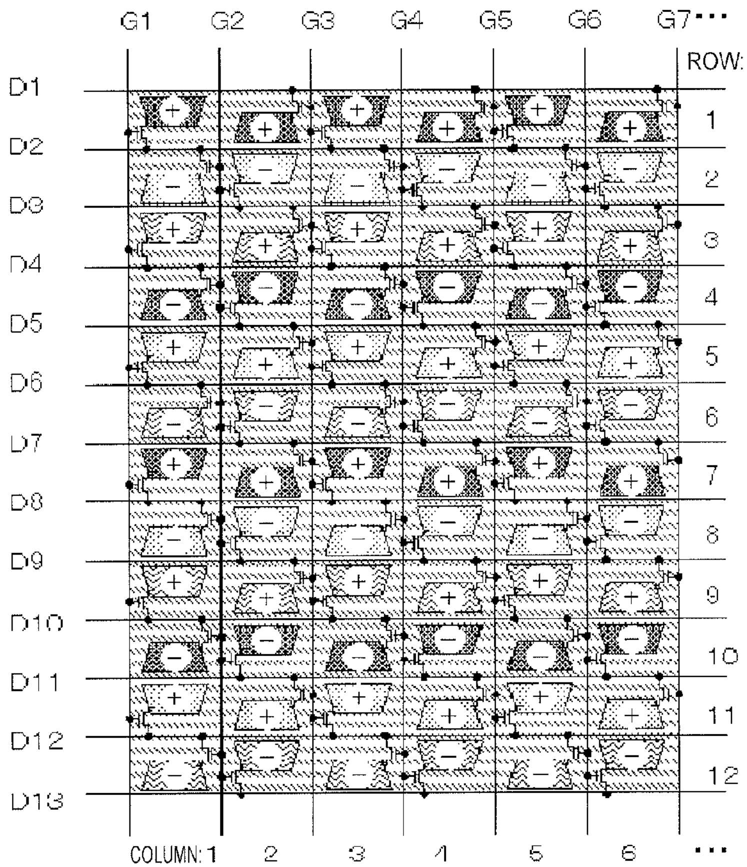
FIG. 74 shows charts showing a polarity distribution when gate line inversion drive is employed to the display part (layout pattern 2)

FIG. 74 shows the polarity distribution of the display part when a gate line inversion drive (1H inversion drive) is employed to the layout pattern 2 shown in FIG. 72, and shows the data line polarity for each scanning line of the gate-line inversion drive. In the illustration, "+" and "−" show the positive/negative polarities of the pixel electrodes and the data lines in an arbitrary frame (a period where scanning of all the scanning lines is done), and negative and positive polarities are inverted in a next frame. The gate line inversion drive is a driving method which inverts the polarity of the data line by each period of selecting one scanning line, which can reduce the resisting pressure of a data-line driving circuit (driver IC for driving data line) by being combined with the so-called common inversion drive which AC-drives the common electrodes on the counter substrate side. Thus, it only requires a small amount of power consumption.

In the polarity distribution when the gate line inversion drive (1H inversion drive) is employed to the layout pattern 2 of the exemplary embodiment, as shown in FIG. 74, the polarities of the sub-pixels forming an arbitrary row are the same and the polarities of the rows before and after thereof are inverted therefrom. That is, it is the same polarity distribution as the case where a typical display panel is driven by the gate line inversion drive (1H inversion drive). Therefore, it is possible to provide the same flicker suppressing effect as the case where the typical panel is drive by the gate line inversion drive for the so-called flickers with which the displayed image is seen with flickering due to the luminance difference generated according to the polarities.

Figure 75:
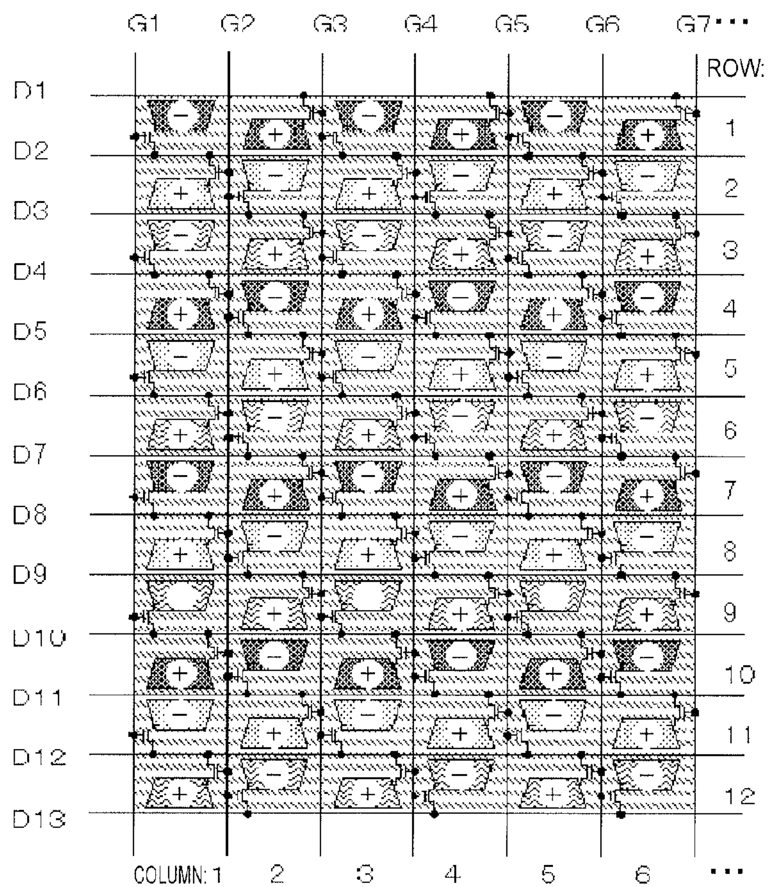
FIG. 75 shows charts showing a polarity distribution when dot inversion drive is employed to the display part (layout pattern 2)

FIG. 75 shows the polarity distribution when the dot inversion drive is employed to the layout pattern 2 shown in FIG. 72, and shows the data line polarity for each scanning line of the dot inversion drive. "+" and "−" in the drawing show the polarity as in the case of FIG. 74. As shown in FIG. 75, the dot inversion drive is a driving method which inverts the polarity by each data line and, further, inverts the polarity of the data line by every selecting period of one scanning line. It is known as a method which suppresses flickers and achieve the high image quality in a typical liquid crystal panel.

When the dot inversion drive is employed to the layout pattern 2 of the exemplary embodiment, the polarities of the odd-numbered columns are the same in a row unit (i.e., the polarities on all the odd-numbered columns on one row are the same) as shown in FIG. 75. This is the same for the even-numbered columns. However, the polarities of the odd-numbered rows and the even-numbered rows on a same row are inverted. Therefore, for each of the separated left-eye image and right-eye image, it is possible to achieve the same flicker suppressing effect as the case of employing the gate line inversion drive (1H inversion drive) to a typical panel. Furthermore, for observation from a region where the left-eye image and the right-eye image projected by the image separating device are not separated but superimposed with each other, the same flicker suppressing effect as the case of employing the dot inversion drive to the typical panel can be achieved.

Figure 76:
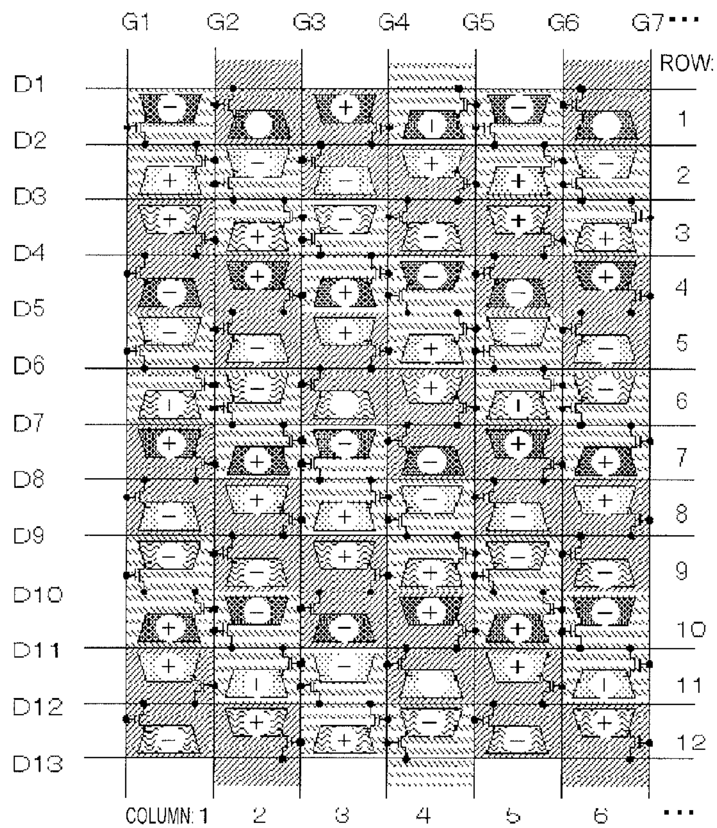
FIG. 76 shows charts showing a polarity distribution when dot inversion drive is employed to the display part (layout pattern 3)

FIG. 76 shows the polarity distribution when the dot inversion drive is employed to the layout pattern 3 shown in FIG. 73, and shows the data line polarity for each scanning line of the dot inversion drive. "+" and "−" in the drawing show the polarity as in the case of FIG. 74.

When the dot inversion drive is employed to the layout pattern 3 of the exemplary embodiment, polarity inversion considering the odd-numbered columns is repeated in an odd-numbered column unit such as on the first row and the third row, the third row and the fifth row, - - - as shown in FIG. 76. Considering the even-numbered columns, the polarity inversion is repeated in an even-numbered column unit on each row. Further, regarding the polarity distribution within an arbitrary column, the polarities of the pixel electrodes of the up-and-down sub-pixel pairs P2L and the up-and-down sub-pixel pairs P2R neighboring to each other in the vertical direction are the same, and the polarity is inverted by every two rows. Thus, the long sides of the pixel electrodes each in a trapezoid form, i.e., the bottom sides of the sub-pixels, come to be in the same polarities. Therefore, it is possible to suppress abnormal alignment of the liquid crystal molecules in the vicinity of the long sides, so that the high image quality can be achieved. Further, for each of the separated left-eye image and right-eye image, the columns where the polarities are inverted for every two rows of sub-pixels in the vertical direction are inverted by a column unit. That is, it is possible to achieve the same flicker suppressing effect as the case of employing the vertical 2-dot inversion drive to a typical panel.

Figure 77:
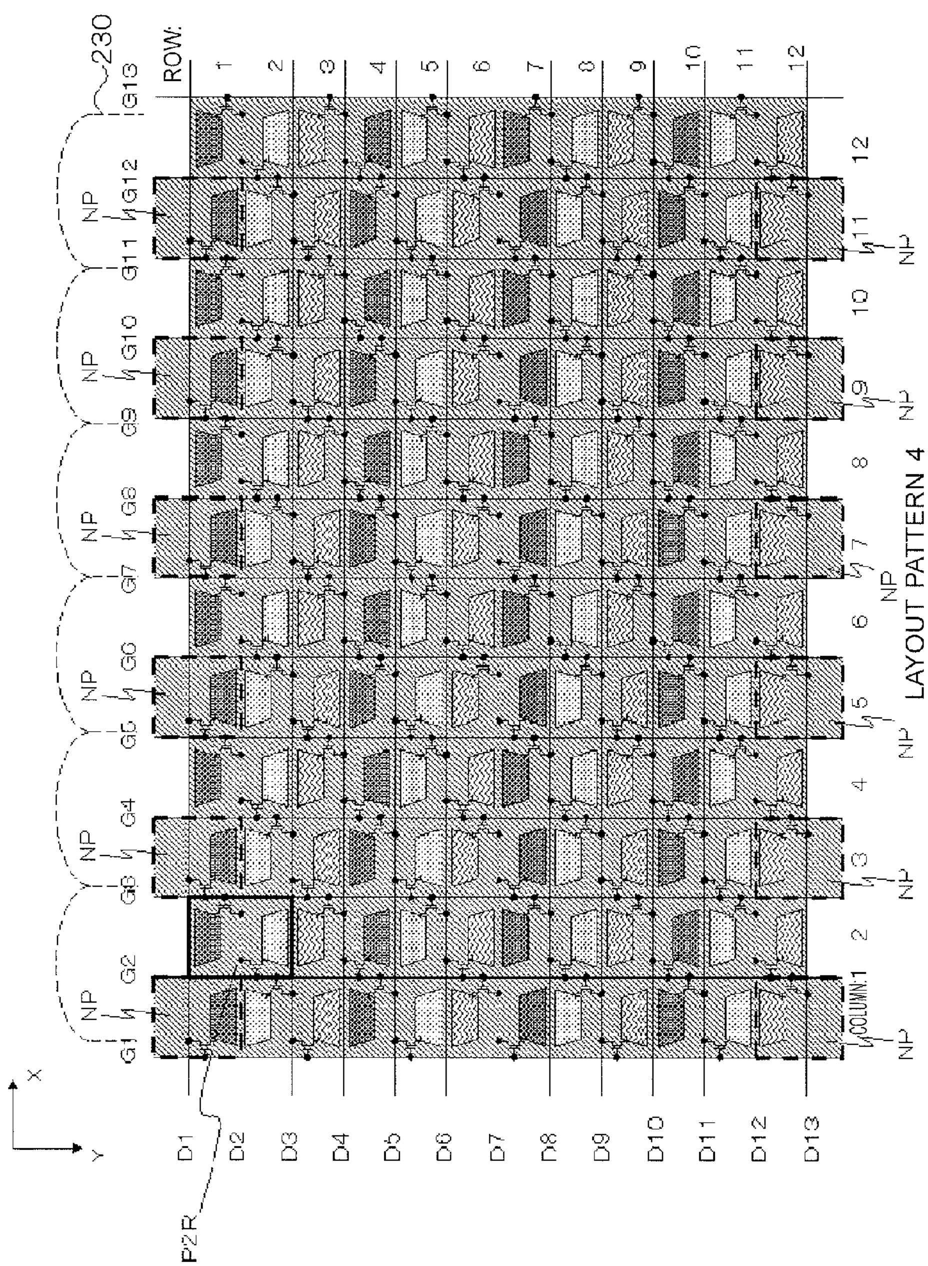
FIG. 77 is a schematic plan view showing a layout pattern 4 of the display part according to the ninth exemplary embodiment.

As described above, the combination of the layout pattern of the display part and the polarity driving method may be selected as appropriate according to the target display quality, the power consumption, and the like. Further, with the display part of the exemplary embodiment, it is also possible to employ layout patterns and polarity inversion driving methods other than those described above as examples. For example, it is possible to employ the layout pattern 4 shown in FIG. 77. With the layout pattern 4, the display part is configured with the up-and-down sub-pixel pairs P2R shown in FIG. 67 by having the position where the upward sub-pixel comes at the first row on the second column as the start point. The layout pattern 4 shown in FIG. 77 and the layout pattern 1 shown in FIG. 71 configured with the same up-and-down sub-pixel pairs P2R are in a relation which is being translated in the horizontal direction by one column.

However, the synthesized image data CM outputted to the data-line driving circuit 280 shown in FIG. 63 needs to be changed in accordance with the changes in the layout pattern. The synthesized image data CM is the image data synthesized from input images M1 and M2, which is the data inputted to the data-line driving circuit 280 for writing the voltage to each pixel electrode of the display part 250 which is configured with the sub-pixels of n-rows×m-columns. That is, the synthesized image data CM is the data obtained by rearranging each of the pixel data configuring the input image data M1 and M2 to correspond to the data lines from D1 to Dn+1 by each of the scanning lines from G1 to Gm+1, and it is expressed with a data structure of (Dn+1) rows and (Gm+1) columns.

Therefore, as can be seen from the layout patterns 1 to 4 shown in FIG. 71-FIG. 73 and FIG. 77, the synthesized image data CM becomes different even with the sub-pixel designated on a same row and same column since the connected data lines or the scanning lines vary depending on the layout patterns.

As specific examples, FIG. 78-FIG. 81 show the synthesized image data when the input image data configured with a plurality of pixel data shown in FIG. 69 is displayed on the display parts of the layout patterns 1-4 while the lenticular lens 230 as the image separating device is arranged. FIG. 78-FIG. 81 show the viewpoint, the positions, and colors of the input image data to be supplied to an arbitrary data line Dy when an arbitrary scanning line Gx is selected. M1 and M2 are viewpoint images, (row number, column number) shows the position within the image, and R/G/B shows the color. Further, "x" mark indicates that there is no pixel electrode. Naturally, there is no input data M1, M2 corresponding to "x" mark and no pixel electrode to which the supplied data to be reflected, so that the data to be supplied to "x" mark is optional.

The synthesized image data CM can be generated based on the parameters determined by designing, such as color layout of the color filters shown in FIG. 70, the layout patterns shown in FIG. 71-FIG. 73 and FIG. 77, and setting of the image separating device to be described later, and based on the connection regularity of the up-and-down sub-pixel pairs in a unit of data line as well as the regularity in a unit of scanning line.

The regularity in a unit of data line will be described. In the exemplary embodiment, viewpoint images M1/M2 that the even/odd of the scanning lines are to display are designated. This is because of the reason as follows. That is, in the layout of the up-and-down sub-pixel pairs configuring the display part, the up-and-down sub-pixel pairs sharing the same data line cannot be lined side by side on two columns but necessarily arranged on every other column. That is, even/odd of the data lines correspond to even/odd of the columns where the sub-pixels are arranged in the Y direction. Further, designation of the viewpoint images M1/M2 is determined by a column unit of the sub-pixels according to the layout of the image separating device whose image separating direction is the X direction.

Figure 82:
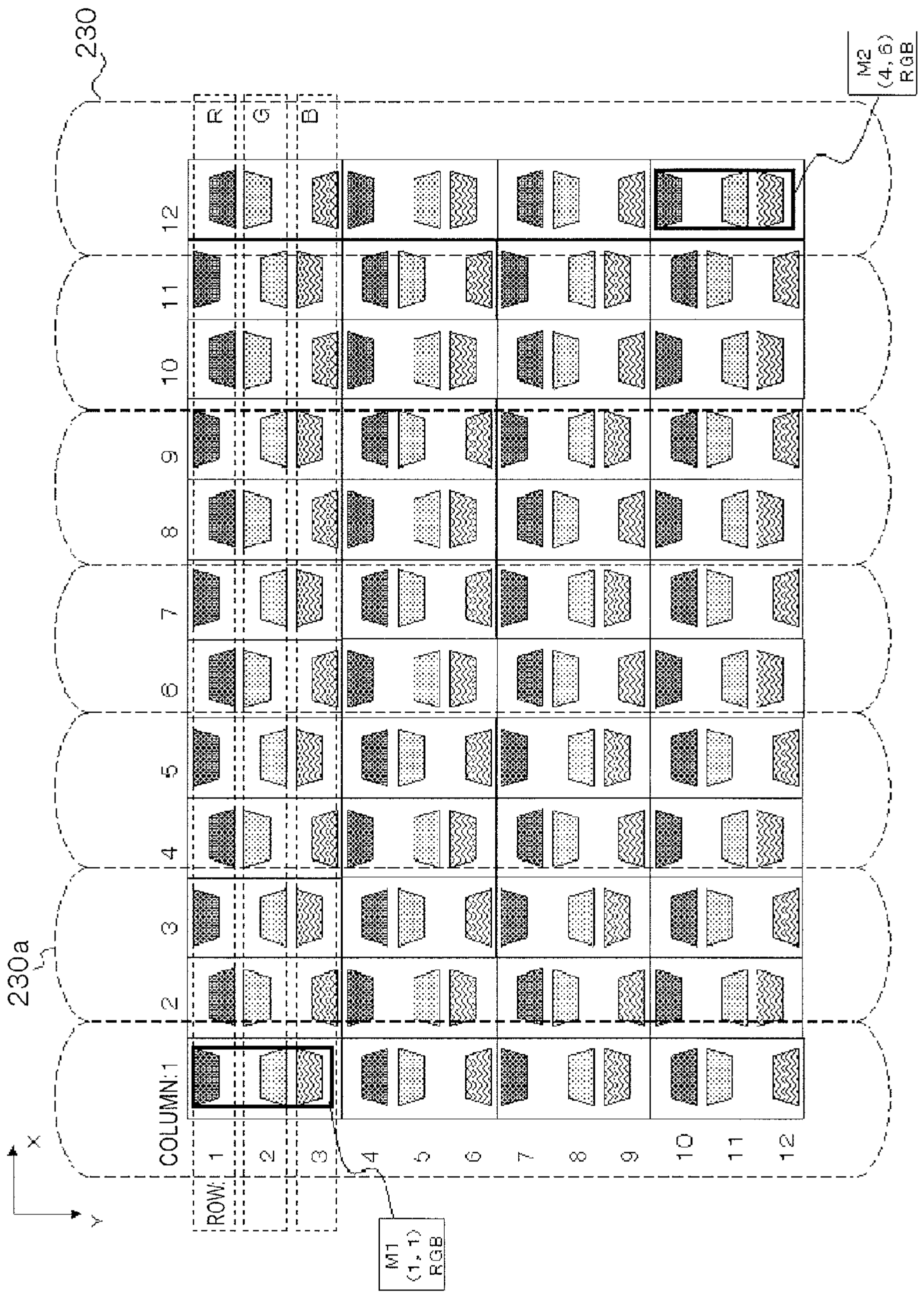
FIG. 82 is a schematic plan view showing a second example of the image separating device layout and the color layout relation according to the ninth exemplary embodiment.

That is, the factors for determining the even/odd of the scanning lines and the viewpoint images M1/M2 are the layout pattern and the layout of the image separating device. For example, in the layout pattern 1 (FIG. 71) and the layout pattern 4 (FIG. 77) where the image separating devices are disposed in the same manner with respect to the column numbers of the sub-pixels, the corresponding relations regarding even/odd of the data lines and the viewpoint images M1/M2 are inverted from each other as it can also be seen from the synthesized image data 1, 4 (FIG. 78 and FIG. 81). Further, the image separating device is not limited to be placed in the manner shown in FIG. 70 but may also be placed in the manner as shown in FIG. 82, for example. In FIG. 70, as described above, the first column is M2 and the second column is M1, i.e., the sub-pixels on the odd-numbered column are M2 and the sub-pixels on the even-numbered columns are M1. Inversely, in the case of FIG. 82, the first column is M1 and the second column is M2, i.e., the sub-pixels on the odd-numbered column are M1 and the sub-pixels on the even-numbered columns are M2. As described, even/odd of the columns where the viewpoint images M1/M2 are displayed is determined depending on the layout of the image separating device.

The relation between the even/odd of the data lines and the viewpoint images M1/M2 determined in the manner described above is summarized in FIG. 83. In FIG. 83, a viewpoint of an input image to which the odd-numbered data line corresponds is shown with “v1”, and a viewpoint of an input image to which the even-numbered data line corresponds is shown with “v2”. The corresponding relations regarding even/odd of the data lines and the viewpoints images M1/M2 described by referring to the cases of the layout pattern 1 (FIG. 71) and the layout pattern 4 (FIG. 77) is determined whether the sub-pixel located on the first row of the first column on the display part is the upward sub-pixel or the downward sub-pixel. It is assumed here that the facing directions (upward or downward) of the sub-pixel to be placed on the first row of the first column is a variable “u”, and the sub-pixel on the first row of the first column is the upward sub-pixel when u=0 while the sub-pixel on the first row of the first column is the downward sub-pixel when u=1. For example, FIG. 83 shows that, when the image separating device is so disposed that the odd-numbered columns of the display part are M1 and the even-numbered columns are M2, and that the sub-pixel on the first row of the first column in the display part is the upward sub-pixel (u=0), “v1=2 and v2=1” applies. That is, the viewpoint images on the odd-numbered data lines are M2, and the viewpoint images on the even-numbered data lines are M1.

R/G/B to be the color of the first row is determined by the color filter. One data line is connected to the sub-pixels of two rows. Thus, the regularity of the colors corresponding to an arbitrary data line is determined when the color on the first row determined by the color filter and the order of colors are determined. For example, as shown in the layout patterns 1-3 (FIG. 71-FIG. 73) and the layout pattern 4 (FIG. 77) described above, in the coloring order of R (red), G (green), and B (blue) continued from the first row, the sub-pixels connected to the data line D3 are G and B, and the sub-pixels connected to the data line D4 are B and R. That is, when the coloring order is determined, the two colors corresponding to arbitrary data line are determined. Considering the repetition of three colors of RGB formed by the color filters in addition to the repetition of the correspondence of the viewpoint images based on even/odd of data lines described above, there is a periodicity of six data line unit in the regularity of designating the input image data.

Further, an arbitrary data line Dy is connected to sub-pixels on the (y−1)-th row and y-th row of the display part (note that there is no 0-th row and (n+1)-th row in the display part configured with sub-pixels of n-rows and m-columns). For the connections between the data lines and the sub-pixels, the upward pixel of the up-and-down sub-pixel pair connected to Dy is on the (y−1)-th row and the downward pixel is on the y-th row. Therefore, as described above, the row number is also designated in addition to designation of the viewpoint number “k” and the colors (R/G/B) in the input image data “Mk (row, column) RGB” shown in FIG. 69. Hereinafter, the row number of arbitrary pixel data of input image data is expressed as “Iy”, and the column number thereof is expressed as “Ix”.

The relation between the arbitrary data line Dy and the input image data described above are summarized in FIG. 84. When the data line number is expressed by using an arbitrary natural number “p”, the row number Iy of the input image data corresponding to the data line Dy(p) is determined according to “p” as shown in FIG. 84. Further, the viewpoint numbers of the input image data corresponding to the data line Dy(p) are shown by using “v1” and “v2” which are determined by FIG. 83. Furthermore, the colors of the input image data corresponding to the data line Dy(p) are put into parameters and shown as C1 for the color on the first row of the display part, C2 for the color on the second row, C3 for the color on the third row, C1 for the color on the fourth row, - - - . When the colors are in order of RGB from the first row, the colors are C1=R, C2=G, and C3=B.

Next, the regularity in a unit of scanning line will be described. As can be seen from the layout patterns 1-4 shown in FIG. 71-FIG. 73 and FIG. 77, an arbitrary scanning line Gx is connected to sub-pixels on two columns of (x−1)-th column and x-th column (note that there is no 0-th column and (m+1)-th column in the display part configured with sub-pixels of n-rows and m-columns). With the image separating device, the sub-pixels on each column correspond to the viewpoint images M1 and M2. Thus, the viewpoint image on the (x−1)-th column and the viewpoint image on the x-th column to which the scanning line Gx is connected are determined based on the layout of the image separating device and even/odd of the scanning lines. For example, in the cases of FIG. 71-FIG. 73 and FIG. 77 where the image separating devices are arranged as in FIG. 70, the (x−1)-th column corresponds to the viewpoint image M1, and the x-th column corresponds to the viewpoint image M2 when the scanning line Gx is the odd-numbered scanning line. When the scanning line Gx is the even-numbered scanning line, the (x−1)-th column corresponds to the viewpoint image M2, and the x-th column corresponds to the viewpoint image M1. Further, when the image separating device is placed as in FIG. 82, for example, the (x−1)-th column corresponds to the viewpoint image M2, and the x-th column corresponds to the viewpoint image M1 when the scanning line Gx is the odd-numbered scanning line. When the scanning line Gx is the even-numbered scanning line, the (x−1)-th column corresponds to the viewpoint image M1, and the x-th column corresponds to the viewpoint image M2.

As described above, an arbitrary scanning line Gx designates the viewpoint number “k” as well as the column number of the input image data “Mk (row, column) RGB” shown in FIG. 69. FIG. 85 shows the scanning lines, the viewpoint images, and the column numbers of the layout patterns 1-4 shown in FIG. 71-FIG. 73 and FIG. 77. Note here that the viewpoint images M1 and M2 shown in FIG. 85 are determined by the layout of the image separating device and even/odd of the data lines. That is, when even/odd of the data line can be known, the viewpoint image can be determined from FIG. 83. Therefore, the relation regarding the column number of the input image data on even/odd data line with respect to the arbitrary scanning line Gx may be derived. From FIG. 85, it can be seen that there is a periodicity of every two scanning lines between the column number of the input image data corresponding to the (x−1)-th column of the display part and the column number of the input image data corresponding to the x-th column of the display part. Thus, the scanning line number is expressed by using an arbitrary natural number “q”, and the column number “Ix” of the input image data corresponding to the scanning line Gx(q) is expressed with “q”.

FIG. 86 shows the summary of the relation regarding the scanning lines and the column numbers of the input image data by using the natural number “q” mentioned above. Note here that the (x−1)-th column and the x-th column of the display part to which the arbitrary scanning line Gx is connected can be expressed with even/odd of the scanning line, the variable “u” showing the “upward” or “downward” of the sub-pixels disposed on the first row of the first column, and even/odd of the data line by using the relation with respect to the viewpoint images. For example, in the layout patterns 1-3 shown in FIG. 71-FIG. 73, “u=0”. The sub-pixel on the (x−1)-th column to which the even-numbered scanning line Gx is connected is connected to the even-numbered data line, and the sub-pixel on the x-th column to which the even-numbered scanning line Gx is connected is connected to the odd-numbered data line. Further, in the layout patterns 1-3 shown in FIG. 71-FIG. 73 where "u=0", the sub-pixel on the (x−1)-th column to which the odd-numbered scanning line Gx is connected is connected to the odd-numbered data line, and the sub-pixel on the x-th column to which the odd-numbered scanning line Gx is connected is connected to the even-numbered data line. Furthermore, in the layout pattern 4 shown in FIG. 77, for example, "u=1". The sub-pixel on the (x−1)-th column to which the even-numbered scanning line Gx is connected is connected to the odd-numbered data line, and the sub-pixel on the x-th column to which the even-numbered scanning line Gx is connected is connected to the even-numbered data line. Further, in the case of FIG. 77 where "u=1", the sub-pixel on the (x−1)-th column to which the odd-numbered scanning line Gx is connected is connected to the even-numbered data line, and the sub-pixel on the x-th column to which the odd-numbered scanning line Gx is connected is connected to the odd-numbered data line. When the arbitrary natural number "q" is used and the above-described relations are employed to FIG. 85, the column numbers of the input image data corresponding to the scanning line Gx(q) can be determined by "q" as shown in FIG. 86.

Heretofore, the relations regarding the viewpoints of input image data corresponding to the upward/downward sub-pixels connected to arbitrary data lines, the column numbers, and the colors are shown in FIG. 83 and FIG. 84, and the relation regarding arbitrary scanning lines and the column numbers of the input image data is shown in FIG. 86. Therefore, when the sub-pixel connected to an arbitrary data line Dy and scanning line Gx can be identified whether it is the upward sub-pixel or the downward sub-pixel, it is possible to generate synthesized image data CM. That is, it is necessary to have information regarding the layout pattern.

As has been described earlier, the display part of the exemplary embodiment uses the up-and-down sub-pixel pair as the structural unit, and is formed with the up-and-down sub-pixel pairs P2R shown in FIG. 67, the up-and-down sub-pixel pairs P2L shown in FIG. 68, or a combination of the up-and-down sub-pixel pairs P2R and the up-and-down sub-pixel pairs P2L. Therefore, as the information regarding the layout patterns, it simply needs to store whether the up-and-down pixel connected to an arbitrary data line Dy and an arbitrary scanning line Gx is the up-and-down sub-pixel pair P2R or P2L.

FIG. 87 shows the up-and-down sub-pixel pairs P2R and P2L connected to the data line Dy and the scanning line Gx in the case of the layout pattern 3 shown in FIG. 73. In FIG. 87, the up-and-down sub-pixel pair P2R is shown as "0", the up-and-down sub-pixel pair P2L is shown as "1", and "x" mark means that there is no connected up-and-down sub-pixel pair. Thus, the vale of a section shown with "x", e.g., the value of (D1, G1), may be "0" or "1". With this, in the case of FIG. 87, there is a repeated pattern with a unit of four data lines and a unit of four gate lines.

FIG. 88 shows a pattern of the up-and-down sub-pixel pairs P2R and P2L with the layout pattern 3 while paying attention to the repetitions described above. In FIG. 88, the pattern is shown with lower bits by expressing Dy and Gx with binary numbers. Also, FIG. 88 shows patterns of the up-and-down sub-pixel pairs P2R and P2L with the layout patterns 1, 4, and 2 by using the lower 2 bits. The connecting relations of the data lines Dy, the scanning lines Gx, and the up-and-down sub-pixel pairs in accordance with the layout patterns shown in FIG. 88 are stored as lookup tables LUT which take Dy and Gx as variables, and return values of "0" and "1". With this, it is possible to identify whether the up-and-down sub-pixel pair connected to an arbitrary data line Dy and an arbitrary scanning line Gx is P2R or P2L from LUT (Dy, Gx).

By combining LUT (Dy, Gx) shown in FIG. 88 with even/odd of the scanning lines and the data liens, the facing directions (upward/downward) of the sub-pixels to be connected to an arbitrary scanning line and data line can be determined as shown in FIG. 89. When the upward pixels and downward pixels shown in FIG. 84 are replaced with LUT (Dy, Gx) and even/odd of the scanning lines, the relation shown in FIG. 90 can be obtained.

As described above, the synthesized image data CM can be generated from the information shown in FIG. 83, FIG. 88 and the regularities shown in FIG. 86, FIG. 89.

FIG. 91 summarizes the parameter variables required for generating the synthesized image data and specific example of the variable contents (layout pattern 3). At least one set of parameter sets shown in FIG. 91 is saved in the parameter storage device 340 shown in FIG. 63 to be used for generating the synthesized image data. As described, through saving the parameters required for generating the synthesized image data, it is possible to correspond to changes in the design of the display part by changing the parameters. It is also possible to switch the parameters according to the changes in the display module to be driven by saving a plurality of parameters. This makes it possible to reduce the number of steps for changing the parameters.

(Explanations of Actions)

Actions of the exemplary embodiment will be described by referring to the drawings. FIG. 92-FIG. 100 are flowcharts showing an example of display action of the display device according to the exemplary embodiment.

(Step S1000)

Figure 92:
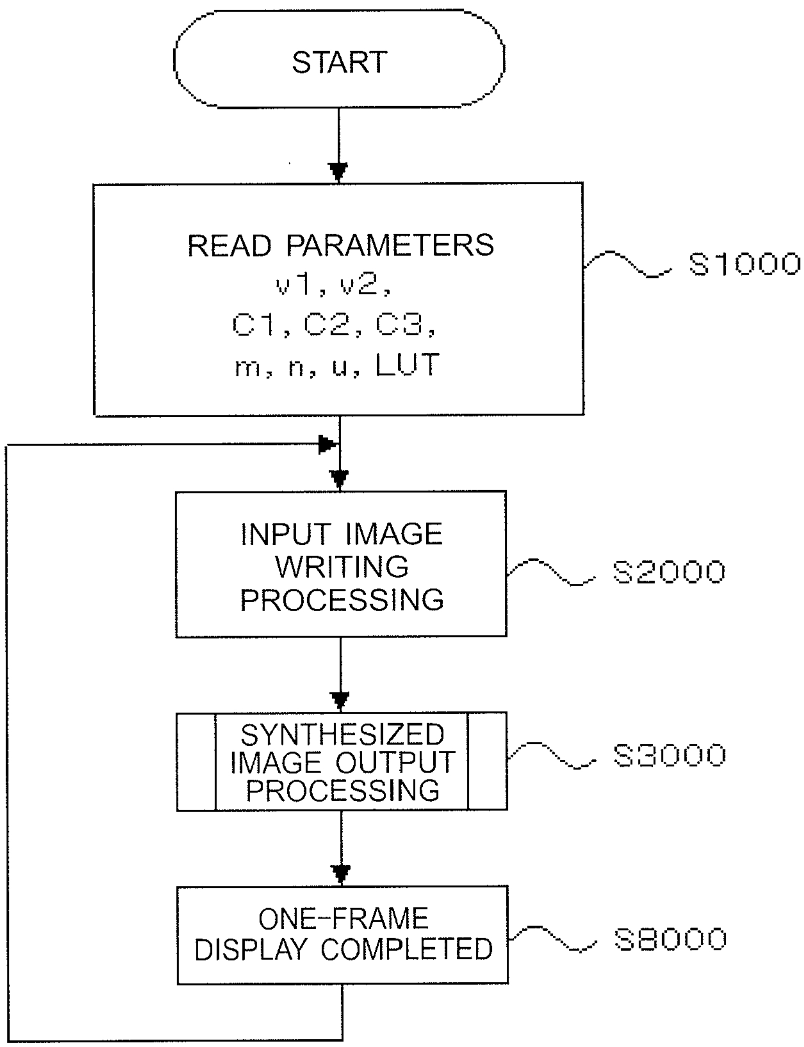
FIG. 92 is a flowchart showing the outline of actions of the display device according to the ninth exemplary embodiment executed for each frame.

As shown in FIG. 92, when the action of the display device according to the exemplary embodiment is started, various kinds of parameters required for generating the synthesized image are read from the parameter storage device 340 shown in FIG. 63. The viewpoint "v1" of the input image to which the odd-numbered data line corresponds, the viewpoint "v2" of the input image to which the even-numbered data line corresponds, colors CL1, CL2, CL3 which show the color order by the color filters in a row unit, the row number "n" and the column number "m" having a sub-pixel of the display part 250 as a unit, "u" which shows the facing direction of the sub-pixel t positioned on the first row of the first column of the display part 250, and LUT showing the layout pattern of the up-and-down sub-pixel pairs configuring the display part 250 are set to the readout control device 330

(Step S2000)

The input image data having the image data M1, M2 configured with image data of i-rows and j-columns and the synchronous signals are inputted to the writing control device 310 from outside. The writing control device 310 sequentially generates addressees of the inputted pixel data from M1 (1, 1) RGB to M1 (i, j) RGB and from M2 (1, 1) RGB to M2 (i, j) RGB by utilizing the synchronous signals, and stores the addresses in the image memory 320. Therefore, it is possible to select arbitrary viewpoint images M1/M2, positions (row Iy, column Ix), each color (R/G/B) luminance data from the input image data stored in the image memory 320 by designation of the address. That is, data readout can be done via the addresses given by the writing control device 310. Explanations regarding a specific address map inside the memory are omitted, since it only needs to be able to identify the viewpoint images of the input image data, position, and each color luminance data. The image memory 320 has regions at least for two screens of the synthesized image data to be outputted, and alternately uses the readout screen region and the write screen region.

(Step S3000)

The input image data (viewpoint images M1, M2) stored in the image memory 320 shown in FIG. 63 are read out by the readout control device 330 according to a prescribed pattern, rearranging processing is performed, and the synthesized image data CM is outputted to the data-line driving circuit 280 of the display panel 220. The actions of synthesized image output processing will be described separately by referring to a flowchart shown in FIG. 93.

(Step S8000)

When the readout and rearranging processing is completed, one-frame display action is completed. The procedure is returned to step S2000, and the above-described actions are repeated.

In FIG. 92, the input image writing processing (step S2000) and the readout and rearranging processing (step S3000) are illustrated in order for convenience' sake. However, as has been described in step S1100, the image memory 320 has the regions for two screens. Therefore, actually, the writing processing in a given frame Fn and readout and rearranging processing of a frame Fn−1 already written to the image memory are executed in parallel.

Figure 93:
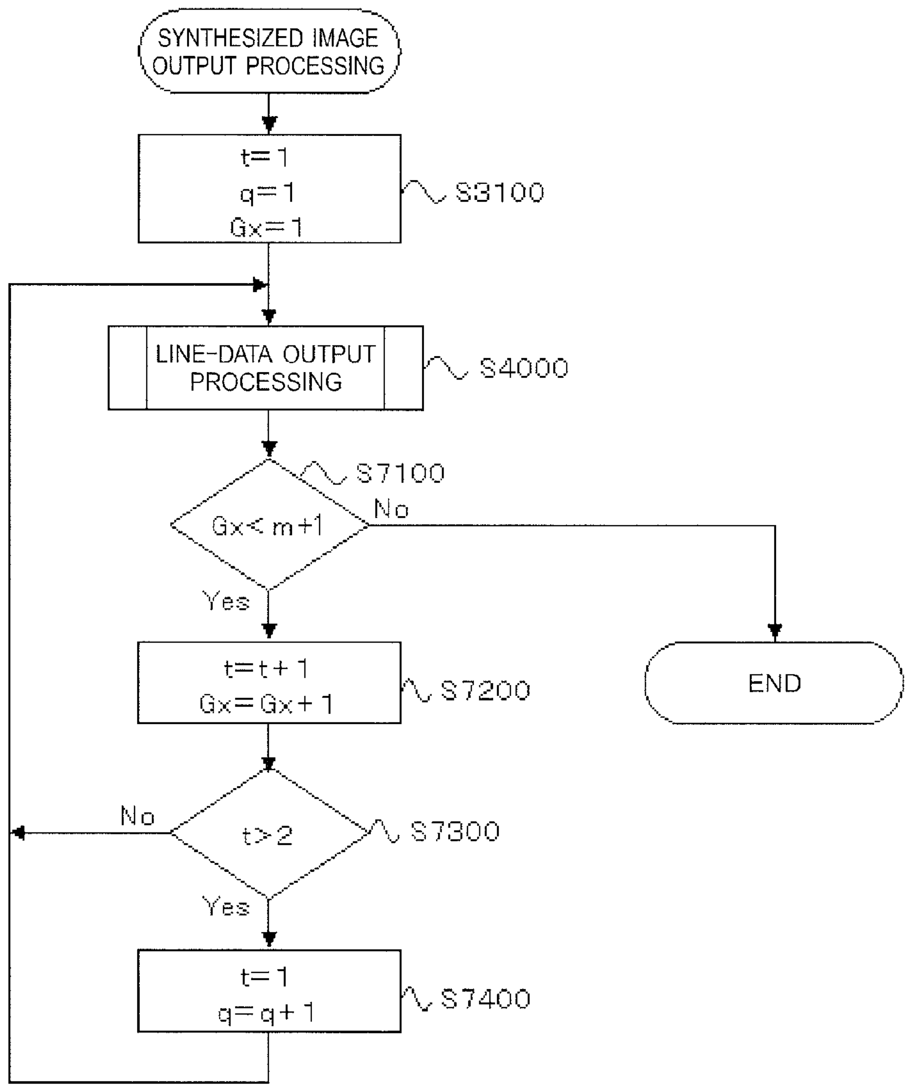
FIG. 93 shows the outline of synthesized image output processing of the ninth exemplary embodiment, which is a flowchart mainly showing count processing in a unit of scanning line.

Next, actions of the synthesized image output processing will be described by referring to FIG. 93. FIG. 93 is a flowchart showing the processing contents of step S3000 shown in FIG. 92. FIG. 93 mainly shows the count processing for one frame having a scanning line as a unit.

(Step S3100)

"1" is given to the variables "Gx", "q", and "t" as an initial value. "Gx" is the variable for counting the number of scanning lines, and the count value corresponds to the scanning line selected in the display panel. Further, "t" is the variable for counting even/odd of the scanning lines, i.e., the cycle of two scanning lines, and "q" is the variable used for designating the column number Ix of the input image data as shown in FIG. 86, which is incremented by 1 every time "t" counts "2".

(Step S4000)

The synthesized image data for one line corresponding to the scanning line Gx of the display panel is outputted. The actions of line data output processing will be described separately by referring to a flowchart shown in FIG. 94.

(Step S7100)

It is judged whether or not the count value of Gx has reached the last scanning line Gm+1 of the display part. For the judgment, the column number "m" of the display part set in step S1000 shown in FIG. 92 is used. When it has not reached to "m+1", it is judged as Yes and the procedure is advanced to step S7200. When it is "m+1", the judgment is No and the procedure of FIG. 93 is ended. Then, the procedure is advanced to step S8000 of FIG. 92.

(Step S7200)

"1" is added to each of the count values of "t" and "Gx" in accordance with the horizontal synchronous signals from the timing control device 350 shown in FIG. 63.

(Step S7300)

Judgment by the count value of "t" is executed. When "t is larger than 2, it is judged as Yes and the procedure is advanced to step S7400. When "t" is 2 or less, the judgment is No and the procedure is advanced to step S4000.

(Step S7400)

The count value of "t" is returned to 1, the count value of "q" is incremented by 1, and the procedure is advanced to step S4000.

Figure 94:
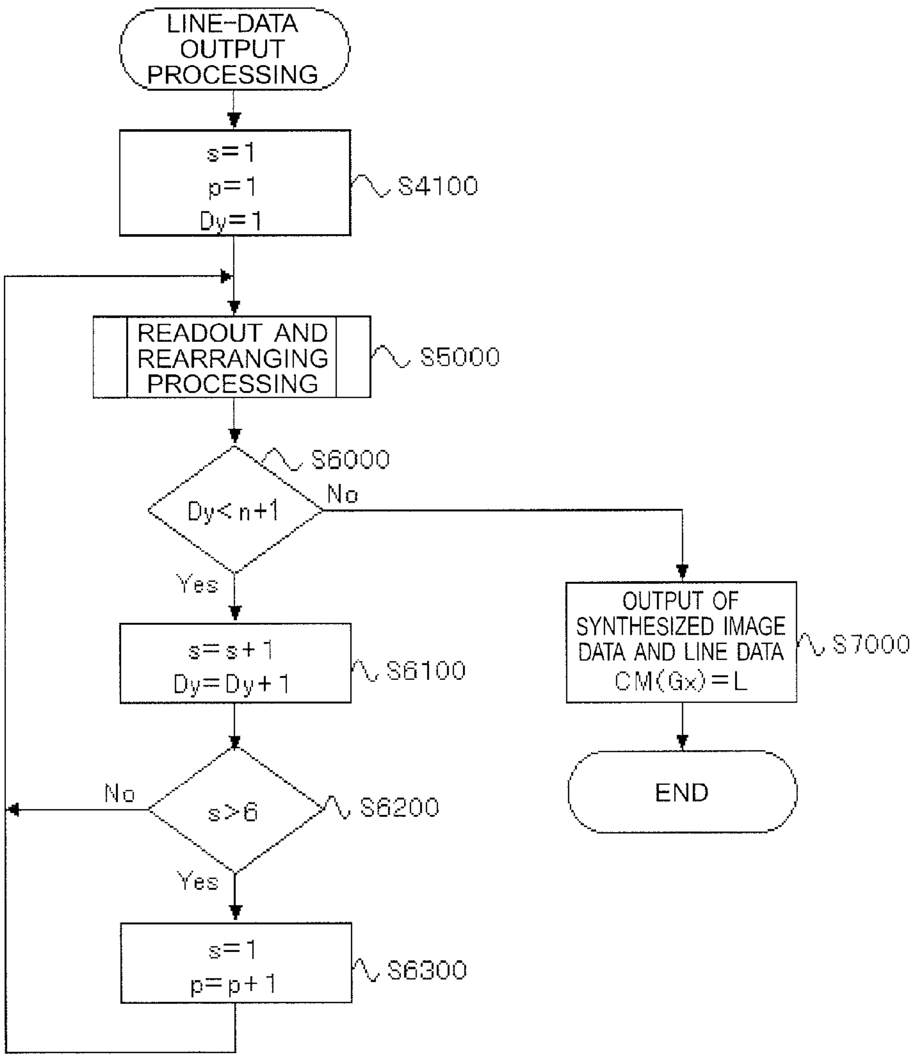
FIG. 94 shows the outline of line data output processing of the ninth exemplary embodiment, which is a flowchart mainly showing count processing in a unit of data line.

Next, actions of line data output processing will be described by referring to FIG. 94. FIG. 94 is a flowchart showing the processing contents of step S4000 shown in FIG. 93. FIG. 93 mainly shows the count processing for one line having a data line as a unit.

(Step S4100)

"1" is given to the variables "Dy", "p", and "s" as an initial value. "Dy" is the variable for counting the number of data line. Further, "s" is the variable when counting the cycle of six data lines, and "s" is the variable used for designating the row number Iy of the input image data as shown in FIG. 90, which is incremented by 1 every time "s" counts "6".

(Step S5000)

The input image data corresponding to the scanning line Gx and the data line Dy is read out from the image memory 320, the input image data is rearranged in the data order according to the display panel, and the rearranged data is stored in a line memory L in the count value order of Dy. The actions of the readout and rearranging processing will be described separately by referring to a flowchart shown in FIG. 95.

(Step S6000)

It is judged whether or not the count value of Dy has reached the entire data line number Dn+1 of the display part. For the judgment, the row number "n" of the display part set in step S1000 shown in FIG. 92 is used. When it has not reached to "n+1", it is judged as Yes and the procedure is advanced to step S6100. When the count value of Dy is "n+1", the judgment is No and the procedure is advanced to step S7000.

(Step S6100)

"1" is added to each of the count values of "s" and "Dy" in accordance with the signals from the timing control device 350 shown in FIG. 63.

(Step S6200)

Judgment by the count value of "s" is executed. When "s" is larger than 6, it is judged as Yes and the procedure is advanced to step S6300. When "t" is 6 or less, the judgment is No and the procedure is advanced to step S5000.

(Step S6300)

The count value of "s" is returned to 1, the count value of "p" is incremented by 1, and the procedure is advanced to step S5000.

(Step S7000)

The synthesized image data CM (Gx) for one line of the scanning line Gx stored in the line memory L is outputted to the data-line driving circuit 280 shown in FIG. 63 by synchronizing with the control signal 281 for data-line driving circuit generated by the timing control device 350. The line data output processing is ended by completing step S7000, and the procedure is advanced to step 7100 shown in FIG. 93. The actions of the procedure are so described that the procedure is advanced to step S7100 of FIG. 93 after completing the processing step S7000. However, it is so described for convenience' sake, and the output processing of the synthesized image data (Gx) by step S7000 and the processing of step S7100 and thereafter shown in FIG. 93 may be executed in parallel.

Figure 95:
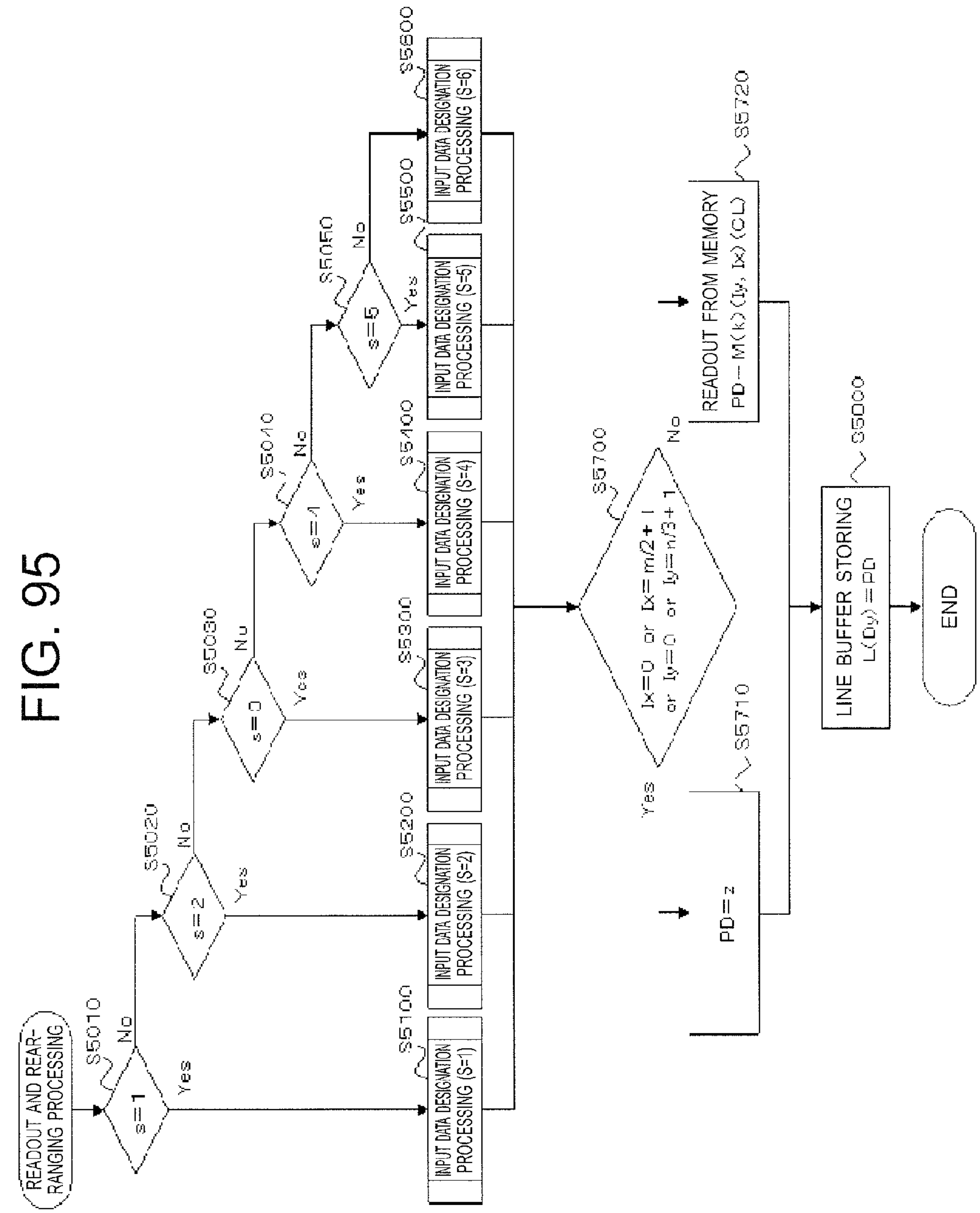
FIG. 95 is a flowchart showing the outline of readout and rearranging processing of the ninth exemplary embodiment.

Next, actions of the readout and rearranging processing will be described by referring to FIG. 95. FIG. 95 is a flowchart showing the processing contents of step S5000 shown in FIG. 94. FIG. 93 mainly shows branching processing for the count values "s" of the cycle of six data lines.

(Steps S5010-S5050)

This is the branching processing executed according to the count value "s". The procedure is advanced to step S5100 when "s=1", advanced to step S5200 when "s=2", advanced to step S5300 when “s=3”, advanced to step S5400 when “s=4”, advanced to step S5500 when “s=5”, and advanced to step S5600 when “s” takes other values (s=6).

(Steps S5100-S5600)

The pixel data corresponding to the sub-pixels connected to the display panel (Dy, Gx) is designated from the input image data within the image memory in accordance with the count value “s”. Actions of the input data designation processing are shown in each of drawings FIG. 96-FIG. 101. With the input data designation processing, the viewpoint number k of the input image data corresponding to the data line Dy and the scanning line Gx, the row number Iy, the column number Ix, and the colors CL are determined.

(Step S5700)

It is judged whether or not the row number Iy and the column number Ix of the designated input image data are the sub-pixels that do not exist on the display part. For the judgment, the row number “n” and the column number “m” of the display part set in step S1000 shown in FIG. 92 are used. Under each of the conditions “Ix=0”, “Ix=m/2+1”, “Iy=0” or “Iy=n/3+1”, there is no corresponding sub-pixel on the display part. Therefore, under any of the above conditions, it is judged as Yes and the procedure is advanced to step S5710. Under a state that does not meet any of those conditions, it is judged as No and the procedure is advanced to step S5720.

(Step S5710)

This is the processing executed in a case where there is no corresponding sub-pixel on the display part on the Iy row and Ix column of the designated input image data. Thus, even though it is not reflected upon display, “z” is outputted as data PD of the data line Dy on the scanning line Gx. As an example, “z” is set as “0”.

(Step S5720)

The corresponding address in the image memory is designated based on the viewpoint number “k” of the designated input image data, the row number Iy, the column number Ix, and the colors CL. By designation of the address, the data PD=M(k) (Iy, Ix) (CL) of the data line Dy on the scanning line Gx is read out from the image memory.

(Step S5800)

The data PD of the data line Dy on the scanning line Gx is stored in the line buffer L which stores data of one scanning line. When the data PD is stored to the line buffer, the readout and rearranging processing is ended. Then, the procedure is advanced to step S6000 shown in FIG. 94 where it is judged whether or not the data storage processing to the line buffer L is completed for all the data lines (n+1) connected to the scanning line Gx.

Figure 96:
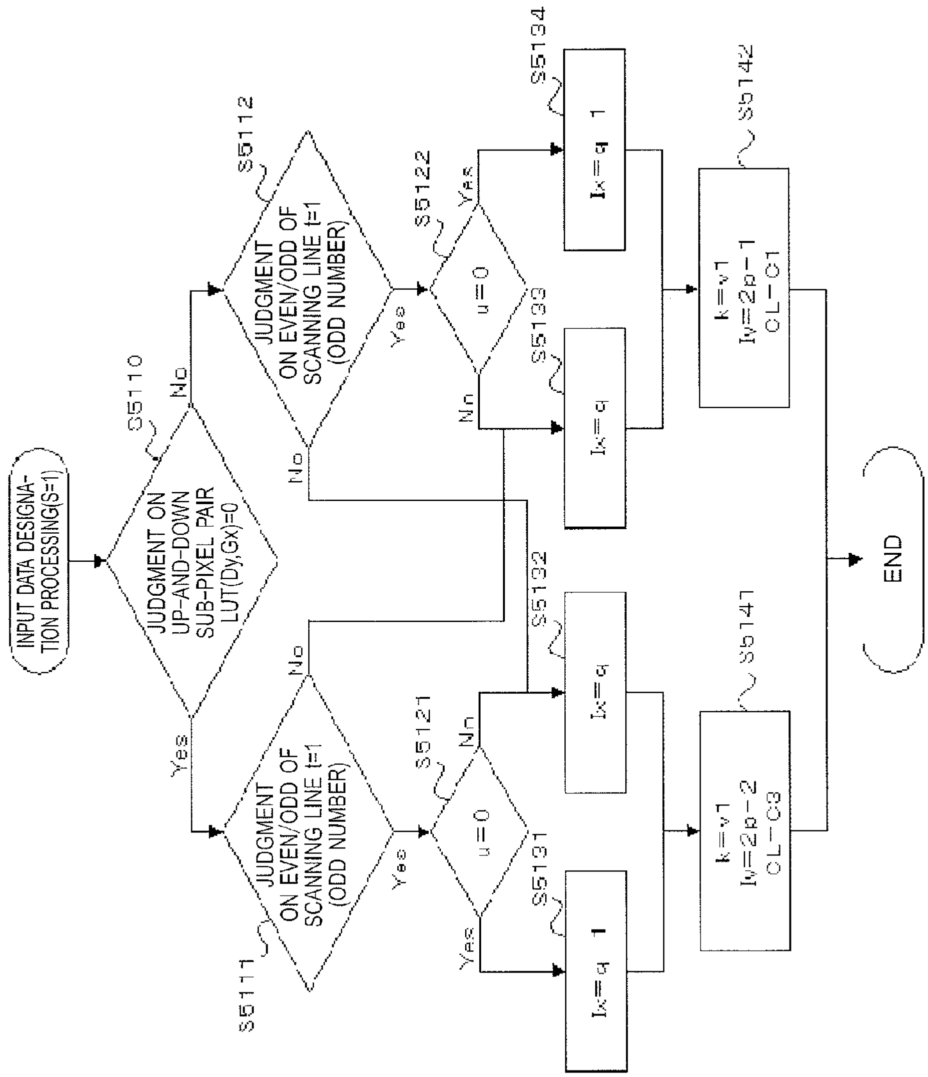
FIG. 96 shows a flowchart showing input data designation processing when count value in a data line unit according to the ninth exemplary embodiment is "s=1"

Next, actions of input data designation processing will be described by referring to FIG. 96-FIG. 101. FIG. 96 shows the processing for designating the viewpoint number “k” of the input image data, the row number Iy, the column number Ix, and the color CL when the count value “s” showing the count processing of FIG. 94 is 1. For the designation, used are the parameters “v1”, “v2”, “C1”, “C2”, “C3”, “u”, “LUT” read in step S1000 shown in FIG. 92, variables “Gx”, “q”, “t”, showing the count processing of FIG. 93, and the variables “Dy”, “p” showing the count processing of FIG. 94.

(Step S5110)

It is judged whether the up-and-down sub-pixel pair connected to the scanning line Gy and the data line Dy is P2L or P2R. As the judgment condition, “LUT (Dy, Gx)=0” is used as an example. When judged as Yes (the up-and-down sub-pixel pair is P2R), the procedure is advanced to step S5111. When judged as No (the up-and-down sub-pixel pair is P2L), the procedure is advanced to step S5112.

(Steps S5111, S5112)

Even/odd of the scanning line Gx is judged. As the judgment condition, “t=1” with which the scanning line Gx becomes an odd-numbered line is used as an example. The odd number and even number of the scanning line is related to designation of the column number Ix as shown in FIG. 86 and related to designation of the row number Iy as well as the color CL as shown in FIG. 90. When judged as Yes (the scanning line is an odd-numbered scanning line), the procedure is advanced from step S5111 to step S5121, and advanced from step S5112 to step S5122 to perform judgment processing of “u” for designating the column number Ix. In the meantime, when the judgment is No, the scanning line is an even-numbered scanning line. In that case, as shown in FIG. 86, the column number Ix does not depend on “u”. Therefore, when judged as No, the procedure is advanced from step S5111 to step S5133, and advanced from step S5112 to step S5132 to perform designation processing of the column number Ix. Note here that, as shown in FIG. 92, designation of the row number Iy and the color CL according to the value of LUT becomes switched depending on even/odd of the scanning line. Thus, as shown in FIG. 96, the processing flow becomes crossed.

(Steps S5121, S5122)

In order to designate the column number Ix according to FIG. 86, it is judged whether the sub-pixel on the first row of the first column is the upward pixel or the downward pixel. As the judgment condition, “u=0” is sued. When the judgment is Yes (the upward pixel), the procedure is advanced from step S5121 to step S5131 and advanced from step S5122 to step S5133. In the meantime, when the judgment is No, the procedure is advanced from step S5121 to step S5132 and advanced from step S5122 to step S5134.

(Steps S5131, S5134)

The column number Iy of the input image data is designated by using “q”, respectively. Since “s=1”, the data line is an odd-numbered data line. Thus, the column number is determined by the conditional branching and FIG. 86. The procedure is advanced from steps S5131, S5132 to step S5141, and advanced from step S5133, S5134 to step S5142.

(Steps S5141, S5142)

Based on the relation shown in FIG. 90, the viewpoint number “k” of the input image data, the row number Ix, and the color CL are designated. Note that “s=1” correspond to data line **6*p*-5 in FIG. 90. The row number Ix is designated by using “p”. The viewpoint number “k” and the color CL are designated by the parameters selected as in steps S5141, S5142 from the parameters read in step S1000 of FIG. 92. In the manner described above, the viewpoint number “k” of the input image data, the row number Ix, and the color CL are designated, and the input data designation processing is ended. Then, the procedure is advanced to step S5770 shown in FIG. 95**.

Figure 97:
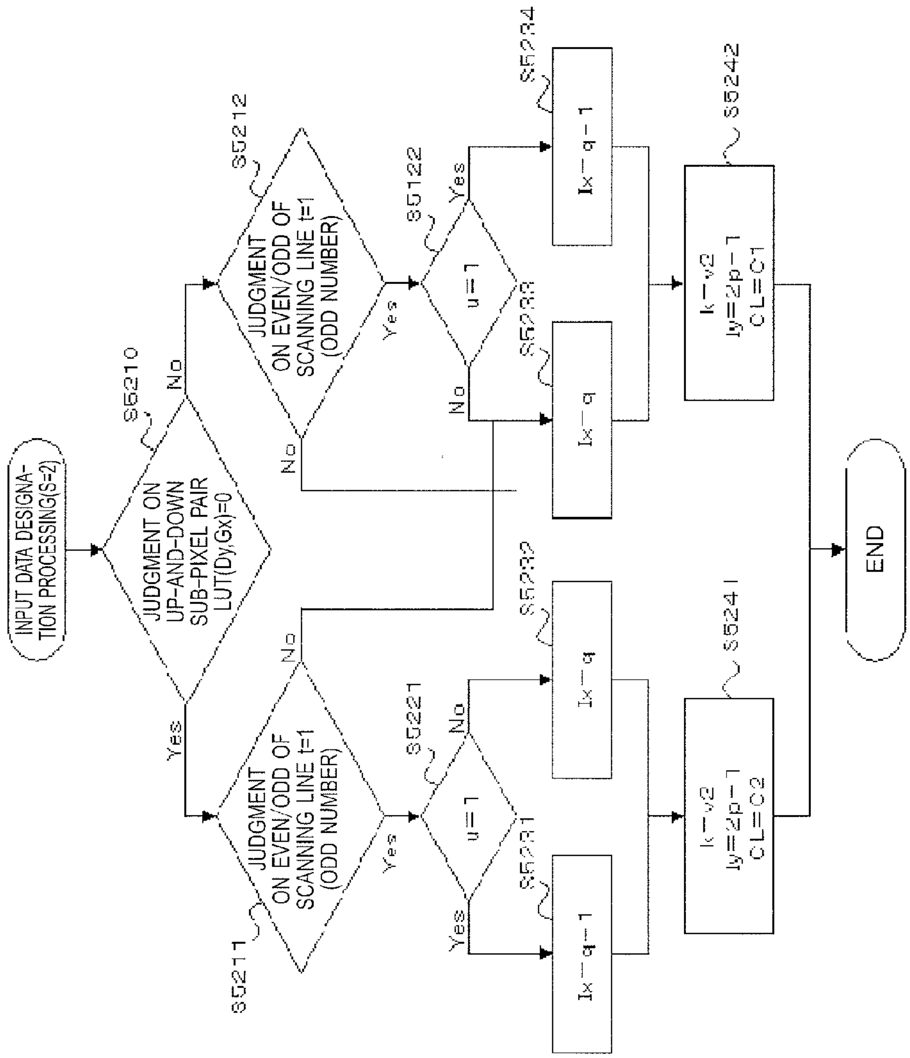
FIG. 97 shows a flowchart showing input data designation processing when count value in a data line unit according to the ninth exemplary embodiment is "s=2"

FIG. 97 shows the processing for designating the viewpoint number “k” of the input image data, the row number Ix, and the color CL when the count value “s” showing the count processing of FIG. 94 is 2. As shown in FIG. 97, designation of the parameters selected as the viewpoint number “k” and the color CL, and the row number Ix are different from the case of FIG. 96, the processing flow is the same as the case when “s=1”. However, when “s” is 2, the data lien is an even-numbered data line. This, designation of the column number Iy as in FIG. 86 is different from the case of FIG. 96. Therefore, for the judgment condition regarding whether the sub-pixel on the first row of the first column of the display part is the upward pixel or the downward pixel, “u=1” is used unlike the case of FIG. 96.

Figure 98:
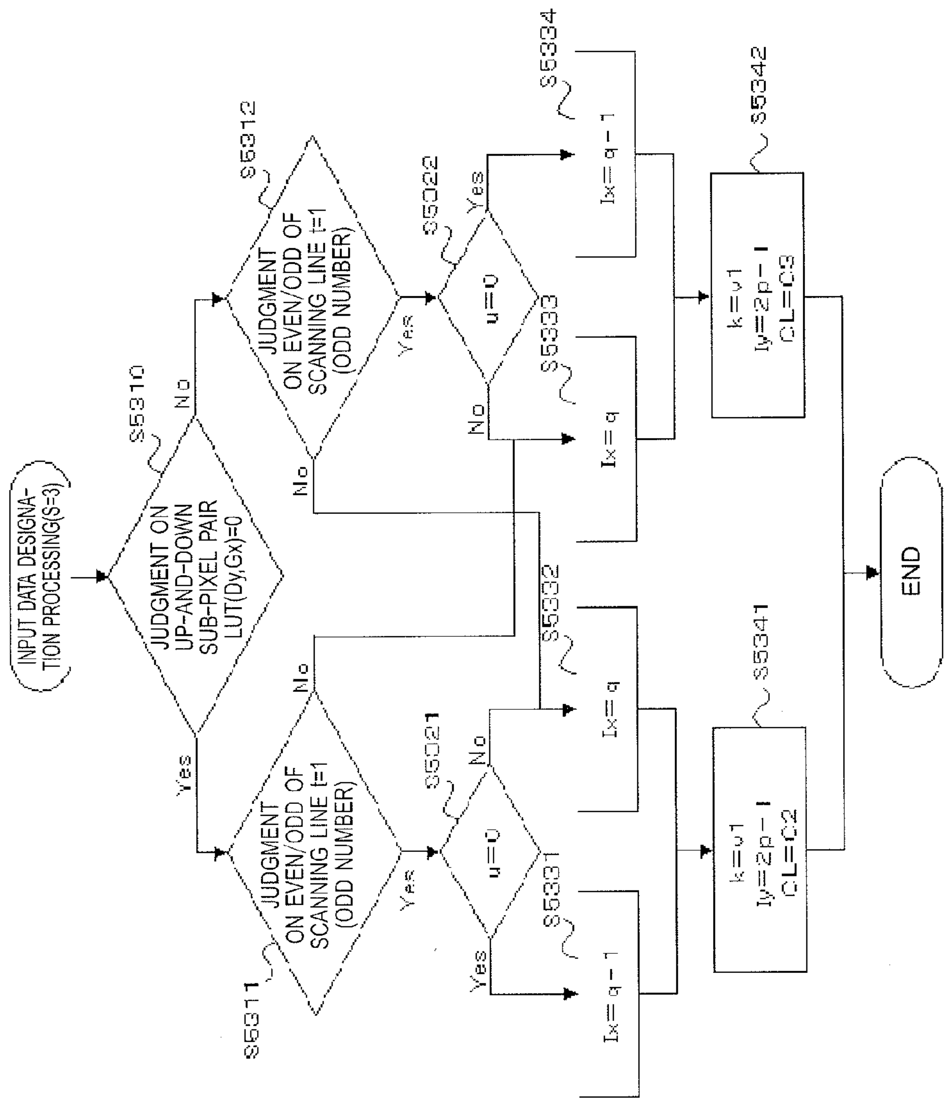
FIG. 98 shows a flowchart showing input data designation processing when count value in a data line unit according to the ninth exemplary embodiment is "s=3"
Figure 99:
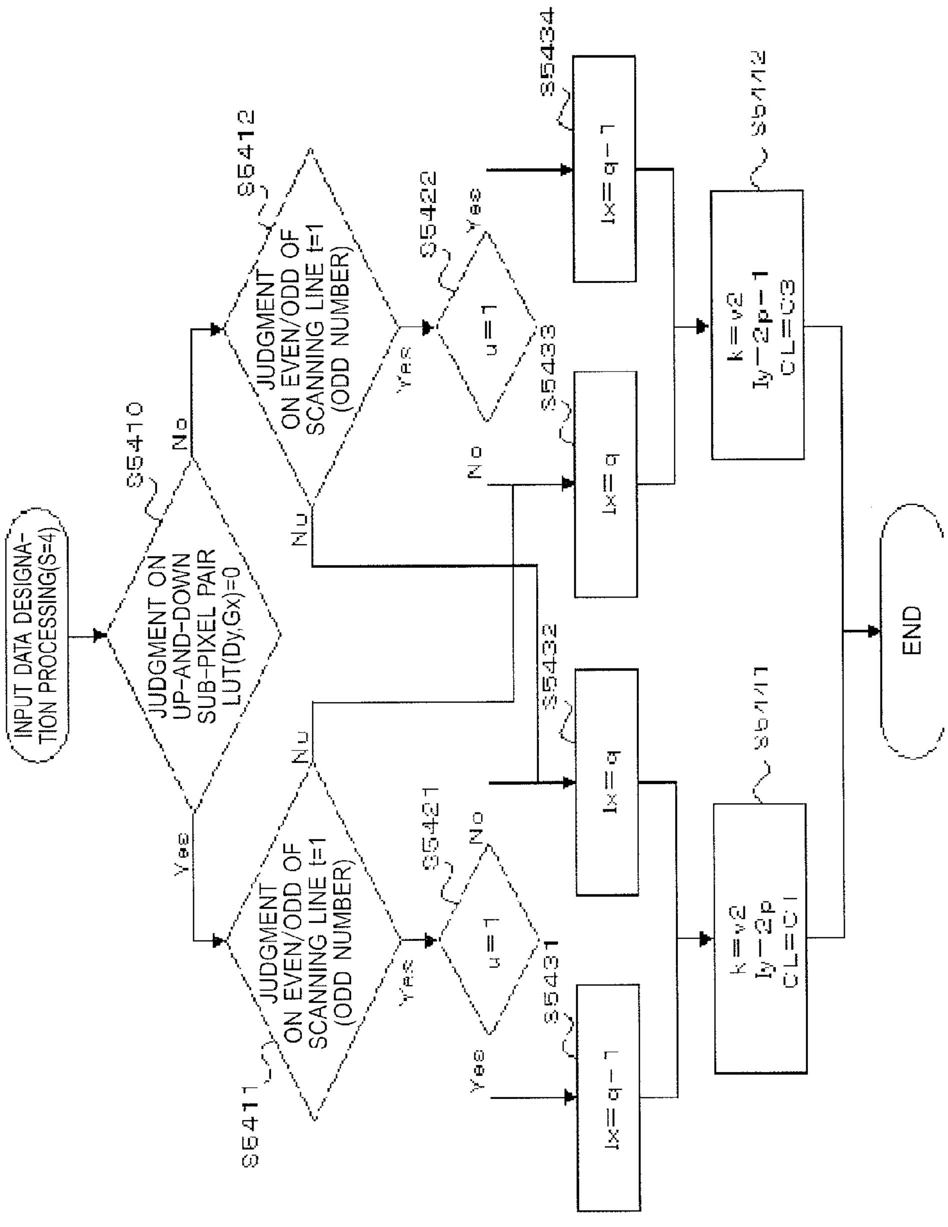
FIG. 99 shows a flowchart showing input data designation processing when count value in a data line unit according to the ninth exemplary embodiment is "s=4"
Figure 100:
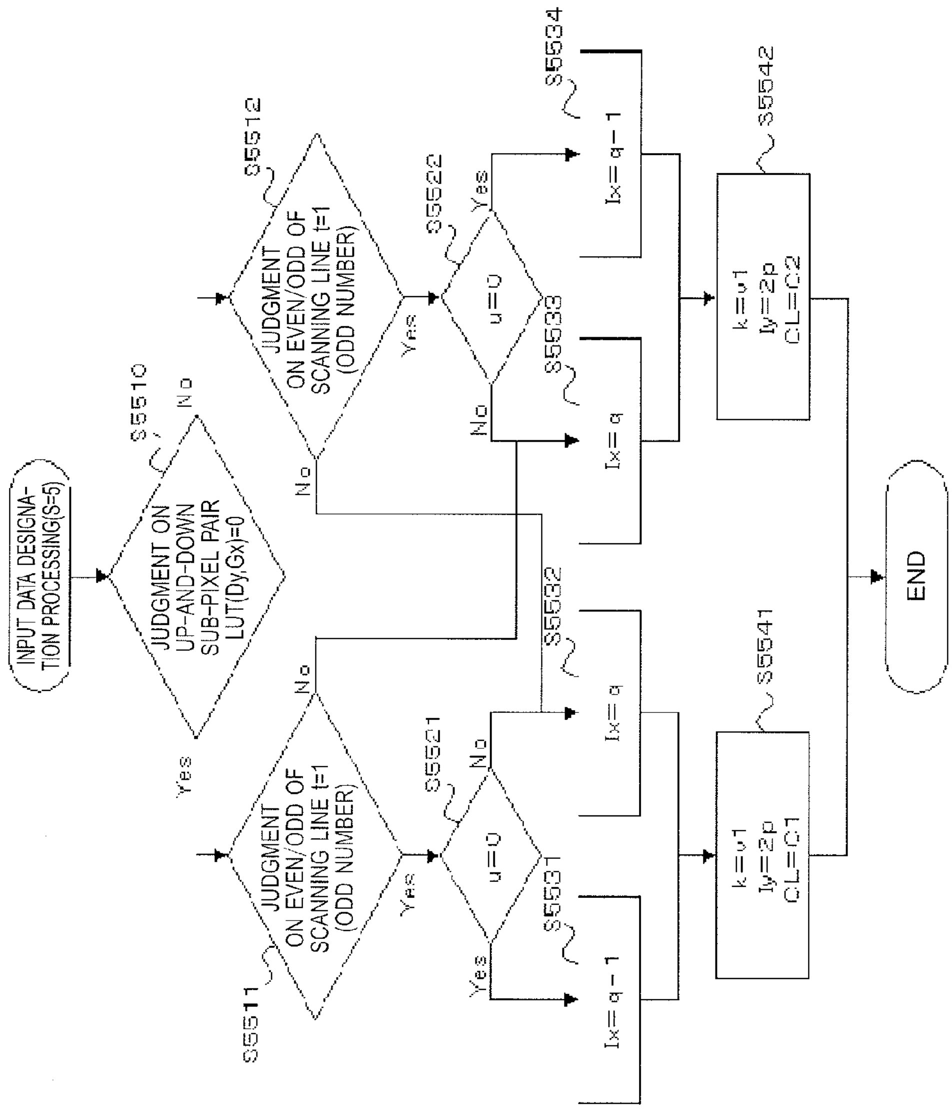
FIG. 100 shows a flowchart showing input data designation processing when count value in a data line unit according to the ninth exemplary embodiment is "s=5"
Figure 101:
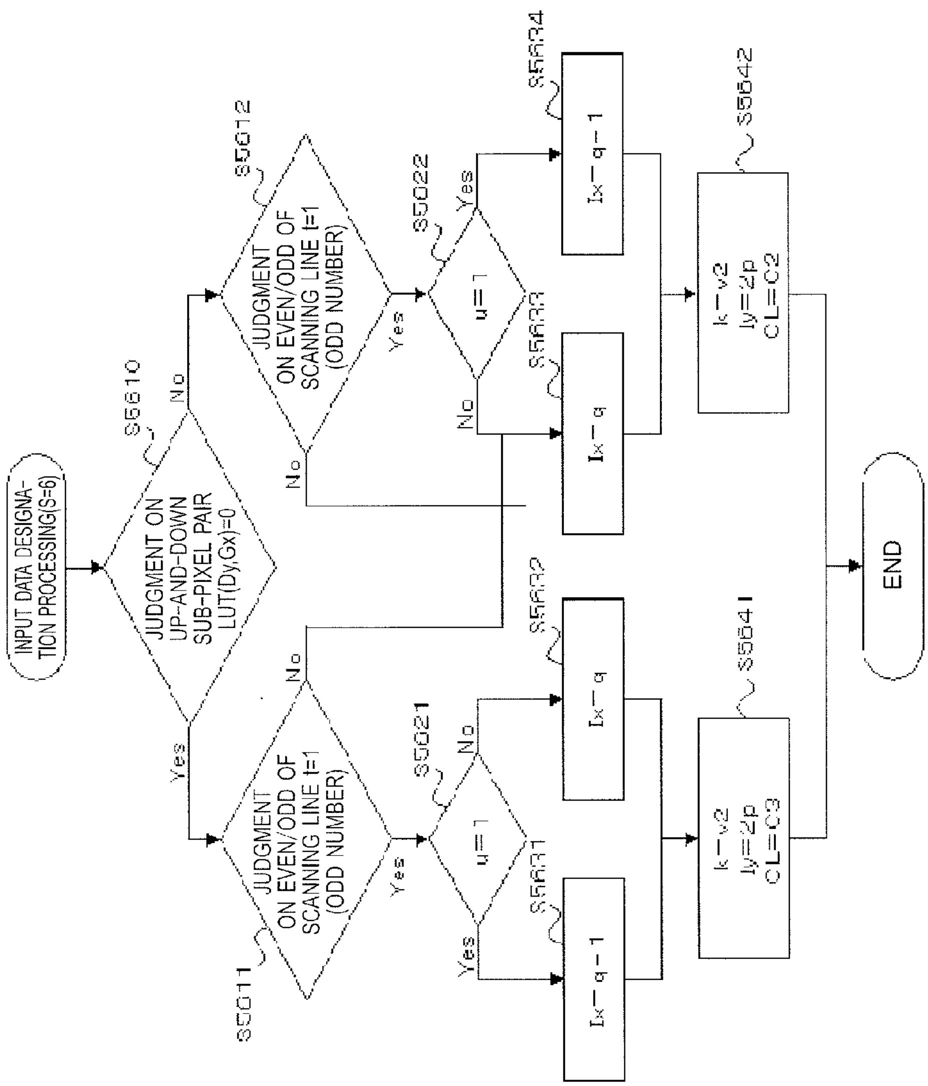
FIG. 101 shows a flowchart showing input data designation processing when count value in a data line unit according to the ninth exemplary embodiment is "s=6"

Similarly, FIG. 98 is a flowchart showing the processing for designating the viewpoint number "k" of the input image data, the row number Ix, and the color CL when the count value "s" is 3, FIG. 99 is a flowchart when the count value "s" is 4, FIG. 100 is a flowchart when the count value "s" is 5, and FIG. 101 is a flowchart when the count value "s" is 6. The processing flows thereof are the same as the case of "s=1", so that explanations thereof are omitted.

As described above, the processing described by using FIG. 92-FIG. 100 makes it possible to execute the actions for generating and displaying the synthesized image data in accordance with the display module from the input image data inputted from outside on the display device of the exemplary embodiment. The processing described above is merely an example of the exemplary embodiment, and the exemplary embodiment is not limited only to such processing. For example, the order of the branching processing executed for designating the viewpoint number "k" of the input image data written in the image memory, the row number Iy, the column number Ix, and the color CL may not have to be in the order shown in FIG. 96-FIG. 101 as longs as the designation result of the input data designation processing matches with FIG. 86 and FIG. 90. Further, in FIG. 95, for example, the sub-pixel which does not exist on the display part is judged, and "z=0" is supplied as the data PD. However, the data supplied as "z" does not contribute to the display and is invalid since the sub-pixel does not exist on the display part. Therefore, when there is enough capacitance in the image memory, the judgment processing itself may be omitted, address of the invalid data may be set, and memory readout processing may be executed. In that case, steps S5700, S5710 of FIG. 95 can be omitted, and step S5720 can be executed as the memory readout processing. Thus, the processing amount can be suppressed, even though the image memory becomes increased.

The structures and operations of the ninth exemplary embodiment of the present invention have been described heretofore.

Figure 102A:
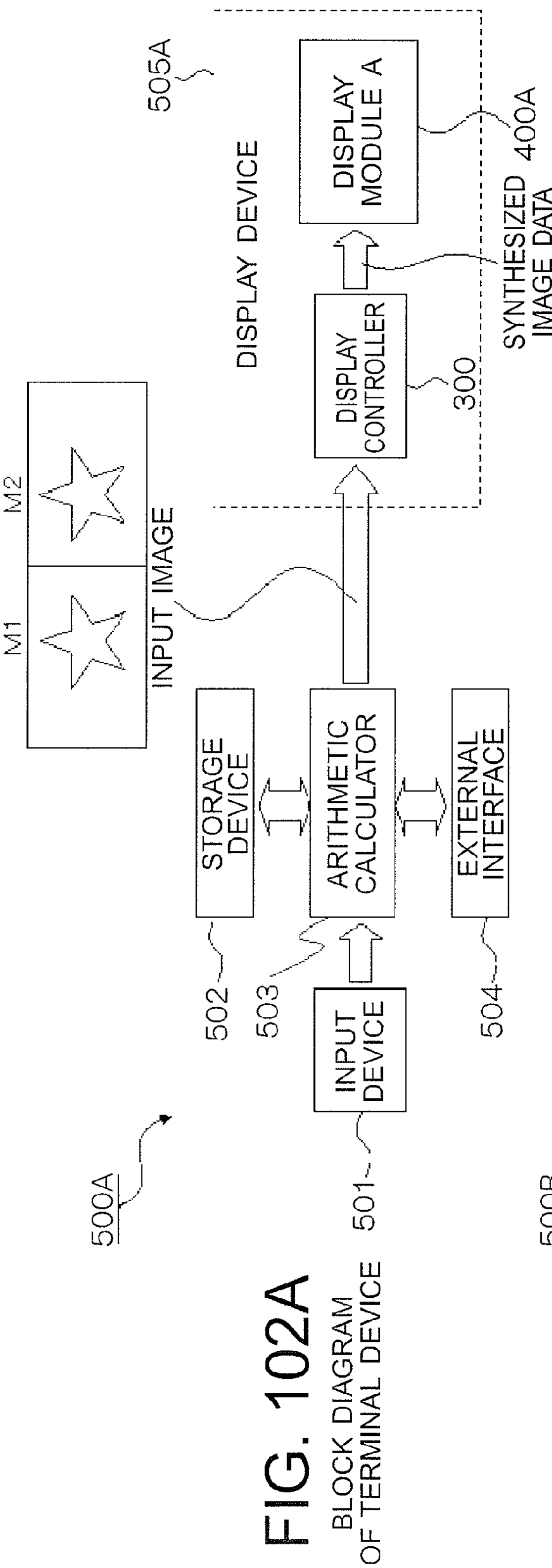
FIGS. 102A and 102B are block diagrams showing a terminal device to which the display device of the ninth exemplary embodiment is applied.

FIG. 102A is a block diagram showing a terminal device that is an example to which the display device of the exemplary embodiment is applied. The terminal device 500A shown in FIG. 102A is configured, including an input device 501, a storage device 502, an arithmetic calculator 503, an external interface 504, a display device 505A of the exemplary embodiment, and the like. As described above, the display device 505A includes a display controller 300, so that data for two images may be transmitted as in a case where the image data is transmitted from the arithmetic calculator 503 to a typical display device. The two pieces of image data may be the image data which are displayed two dimensionally on a typical display panel. That is, the display device 505A of the exemplary embodiment includes the display controller 300, so that the arithmetic calculator 503 does not need to execute any special processing on the two pieces of images data to be outputted. Thus, there is no load imposed upon the arithmetic calculator 503 in this respect. Further, the display controller 300 of the exemplary embodiment includes an image memory 320 (FIG. 63). Thus, the two pieces of image data outputted by the arithmetic calculator 503 are not limited to be in a form where the image data are lined in the horizontal direction whose image is shown in FIG. 102 (the so-called side-by-side form), but may be in a form where the image data are lined in the vertical direction or in a frame time-division form.

With the terminal device to which the present invention is applied, the display controller is not limited to the structure to be loaded on the display device as in the case of FIG. 102A. For example, the display controller may be loaded not on the display device but on a circuit substrate where the arithmetic calculator 503 is loaded.

Further, as in the case of a terminal device 500B shown in FIG. 120B, the processing procedure of the display controller may be put into a program and the display controller 300 may be provided to the arithmetic calculator 503.

Figure 102B:
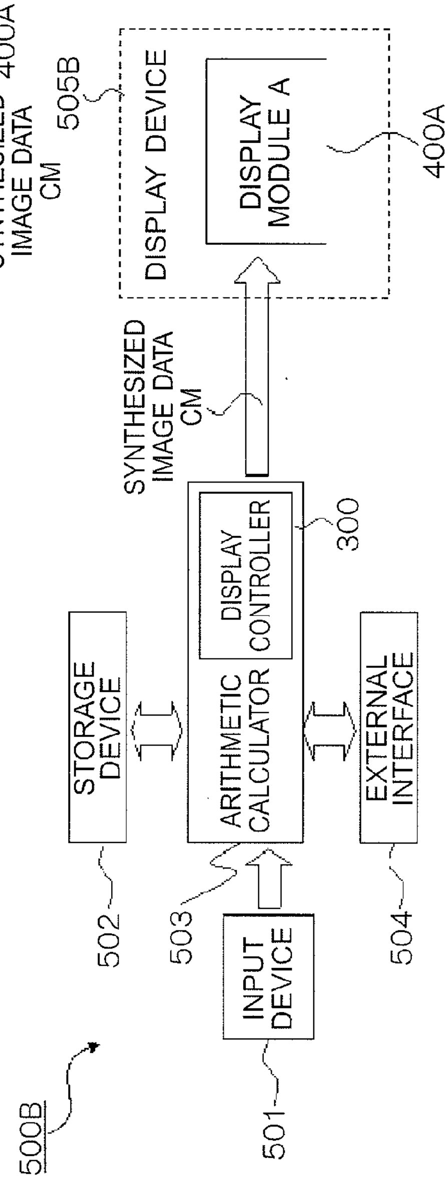

The terminal devices shown in FIG. 102A and FIG. 102B can deal with a case where a display module A is changed to a display module B (not shown) without changing the display controller 300. For example, the display module 400B (not shown) is different from the display module 400A in terms of the layout of the image separating device, the order of the color filters, the layout patterns of the up-and-down sub-pixel pairs, and the like. Specifications of the display modules are determined depending on the various factors required to the display devices from the terminal devices to be loaded, such as the image quality, cost, size, and resolution. The display controller 300 according to the present invention includes the parameter storage device 340 (FIG. 63). Thus, it is possible to deal with the changes in the display module by rewriting or selecting the parameters, and the same display controller 300 can be used. This makes it possible to decrease the number of designing steps for the display device and the terminal device, and to decrease the cost therefore.

While the exemplary embodiment has been described by referring to the case of the stereoscopic display device which provides different images to both eyes of the observer. The present invention may also be applied to a 2-viewpoint display device which provides different images depending on the observing positions.

Further, while the exemplary embodiment has been described by referring to the case where the lenticular lens is used for the optical image separating device and the lenticular lens is disposed on the observer side of the display panel, the lenticular lens may be disposed on the opposite side from the observer. Furthermore, as the optical image separating device, it is also possible to employ a parallax barrier. Moreover, it is also possible to provide, on a display panel, a substrate where polarization elements corresponding to each sub-pixel for displaying the viewpoint images M1, M2 are arranged in such a manner that the light emitted from the sub-pixels comes under different polarization state for each viewpoint image, and such display panel may be applied to an eye-glass type stereoscopic image display device.

Figures 103A, 103B, 103C:
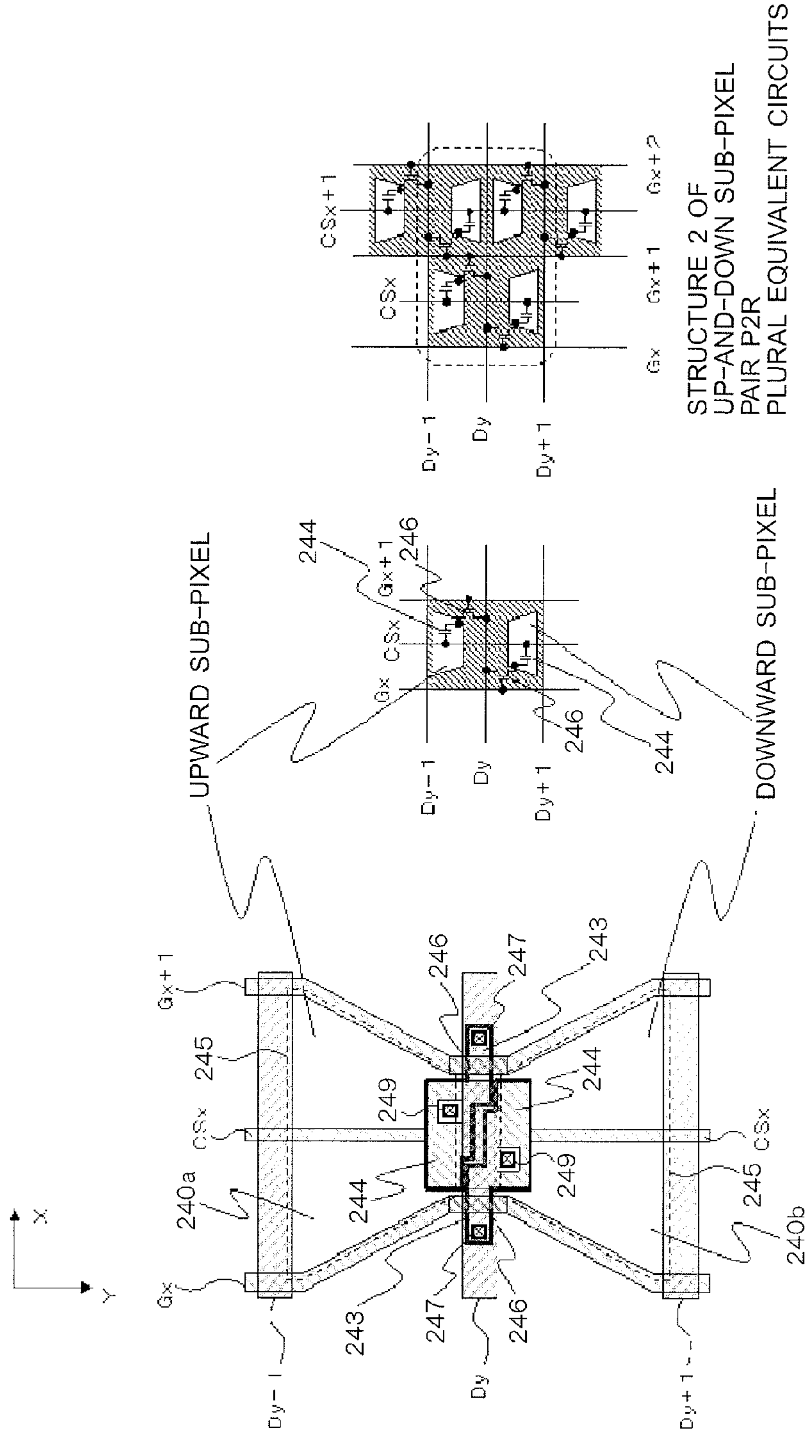
FIGS. 103A, 103B and 103C show a plan view which illustrates a second example of the structure of the up-and-down sub-pixel pair P2R according to the ninth exemplary embodiment, and show circuit diagrams of equivalent circuit 2.
Figures 104A, 104B, 104C:
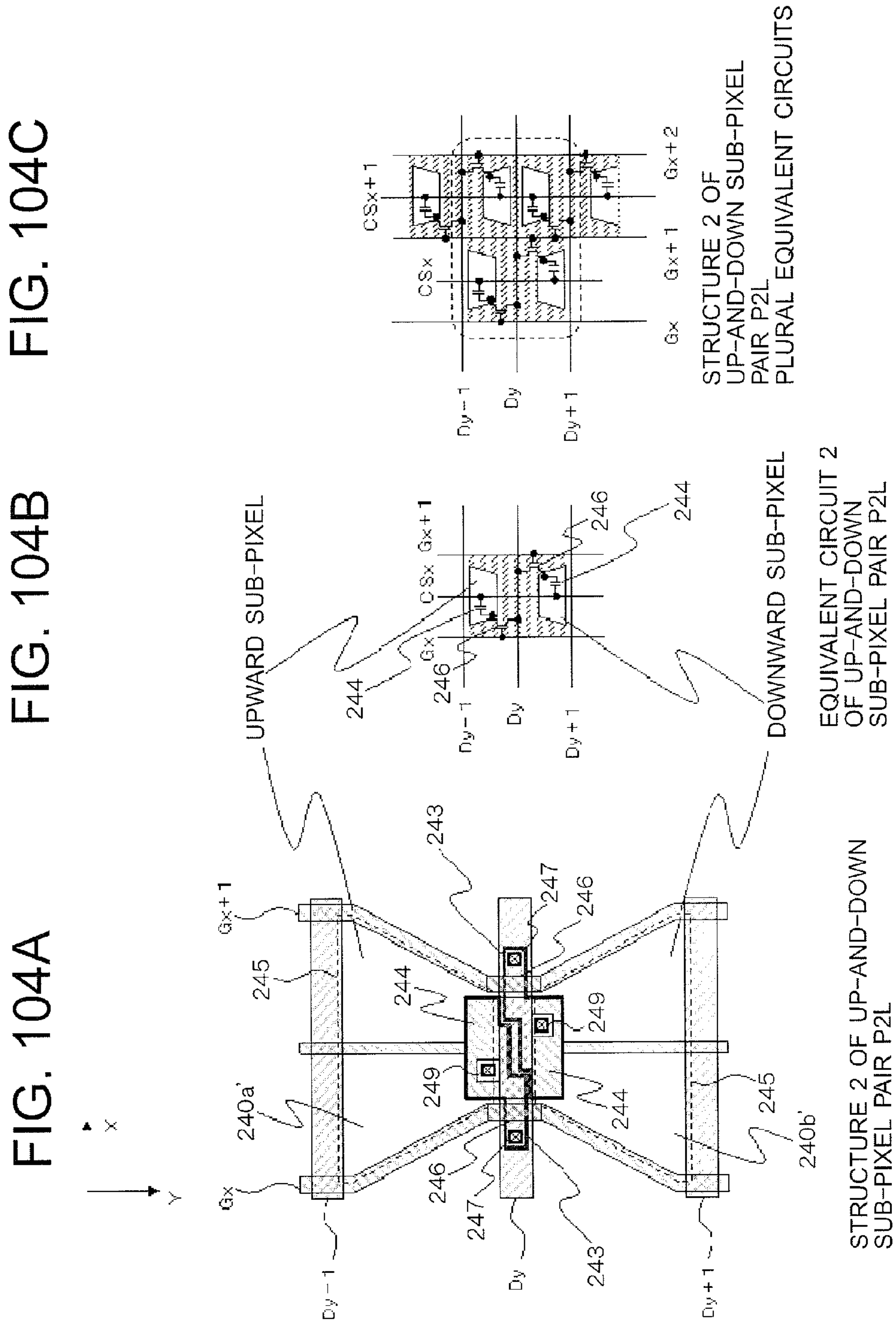
FIGS. 104A, 104B and 104C show a plan view which illustrates a second example of the structure of the up-and-down sub-pixel pair P2L according to the ninth exemplary embodiment, and show circuit diagrams of equivalent circuit 2.

Further, the structure of the sub-pixel 40 (FIG. 63) is not limited to the first example (referred to as "first sub-pixel" and "first up-and-down sub-pixel pair" hereinafter) shown in FIG. 65-FIG. 68, but a second example (referred to as "second sub-pixel" and "second up-and-down sub-pixel pair" hereinafter) shown in FIG. 103 and FIG. 104 can also be applied. FIG. 103 shows the structure of the second up-and-down sub-pixel pair P2R and equivalent circuits, and FIG. 104 shows the structure of the second up-and-down sub-pixel pair P2L and equivalent circuits. In those drawings, the sizes and reduced scales of each structural element are altered as appropriate for securing the visibility in the drawing.

The difference between the first sub-pixel and the second sub-pixel that is shown in FIG. 103 and FIG. 104 is the layout of the storage capacitance lines. In the second sub-pixel, the storage capacitance line CSx is formed on a metal film that is on the same layer as that of the scanning lines. Thus, among the electrodes that form a storage capacitance 444, the electrode on the opposite side of a semiconductor layer 443 and the storage capacitance CSx can be formed with the same-layer metal film. Further, by disposing the storage capacitance CSx between the scanning lines perpendicularly with respect to the data line, the contact hole 448 (FIG. 67 and the like) which is necessary in the first sub-pixel can be omitted. The contact hole can be omitted with the second sub-pixel, so that micronization of the sub-pixels can be achieved. This makes it possible to achieve high resolution of the display part.

In the first sub-pixel, as shown in FIG. 67 and the like, the storage capacitances 44 of the sub-pixels lined in the horizontal direction are connected via the storage capacitance lines CS. In the meantime, in the second sub-pixel, the storage capacitances 444 of the sub-pixels lined in the vertical direction are connected via the storage capacitance lines CSx. Thus, with the second sub-pixels, it is necessary to be cautious about the storage capacitance lines connected in a column unit and the polarity of the voltage written to the sub-pixels, when applying the polarity inversion drive to a liquid crystal panel.

For example, in a case where a dot inversion drive is employed to the layout pattern 3 shown in FIG. 76, when an arbitrary scanning line (e.g., Gx+1 (FIG. 103C, FIG. 104C) is selected, the polarities written to the sub-pixels become the same by a column unit i.e., by a storage capacitance line unit (e.g., by CSx, CSx+1). When the polarities written to the sub-pixels connected to the storage capacitance line becomes the same at the gate selection timing, potential fluctuations in the storage capacitance lines generated by the written voltages become uniform as well. This generates crosstalk in the extending direction of the storage capacitance lines, thereby deteriorating the displayed image quality.

Figure 105:
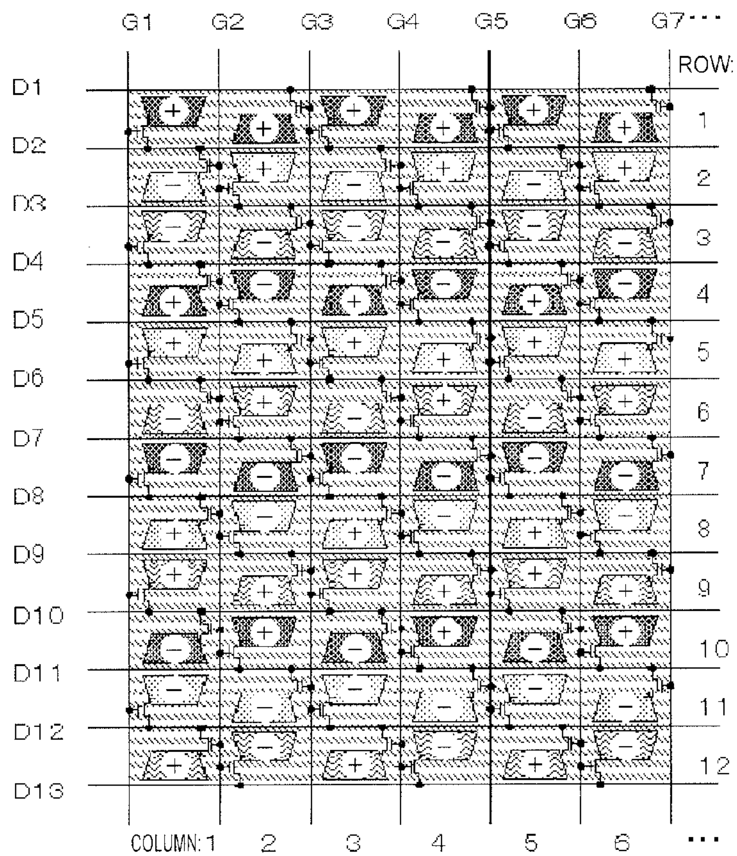
FIG. 105 shows charts showing a polarity distribution when 2-dot inversion drive is employed to the display part (layout pattern 2) according to the ninth exemplary embodiment.

Therefore, when the second sub-pixels shown in FIG. 103 and FIG. 104 are used, it is preferable to employ a 2-dot inversion drive for the polarity inversion drive method. FIG. 105 shows the polarity distribution of the display part when the 2-dot inversion drive is employed to the layout pattern 2 shown in FIG. 82, and the data line polarity for each scanning line of the 2-dot inversion drive. "+" and "−" in the drawing show the polarity as in the case of FIG. 74. As shown in FIG. 105, the 2-dot inversion drive is a driving method which inverts the polarity by every two data lines and, further, inverts the polarity of the data line every selecting period of single scanning line. In this case, when an arbitrary scanning line Gx+1 is selected, the polarities of the sub-pixels to which the voltage is written become different in a unit of x column or a unit of (x+1) columns. That is, there are both positive and negative polarities for the polarities written to the sub-pixels connected to the storage capacitance lines at the gate selecting timing. Thus, the potential fluctuations in the storage capacitance lines generated due to the written voltages can be set off and uniformanized, which provides an effect of suppressing crosstalk generated in the extending direction of the storage capacitance line.

Figure 106:
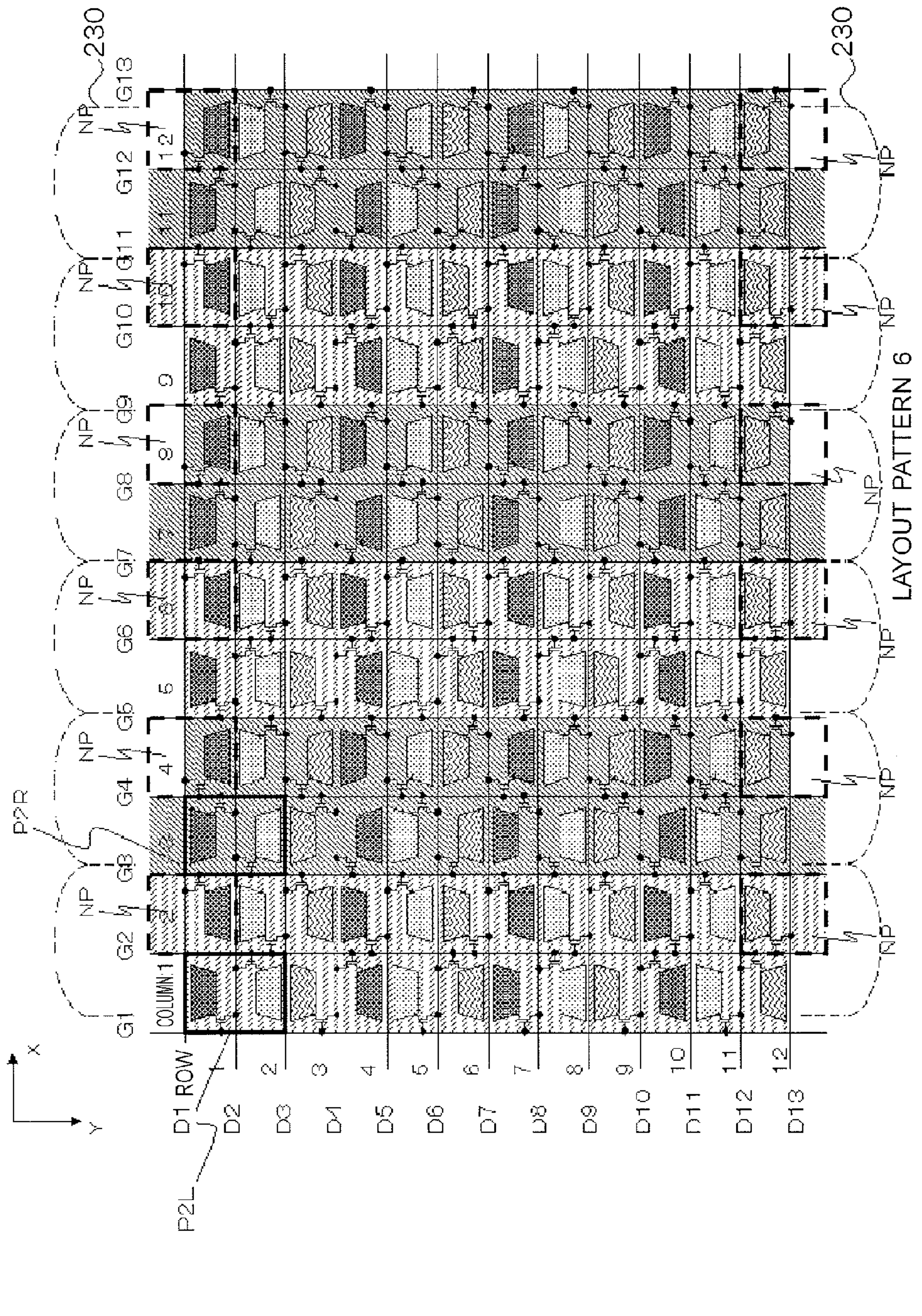
FIG. 106 is a schematic plan view showing a layout pattern 6 of the display part according to the ninth exemplary embodiment.
Figure 107:
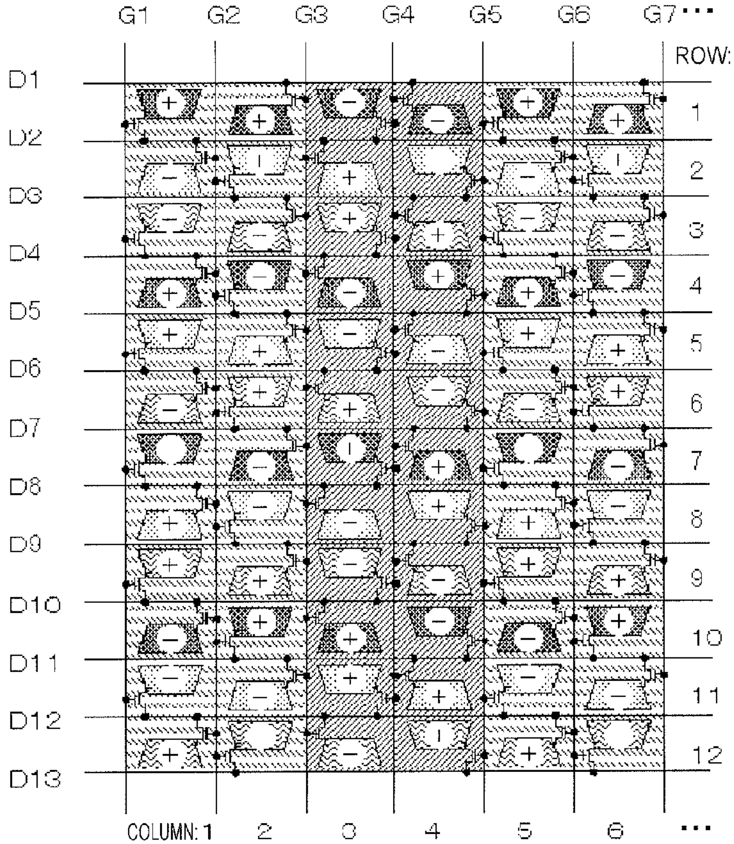
FIG. 107 shows charts showing a polarity distribution when 2-dot inversion drive is employed to the display part (layout pattern 6) according to the ninth exemplary embodiment.

In the polarity distribution shown in FIG. 105, the polarities are the same in a row unit. Thus, it is possible to achieve the same flicker suppressing effect as that of the case where a gate line inversion drive (1H inversion drive) is employed to a typical panel. Further, in a case where the structure of the second sub-pixel shown in FIG. 103 and FIG. 104 is used, it is possible to achieve the same flicker suppressing effect as that of the case where a dot inversion drive is employed to a typical panel through employing the 2-dot inversion drive by using a layout pattern 6 shown in FIG. 106. FIG. 107 shows the polarity distribution of the display part when the 2-dot inversion drive is employed to the layout pattern 6 shown in FIG. 106.

The polarity inversion drive method for the case using the second sub-pixels shown in FIG. 103 and FIG. 104 is not limited to the 2-dot inversion drive. It is also possible to employ a 3-dot inversion drive (pixel inversion drive) and the like.

Further, the display panel of the exemplary embodiment has been described as the liquid crystal display panel using liquid crystal molecules. However, as the liquid crystal display panel, not only a transmissive liquid crystal display panel but also a reflective liquid crystal display panel, a transflective liquid crystal display panel, a slight-reflective liquid crystal display panel in which the ratio of the transmissive region is larger than that of the reflective region, a slight-transmissive liquid crystal panel in which the ratio of the reflective region is larger than the transmissive region, and the like can be applied. Further, the driving method of the display panel can be applied to the TFT method in a preferable manner.

For the TFTs of the TFT method, not only those using amorphous silicon, low-temperature polysilicon, high-temperature polysilicon, single crystal silicon, but also those using an organic matter, oxide metal such as zinc oxide, and carbon nanotube can also be employed. Further, the present invention does not depend on the structures of the TFTs. A bottom gate type, a top gate type, a stagger type, an inverted stagger type, and the like can also be employed in a preferable manner.

Further, the exemplary embodiment has been described by referring to the case where the sub-pixel of the up-and-down sub-pixel pairs is in a substantially trapezoid shape. However, the shape of the sub-pixel is not limited to the trapezoid, as long as it is a shape which can maintain the optical property of the up-and-down sub-pixel pairs, and the connecting relation thereof with respect to the scanning lines and the data lines. Other polygonal shapes may also be employed. For example, when the top side of the trapezoid described in the exemplary embodiment is shortened, the shape turns out as a triangle. Further, when the upward sub-pixel and the downward sub-pixel are rotationally symmetric by 180 degrees, a hexagonal shape, an octagonal shape, and the like with the bent scanning lines may also be employed.

Further, for the display panel, it is possible to employ those other than the liquid crystal type. For example, it is possible to employ an organic electroluminescence display panel, an inorganic electroluminescence display panel, a plasma display panel, a field emission display panel, or PALC (Plasma Address Liquid Crystal).

Tenth Exemplary Embodiment

The structure of a display device according to a tenth exemplary embodiment of the present invention will be described. It is a display device which provides different images to a plurality of N-viewpoints, and it is a feature of this display device that N is 3 or larger while N is 2 with the display device of the ninth exemplary embodiment. Hereinafter, the tenth exemplary embodiment will be described by referring to a case of stereoscopic display device which provides different images to four viewpoints (N=4).

First, the outline of the tenth exemplary embodiment will be described by referring to FIG. 108. A display controller 301 of this exemplary embodiment further includes an input data rearranging device 360 which rearranges viewpoint image data for three viewpoints or more inputted from outside into two pieces of image data. Hereinafter, the two pieces of image data rearranged by the input data rearranging device 360 are referred to as two pieces of input synthesized data.

The writing control device 310 has a function of writing the two pieces of input synthesized data rearranged by the input rearranging device 360 to the image memory 320 instead of the viewpoint images inputted from outside. The two pieces of input synthesized data correspond to the viewpoint images M1, M2 of the input image data of the ninth exemplary embodiment. Hereinafter, the tenth exemplary embodiment will be described in details.

The display part of the tenth exemplary embodiment is configured with up-and-down sub-pixel pairs whose structure and equivalent circuits are shown in FIG. 67 and FIG. 68. Explanations of the up-and-down sub-pixel pairs are omitted, since those are the same as the case of the ninth exemplary embodiment.

Figure 109:
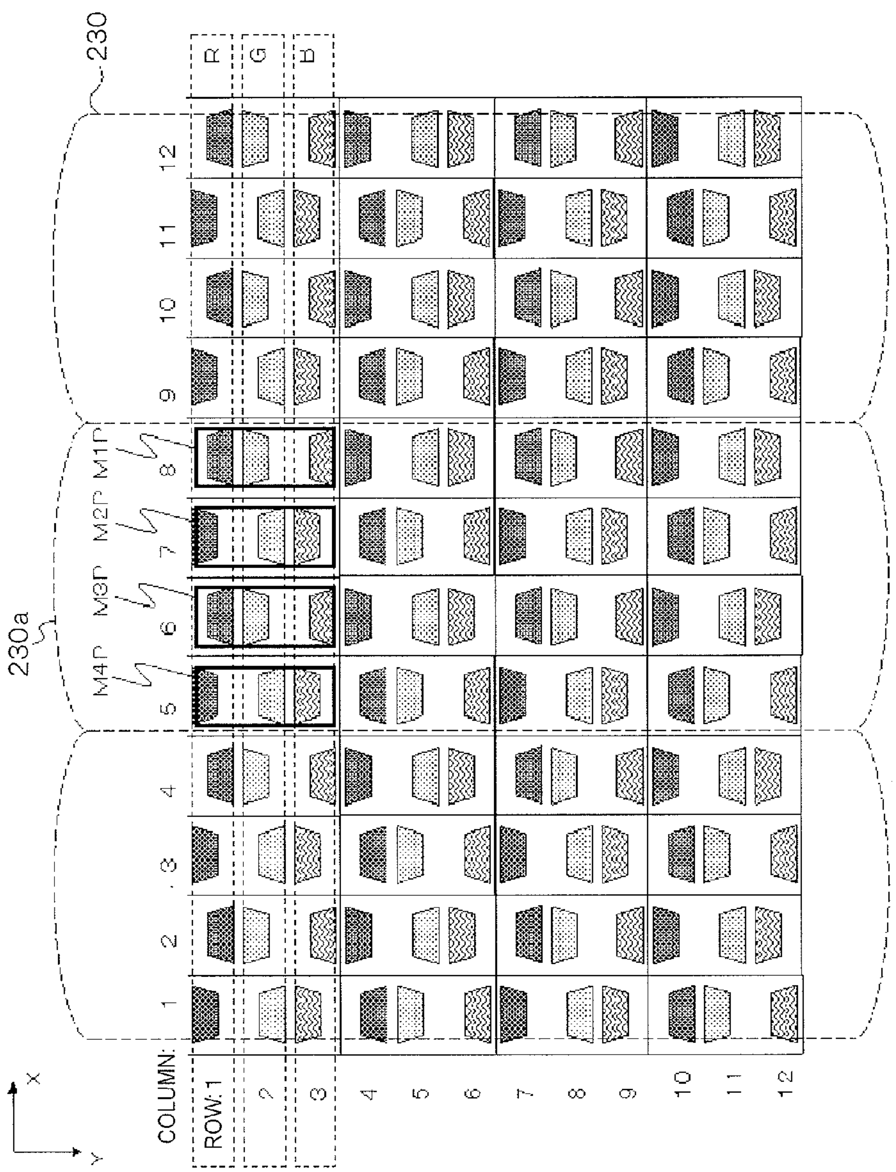
FIG. 109 is a schematic plan view showing a example of the image separating device layout and an example of color layout according to the tenth exemplary embodiment.

FIG. 109 is an example showing the relation between an image separating device and the display part according to the tenth exemplary embodiment. Regarding the XY axes in the drawing, X shows the horizontal direction and Y shows the vertical direction. Trapezoids arranged in twelve rows in the vertical direction and in twelve columns in the horizontal direction are the sub-pixels, and shadings are the colors in a pattern in which R, G, and B are repeated in this order by each row from the first row. In the image separating device, a cylindrical lens 230*a* configuring a lenticular lens 230 corresponds to a unit of four columns of sub-pixels, and it is so arranged that the longitudinal direction thereof becomes in parallel to the vertical direction so as to exhibit the lens effect for the horizontal direction. Light rays emitted from the sub-pixels are separated to different directions of four-column cycles in a column unit, and form four viewpoint images at positions distant from the lens plane due to the lens effect of the cylindrical lenses 230*a*. The pixel as the structural unit of each of the four viewpoint images is configured with three sub-pixels of RGB lined in the vertical direction in a column unit. As each example, FIG. 109 shows the pixel of the first viewpoint image as M1P, the pixel of the second viewpoint image as M2P, the pixel of the third viewpoint image as M3P, and the pixel of the fourth viewpoint image as M4P.

Figure 110:
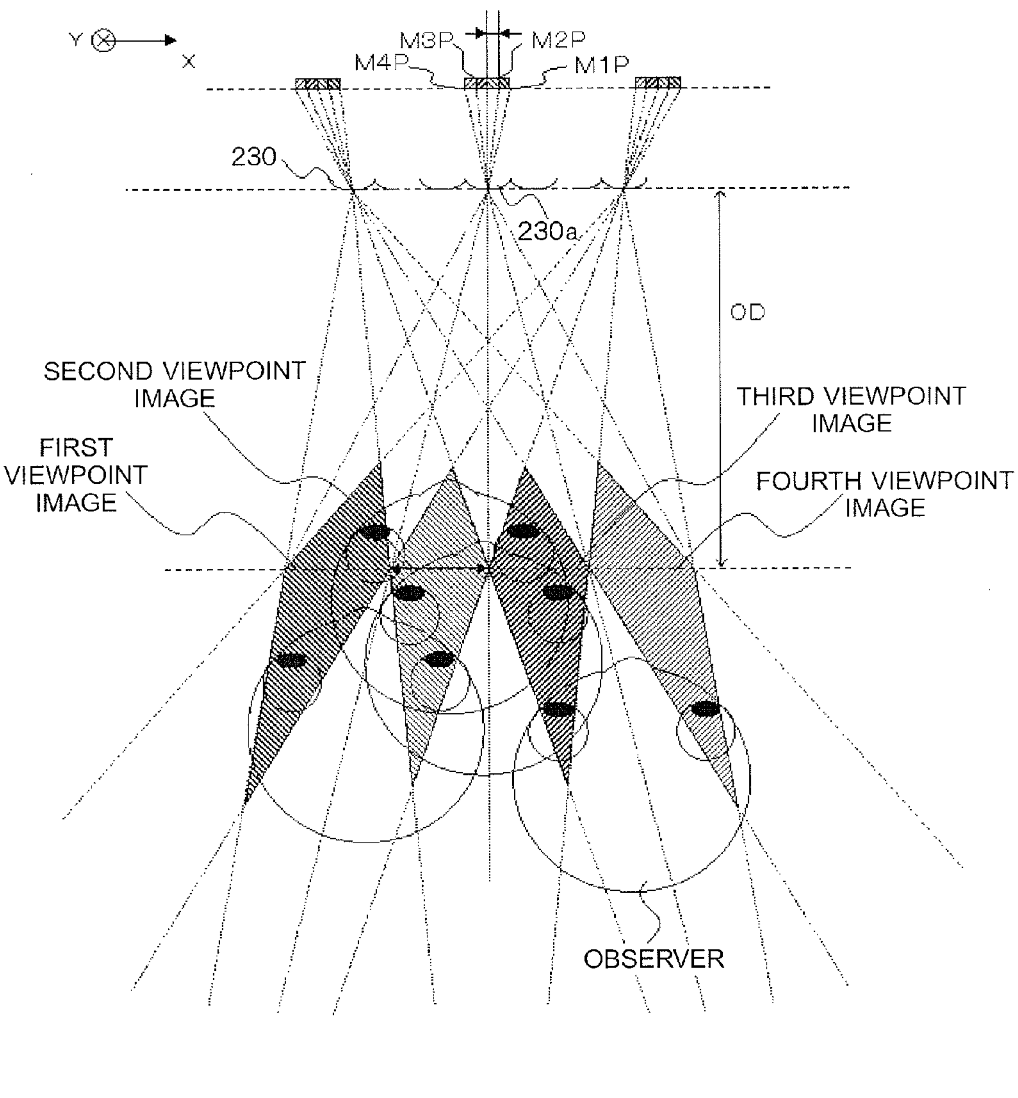
FIG. 110 is an explanatory diagram showing an optical model of the tenth exemplary embodiment.

FIG. 110 shows an optical model of each viewpoint image formed by the light rays emitted from the pixels M1P-M4P for each viewpoint. As shown in FIG. 110, the lenticular lens 230 is disposed on the observer side of the display panel, and also disposed in such a manner that the projected images from all M1P of the display part are superimposed at a plane away from the lens plane by a distance OD, and also projected images from M2P, M3P, and M4P are superimposed and the width of the superimposed projected images in the X direction becomes the maximum. With this layout, the regions of the first viewpoint image, the second viewpoint image, the third viewpoint image, and the fourth viewpoint image are formed in the horizontal direction in order from the left viewed from the observer.

Figure 111:
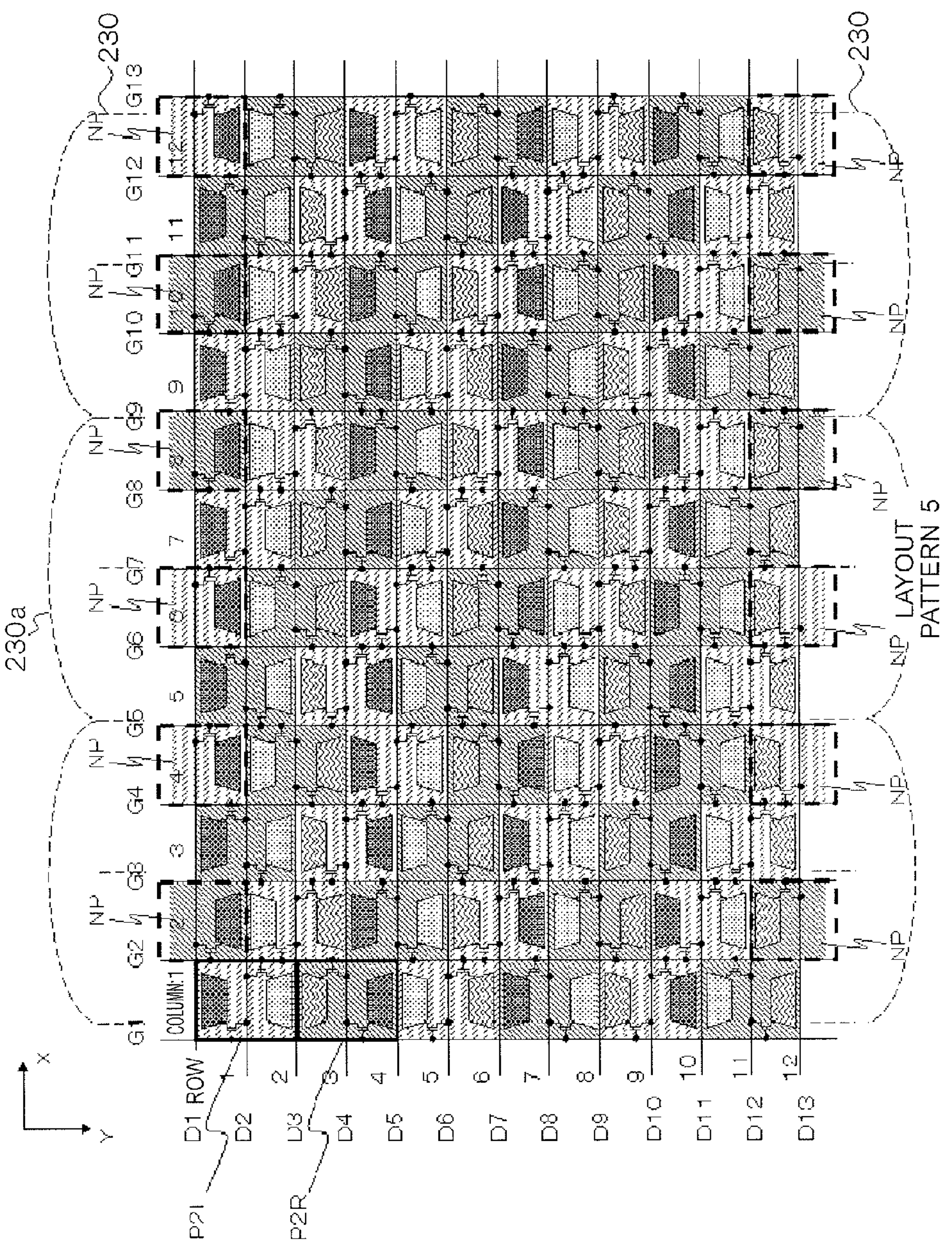
FIG. 111 is a schematic plan view showing a layout pattern 5 of the display part according to the tenth exemplary embodiment.

Next, the connecting relation regarding the sub-pixels shown in FIG. 109 and scanning line as well as data lines will be described. FIG. 111 is an example of the display part of the tenth exemplary embodiment shown in FIG. 109 which is configured with up-and-down sub-pixel pairs P2R and P2L, and it is a layout pattern 5. As shown in FIG. 111, the combination of the up-and-down sub-pixel pairs P2L and P2R of the layout pattern 5 is the same as that of the layout pattern 3 shown in FIG. 73 from the first column to the fourth column of the display part, while the up-and-down sub-pixel pairs P2R and the up-and-down sub-pixel pairs P2L are switched with respect to the case of the layout pattern 3 from the fifth column to the eight column of the display part. Further, it is the same with the layout pattern 3 from the ninth column to the twelfth column of the display part. That is, the layout pattern 5 is a pattern in which the layout pattern 3 and the pattern where the up-and-down sub-pixels P2R and the up-and-down sub-pixel pairs P2L are switched with respect to the case of the layout pattern 3 are repeated by every four columns. The layout pattern 5 exhibits a flicker suppressing effect and an effect of suppressing abnormal alignment of the liquid crystal molecules, when the dot inversion driving method is employed for the polarity inversion drive method.

Figure 112:
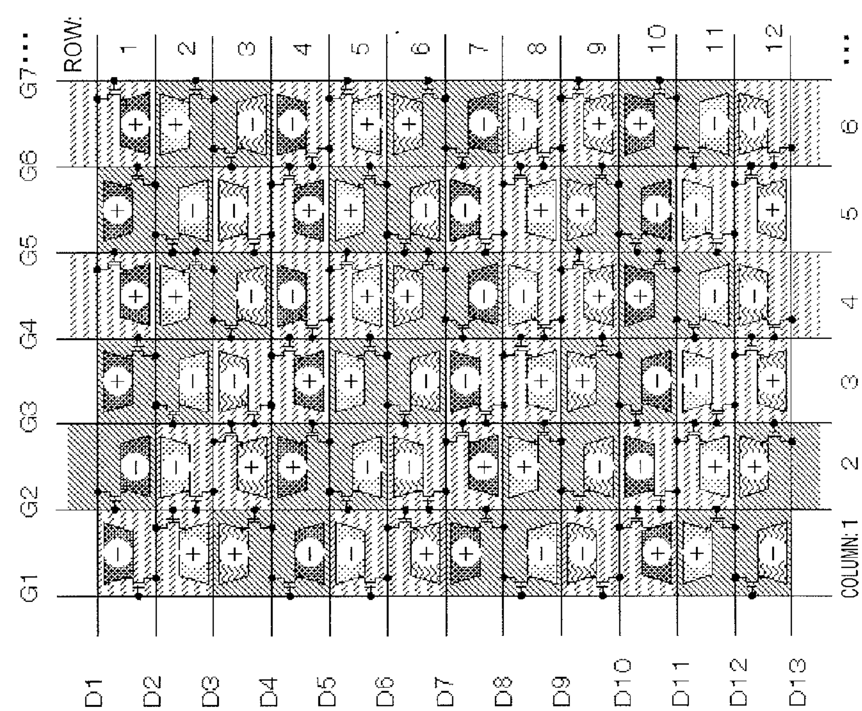
FIG. 112 shows charts showing a polarity distribution when dot inversion drive is employed to the display part (layout pattern 5) according to the tenth exemplary embodiment.

FIG. 112 shows the polarity distribution of the display part when the dot inversion drive is applied to the layout pattern 5 shown in FIG. 111, and shows the data line polarity for each scanning line of the dot inversion drive. As described in FIG. 109, with the tenth exemplary embodiment, each viewpoint image is provided in a four-column cycle. As shown in FIG. 111, the up-and-down sub-pixel pairs P2R and P2L in the layout pattern 3 (FIG. 73) are switched in a four-column cycle by corresponding to the periodicity of the viewpoint images, and the dot inversion drive is employed. With this, in each of the separated viewpoint images from the first viewpoint image to the fourth viewpoint image, the polarities of the laterally-neighboring sub-pixels are inverted, and the polarities are inverted by every two rows of the sub-pixels in the vertical direction. That is, the same flicker suppressing effect as the case of employing the vertical 2-dot inversion drive for a typical panel can be achieved. Further, regarding the polarity distribution of the layout pattern 5, the long sides of the pixel electrodes in trapezoids come to be in a same polarity. Thus, it is possible to suppress abnormal alignment of the liquid crystal molecules in the vicinity of the long sides neighboring to each other, thereby making it possible to provide a high image quality.

Next, described is synthesized image data that is supplied to the display part of the tenth exemplary embodiment by referring to a case where the display part is in the layout pattern 5 (FIG. 111). FIG. 113 shows image data for four viewpoints inputted to the display controller 301 from outside. Each of the first viewpoint image data to the fourth viewpoint image data as the input image data is configured with pixel data lined in i-rows and j-columns (i=4, j=3). Regarding each of reference codes in "Mk (Iy, Ix) RGB", "k" indicates the viewpoint number, "Iy" is the row number within an image, "Ix" is the column number within the image, and "RGB" means that it carries luminance information of each of the colors R: red, G: green, and B: blue.

FIG. 114 shows synthesized image data 5 to be supplied to the display module, when the input image data shown in FIG. 113 is displayed on the layout pattern 5 shown in FIG. 111. The synthesized image data 5 can be generated in the manner described hereinafter by using the input data rearranging device 360 shown in FIG. 108 from the regularities of the data line unit and the scanning line unit based on the setting parameters of the image separating device and the color layout of the color filters, the setting parameter of the layout pattern, and the layout of the up-and-down sub-pixel layout (LUT) as in the case of the ninth exemplary embodiment. FIG. 115 shows LUT (Dy, Gx) which is the pattern of the up-and-down sub-pixel pairs P2R and P2L connected to an arbitrary data line Dy and an arbitrary scanning line Gx of the layout pattern 5.

Figure 116:
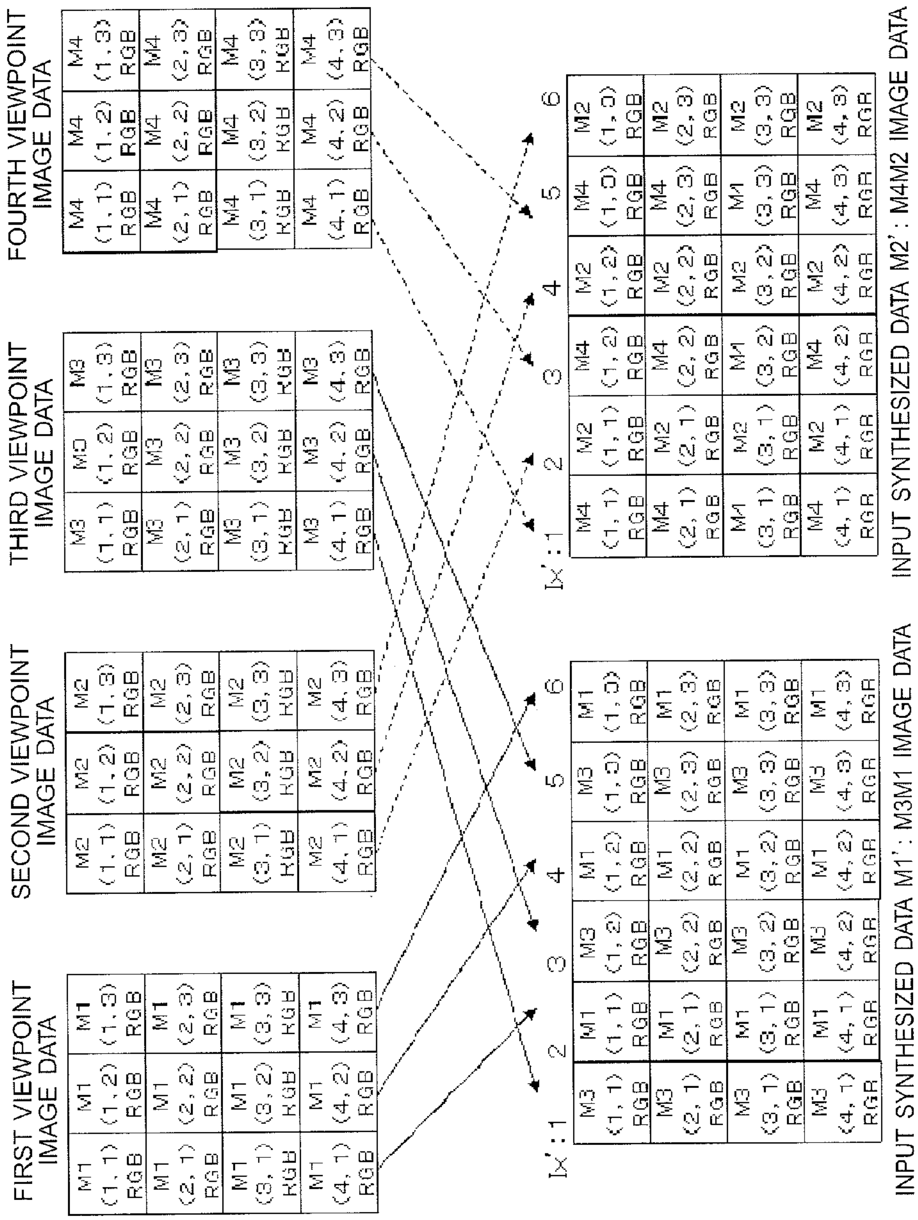
FIG. 116 shows charts showing an example of input image data rearrangement according to the tenth exemplary embodiment.

The input data rearranging device 360 rearranges the image data for N-viewpoints inputted from outside into two pieces of input synthesized data M1' and M2' which correspond to the odd-numbered columns and the even-numbered columns of the display part in a column unit. In the layout of the image separating device disposed on the display part shown in FIG. 109 and FIG. 110, synthesized input data M1', M2' generated from the input data for four viewpoints (N=4) shown in FIG. 113 are illustrated in FIG. 116. As show in FIG. 116, rearrangement in a column unit is executed, so that an arbitrary row number Iy of the input image data and the row number of the generated input synthesized data correspond with each other (same row number Iy). However, the column number of the input synthesized data is different from the arbitrary column number Ix of the input image data. Thus, the column number of the input synthesized image data is expressed as Ix'.

In the ninth exemplary embodiment, the two viewpoint images M1 and M2 of the input image data are displayed by being separated for the even-numbered columns and the odd-numbered columns of the display part. Therefore, as described above, it is possible to generate the synthesized image data with the same processing as the processing described in the ninth exemplary embodiment through sending the input synthesized data M1' and M2' generated by the rearranging processing that is executed according to the even-numbered columns and the odd-numbered columns of the display part to the writing control device 310. However, in order to generate the input synthesized data by having the image data for N-viewpoints inputted from outside corresponded to the even-numbered columns and the odd-numbered columns of the display part, information regarding the column numbers of the display part and the viewpoint numbers of the inputted image data is required.

Figure 117:
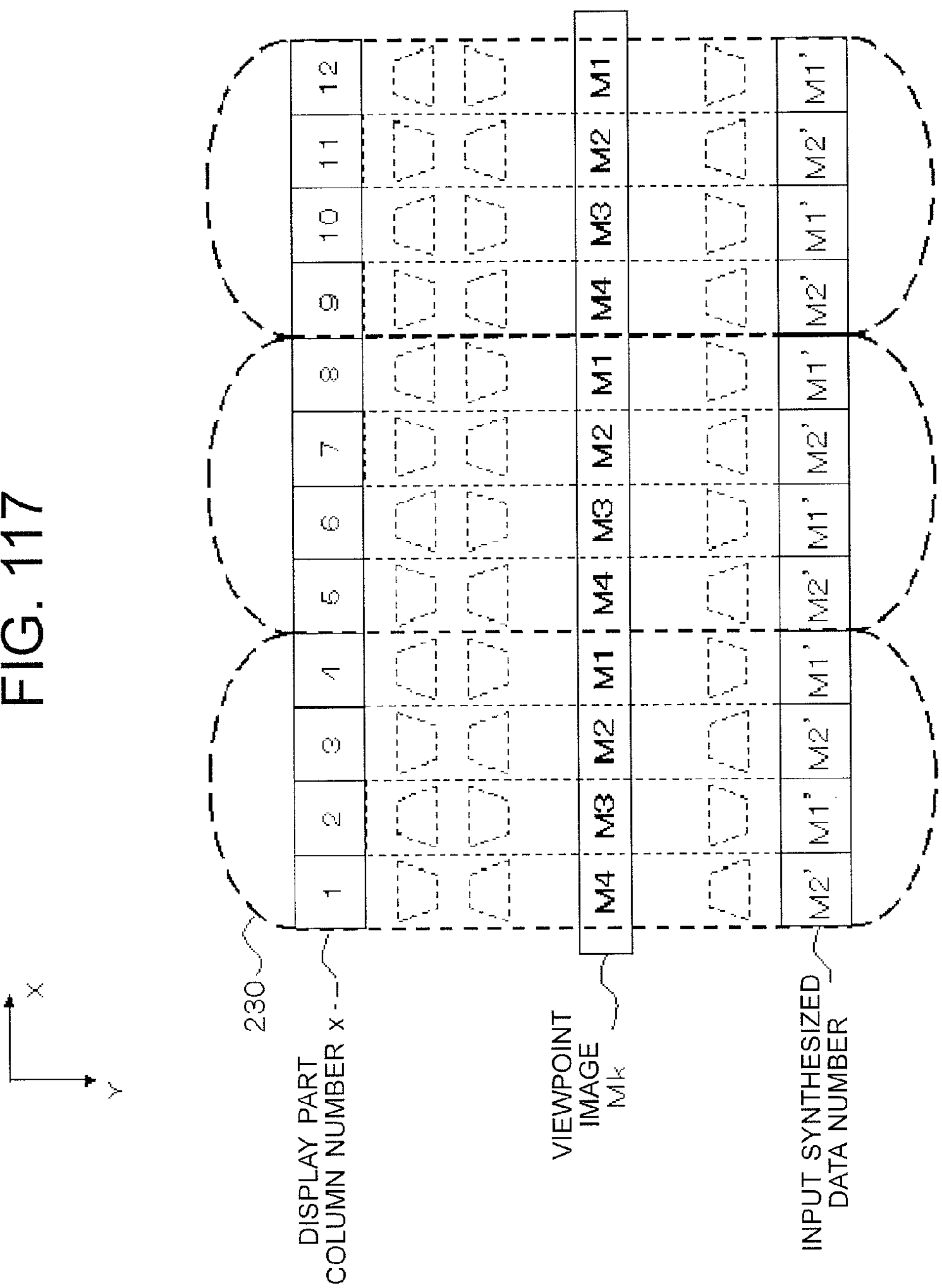
FIG. 117 is a schematic plan view showing a first example of corresponding relation between an image separating device and column number of the display part according to the tenth exemplary embodiment.
Figure 118:
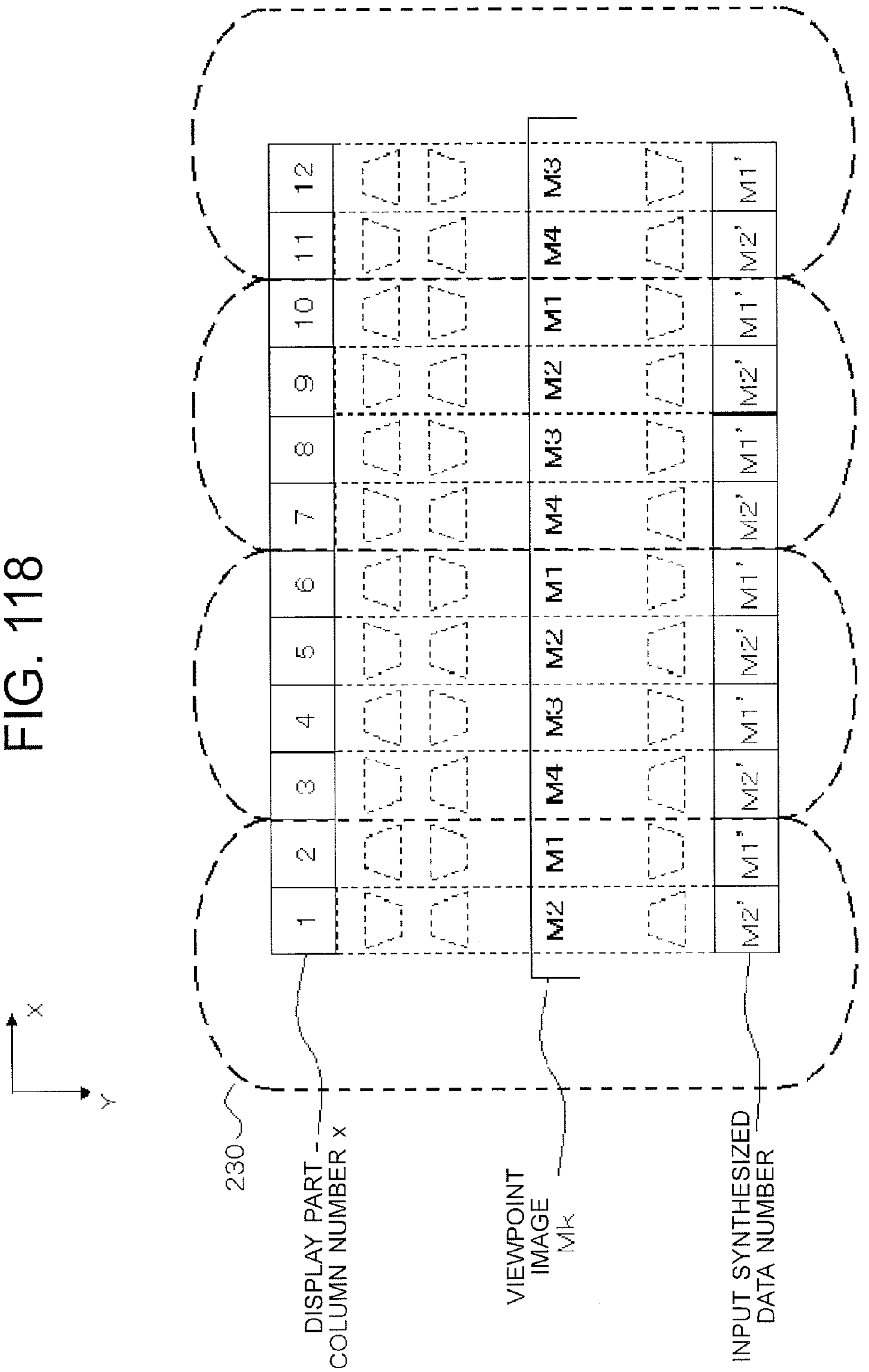
FIG. 118 is a schematic plan view showing a second example of corresponding relation between the image separating device and column number of the display part according to the tenth exemplary embodiment.

FIG. 117 is an example of a relation regarding the column number "x", the viewpoint images M1-M2 of the input image data, and the input synthesized data M1', M2' under the relation of the display part and the image separating device shown in FIG. 109. The column number and the viewpoint image Mk are related to the layout of the image separating device and the number of viewpoints, and determined by design of the display module. For example, the image separating device disposed on the observer side of the display panel as in FIG. 110 may be disposed to be in the relation with respect to the display part shown in FIG. 118. In that case, in order to form the regions of the first viewpoint image, the second viewpoint image, the third viewpoint image, and the fourth viewpoint image along the horizontal direction in order from the left side viewed from the observer as in the case of FIG. 110, the sub-pixel on the first column (x=1) of the display part corresponds to M2, the sub-pixel of x=2 corresponds to M1, the sub-pixel of x=3 corresponds to M4, the sub-pixel of x=4 corresponds to M3, the sub-pixel of x=5 corresponds to M2, - - - , respectively, as shown in FIG. 118.

Further, when the image separating device is disposed to the display panel on the opposite side from the observer unlike the case of FIG. 110 even though the positional relation between the image separating device and the display part is the same as the case of FIG. 117, the sub-pixel of the column number x=1 corresponds to M1, the sub-pixel of x=2 corresponds to M2, the sub-pixel of x=3 corresponds to M3, the sub-pixel of x=4 corresponds to M4, - - - , respectively. Further, when the number of viewpoints of the display module changes, the corresponding relation between the column number "x" and the viewpoint number becomes different from that of FIG. 117.

As described above, in order to execute the input rearranging processing, the relation between the column number "x" of the display part and the viewpoint number "k" needs to be stored in the display controller. As an example, FIG. 119 shows a table TM (N, op, x) which shows the value of the viewpoint number "k" according to the column number "x" of the display part. The table TM shown in FIG. 119 uses parameters "N" and "op" for corresponding to a plurality of display modules. "N" shows the number of viewpoints, and "op" is corresponded depending on the difference in the layout of the image separating device as in FIG. 117 and FIG. 118. With the table TM, it is not necessary to store the viewpoint "k" for all the m-columns configuring the display part as shown in FIG. 119. It is possible to compress the information amount by storing the viewpoint according to the repeated pattern of the viewpoint numbers corresponding to the column number. Further, the parameters "N" and "op" may be defined as appropriate according to the design of the display controller, and it is possible to compress the information amount of the table TM through limiting the types. The table TM may be stored in the parameter storage device 341 shown in FIG. 108.

The viewpoint number "k" of the input image data corresponding to an arbitrary column "x" of the display part can be obtained from the table TM. Thus, the input synthesized data M1' and M2' can be generated through rearranging the input image data by corresponding those to the even/odd of the columns of the display part. In the case of FIG. 117, the input synthesized data M1' is corresponded to the even-numbered columns of the display part, and the input synthesized data M2' is corresponded to the odd-numbered columns of the display part. However, inversely, the input synthesized data M1' may be corresponded to the odd-numbered columns of the display part, and the input synthesized data M2' may be corresponded to the even-numbered columns of the display part. It is to be noted, however, that the corresponding relation between the input synthesized data M1', M2' and the even/odd of the columns of the display part is related to the viewpoint "v1" of the odd-numbered data line and the viewpoint "v2" of the even-numbered data line used in the readout control device 331. That is, as described by referring to FIG. 83 of the ninth exemplary embodiment, the values of "v1" and "v2" are determined along with the facing direction "u" of the sub-pixel on the first row of the first column of the display part. FIG. 120 summarizes the relation between the input synthesized data M1', M2' and even/odd of the data lines.

In addition to the table TM, the tenth exemplary embodiment also requires the parameter variables shown in FIG. 91 for generating the synthesized image data as in the case of the ninth exemplary embodiment. The table TM including the viewpoint number (N) and the parameters shown in FIG. 91 are saved in the parameter storage device 341 to be used for generating the synthesized image data.

(Explanations of Actions)

Figure 121:
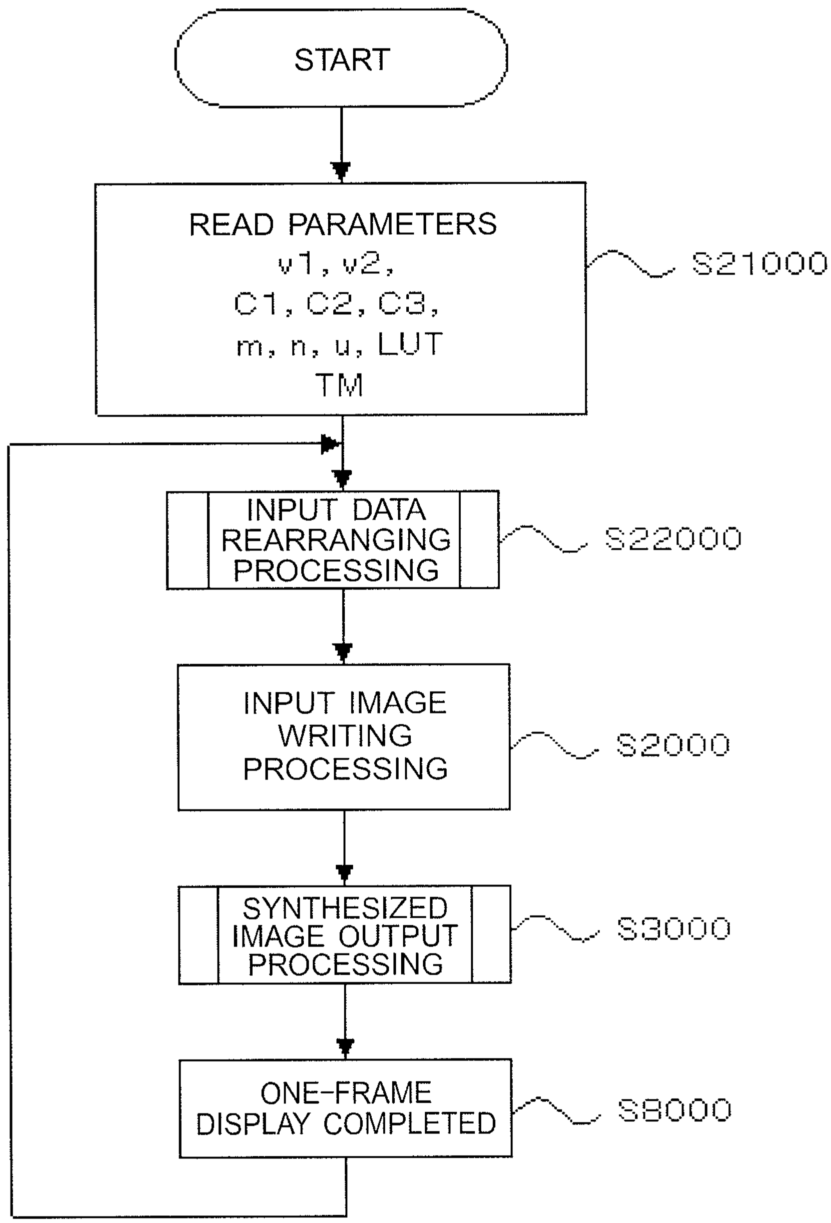

An example of the actions of the tenth exemplary embodiment will be described by referring to a flowchart. For the processing that is the same as the processing of the ninth exemplary embodiment, the same drawings and reference numerals are used for the explanations. FIG. 121 is a flowchart showing the outline of the actions of the tenth exemplary embodiment.

(Step S21000)

Figure 108:
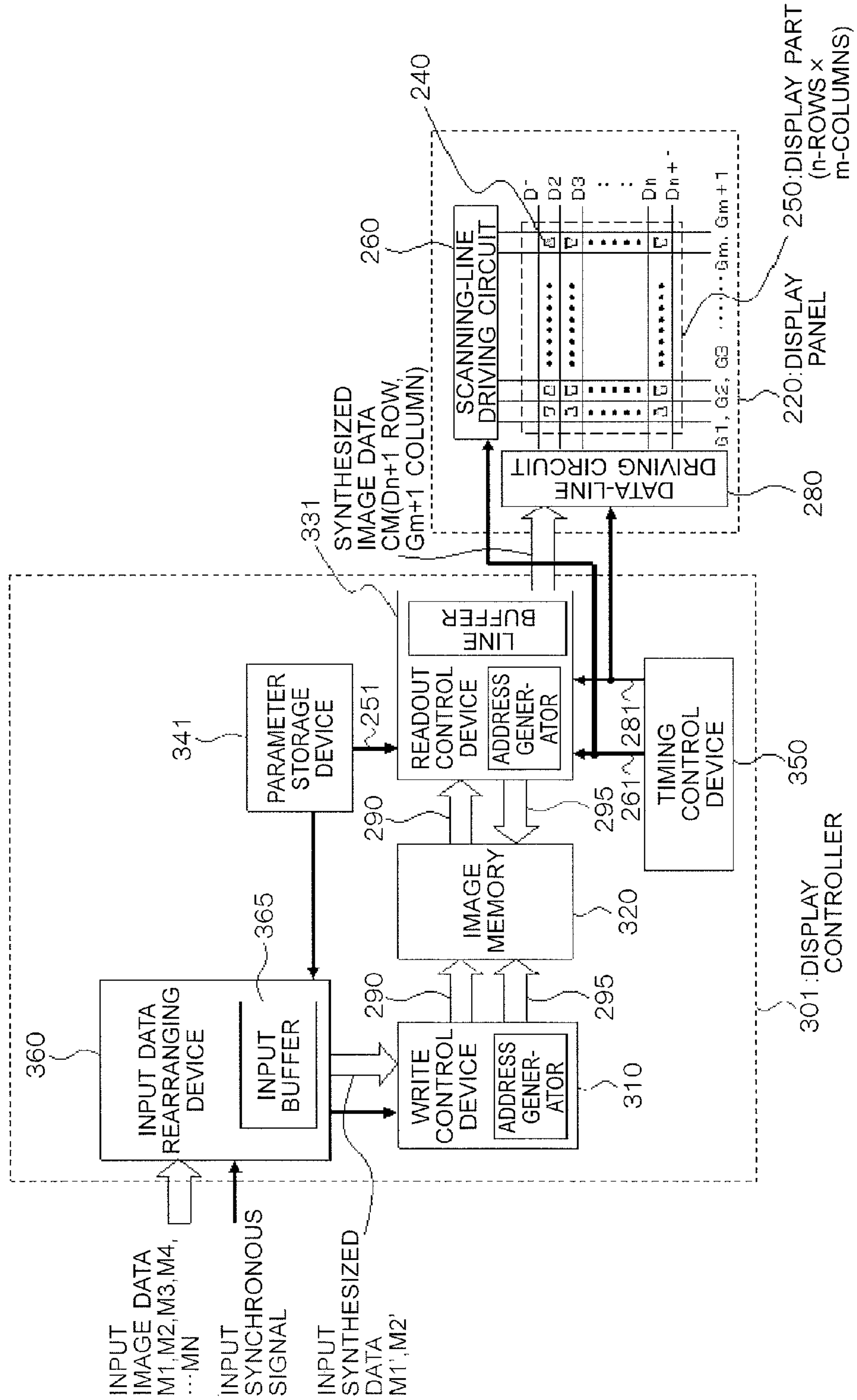
FIG. 108 is a functional block diagram showing a tenth exemplary embodiment.

As shown in FIG. 121, when the action of the display device according to the exemplary embodiment is started, the table TM required for generating the input synthesized data and various kinds of parameters required for generating the synthesized image are read from the parameter storage device 341 shown in FIG. 108. The viewpoint "v1" shows the input synthesized data to which the odd-numbered data line corresponds, and the viewpoint "v2" shows the input synthesized data to which the even-numbered data line corresponds. Other parameters are the sane as those of the ninth exemplary embodiment, so that explanations thereof are omitted.

(Step S22000)

The input image data for N-viewpoints configured each with image data of i-rows and j-columns and the synchronous signals are inputted to the input data rearranging device 360 shown in FIG. 108 from outside. The inputted image data for N-viewpoints is rearranged to two pieces of input synthesized data M1' and M2' which correspond to the odd-numbered columns and the even-numbered columns of the display part in a column unit, and outputted to the writing control device 310. Actions of the input data rearranging processing will be described separately by referring to a flowchart shown in FIG. 122.

(Steps S2000, S3000, S8000)

The image input writing processing and the synthesized image output processing is the same as the processing shown in the flowchart of the ninth exemplary embodiment where the reference numerals are replaced from the viewpoint images M1, M2 of the input image data are replaced with the input synthesized data M1', M2' and the column Ix of the input image data is replaced with the column Ix' of the input synthesized data. The ninth exemplary embodiment is to be cited for the flowchart and the explanations of the actions.

Figure 122:
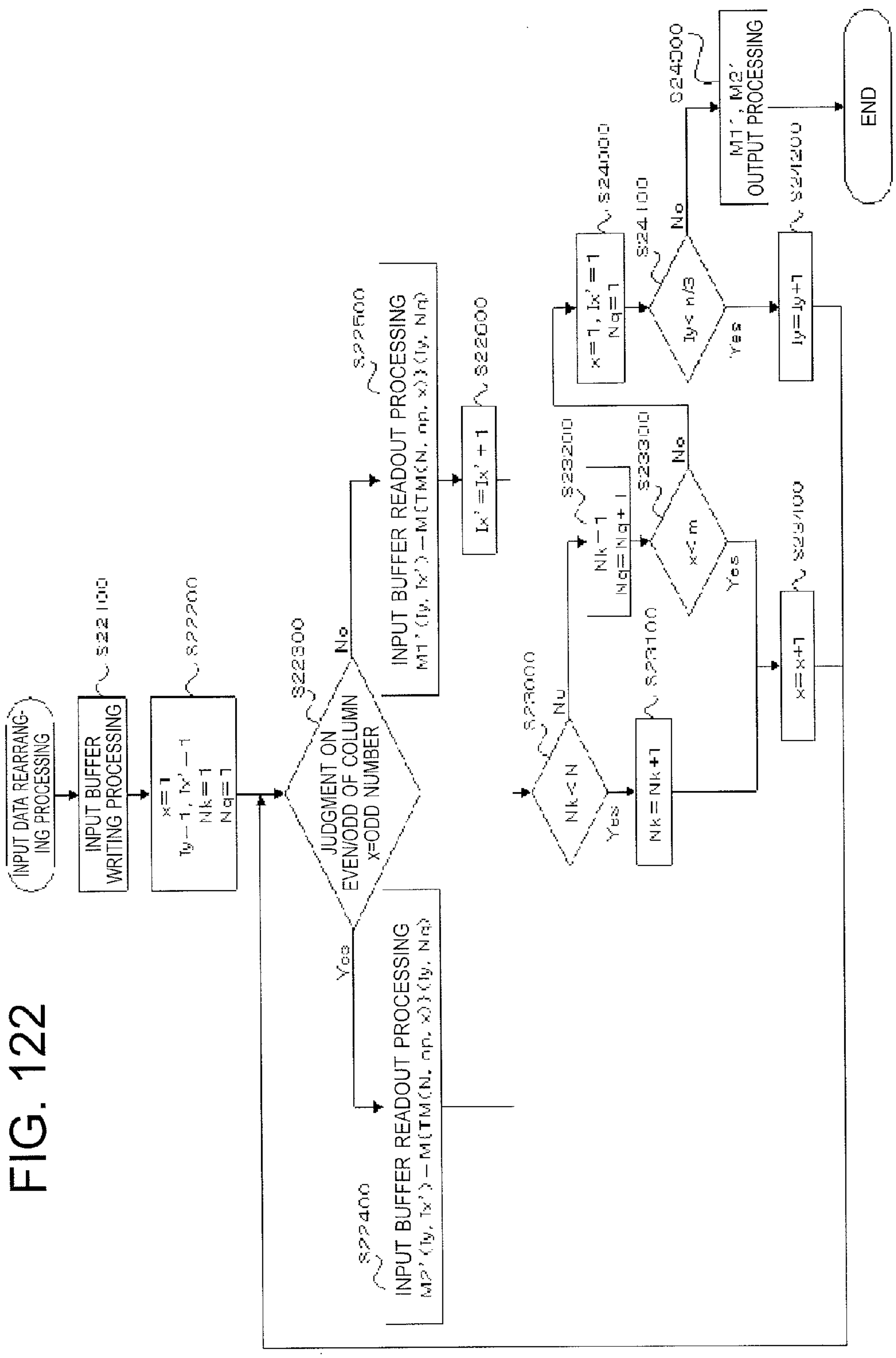

Next, actions of the input data rearranging processing will be described by referring to FIG. 122. The rearranging processing reads out the corresponding pixel data from the input buffer through counting the column number "x" of the display part, and executing processing by using the table TM and by using the count value "x" as the reference. When the rearranging processing for one row of the input synthesized data is completed, the count value "x" is returned to 1. The same processing is executed over i-rows of input image data.

(Step S22100)

The image data for N-viewpoints inputted from outside is stored to the input buffer by using the synchronous signals inputted from outside. Regarding the data stored in the input buffer, an arbitrary viewpoint number "k", position (row Iy, column Ix), and each color (R/G/B) luminance data can be selected in a pixel data unit. The input buffer does not depend on the transfer form of the input image data for N-viewpoints, as long as it has the data capacity capable of storing all the inputted image data for N-viewpoints. In other words, the data capacity of the input buffer can be compressed according to the characteristics of the form (e.g., side-by-side format) with which the input image data for N-viewpoints is inputted.

(Step S22200)

"1" is given to the variables "x", "Iy", "Ix'", "Nk" and "Nq" as an initial value. Further, "x" shows the column number of the display part. "Iy" shows the row number of the input image data and the row number of the input synthesized data, and "Ix'" shows the column number of the input synthesized data to be generated. "Nk" is the count value when counting the viewpoints number from 1 to N, and "Nq" is the variable used for designating the column number of the input pixel data.

(Step S22300)

Even/odd of the count value "x" of the column is judged. The judgment condition is whether "x" is an odd-number or an even number. When judged as Yes, the procedure is advanced to step S22400. When judged as No, the procedure is advanced to step S22500.

(Step S22400)

The pixel data "M{TM(N, op, x)} (Iy, Nq) RGB" is read out from the input buffer by using the table TM and the count value "x", "Iy", and "Nq", and it is substituted to the input synthesized data "M2'(Iy, Ix') RGB". Note here that the substitution processing to the input synthesized data is executed assuming the case where the input synthesized data M2' is corresponded to the odd-numbered columns of the display part. When the input synthesized data M1' is corresponded to the odd-numbered columns of the display part, the input synthesized image data M2' in this step may be replaced with the input synthesized data M1'.

(Step S22500)

The pixel data "M{TM(N, op, x)} (Iy, Nq) RGB" is read out from the input buffer by using the table TM and the count value "x", "Iy", and "Nq", and it is substituted to the input synthesized data "M1'(Iy, Ix') RGB". Note here that the substitution processing to the input synthesized data is executed assuming the case where the input synthesized data M1' is corresponded to the even-numbered columns of the display part. When the input synthesized data M2' is corresponded to the even-numbered columns of the display part, the input synthesized image data M1' in this step may be replaced with the input synthesized data M2'.

(Step S22600)

"1" is added to the count value "Ix'" which shows the column number of the input synthesized data.

(Step S23000)

It is judged whether the count value "Nk" showing the viewpoint number has reached to "N". The judgment is conducted by comparing the number of viewpoints (types) "N" of the input image data read as TM in step S21000 shown in FIG. 121 with the count value "Nk". When the count value "Nk" has not reached to the viewpoint number "N", it is judged as Yes and the procedure is advanced to step S23100. When the count value "Nk" has reached to the viewpoint number "N", it is judged as No and the procedure is advanced to step S23200.

(Step S23100)

"1" is added to the count value "Nk", and the procedure is advanced to step S23400.

(Step S23200)

The count value "Nk" is returned to 1, and 1 is added to the count value "Nq" which designates the column number of the input pixel data.

(Step S23300)

It is judged whether the count value "x" of the column of the display part has reached to the column number "m" of one row. The judgment is conducted by comparing the count value "x" with the column number "m" of the display part read in step S21000 shown in FIG. 121. When the count value "x" has not reached to the column number "m", it is judged as Yes and the procedure is advanced to step S23400. When the count value "x" has reached to the column number "m", it is judged as No and the procedure is advanced to step S24000.

(Step S23400)

"1" is added to the count value "x", and the procedure is advanced to step S22300.

(Step S24000)

The rearranging processing for one row has been completed, so that the count values "x", "Ix'", and "Nq" are returned to 1.

(Step S24100)

It is judged whether the count value "Iy" has reached to row number "n/3" of the input image data calculated from the row number "n" of the sub-pixel of the display part read in step S21000 shown in FIG. 121. The judgment is conducted by comparing the count number "Iy" with "n/3". When the count value "Iy" has not reached to "n/3", it is judged as Yes and the procedure is advanced to step S24200. When the count value "Iy" has reached to "n/3", it is judged as No and the procedure is advanced to step S24300.

(Step S24200)

"1" is added to the count value "Iy", and the procedure is advanced to step S22300.

(Step S24300)

The input synthesized data M1' and M2' rearranged by the above-described steps are outputted to the writing control device 310 shown in FIG. 108. With this step, the input data rearranging processing is completed, and the procedure is advanced to step S2000 shown in FIG. 121.

While the actions of the tenth exemplary embodiment have been described above, the explanations provided above are merely presented as a way of examples, and the exemplary embodiment is not limited only to that. For example, in the input data rearranging processing shown in FIG. 122, the count value "x" of the column of the display part is used as the reference to execute the processing, and the input pixel data is alternately substituted to M2' and M1'. However, it is possible to change the flow to execute substitution processing of the input pixel data to M1' after completing all the substitution processing for M2'.

Further, regarding the structure of the tenth exemplary embodiment, FIG. 10 separately illustrates the input data rearranging device 360 and the writing control device 310. However, the structure of the exemplary embodiment is not limited only to such case. For example, the writing control device 310 may include the input data rearranging function shown in FIG. 116. By having the writing control device 310 control the generated addresses in a column unit of each viewpoint image, the same processing as the input data rearranging processing shown in FIG. 116 can be executed.

(Effects)

As shown in FIG. 110, the number of viewpoints can be increased with the tenth exemplary embodiment. Thus, the observer can enjoy stereoscopic images from different angles by changing the observing positions. Further, motion parallax is also provided at the same time, which can give a higher stereoscopic effect to the images.

Eleventh Exemplary Embodiment

The structure of a display device according to an eleventh exemplary embodiment of the present invention will be described. The eleventh exemplary embodiment is the same as the display device of the ninth exemplary embodiment, except that the region of the image memory provided to the display controller is reduced.

Figure 123:
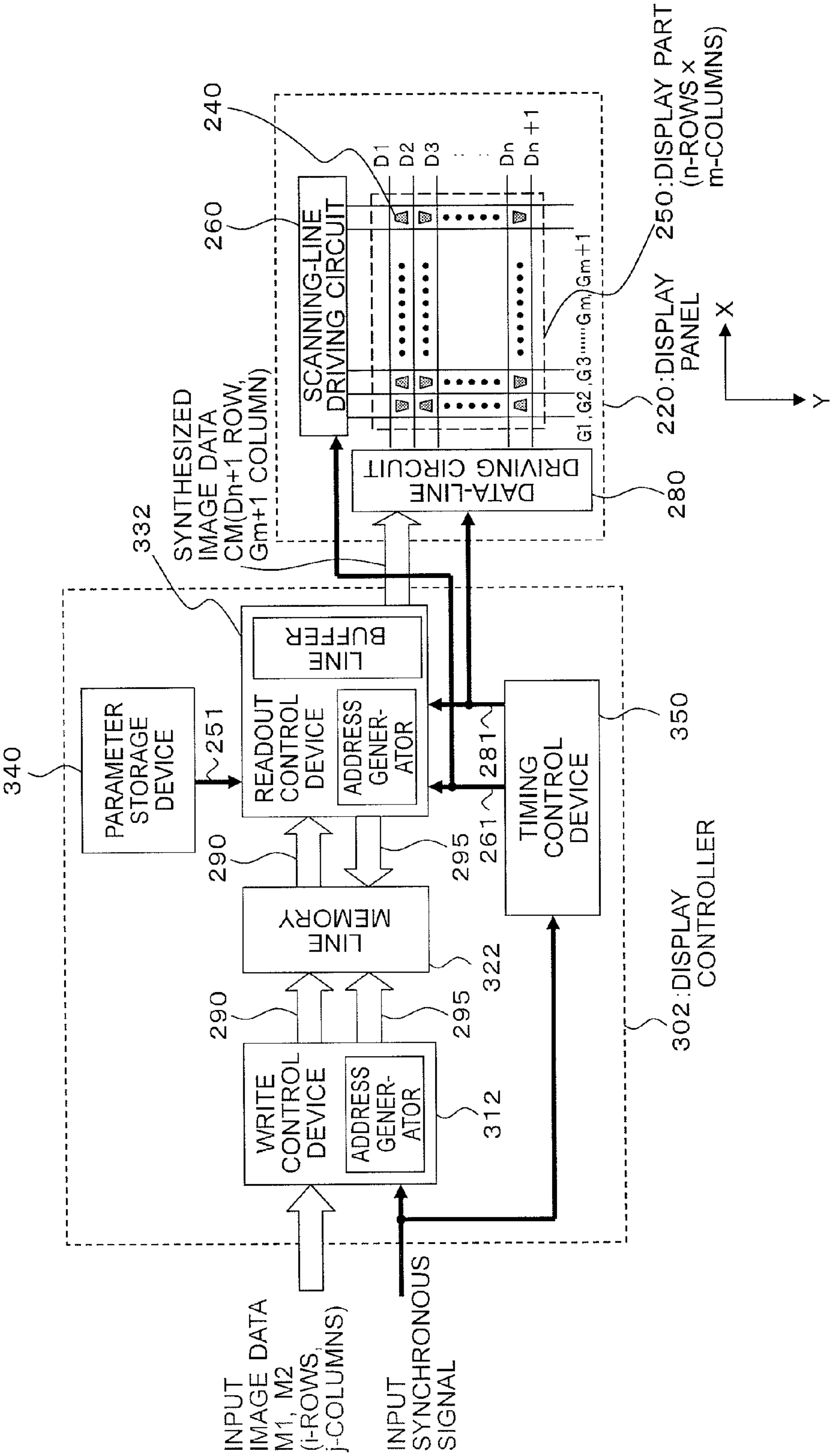

FIG. 123 shows a functional block diagram of the eleventh exemplary embodiment. As in the case of the ninth exemplary embodiment, it is configured with: a display controller 302 which generates synthesized image data CM from the image data for each viewpoint inputted from outside; and a display panel 220 which is a display device of the synthesized image data CM. The display panel 220 includes a display part 250 as in the case of the ninth exemplary embodiment. In the display part 250, data lines are so arranged that the extending direction thereof is set to be the horizontal direction (X direction), and scanning lines are so arranged that the extending direction thereof is set to be the vertical direction (Y direction).

The structure of the display controller 302 is different from that of the ninth exemplary embodiment in respect that the region of the image memory is reduced and that a line memory 322 is provided. The line memory 322 has a memory region for a plurality of columns of sub-pixels 240 of the display part 250. The display controller 302 includes: a writing control device 312 which has a function of writing input image data to the line memory 322; and a readout control device 332 which has a function of reading out the data from the line memory 322. Other structures of the display controller 302 are the same as those of the ninth exemplary embodiment, so that the same reference numerals are applied thereto and explanations thereof are omitted.

The eleventh exemplary embodiment uses the input image data transfer form shown in FIG. 124C. With this, the image memory capable of writing and saving all the input image data becomes unnecessary, thereby making it possible to reduce the memory region. The transfer form of the input image data according to the eleventh exemplary embodiment will be described by referring to FIG. 124.

FIG. 124A shows viewpoint images M1 and M2 as the images for the left eye and the right eye. Each of the viewpoint images M1 and M2 is configured with pixel data of i-rows and j-columns, and the pixel data carries three-color luminance information of R (red) luminance, G (green) luminance, and B (blue) luminance. FIG. 124B shows a stereoscopic image observed from a proper observing position, when the viewpoint images M1 and M2 shown in FIG. 124A are displayed on the display part 250. FIG. 124C is a transfer image of the viewpoint images M1 and M2 shown in FIG. 124A of the eleventh exemplary embodiment.

As shown in FIG. 70, with the image separating device (lenticular lens 230), the sub-pixels on the odd-numbered columns of the display part 250 are M2 (for the right eye) and the sub-pixels on the even-numbered columns are M1 (for the left eye). In the eleventh exemplary embodiment, the viewpoint image data shown in FIG. 124A is transferred by each column for enabling the processing by the line memory 322. Further, the transfer order of the viewpoint images M1 and M2 is corresponded to the start column of the display part 250. Thus, in the case of the layout of the image separating device shown in FIG. 70, the data transfer is started from "M2 (1, 1) RGB". Subsequently, the data transfer is executed as in" M2 (2, 1) RGB", "M2 (3, 1) RGB", - - - . When it reaches to "M2 (i, 1) RGB", the transfer then starts in order of "M1 (1, 1) RGB", "M1 (2, 1) RGB", "M1 (3, 1) RGB", - - - , "M1 (i, 1) RGB". When the data transfer of M2 and M1 on the first column is completed, the transfer is repeated in the same manner on the second column, the third column, - - - , until completing the data transfer of the j-th column.

Figure 125:
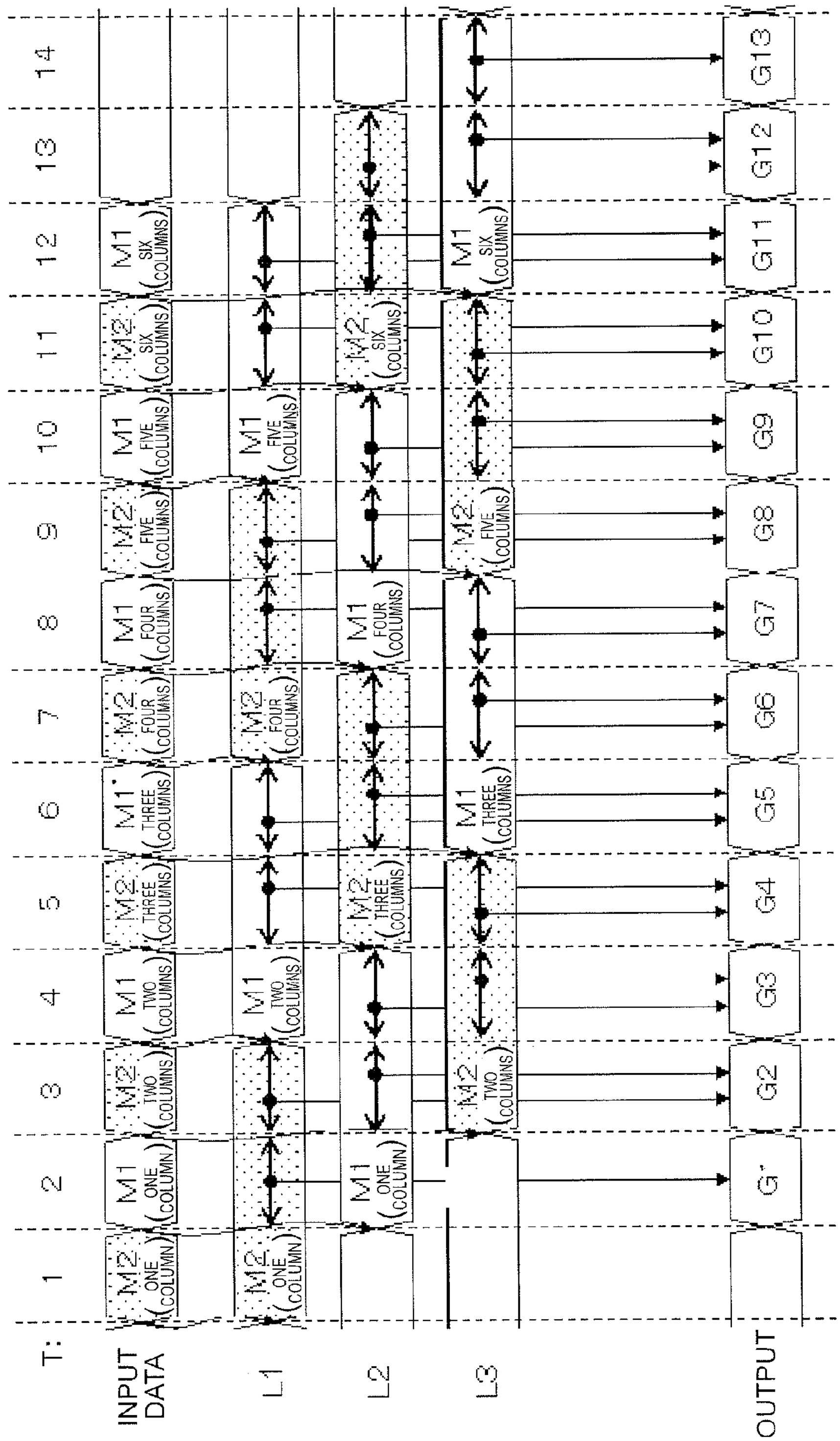

Next, the transfer method described by referring to FIG. 124 and the actions of the eleventh exemplary embodiment using the line memory will be described by referring to FIG. 125. FIG. 125 shows output timings in a scanning line unit when the image data of viewpoint images M1, M2 configured with 4 rows×6 columns of pixels shown in FIG. 69 are inputted according to the above-described transfer method. "T" shows one scanning period of the display panel, and input data shows transfer of the viewpoint images M1 and M2 shown in FIG. 69 in a column unit. From L1 to L3 are line memories which can store each of inputted viewpoint image data for one column.

The data of M2 on the first column is stored in L1 in a period of T=1 (abbreviated as T1 hereinafter). Subsequently, in T2, the line data output processing (FIG. 94-FIG. 101) described in the ninth exemplary embodiment is executed by using the data stored in L1, and the synthesized image data of scanning line G1 is outputted. Further, in T2, the data of M1 on the first column is stored to L2 in parallel. Then, in T3, the line data output processing (FIG. 94-FIG. 101) described in the ninth exemplary embodiment is executed by using the data stored in L1 and L2, and the synthesized image data of scanning line G2 is outputted. Further, in T3, the data of M2 on the second column is stored to L3 in parallel. Then, in T4, the line data output processing as in T2 and T3 is executed by using the data stored in L2 and L3, and the synthesized image data of scanning line G3 is outputted. Here, output of the data of M2 on the first column stored in L1 is completed in T2 and T3. Thus, in T4, the data of M1 on the second column is stored in L1. In next period T5, the line data output processing is executed by using the data stored in L3 and L1, and the synthesized data of scanning line G5 is outputted. Through repeating the processing described above, the synthesized data up to the scanning line G13 is outputted as shown in FIG. 125.

Therefore, the memory region for the image data required in the eleventh exemplary embodiment is three columns of each viewpoint image data. With the sub-pixel unit of the display part, it is necessary to have a data storage region for the number of sub-pixels (except for G1 and Gm+1) which are connected to three scanning lines. That is, in a case when displaying the two pieces of input viewpoint image data of 4 rows×6 columns shown in FIG. 125, it is required to have a data region of thirty-six sub-pixels (4×3 (color)×3 (scanning line)=36). In a case where the display part is configured with sub-pixels of n-rows and m-columns, it is required to have a data region of "n×3" sub-pixels.

In the above, the eleventh exemplary embodiment has been described by referring to the case where the image separating device is so arranged that the sub-pixels on the odd-numbered columns of the display part 250 are M2 (for the right eye) and the sub-pixels on the even-numbered columns are M1 (for the left eye), as show in FIG. 70. However, the exemplary embodiment can be applied even when the image separating device is so arranged that the sub-pixels on the odd-numbered columns of the display part 250 are M1 (for the left eye) and the sub-pixels on the even-numbered columns are M2 (for the right eye), as show in FIG. 82. However, in the case where the image separating device is arranged as in FIG. 82, it is necessary to change the transfer order of the viewpoint images M1, M2 and to execute data transfer from the first column of M1.

Figure 126B:
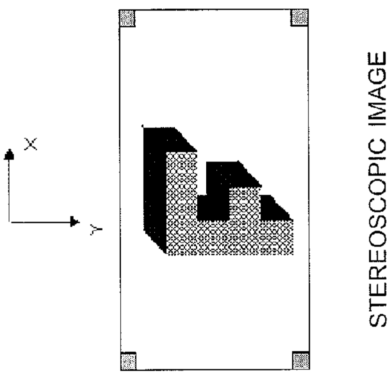
Figure 126A:
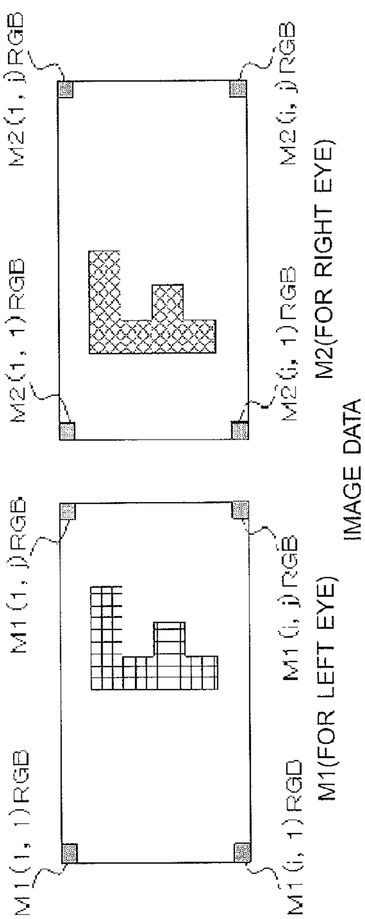
Figure 126C:
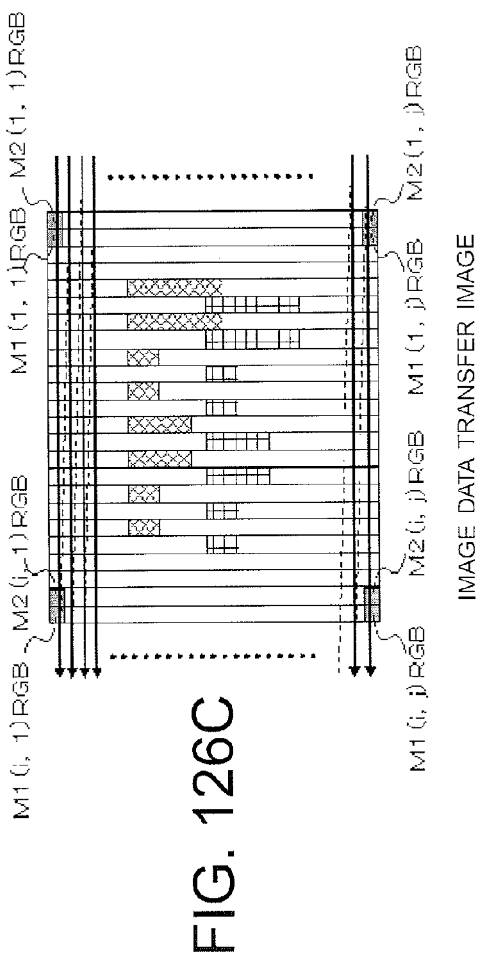

Further, in order to reduce the region of the image memory, the eleventh exemplary embodiment uses the transfer form of the input image data shown in FIG. 124. However, the transfer form of the input image data is not limited only to that. For example, a transfer form shown in FIG. 126 may be used. The transfer form shown in FIG. 126 is a method which transfers the viewpoint images M1 and M2 alternately in a pixel data unit. However, in the case of the transfer method shown in FIG. 126, it is necessary to increase the memory capacity compared to the case of the transfer form shown in FIG. 124.

Furthermore, while the eleventh exemplary embodiment has been described by referring to the display device of N=2 as in the case of the ninth exemplary embodiment, it is also possible to apply the eleventh exemplary embodiment to the display device of the tenth exemplary embodiment having three or more viewpoints (N=3 or larger). In the case where N is 3 or more, the viewpoint image may be transferred by each column in accordance with the corresponding order of the viewpoint images on the display part determined due to the layout of the image separating device.

(Effects)

With the eleventh exemplary embodiment, the image memory can be reduced down to the line memory which corresponds to the sub-pixel data for three scanning lines. Thus, the circuit scale of the display controller can be reduced greatly, thereby making it possible to cut the cost. Furthermore, the size can be reduced as well. For example, the number of alternatives regarding the places to have the display controller loaded can be increased, e.g., the display controller can be built-in to the data-line driving circuit.

Twelfth Exemplary Embodiment

The structure of a display device according to a twelfth exemplary embodiment of the present invention will be described. The structure of the twelfth exemplary embodiment is the same as that of the eleventh exemplary embodiment shown in FIG. 123 of the eleventh exemplary embodiment which uses the line memory. However, the transfer method of the input image data, rearranging processing of the image data, and the driving method of the display panel are different with respect to those of the eleventh exemplary embodiment.

The transfer form of the input image data used in the twelfth exemplary embodiment will be described by referring to FIG. 127. As in the case of FIG. 124A, FIG. 127A shows viewpoint images M1 and M2 each configured with pixel data of i-rows and j-columns, and the pixel data carries three-color luminance information. As in the case of FIG. 124B, FIG. 127B shows a stereoscopic image. FIG. 127C is a transfer images of the viewpoint images M1 and M2 shown in FIG. 127A.

Figures 127A, 127B, 127C:
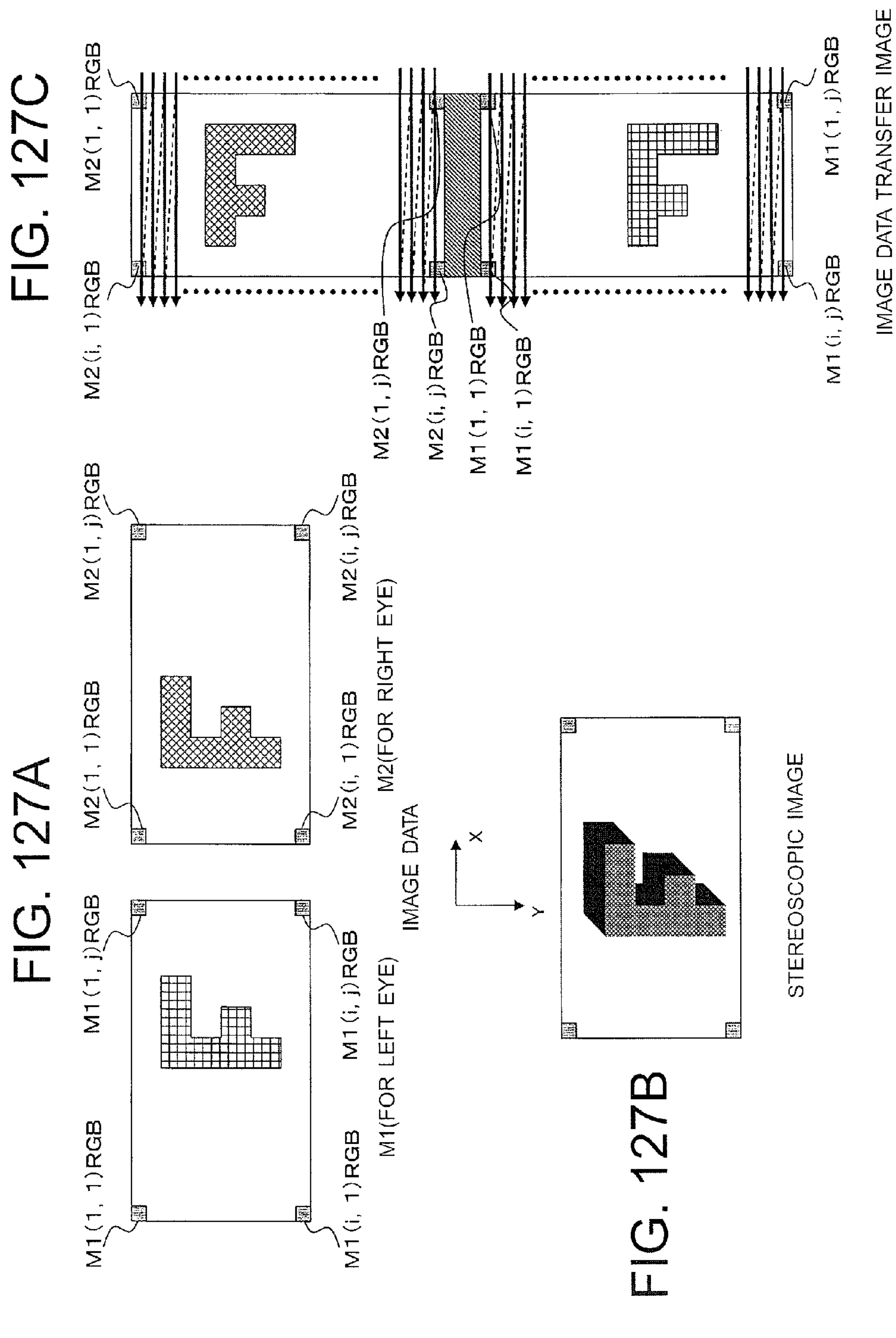

As shown in FIG. 127C, the transfer form of the input image data according to the twelfth exemplary embodiment is a method which transfers data by a viewpoint image unit, which is the so-called a frame time-division transfer form. FIG. 127C shows a case where the pixel data of the viewpoint image M1 is transferred following the transfer of the viewpoint image M2. As described in the eleventh exemplary embodiment, the viewpoint image data is transferred by each column also in the twelfth exemplary embodiment for enabling the processing by the line memory. As shown in FIG. 127C, when the data transfer is started from "M2 (1, 1) RGB", the data transfer is then executed as in "M2 (2, 1) RGB", "M2 (3, 1) RGB", - - - . When it reaches to "M2 (i, 1) RGB", the data is transferred in order of "M2 (1, 2) RGB", "M2 (2, 2) RGB", "M2 (3, 2) RGB", - - - , "M2 (i, 2) RGB". When the transfer is repeated in the same manner and the data transfer of viewpoint image on the j-th column, M2 (i, j) RGB, is completed, the data transfer of the viewpoint image M1 is started from "M1 (1, 1) RGB". Then, the data transfer on the first column is executed as in "M1 (2, 1) RGB", "M1 (3, 1) RGB", - - - "M1 (i, 1) RGB". In the same manner, data transfer is executed on the second column, the third column, - - - . Thereby, the data transfer of the viewpoint image M1 up to the j-th column, "M1 (i, j) RGB", is completed.

Figure 128:
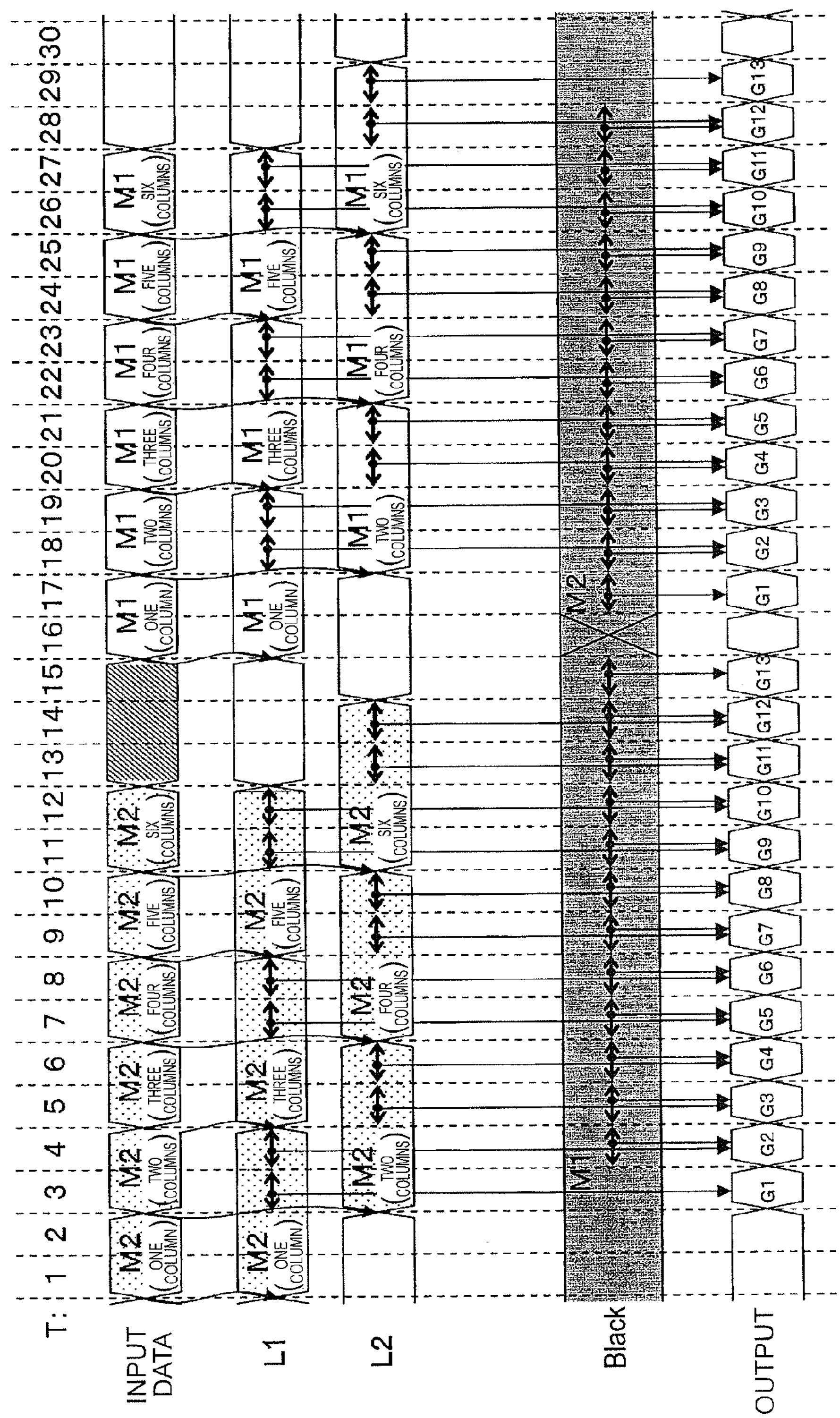

Next, the image data rearranging processing and driving method according to the twelfth exemplary embodiment will be described by referring to FIG. 128. As an example of the actions of the twelfth exemplary embodiment, used is a case where the image separating device (230) is disposed to the display part (FIG. 123) as in the case of FIG. 70, and the display panel 220 win the layout pattern of FIG. 71 is driven. FIG. 128 shows timings for outputting synthesized image data to the display panel in a scanning line unit when the image data of viewpoint images M1, M2 configured with 4 rows×6 columns of pixels shown in FIG. 69 is inputted according to the above-described transfer method (FIG. 127C). "T" in FIG. 128 shows one scanning period of the display panel, and input data shows transfer of the viewpoint images M1 and M2 shown in FIG. 69 in a column unit. L1 and L2 are line memories which can store each of inputted viewpoint image data for one column.

The twelfth exemplary embodiment does not use the image memory to which all the input image data can be written and saved. Thus, as shown in FIG. 128, all the scanning lines of the display panel are scanned in every transfer period of input image data for one viewpoint. At the time of scanning, among the sub-pixels connected to the selected scanning line, data is read out from the line memory for the viewpoint sub-pixel whose data is stored in the line memory. For the viewpoint sub-pixels whose data is not stored in the line memory, data with which the viewpoint image display thereof becomes black display (minimum luminance display) is outputted. "Black" in FIG. 128 shows the data which provides black display. FIG. 128 will be described in detail. The data of M2 on the first column is stored in L1 in a period of T=1 and a period of T=2 (abbreviated as T1 and T2 hereinafter). Subsequently, in T3 and T4, the line data output processing (FIG. 94-FIG. 101) described in the ninth exemplary embodiment is executed by using the data stored in L1. At this time, if "k" takes a value designating M1 in step S5720 shown in FIG. 95, the black data mentioned earlier is supplied to PD. Further, in T3 and T4, the data of M2 on the second column is stored to L2 in parallel with the output action of the synthesized image data of the scanning lines G1 and G2. Then, in T5 and T6, the synthesized image data of the scanning lines G3 and G4 are outputted through the same processing described above by using the data stored in L2. Further, the readout action of the data of M2 on the first column stored in L1 is completed in T4, so that the data of M2 on the third column is stored to L1 in T5 and T6. Thereafter, the same processing described above is repeated, and output of the synthesized image data up to the scanning line G13 is completed in T15. The input data from T13 to T15 is shown with oblique lines as invalid data, which is the so-called blacking period. Then, the data of M1 on the first column is stored to L1 in a period of T16 and T17. Further, the line data output processing (FIG. 94-FIG. 101) for the scanning line G1 is started from T17. At this time, as described earlier, if "k" takes a value designating M2 in step S5720 shown in FIG. 95, the black data mentioned earlier is supplied to PD. Subsequently, in T18 and T19, synthesized image data of the scanning lines G2 and G3 are outputted by using the data stored in L1. Further, the data of M1 on the second column is stored to L2 in parallel to this output action. Thereafter, the same processing described above is repeated, and output of the synthesized image data up to the scanning line G13 is completed in T29.

Figure 129:
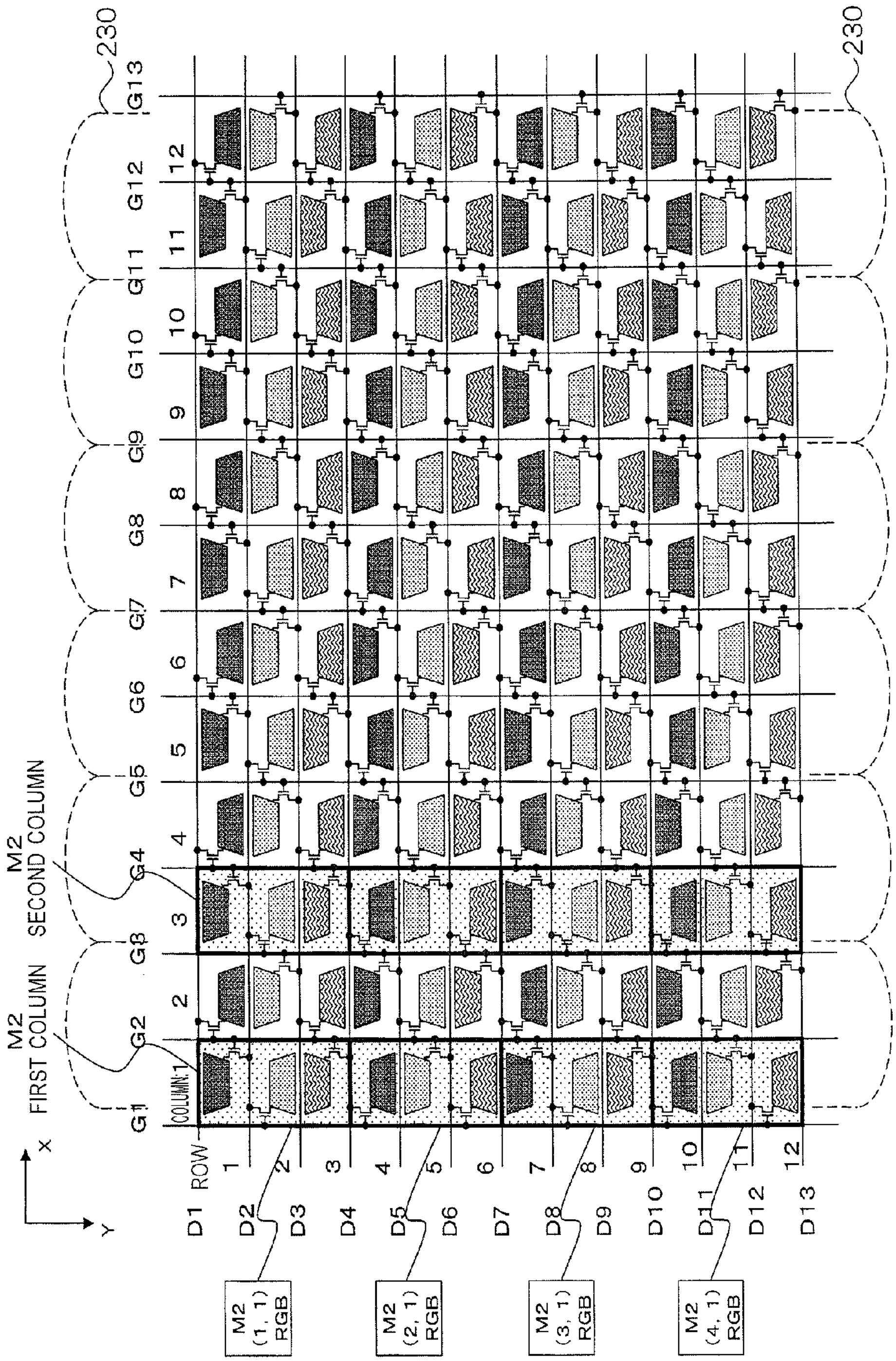

In the twelfth exemplary embodiment operated in the manner described above, the required memory region for the image data is the capacity of the line memories L1, L2 of FIG. 128, i.e., for two columns of inputted viewpoint image data. FIG. 129 shows the corresponding relation between the first column, the second column of the second viewpoint image data M2 shown in FIG. 69 and the sub-pixels of the display panel with the layout pattern shown in FIG. 71. From FIG. 129, the memory region for the image data required in the twelfth exemplary embodiment can be expressed as the number of the sub-pixels that are connected to two scanning lines (except for G1 and Gm+1). In other words, the required memory region is "n×2" sub-pixels when the display part is configured with sub-pixels of n-rows and m-columns.

In the above, the twelfth exemplary embodiment has been described by referring to the case where the image separating device is so arranged that the sub-pixels on the odd-numbered columns of the display part 250 (FIG. 123) are M2 (for the right eye) and the sub-pixels on the even-numbered columns are M1 (for the left eye), as shown in FIG. 70. However, the exemplary embodiment can be applied even when the image separating device is so arranged that the sub-pixels on the odd-numbered columns of the display part 250 (FIG. 123) are M1 (for the left eye) and the sub-pixels on the even-numbered columns are M2 (for the right eye), as shown in FIG. 82. Further, while the twelfth exemplary embodiment has been described by referring to the case of the display part that is formed in the layout pattern of FIG. 71, the exemplary embodiment is not limited only to that. As described in the ninth exemplary embodiment, the twelfth exemplary embodiment can be applied to various layout patterns based on the regularity of the sub-pixel layout and settings of the parameters.

(Effects)

With the twelfth exemplary embodiment, the image memory can be reduced down to the line memory which corresponds to the sub-pixel data for two scanning lines. Thus, the circuit scale of the display controller can be reduced greatly, thereby making it possible to cut the cost. Furthermore, the size can be reduced as well. For example, the number of alternatives regarding the places to have the display controller loaded can be increased, e.g., the display controller can be built-in to the data-line driving circuit.

Thirteenth Exemplary Embodiment

The structure of a display device according to a thirteenth exemplary embodiment of the present invention will be described. The thirteenth exemplary embodiment uses the same input image data transfer form (the so-called frame time-division transfer form) as that of the twelfth exemplary embodiment, and uses the line memory corresponding to the sub-pixel data for two scanning lines as the image memory as in the case of the twelfth exemplary embodiment. The structure of the data-line driving circuit for driving the data lines is different with respect to the twelfth exemplary embodiment. The data-line driving circuit used in the thirteenth exemplary embodiment alternately drives the odd-numbered data lines and the even-numbered data lines on the display part to be in a high-impedance state.

Figure 130:
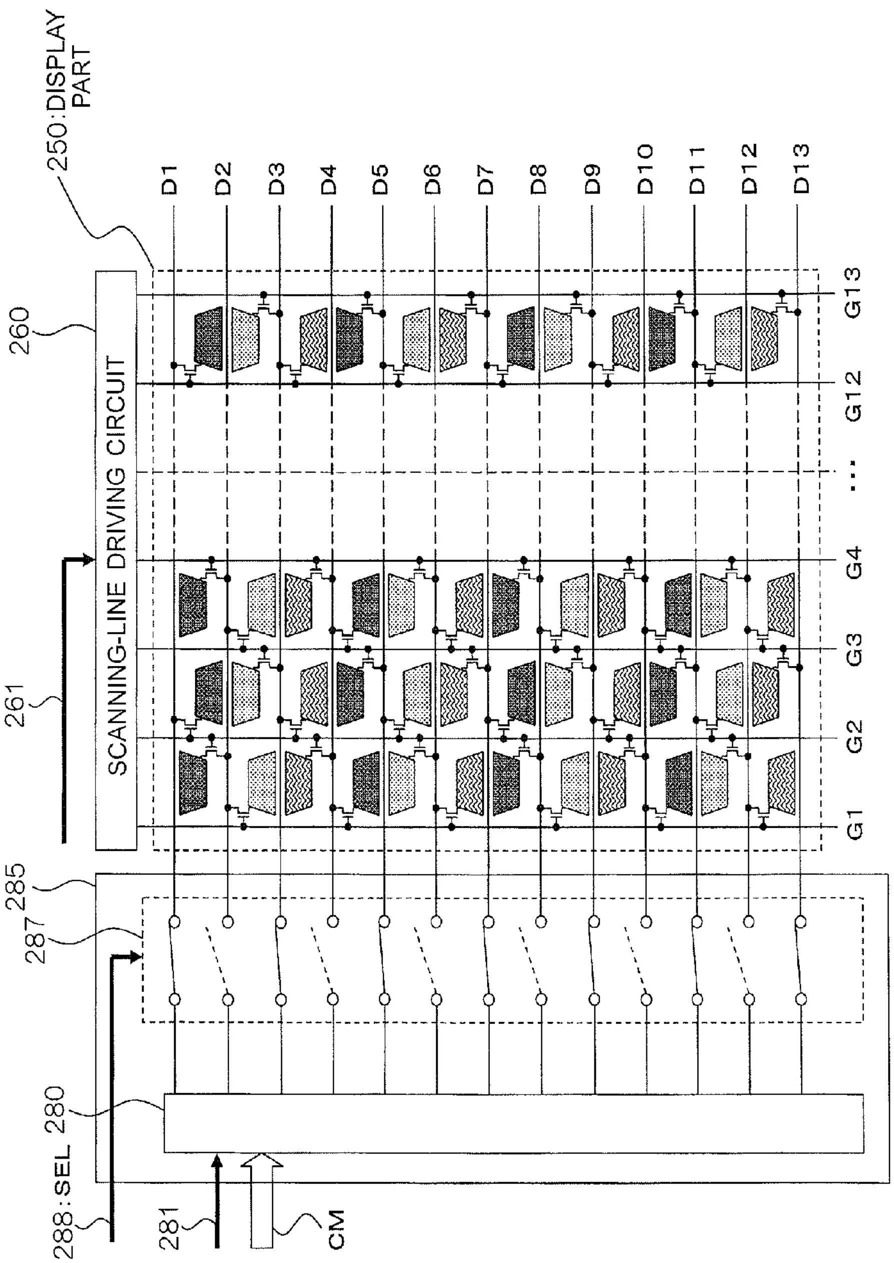

The structure of the thirteenth exemplary embodiment will be described by referring to FIG. 130. FIG. 130 shows a display panel 20 (FIG. 123) which uses a data-line driving circuit 285 which is different from that of the twelfth exemplary embodiment. Explanations of the structural components that are the same as those of the third and twelfth exemplary embodiments shown in FIG. 124 are omitted by applying the same reference numerals thereto. An example of the data-line driving circuit used in the thirteenth exemplary embodiment shown in FIG. 130 is structured by adding an selection circuit 287 on the output side of the data-line driving circuit 280 (simply referred to as "circuit 280" hereinafter) used in other exemplary embodiments. The selection circuit 287 includes a switch function which changes over connection/disconnection for odd-numbered outputs and even-numbered outputs in accordance with a signal SEL 288. FIG. 130 shows a state where the odd-numbered outputs are connected and the even-numbered outputs are disconnected. The data lines disconnected from the outputs of the circuit 280 by the selection circuit 287 come under a high-impedance state.

Figure 131:
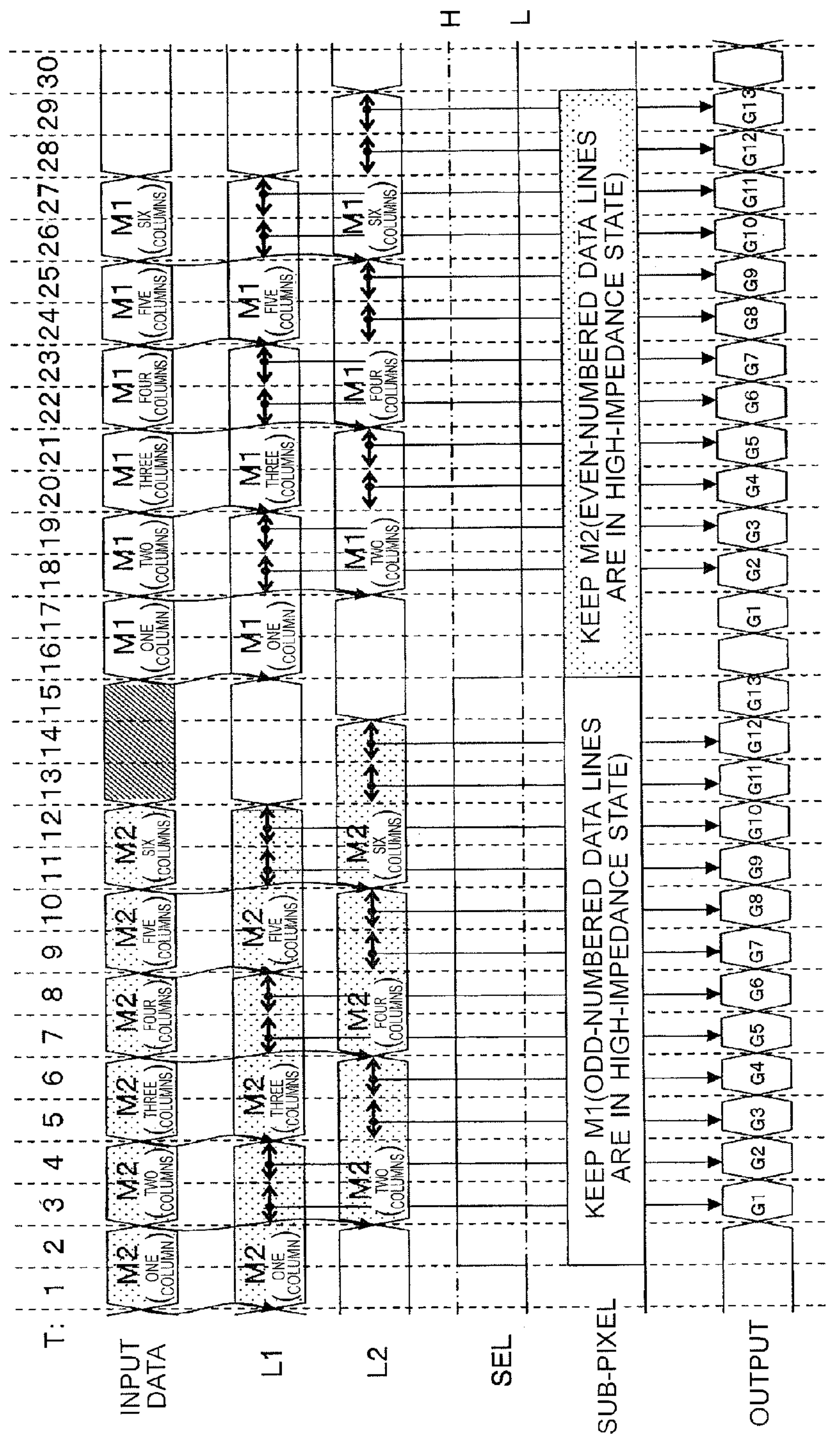

Next, actions of the thirteenth exemplary embodiment will be described by referring to FIG. 131. FIG. 131 shows a timing chart for outputting the synthesized image data to the display panel in a scanning line unit when the image data of viewpoint images M1, M2 configured with 4 rows×6 columns of pixels shown in FIG. 69 are inputted according to the transfer method of FIG. 127C, as in FIG. 128 used for the twelfth exemplary embodiment. The display part 250 is formed with the layout pattern show in FIG. 71, and it is assumed that the image separating device is disposed as in FIG. 70.

"T", the input data, the line memories L1, L2, and the outputs in FIG. 131 are the same as those of FIG. 128 described in the twelfth exemplary embodiment, so that explanations thereof are omitted by applying the same reference numerals thereto. SEL in FIG. 131 is a signal which controls the selection circuit 287 shown in FIG. 130. When SEL=H, the outputs of the circuit 280 and the even-numbered data lines are connected, and the even-numbered data lines come to be in a high-impedance state. When SEL=L, the relation of the odd-numbered data lines and the even-numbered data lines is switched over.

When SEL becomes H in T2, the odd-numbered data lines come to be in a high-impedance sate. Then, in T3 and T4, the synthesized image data of the scanning lines G1 and G2 is outputted from the input data of M2 (first column) stored in the line memory L1. In this period, there is no input image data of M1 for generating the synthesized image data. However, in this example of the actions, the M1-viewpoint sub-pixels are connected to the odd-numbered data lines. In the sub-pixels connected to the odd-numbered data lines that are in the high-impedance state due to the state of SEL=H, writing of data is not executed even if the scanning line is selected. Thus, PD when "k" designates M1 is invalid when generating the synthesized image data, and black data may be supplied as in the case of the twelfth exemplary embodiment, for example. That is, the processing actions executed in the period from T2 to T6 are the same as the actions of the twelfth exemplary embodiment. Thus, explanations thereof are omitted.

When SEL becomes L in T16, the even-numbered data lines come to be in a high-impedance state. In this example of the actions, the M2-viewpoint sub-pixels are connected to the even-numbered data lines. In the sub-pixels connected to the high-impedance data lines, writing of data is not executed even if the scanning line is selected. Thus, the state where the data is written in the period from T3 to T14 is kept. Further, as described earlier, the processing actions regarding generation of the synthesized image data are the same as the actions of the twelfth exemplary embodiment. Thus, explanations thereof are omitted.

As described above, with the thirteenth exemplary embodiment, the high-impedance state of the even/odd-numbered data lines is repeated by every scanning period of all the scanning lines by corresponding to the viewpoint of the input image data. With this, data writing and keeping of the written state are repeated for every scanning period of all the scanning lines in a unit of each viewpoint sub-pixel. The required memory region for the image data is the capacity for the line memories L1, L2, i.e., for two columns of inputted viewpoint image data, as in the case of the twelfth exemplary embodiment. It can be expressed as the number of the sub-pixels that are connected to two scanning lines (except for G1 and Gm+1).

In the above, the data-line driving circuit configuring the thirteenth exemplary embodiment has been described by referring to FIG. 130. However, the thirteenth exemplary embodiment is not limited only to such case, as long as it has a function which can alternately drive the odd-numbered data lines and the even-numbered data lines on the display part to be in a high-impedance state. For example, it is possible to employ the structure of a data-line driving circuit shown in FIG. 132. FIG. 132 shows a case where the structure of the selection circuit 287 is changed into the structure of a selection circuit 289. In this case, the number of outputs of the circuit 280 shown in FIG. 130 can be reduced to a half as in the circuit 286 shown in FIG. 132, so that the circuit scale can be reduced. Furthermore, it is also possible to employ the structure of a data-line driving circuit shown in FIG. 132, in which the structures of FIG. 130 and FIG. 132 are combined.

Further, while the thirteenth exemplary embodiment has been described by referring to the example shown in FIG. 130 which is configured with sub-pixels of 12 rows×12 columns, the display part is not limited only to such case. The display part is configured with sub-pixels of n-rows and m-columns. Further, while the thirteenth exemplary embodiment has been described by referring to the case where the image separating device is disposed to the display part as shown in FIG. 70, the image separating device may be disposed in the manner as shown in FIG. 82. Further, while the thirteenth exemplary embodiment has been described by referring to the case of the display part that is formed in the layout pattern of FIG. 71, the exemplary embodiment is not limited only to that. As described in the ninth exemplary embodiment, the thirteenth exemplary embodiment can be applied to various layout patterns based on the regularity of the sub-pixel layout and settings of the parameters.

(Effects)

With the thirteenth exemplary embodiment, the effect of reducing the image memory down to the line memory can be achieved as in the case of the twelfth exemplary embodiment. In addition, it is possible to provide a brighter display screen compared to the case of the twelfth exemplary embodiment, since the thirteenth exemplary embodiment does not provide black display.

While the present invention has been described above by referring to each of the exemplary embodiments, the present invention is not limited to each of those exemplary embodiments described above. Various changes and modifications that occurred to those skilled in art can be applied to the structures and details of the present invention. It is to be understood that the present invention includes forms that are mutual and proper combinations of a part of or a whole part of the structures of each of the exemplary embodiments.

INDUSTRIAL APPLICABILITY

The present invention can be applied to portable telephones, portable game machines, portable terminals, other general display devices (personal notebook computers, etc.), and the like.

What is claimed is:

1. A display controller for outputting synthesized image data to a display module which includes: a display part in which sub-pixels connected to data lines via switching devices controlled by scanning lines are arranged in n-rows and m-columns (m and n are natural numbers), which is driven by (n+1) pieces of data lines and (m+1) pieces of the scanning lines; and an image separating device which directs light emitted from the sub-pixels towards a plurality of viewpoints in an extending direction of the data lines in a sub-pixel unit; the display controller comprising:

- an image memory which stores viewpoint image data for the plurality of viewpoints;
- a writing control device which writes the viewpoint image data inputted from outside to the image memory; and
- a readout control device which reads out the viewpoint image data from the image memory according to a readout order corresponding to the display module, and outputs the readout data to the display module as the synthesized image data,
- wherein the readout order corresponding to the display module is a readout order that is obtained from a repeating regulation that is determined based on a positional relation between the image separating device and the display part as well as layout of the sub-pixels, number of colors, and layout of the colors,
- wherein:
- the display part is formed by having an up-and-down sub-pixel pair that is formed with two of the sub-pixels arranged by sandwiching one data line as a basic unit;
- the switching devices provided respectively to the two sub-pixels are connected in common to the data line sandwiched by the two sub-pixels, and are controlled by different scanning lines from each other; and the up-and-down sub-pixel pairs neighboring to each other in the extending direction of the data lines are so disposed that the switching devices thereof are connected to the different data lines from each other, and wherein:

the number of colors of the sub-pixels are three colors of a first color, a second color, and a third color;

provided that “y” is a natural number, one of the colors of two sub-pixels of the up-and-down sub-pixel pair connected to y-th data line is the first color and the other color is the second color, the pair forming either an even-numbered column or an odd-numbered column of the display part;

one of the colors of two sub-pixels of the up-and-down sub-pixel pair connected to (y+1)-th data line is the second color and the other color is the third color, the pair forming the other one of the even-numbered column or the odd-numbered column of the display part;

one of the colors of two sub-pixels of the up-and-down sub-pixel pair connected to (y+2)-th data line is the third color and the other color is the first color, the pair forming either an even-numbered column or an odd-numbered column of the display part;

one of the colors of two sub-pixels of the up-and-down sub-pixel pair connected to (y+3)-th data line is the first color and the other color is the second color, the pair forming the other one of the even-numbered column or the odd-numbered column of the display part;

one of the colors of two sub-pixels of the up-and-down sub-pixel pair connected to (y+4)-th data line is the second color and the other color is the third color, the pair forming either an even-numbered column or an odd-numbered column of the display part;

one of the colors of two sub-pixels of the up-and-down sub-pixel pair connected to (y+5)-th data line is the third color and the other color is the first color, the pair forming the other one of the even-numbered column or the odd-numbered column of the display part; and in a following readout order from the image memory, the readout control device:

reads out the first color and the second color by corresponding to the y-th data line, and reads out a viewpoint image which corresponds to one of the even-numbered column or the odd-numbered column of the display part;

reads out the second color and the third color by corresponding to the (y+1)-th data line, and reads out a viewpoint image which corresponds to the other one of the even-numbered column or the odd-numbered column of the display part;

reads out the third color and the first color by corresponding to the (y+2)-th data line, and reads out a viewpoint image which corresponds to one of the even-numbered column or the odd-numbered column of the display part;

reads out the first color and the second color by corresponding to the (y+3)-th data line, and reads out a viewpoint image which corresponds to the other one of the even-numbered column or the odd-numbered column of the display part;

reads out the second color and the third color by corresponding to the (y+4)-th data line, and reads out a viewpoint image which corresponds to one of the even-numbered column or the odd-numbered column of the display part;

reads out the third color and the first color by corresponding to the (y+5)-th data line, and reads out a viewpoint image which corresponds to the other one of the even-numbered column or the odd-numbered column of the display part.

2. The display controller as claimed in claim 1, further comprising a parameter storage device which stores parameters showing a positional relation between the first image separating device and the display part as well as the layout of the sub-pixels, the number of colors, and the layout of the colors.

3. The display controller as claimed in claim 1, further comprising an input data rearranging device which rearranges the viewpoint image data for three viewpoints or more inputted from outside into the viewpoint image data for two viewpoints, wherein the writing control device has a function which writes the viewpoint image data that is rearranged by the input data rearranging device into the image memory, instead of writing the viewpoint image data inputted from outside.

4. The display controller as claimed in claim 1, wherein the image memory includes a memory region at least for the sub-pixels of n-rows×2 columns.

5. A display device, comprising:

the display controller claimed in claim 1; and the display module.

6. An image processing method for generating synthesized image data to be outputted to a display module which includes: a display part in which sub-pixels connected to data lines via switching devices controlled by scanning lines are arranged in n-rows and m-columns (m and n are natural numbers), which is driven by (n+1) pieces of data lines and (m+1) pieces of the scanning lines; and an image separating device which directs light emitted from the sub-pixels towards a plurality of viewpoints in an extending direction of the data lines in a sub-pixel unit; the image processing method comprising:

inputting viewpoint image data for the plurality of viewpoints from outside, and writing the data into an image memory;

reading out the viewpoint image data from the image memory according to a readout order corresponding to the display module; and outputting the readout viewpoint image data to the display module as the synthesized image data, wherein the readout order corresponding to the display module is a readout order that is obtained from a repeating regulation that is determined based on a positional relation between the image separating device and the display part as well as layout of the sub-pixels, number of colors, and layout of the colors, and wherein:

the display part is formed by having an up-and-down sub-pixel pair that is formed with two of the sub-pixels arranged by sandwiching one data line as a basic unit;

the switching devices provided respectively to the two sub-pixels are connected in common to the data line sandwiched by the two sub-pixels, and are controlled by the different scanning lines from each other;

the up-and-down sub-pixel pairs neighboring to each other in the extending direction of the data lines are so disposed that the switching devices thereof are connected by the different data lines from each other;

the number of colors of the sub-pixels are three colors of a first color, a second color, and a third color;

provided that “y” is a natural number, one of the colors of two sub-pixels of the up-and-down sub-pixel pair connected to y-th data line is the first color and the other color is the second color, the pair forming either an even-numbered column or an odd-numbered column of the display part;

one of the colors of two sub-pixels of the up-and-down sub-pixel pair connected to (y+1)-th data line is the second color and the other color is the third color, the pair forming the other one of the even-numbered column or the odd-numbered column of the display part;

one of the colors of two sub-pixels of the up-and-down sub-pixel pair connected to (y+2)-th data line is the third color and the other color is the first color, the pair forming either an even-numbered column or an odd-numbered column of the display part;

one of the colors of two sub-pixels of the up-and-down sub-pixel pair connected to (y+3)-th data line is the first color and the other color is the second color, the pair forming the other one of the even-numbered column or the odd-numbered column of the display part;

one of the colors of two sub-pixels of the up-and-down sub-pixel pair connected to (y+4)-th data line is the second color and the other color is the third color, the pair forming either an even-numbered column or an odd-numbered column of the display part;

one of the colors of two sub-pixels of the up-and-down sub-pixel pair connected to (y+5)-th data line is the third color and the other color is the first color, the pair forming the other one of the even-numbered column or the odd-numbered column of the display part, the image processing method comprising, according to a following readout order from the image memory:

reading out the first color and the second color by corresponding to the y-th data line, and reading out a viewpoint image which corresponds to one of the even-numbered column or the odd-numbered column of the display part;

reading out the second color and the third color by corresponding to the (y+1)-th data line, and reading out a viewpoint image which corresponds to the other one of the even-numbered column or the odd-numbered column of the display part;

reading out the third color and the first color by corresponding to the (y+2)-th data line, and reading out a viewpoint image which corresponds to one of the even-numbered column or the odd-numbered column of the display part;

reading out the first color and the second color by corresponding to the (y+3)-th data line, and reading out a viewpoint image which corresponds to the other one of the even-numbered column or the odd-numbered column of the display part;

reading out the second color and the third color by corresponding to the (y+4)-th data line, and reading out a viewpoint image which corresponds to one of the even-numbered column or the odd-numbered column of the display part;

reading out the third color and the first color by corresponding to the (y+5)-th data line, and reading out a viewpoint image which corresponds to the other one of the even-numbered column or the odd-numbered column of the display part.

7. The image processing method as claimed in claim 6, comprising:

storing parameters showing a positional relation between the image separating device and the display part as well as layout of the sub-pixels, number of colors, and layout of the color into a parameter storage device; and reading out the viewpoint image data from the image memory according to a readout order obtained from a repeating regulation that is determined based on the parameters read out from the parameter storage device.

8. A non-transitory computer readable recording medium storing an image processing program for generating synthesized image data to be outputted to a display module which includes: a display part in which sub-pixels connected to data lines via switching devices controlled by scanning lines are arranged in n-rows and m-columns (m and n are natural numbers), which is driven by (n+1) pieces of data lines and (m+1) pieces of the scanning lines; and an image separating device which directs light emitted from the sub-pixels towards a plurality of viewpoints in an extending direction of the data lines in a sub-pixel unit; the image processing program causing a computer to execute:

a procedure for inputting viewpoint image data for the plurality of viewpoints from outside, and writing the data into an image memory;

a procedure for reading out the viewpoint image data from the image memory according to a readout order corresponding to the display module; and a procedure for outputting the readout viewpoint image data to the display module as the synthesized image data, wherein the readout order corresponding to the display module is a readout order that is obtained from a repeating regulation that is determined based on a positional relation between the image separating device and the display part as well as layout of the sub-pixels, number of colors, and layout of the colors, and wherein:

when the display part is formed by having an up-and-down sub-pixel pair that is formed with two of the sub-pixels arranged by sandwiching one data line as a basic unit;

the switching devices provided respectively to the two sub-pixels are connected in common to the data line sandwiched by the two sub-pixels, and are controlled by the different scanning lines from each other;

the up-and-down sub-pixel pairs neighboring to each other in the extending direction of the data lines are so disposed that the switching devices thereof are connected by the different data lines from each other;

the number of colors of the sub-pixels are three colors of a first color, a second color, and a third color;

provided that “y” is a natural number, one of the colors of two sub-pixels of the up-and-down sub-pixel pair connected to y-th data line is the first color and the other color is the second color, the pair forming either an even-numbered column or an odd-numbered column of the display part;

one of the colors of two sub-pixels of the up-and-down sub-pixel pair connected to (y+1)-th data line is the second color and the other color is the third color, the pair forming the other one of the even-numbered column or the odd-numbered column of the display part;

one of the colors of two sub-pixels of the up-and-down sub-pixel pair connected to (y+2)-th data line is the third color and the other color is the first color, the pair forming either an even-numbered column or an odd-numbered column of the display part;

one of the colors of two sub-pixels of the up-and-down sub-pixel pair connected to (y+3)-th data line is the first color and the other color is the second color, the pair forming the other one of the even-numbered column or the odd-numbered column of the display part;

one of the colors of two sub-pixels of the up-and-down sub-pixel pair connected to (y+4)-th data line is the second color and the other color is the third color, the pair forming either an even-numbered column or an odd-numbered column of the display part;

one of the colors of two sub-pixels of the up-and-down sub-pixel pair connected to (y+5)-th data line is the third color and the other color is the first color, the pair forming the other one of the even-numbered column or the odd-numbered column of the display part, the image processing program causes the computer to execute the procedures for reading out the viewpoint image data from the image memory according to the readout order in a following manner of:

reading out the first color and the second color by corresponding to the y-th data line, and reading out a viewpoint image which corresponds to one of the even-numbered column or the odd-numbered column of the display part;

reading out the second color and the third color by corresponding to the (y+1)-th data line, and reading out a viewpoint image which corresponds to the other one of the even-numbered column or the odd-numbered column of the display part;

reading out the third color and the first color by corresponding to the (y+2)-th data line, and reading out a viewpoint image which corresponds to one of the even-numbered column or the odd-numbered column of the display part;

reading out the first color and the second color by corresponding to the (y+3)-th data line, and reading out a viewpoint image which corresponds to the other one of the even-numbered column or the odd-numbered column of the display part;

reading out the second color and the third color by corresponding to the (y+4)-th data line, and reading out a viewpoint image which corresponds to one of the even-numbered column or the odd-numbered column of the display part;

reading out the third color and the first color by corresponding to the (y+5)-th data line, and reading out a viewpoint image which corresponds to the other one of the even-numbered column or the odd-numbered column of the display part.

* * * * *